US012578975B2

(12) United States Patent
Chen et al.

(10) Patent No.: US 12,578,975 B2
(45) Date of Patent: Mar. 17, 2026

(54) USER INTERFACES FOR INDICATING TIME

(71) Applicant: Apple Inc., Cupertino, CA (US)

(72) Inventors: Kevin W. Chen, Cupertino, CA (US); Diogo Jose Da Silva Valente Soares, Moss Beach, CA (US); Aurelio Guzman, San Jose, CA (US); Michael T. Nartey, San Jose, CA (US)

(73) Assignee: Apple Inc., Cupertino, CA (US)

( * ) Notice: Subject to any disclaimer, the term of this patent is extended or adjusted under 35 U.S.C. 154(b) by 54 days.

(21) Appl. No.: 18/368,521

(22) Filed: Sep. 14, 2023

(65) Prior Publication Data

US 2024/0134664 A1    Apr. 25, 2024
US 2024/0231854 A9    Jul. 11, 2024

Related U.S. Application Data

(60) Provisional application No. 63/537,809, filed on Sep. 11, 2023, provisional application No. 63/470,929, filed on Jun. 4, 2023, provisional application No. 63/462,216, filed on Apr. 26, 2023, provisional application No. 63/439,512, filed on Jan. 17, 2023, provisional application No. 63/407,123, filed on Sep. 15, 2022.

(51) Int. Cl.
    *G06F 9/451*       (2018.01)
    *G04G 9/00*       (2006.01)
    *G06T 13/80*       (2011.01)
(52) U.S. Cl.
    CPC ........... *G06F 9/451* (2018.02); *G04G 9/0064* (2013.01); *G06T 13/80* (2013.01)

(58) Field of Classification Search
    CPC ....... G06F 9/451; G06T 13/80; G04G 9/0064; G04G 9/007; G04G 21/08
    See application file for complete search history.

(56) References Cited

U.S. PATENT DOCUMENTS

| 872,200 | A | 11/1907 | Rowe |
|---|---|---|---|
| 3,148,500 | A | 9/1964 | Hayes |
| 3,633,354 | A | 1/1972 | Stemmler |
| 4,174,606 | A | 11/1979 | Masuda et al. |
| 4,355,380 | A | 10/1982 | Huguenin et al. |

(Continued)

FOREIGN PATENT DOCUMENTS

| AU | 2010249319 A1 | 6/2012 |
|---|---|---|
| AU | 2015101019 A4 | 9/2015 |

(Continued)

OTHER PUBLICATIONS

Decision to Grant received for European Patent Application No. 21728746.5, mailed on Feb. 6, 2025, 4 pages.

(Continued)

*Primary Examiner* — Daniel Samwel
(74) *Attorney, Agent, or Firm* — YHE Law LLP

(57) ABSTRACT

User interfaces for indicating time, displaying a user interface based on a day of the week, user interfaces that include a dynamic text string, user interfaces that include a customizable border complication, user interfaces that include a watch hand that changes color at predetermined times, and user interfaces that include a simulated lighting visual effect.

37 Claims, 52 Drawing Sheets

(56) References Cited

U.S. PATENT DOCUMENTS

| | | | |
|---|---|---|---|
| 4,597,674 A | 7/1986 | Thompson, III |
| 4,847,819 A | 7/1989 | Hong |
| 4,945,521 A | 7/1990 | Klaus |
| 5,124,959 A | 6/1992 | Yamazaki et al. |
| 5,208,790 A | 5/1993 | Sato et al. |
| 5,220,541 A | 6/1993 | Vuilleumier |
| 5,383,165 A | 1/1995 | Vaucher |
| 5,455,808 A | 10/1995 | Grupp et al. |
| 5,487,054 A | 1/1996 | Capps et al. |
| 5,508,979 A | 4/1996 | Eisenegger |
| 5,659,693 A | 8/1997 | Hansen et al. |
| 5,825,353 A | 10/1998 | Will |
| 5,845,257 A | 12/1998 | Fu et al. |
| 5,870,683 A | 2/1999 | Wells et al. |
| 5,892,519 A | 4/1999 | Hirai et al. |
| 5,986,655 A | 11/1999 | Chiu et al. |
| 5,999,195 A | 12/1999 | Santangeli |
| 6,043,818 A | 3/2000 | Nakano et al. |
| 6,084,598 A | 7/2000 | Chekerylla |
| 6,128,012 A | 10/2000 | Seidensticker et al. |
| 6,160,767 A | 12/2000 | Ho |
| 6,279,018 B1 | 8/2001 | Kudrolli et al. |
| 6,359,839 B1 | 3/2002 | Schenk et al. |
| 6,418,394 B1 | 7/2002 | Puolakanaho et al. |
| 6,441,824 B2 | 8/2002 | Hertzfeld et al. |
| 6,449,219 B1 | 9/2002 | Hepp et al. |
| 6,452,597 B1 | 9/2002 | Goldberg et al. |
| 6,477,117 B1 | 11/2002 | Narayanaswami et al. |
| 6,496,780 B1 | 12/2002 | Harris et al. |
| 6,525,997 B1 | 2/2003 | Narayanaswami et al. |
| 6,549,218 B1 | 4/2003 | Gershony et al. |
| 6,556,222 B1 | 4/2003 | Narayanaswami |
| 6,690,623 B1 | 2/2004 | Maano |
| 6,728,533 B2 | 4/2004 | Ishii et al. |
| 6,809,724 B1 | 10/2004 | Shiraishi et al. |
| 6,871,076 B2 | 3/2005 | Samn et al. |
| 7,203,380 B2 | 4/2007 | Chiu et al. |
| 7,257,254 B2 | 8/2007 | Tunney et al. |
| 7,515,509 B2 | 4/2009 | Klein et al. |
| 7,515,903 B1 | 4/2009 | Cast |
| 7,593,755 B2 | 9/2009 | Colando et al. |
| 7,637,204 B2 | 12/2009 | Sumser et al. |
| 7,716,057 B2 | 5/2010 | Horvitz |
| 7,751,285 B1 | 7/2010 | Cain et al. |
| 7,843,769 B2 | 11/2010 | Ishida et al. |
| 7,898,542 B1 | 3/2011 | Yu et al. |
| 7,907,476 B2 | 3/2011 | Lee |
| 8,059,491 B1 | 11/2011 | Hennings-Kampa |
| D661,612 S | 6/2012 | Hsu et al. |
| 8,364,855 B2 | 1/2013 | James et al. |
| 8,405,663 B2 | 3/2013 | Wikkerink et al. |
| 8,588,033 B2 | 11/2013 | Pozzo Di Borgo et al. |
| 8,595,649 B2 | 11/2013 | Sherrard et al. |
| 8,924,894 B1 | 12/2014 | Yaksick et al. |
| 8,963,894 B2 | 2/2015 | Klassen et al. |
| 9,070,092 B2 | 6/2015 | Shieh et al. |
| 9,082,314 B2 | 7/2015 | Tsai |
| 9,141,270 B1 | 9/2015 | Stuart et al. |
| 9,171,268 B1 | 10/2015 | Penilla et al. |
| 9,173,052 B2 | 10/2015 | Hauser et al. |
| 9,237,855 B2 | 1/2016 | Hong et al. |
| 9,259,615 B2 | 2/2016 | Weast et al. |
| 9,369,537 B1 | 6/2016 | Mathew et al. |
| 9,377,762 B2 | 6/2016 | Hoobler et al. |
| 9,459,781 B2 | 10/2016 | Kocienda et al. |
| 9,542,070 B2 | 1/2017 | Xu et al. |
| 9,547,425 B2 | 1/2017 | Kocienda et al. |
| 9,582,165 B2 | 2/2017 | Wilson et al. |
| 9,594,354 B1 | 3/2017 | Kahn et al. |
| 9,606,695 B2 | 3/2017 | Matas |
| 9,625,987 B1 | 4/2017 | Lapenna et al. |
| 9,638,730 B2 | 5/2017 | Umamoto |
| 9,794,397 B2 | 10/2017 | Min et al. |
| 9,839,363 B2 | 12/2017 | Albert |
| 10,019,599 B1 | 7/2018 | Moran et al. |
| 10,062,133 B1 | 8/2018 | Mishra et al. |
| 10,282,078 B2 | 5/2019 | Choi |
| 10,356,070 B2 | 7/2019 | Cha et al. |
| 10,620,590 B1 | 4/2020 | Guzman et al. |
| 10,643,246 B1 | 5/2020 | Suprasadachandran Pillai |
| 10,684,592 B2 | 6/2020 | Chang et al. |
| 10,721,711 B2 | 7/2020 | Kirov et al. |
| 10,788,797 B1 | 9/2020 | Guzman et al. |
| 10,817,981 B1 | 10/2020 | Belkin |
| 10,852,905 B1 | 12/2020 | Guzman et al. |
| 11,009,833 B2 | 5/2021 | Essery |
| 11,050,873 B2 | 6/2021 | Kim et al. |
| 11,061,372 B1 | 7/2021 | Chen et al. |
| 11,694,590 B2 | 7/2023 | Connor et al. |
| 11,847,949 B2 | 12/2023 | Huang et al. |
| 2001/0043514 A1 | 11/2001 | Kita et al. |
| 2002/0054066 A1 | 5/2002 | Kikinis et al. |
| 2002/0054157 A1 | 5/2002 | Hayashi et al. |
| 2002/0054541 A1 | 5/2002 | Hall et al. |
| 2002/0059623 A1 | 5/2002 | Rodriguez et al. |
| 2002/0081976 A1 | 6/2002 | Fujisawa et al. |
| 2002/0098857 A1 | 7/2002 | Ishii |
| 2002/0099452 A1 | 7/2002 | Kawai |
| 2002/0131331 A1 | 9/2002 | Molander et al. |
| 2003/0027621 A1 | 2/2003 | Libby et al. |
| 2003/0067497 A1 | 4/2003 | Pichon et al. |
| 2003/0135769 A1 | 7/2003 | Loughran |
| 2003/0140309 A1 | 7/2003 | Saito et al. |
| 2003/0157983 A1 | 8/2003 | Kobayashi et al. |
| 2003/0164847 A1 | 9/2003 | Zaima et al. |
| 2003/0214885 A1 | 11/2003 | Powell et al. |
| 2004/0001105 A1 | 1/2004 | Chew et al. |
| 2004/0017733 A1 | 1/2004 | Sullivan |
| 2004/0021699 A1 | 2/2004 | Fildebrandt et al. |
| 2004/0027396 A1 | 2/2004 | Lection |
| 2004/0047244 A1 | 3/2004 | Iino et al. |
| 2004/0075699 A1 | 4/2004 | Franchi et al. |
| 2004/0075700 A1 | 4/2004 | Liu et al. |
| 2004/0192332 A1 | 9/2004 | Samn |
| 2004/0203342 A1 | 10/2004 | Sibecas et al. |
| 2004/0218472 A1 | 11/2004 | Narayanaswami et al. |
| 2004/0225966 A1 | 11/2004 | Besharat et al. |
| 2005/0041667 A1 | 2/2005 | Miller et al. |
| 2005/0094492 A1 | 5/2005 | Rosevear et al. |
| 2005/0122543 A1 | 6/2005 | Walker |
| 2005/0124389 A1 | 6/2005 | Yang |
| 2005/0174216 A1 | 8/2005 | Lintell |
| 2005/0188856 A1 | 9/2005 | Sumser et al. |
| 2005/0190653 A1 | 9/2005 | Chen |
| 2005/0198319 A1 | 9/2005 | Chan et al. |
| 2005/0200611 A1 | 9/2005 | Goto et al. |
| 2005/0240786 A1 | 10/2005 | Ranganathan |
| 2005/0261031 A1 | 11/2005 | Seo et al. |
| 2005/0278757 A1 | 12/2005 | Grossman et al. |
| 2006/0007785 A1 | 1/2006 | Fernandez et al. |
| 2006/0020904 A1 | 1/2006 | Aaltonen et al. |
| 2006/0085765 A1 | 4/2006 | Peterson et al. |
| 2006/0092770 A1 | 5/2006 | Demas |
| 2006/0166708 A1 | 7/2006 | Kim et al. |
| 2006/0214935 A1 | 9/2006 | Boyd et al. |
| 2006/0239640 A1 | 10/2006 | Watanabe et al. |
| 2007/0006096 A1 | 1/2007 | Kim et al. |
| 2007/0021153 A1 | 1/2007 | Novak |
| 2007/0052851 A1 | 3/2007 | Ochs et al. |
| 2007/0094330 A1 | 4/2007 | Russell et al. |
| 2007/0113181 A1 | 5/2007 | Blattner et al. |
| 2007/0152979 A1 | 7/2007 | Jobs et al. |
| 2007/0192718 A1 | 8/2007 | Voorhees et al. |
| 2007/0213955 A1 | 9/2007 | Ishida et al. |
| 2007/0226653 A1 | 9/2007 | Moore et al. |
| 2007/0239754 A1 | 10/2007 | Schnitman et al. |
| 2007/0250772 A1 | 10/2007 | Milosevski |
| 2007/0279190 A1 | 12/2007 | Lugt et al. |
| 2007/0287140 A1 | 12/2007 | Liebowitz |
| 2008/0095470 A1 | 4/2008 | Chao et al. |
| 2008/0098031 A1 | 4/2008 | Ducharme |
| 2008/0127268 A1 | 5/2008 | Bergeron et al. |
| 2008/0130421 A1 | 6/2008 | Akaiwa et al. |
| 2008/0151700 A1 | 6/2008 | Inoue et al. |

(56) References Cited

U.S. PATENT DOCUMENTS

| | | |
|---|---|---|
| 2008/0168396 A1 | 7/2008 | Matas et al. |
| 2008/0186808 A1 | 8/2008 | Lee |
| 2008/0192021 A1 | 8/2008 | Lim et al. |
| 2008/0201438 A1 | 8/2008 | Mandre et al. |
| 2008/0246778 A1 | 10/2008 | Ham et al. |
| 2009/0007017 A1 | 1/2009 | Anzures et al. |
| 2009/0011821 A1 | 1/2009 | Griswold et al. |
| 2009/0016168 A1 | 1/2009 | Smith |
| 2009/0068984 A1 | 3/2009 | Burnett |
| 2009/0077497 A1 | 3/2009 | Cho et al. |
| 2009/0143114 A1 | 6/2009 | Vargas et al. |
| 2009/0164923 A1 | 6/2009 | Ovi et al. |
| 2009/0178007 A1 | 7/2009 | Matas et al. |
| 2009/0183080 A1 | 7/2009 | Thakkar et al. |
| 2009/0199130 A1 | 8/2009 | Tsern et al. |
| 2009/0201297 A1 | 8/2009 | Johansson |
| 2009/0233650 A1 | 9/2009 | Hosono |
| 2009/0249247 A1 | 10/2009 | Tseng et al. |
| 2009/0259958 A1 | 10/2009 | Ban |
| 2009/0287470 A1 | 11/2009 | Farnsworth et al. |
| 2009/0300146 A1 | 12/2009 | Park et al. |
| 2009/0300513 A1 | 12/2009 | Nims et al. |
| 2009/0305732 A1 | 12/2009 | Marcellino et al. |
| 2009/0327886 A1 | 12/2009 | Whytock et al. |
| 2009/0327897 A1 | 12/2009 | Serpico et al. |
| 2010/0026640 A1 | 2/2010 | Kim et al. |
| 2010/0064255 A1 | 3/2010 | Rottler et al. |
| 2010/0069035 A1 | 3/2010 | Johnson |
| 2010/0085203 A1 | 4/2010 | Kahn et al. |
| 2010/0107070 A1 | 4/2010 | Devineni et al. |
| 2010/0110082 A1 | 5/2010 | Myrick et al. |
| 2010/0124152 A1 | 5/2010 | Lee |
| 2010/0149573 A1 | 6/2010 | Pat et al. |
| 2010/0156833 A1 | 6/2010 | Kim et al. |
| 2010/0157742 A1 | 6/2010 | Relyea et al. |
| 2010/0205563 A1 | 8/2010 | Haapsaari et al. |
| 2010/0218089 A1 | 8/2010 | Chao et al. |
| 2010/0226213 A1 | 9/2010 | Drugge |
| 2010/0235726 A1 | 9/2010 | Ording et al. |
| 2010/0243516 A1 | 9/2010 | Martin et al. |
| 2010/0257469 A1 | 10/2010 | Kim et al. |
| 2010/0281374 A1 | 11/2010 | Schulz et al. |
| 2011/0000968 A1 | 1/2011 | Phillips et al. |
| 2011/0003665 A1 | 1/2011 | Burton et al. |
| 2011/0004835 A1 | 1/2011 | Yanchar et al. |
| 2011/0007611 A1 | 1/2011 | Kato et al. |
| 2011/0025719 A1 | 2/2011 | Yanase et al. |
| 2011/0026368 A1 | 2/2011 | Relyea |
| 2011/0029870 A1 | 2/2011 | May et al. |
| 2011/0047014 A1 | 2/2011 | De |
| 2011/0071818 A1 | 3/2011 | Jiang |
| 2011/0074807 A1 | 3/2011 | Inada et al. |
| 2011/0080411 A1 | 4/2011 | Wikkerink et al. |
| 2011/0115721 A1 | 5/2011 | Li et al. |
| 2011/0119610 A1 | 5/2011 | Hackborn et al. |
| 2011/0138329 A1 | 6/2011 | Wells et al. |
| 2011/0151415 A1 | 6/2011 | Darling et al. |
| 2011/0181521 A1 | 7/2011 | Reid et al. |
| 2011/0191661 A1 | 8/2011 | Phillips et al. |
| 2011/0197165 A1 | 8/2011 | Filippov et al. |
| 2011/0202834 A1 | 8/2011 | Mandryk et al. |
| 2011/0202883 A1 | 8/2011 | Oh et al. |
| 2011/0205851 A1 | 8/2011 | Harris |
| 2011/0218765 A1 | 9/2011 | Rogers et al. |
| 2011/0237221 A1 | 9/2011 | Prakash et al. |
| 2011/0256848 A1 | 10/2011 | Bok et al. |
| 2011/0275940 A1 | 11/2011 | Nims et al. |
| 2011/0281342 A1 | 11/2011 | Porsch et al. |
| 2011/0306421 A1 | 12/2011 | Nishimoto et al. |
| 2011/0316858 A1 | 12/2011 | Shen et al. |
| 2011/0320938 A1 | 12/2011 | Schorsch et al. |
| 2012/0017180 A1 | 1/2012 | Flik et al. |
| 2012/0028707 A1 | 2/2012 | Raitt et al. |
| 2012/0054651 A1 | 3/2012 | Tsai |
| 2012/0079375 A1 | 3/2012 | Ogino et al. |
| 2012/0084729 A1 | 4/2012 | Lin et al. |
| 2012/0092383 A1 | 4/2012 | Hysek et al. |
| 2012/0110438 A1 | 5/2012 | Peraza et al. |
| 2012/0113762 A1 | 5/2012 | Frost |
| 2012/0117507 A1 | 5/2012 | Tseng et al. |
| 2012/0124499 A1 | 5/2012 | Tsai et al. |
| 2012/0210263 A1 | 8/2012 | Perry et al. |
| 2012/0212495 A1 | 8/2012 | Butcher et al. |
| 2012/0218201 A1 | 8/2012 | Tamas et al. |
| 2012/0243735 A1 | 9/2012 | Wu et al. |
| 2012/0254804 A1 | 10/2012 | Sheha et al. |
| 2012/0297346 A1 | 11/2012 | Hoffknecht et al. |
| 2012/0304084 A1 | 11/2012 | Kim et al. |
| 2012/0324390 A1 | 12/2012 | Tao et al. |
| 2013/0019175 A1 | 1/2013 | Kotler et al. |
| 2013/0027412 A1 | 1/2013 | Roddy |
| 2013/0044080 A1 | 2/2013 | Chiang |
| 2013/0050263 A1 | 2/2013 | Khoe et al. |
| 2013/0057566 A1 | 3/2013 | Kriese et al. |
| 2013/0067407 A1 | 3/2013 | Dehmann |
| 2013/0069893 A1 | 3/2013 | Brinda et al. |
| 2013/0076757 A1 | 3/2013 | Pritting |
| 2013/0082965 A1 | 4/2013 | Wada et al. |
| 2013/0107674 A1 | 5/2013 | Gossweiler et al. |
| 2013/0111550 A1 | 5/2013 | Naveh et al. |
| 2013/0116967 A1 | 5/2013 | Akcasu et al. |
| 2013/0121119 A1 | 5/2013 | Umamoto |
| 2013/0132888 A1 | 5/2013 | Tijssen |
| 2013/0141371 A1 | 6/2013 | Hallford et al. |
| 2013/0143512 A1 | 6/2013 | Hernandez et al. |
| 2013/0157646 A1 | 6/2013 | Ferren et al. |
| 2013/0170324 A1 | 7/2013 | Tu et al. |
| 2013/0191785 A1 | 7/2013 | Wu et al. |
| 2013/0205194 A1 | 8/2013 | Decker et al. |
| 2013/0215044 A1 | 8/2013 | Ahn et al. |
| 2013/0225152 A1 | 8/2013 | Matthews et al. |
| 2013/0234964 A1 | 9/2013 | Kim et al. |
| 2013/0238686 A1 | 9/2013 | O'Donoghue et al. |
| 2013/0254705 A1 | 9/2013 | Mooring et al. |
| 2013/0305189 A1 | 11/2013 | Kim |
| 2013/0314204 A1 | 11/2013 | Ho et al. |
| 2013/0318437 A1 | 11/2013 | Jung et al. |
| 2013/0322218 A1 | 12/2013 | Burkhardt et al. |
| 2013/0326418 A1 | 12/2013 | Utsuki et al. |
| 2014/0013414 A1 | 1/2014 | Bruck et al. |
| 2014/0043367 A1 | 2/2014 | Sakaino et al. |
| 2014/0047389 A1 | 2/2014 | Aarabi |
| 2014/0047525 A1 | 2/2014 | Bonhoff |
| 2014/0055495 A1 | 2/2014 | Kim et al. |
| 2014/0059493 A1 | 2/2014 | Kim |
| 2014/0068755 A1 | 3/2014 | King et al. |
| 2014/0074570 A1 | 3/2014 | Hope et al. |
| 2014/0082533 A1 | 3/2014 | Kelley et al. |
| 2014/0101169 A1 | 4/2014 | Kurata et al. |
| 2014/0125620 A1 | 5/2014 | Panther et al. |
| 2014/0126336 A1 | 5/2014 | Goeller et al. |
| 2014/0129959 A1 | 5/2014 | Battles et al. |
| 2014/0135631 A1 | 5/2014 | Brumback et al. |
| 2014/0143671 A1 | 5/2014 | Kovalick |
| 2014/0143678 A1 | 5/2014 | Mistry et al. |
| 2014/0143737 A1 | 5/2014 | Mistry et al. |
| 2014/0157189 A1 | 6/2014 | Morita |
| 2014/0157321 A1 | 6/2014 | Kurita et al. |
| 2014/0164907 A1 | 6/2014 | Jung et al. |
| 2014/0173439 A1 | 6/2014 | Gutierrez et al. |
| 2014/0173517 A1 | 6/2014 | Chaudhri et al. |
| 2014/0189584 A1 | 7/2014 | Weng et al. |
| 2014/0244165 A1 | 8/2014 | Bells et al. |
| 2014/0245177 A1 | 8/2014 | Maklouf et al. |
| 2014/0250374 A1 | 9/2014 | Ohki et al. |
| 2014/0250391 A1 | 9/2014 | Jong et al. |
| 2014/0258935 A1 | 9/2014 | Nishida et al. |
| 2014/0267303 A1 | 9/2014 | Larkin et al. |
| 2014/0276244 A1 | 9/2014 | Kamyar |
| 2014/0282254 A1 | 9/2014 | Feiereisen et al. |
| 2014/0289660 A1 | 9/2014 | Min |
| 2014/0293755 A1 | 10/2014 | Geiser et al. |
| 2014/0302834 A1 | 10/2014 | Jones |
| 2014/0304664 A1 | 10/2014 | Lee et al. |

(56) References Cited

U.S. PATENT DOCUMENTS

| | | |
|---|---|---|
| 2014/0310350 A1 | 10/2014 | Borggaard et al. |
| 2014/0328151 A1 | 11/2014 | Serber |
| 2014/0331314 A1 | 11/2014 | Fujioka |
| 2014/0344951 A1 | 11/2014 | Brewer |
| 2014/0359124 A1 | 12/2014 | Adimatyam et al. |
| 2014/0365956 A1 | 12/2014 | Karunamuni et al. |
| 2014/0380229 A1 | 12/2014 | Volodin et al. |
| 2015/0011204 A1 | 1/2015 | Seo et al. |
| 2015/0015500 A1 | 1/2015 | Lee et al. |
| 2015/0019981 A1 | 1/2015 | Petitt et al. |
| 2015/0019982 A1 | 1/2015 | Petitt et al. |
| 2015/0022438 A1 | 1/2015 | Hong |
| 2015/0037545 A1 | 2/2015 | Sun |
| 2015/0042571 A1 | 2/2015 | Lombardi et al. |
| 2015/0043046 A1 | 2/2015 | Iwamoto |
| 2015/0049033 A1 | 2/2015 | Kim et al. |
| 2015/0052461 A1 | 2/2015 | Sullivan et al. |
| 2015/0055197 A1 | 2/2015 | Romanoff et al. |
| 2015/0062052 A1 | 3/2015 | Bernstein et al. |
| 2015/0070378 A1 | 3/2015 | Kriese et al. |
| 2015/0082193 A1 | 3/2015 | Wallace et al. |
| 2015/0082446 A1 | 3/2015 | Flowers et al. |
| 2015/0100621 A1 | 4/2015 | Pan |
| 2015/0105125 A1 | 4/2015 | Min et al. |
| 2015/0106221 A1 | 4/2015 | Tapley et al. |
| 2015/0106752 A1 | 4/2015 | Yang |
| 2015/0110419 A1 | 4/2015 | Xu et al. |
| 2015/0113468 A1 | 4/2015 | Clark |
| 2015/0117162 A1 | 4/2015 | Tsai et al. |
| 2015/0143234 A1 | 5/2015 | Norris, III |
| 2015/0160806 A1 | 6/2015 | Fey et al. |
| 2015/0160812 A1 | 6/2015 | Yuan et al. |
| 2015/0160856 A1 | 6/2015 | Jang et al. |
| 2015/0172438 A1 | 6/2015 | Yang |
| 2015/0173631 A1 | 6/2015 | Richards et al. |
| 2015/0185703 A1 | 7/2015 | Tanaka |
| 2015/0248235 A1 | 9/2015 | Offenberg et al. |
| 2015/0253736 A1 | 9/2015 | Watterson |
| 2015/0253740 A1 | 9/2015 | Nishijima et al. |
| 2015/0254875 A1 | 9/2015 | Zhang |
| 2015/0286372 A1 | 10/2015 | Swindell et al. |
| 2015/0301506 A1 | 10/2015 | Koumaiha |
| 2015/0301608 A1 | 10/2015 | Nagaraju et al. |
| 2015/0302624 A1 | 10/2015 | Burke |
| 2015/0317945 A1 | 11/2015 | Andress et al. |
| 2015/0331589 A1 | 11/2015 | Kawakita |
| 2015/0339261 A1 | 11/2015 | Jha et al. |
| 2015/0346694 A1 | 12/2015 | Hoobler et al. |
| 2015/0355830 A1 | 12/2015 | Chaudhri et al. |
| 2015/0366518 A1 | 12/2015 | Sampson |
| 2015/0370469 A1 | 12/2015 | Leong et al. |
| 2015/0379476 A1 | 12/2015 | Chaudhri et al. |
| 2016/0019360 A1 | 1/2016 | Pahwa et al. |
| 2016/0034133 A1 | 2/2016 | Wilson et al. |
| 2016/0034148 A1 | 2/2016 | Wilson et al. |
| 2016/0034152 A1 | 2/2016 | Wilson et al. |
| 2016/0034166 A1 | 2/2016 | Wilson et al. |
| 2016/0034167 A1 | 2/2016 | Wilson et al. |
| 2016/0041597 A1 | 2/2016 | Graham et al. |
| 2016/0044442 A1 | 2/2016 | Pacelli et al. |
| 2016/0048161 A1 | 2/2016 | Carceroni et al. |
| 2016/0048283 A1 | 2/2016 | Yang et al. |
| 2016/0054710 A1 | 2/2016 | Jo et al. |
| 2016/0054892 A1 | 2/2016 | Kim et al. |
| 2016/0058336 A1 | 3/2016 | Blahnik et al. |
| 2016/0058337 A1 | 3/2016 | Blahnik et al. |
| 2016/0062541 A1 | 3/2016 | Anzures et al. |
| 2016/0062572 A1 | 3/2016 | Yang et al. |
| 2016/0062582 A1 | 3/2016 | Wilson et al. |
| 2016/0070233 A1 | 3/2016 | Hiranuma et al. |
| 2016/0091867 A1 | 3/2016 | Mansour et al. |
| 2016/0098137 A1 | 4/2016 | Kim et al. |
| 2016/0103427 A1 | 4/2016 | Westra et al. |
| 2016/0132023 A1 | 5/2016 | Jung |
| 2016/0134840 A1 | 5/2016 | Mcculloch |
| 2016/0142763 A1 | 5/2016 | Kim et al. |
| 2016/0165037 A1 | 6/2016 | Youn et al. |
| 2016/0166197 A1 | 6/2016 | Venkatraman et al. |
| 2016/0179353 A1 | 6/2016 | Iskander |
| 2016/0187995 A1 | 6/2016 | Rosewall |
| 2016/0188179 A1 | 6/2016 | Roh |
| 2016/0188181 A1 | 6/2016 | Smith |
| 2016/0191511 A1 | 6/2016 | Tijerina et al. |
| 2016/0210934 A1 | 7/2016 | Halfman et al. |
| 2016/0259518 A1 | 9/2016 | King et al. |
| 2016/0259656 A1 | 9/2016 | Sumner et al. |
| 2016/0266548 A1 | 9/2016 | Akiyama |
| 2016/0299679 A1 | 10/2016 | Park et al. |
| 2016/0313869 A1 | 10/2016 | Jang et al. |
| 2016/0327911 A1 | 11/2016 | Eim et al. |
| 2016/0327915 A1 | 11/2016 | Katzer et al. |
| 2016/0341568 A1 | 11/2016 | Roush |
| 2016/0357151 A1 | 12/2016 | Block et al. |
| 2016/0357282 A1 | 12/2016 | Block et al. |
| 2016/0357386 A1 | 12/2016 | Choi |
| 2016/0358311 A1 | 12/2016 | Chen et al. |
| 2016/0378067 A1 | 12/2016 | Bishop |
| 2017/0003659 A1 | 1/2017 | Nakanishi |
| 2017/0011210 A1 | 1/2017 | Cheong et al. |
| 2017/0039535 A1 | 2/2017 | Park et al. |
| 2017/0045993 A1 | 2/2017 | Oh et al. |
| 2017/0046024 A1 | 2/2017 | Dascola et al. |
| 2017/0046052 A1 | 2/2017 | Lee et al. |
| 2017/0053542 A1 | 2/2017 | Wilson et al. |
| 2017/0068407 A1 | 3/2017 | Wilson et al. |
| 2017/0075305 A1 | 3/2017 | Ryu et al. |
| 2017/0082983 A1 | 3/2017 | Katzer et al. |
| 2017/0085887 A1 | 3/2017 | Rosewarne et al. |
| 2017/0105081 A1 | 4/2017 | Jin et al. |
| 2017/0123640 A1 | 5/2017 | Wilson et al. |
| 2017/0131886 A1 | 5/2017 | Kim et al. |
| 2017/0149795 A1 | 5/2017 | Day, II |
| 2017/0176950 A1 | 6/2017 | Jung et al. |
| 2017/0186399 A1 | 6/2017 | Moritani et al. |
| 2017/0230236 A1 | 8/2017 | Kim et al. |
| 2017/0255169 A1 | 9/2017 | Lee et al. |
| 2017/0269715 A1 | 9/2017 | Kim et al. |
| 2017/0286614 A1 | 10/2017 | Morris et al. |
| 2017/0286913 A1 | 10/2017 | Liu et al. |
| 2017/0322711 A1 | 11/2017 | Robinson et al. |
| 2017/0329477 A1 | 11/2017 | Sachidanandam et al. |
| 2017/0337554 A1 | 11/2017 | Mokhasi et al. |
| 2017/0354845 A1 | 12/2017 | Williams et al. |
| 2017/0357329 A1 | 12/2017 | Park et al. |
| 2017/0357426 A1 | 12/2017 | Wilson et al. |
| 2017/0357427 A1* | 12/2017 | Wilson .................. G06Q 10/109 |
| 2018/0039232 A1 | 2/2018 | Abramov et al. |
| 2018/0052428 A1 | 2/2018 | Abramov |
| 2018/0059809 A1 | 3/2018 | McClendon et al. |
| 2018/0059903 A1 | 3/2018 | Lim et al. |
| 2018/0061308 A1 | 3/2018 | Bae et al. |
| 2018/0067633 A1 | 3/2018 | Wilson et al. |
| 2018/0081515 A1 | 3/2018 | Block et al. |
| 2018/0088537 A1 | 3/2018 | Murai |
| 2018/0097925 A1 | 4/2018 | Ryu et al. |
| 2018/0121060 A1 | 5/2018 | Jeong et al. |
| 2018/0136810 A1 | 5/2018 | Martin et al. |
| 2018/0143748 A1 | 5/2018 | Ahmed et al. |
| 2018/0150212 A1 | 5/2018 | Chen et al. |
| 2018/0150443 A1 | 5/2018 | Singleton |
| 2018/0157452 A1 | 6/2018 | Nelson et al. |
| 2018/0181078 A1 | 6/2018 | Imamura |
| 2018/0188925 A1 | 7/2018 | Na et al. |
| 2018/0205675 A1 | 7/2018 | Koo et al. |
| 2018/0246635 A1 | 8/2018 | Baer et al. |
| 2018/0246639 A1 | 8/2018 | Han et al. |
| 2018/0260080 A1 | 9/2018 | Cho |
| 2018/0283094 A1 | 10/2018 | Hall |
| 2018/0288560 A1 | 10/2018 | Naik et al. |
| 2018/0316783 A1 | 11/2018 | Ye et al. |
| 2018/0321842 A1 | 11/2018 | Lee et al. |
| 2018/0329587 A1 | 11/2018 | Ko et al. |
| 2018/0335927 A1 | 11/2018 | Anzures et al. |
| 2018/0343023 A1 | 11/2018 | Park et al. |

(56) References Cited

U.S. PATENT DOCUMENTS

| | | |
|---|---|---|
| 2018/0352435 A1 | 12/2018 | Donley et al. |
| 2018/0364648 A1 | 12/2018 | Chi et al. |
| 2019/0050045 A1 | 2/2019 | Jha et al. |
| 2019/0072909 A1 | 3/2019 | Misaki et al. |
| 2019/0101869 A1 | 4/2019 | Lee et al. |
| 2019/0121300 A1 | 4/2019 | Peterson et al. |
| 2019/0139207 A1 | 5/2019 | Jeong et al. |
| 2019/0180221 A1 | 6/2019 | Greenberger et al. |
| 2019/0181078 A1 | 6/2019 | Yamamoto et al. |
| 2019/0182749 A1 | 6/2019 | Breaux et al. |
| 2019/0213037 A1 | 7/2019 | Kim et al. |
| 2019/0235748 A1 | 8/2019 | Seol et al. |
| 2019/0250813 A1 | 8/2019 | Block et al. |
| 2019/0268771 A1 | 8/2019 | Seo et al. |
| 2019/0324404 A1* | 10/2019 | Olwal ................ G04C 17/0091 |
| 2019/0339860 A1 | 11/2019 | Chen et al. |
| 2019/0340348 A1 | 11/2019 | Yu et al. |
| 2019/0349469 A1 | 11/2019 | Skogen et al. |
| 2020/0042311 A1 | 2/2020 | Shin |
| 2020/0068095 A1 | 2/2020 | Nabetani |
| 2020/0089302 A1 | 3/2020 | Kim et al. |
| 2020/0110522 A1 | 4/2020 | Zambetti et al. |
| 2020/0110946 A1 | 4/2020 | Kline et al. |
| 2020/0125037 A1 | 4/2020 | Jo et al. |
| 2020/0133206 A1 | 4/2020 | Jo et al. |
| 2020/0175485 A1 | 6/2020 | Knock |
| 2020/0228646 A1 | 7/2020 | Hotes et al. |
| 2020/0249632 A1 | 8/2020 | Olwal et al. |
| 2020/0264567 A1 | 8/2020 | Ok et al. |
| 2020/0342144 A1 | 10/2020 | Alameh et al. |
| 2020/0348827 A1 | 11/2020 | Wilson et al. |
| 2020/0356063 A1 | 11/2020 | Guzman et al. |
| 2020/0356224 A1 | 11/2020 | Wilson |
| 2020/0356242 A1 | 11/2020 | Wilson et al. |
| 2020/0356252 A1 | 11/2020 | Ko et al. |
| 2020/0356687 A1 | 11/2020 | Salzman et al. |
| 2020/0359204 A1 | 11/2020 | Hawkins et al. |
| 2020/0379413 A1 | 12/2020 | Chen et al. |
| 2021/0073007 A1* | 3/2021 | Guzman ................ G06F 3/0482 |
| 2021/0149694 A1 | 5/2021 | Guzman et al. |
| 2021/0216654 A1 | 7/2021 | Ko et al. |
| 2021/0349426 A1 | 11/2021 | Chen et al. |
| 2021/0349427 A1 | 11/2021 | Chen et al. |
| 2021/0349611 A1 | 11/2021 | Chen et al. |
| 2022/0091567 A1 | 3/2022 | Minami et al. |
| 2022/0198984 A1 | 6/2022 | Connor et al. |
| 2022/0214785 A1 | 7/2022 | Giv |
| 2022/0229537 A1 | 7/2022 | Chen et al. |
| 2022/0236867 A1 | 7/2022 | Chen et al. |
| 2022/0244782 A1 | 8/2022 | Robert et al. |
| 2022/0276780 A1 | 9/2022 | Ko et al. |
| 2023/0004270 A1 | 1/2023 | Chen et al. |
| 2023/0004406 A1 | 1/2023 | Hu et al. |
| 2023/0035532 A1 | 2/2023 | Chen et al. |
| 2023/0236547 A1 | 7/2023 | Chen et al. |
| 2023/0236549 A1 | 7/2023 | Guzman et al. |
| 2023/0236550 A1 | 7/2023 | Chen et al. |
| 2023/0282146 A1 | 9/2023 | Connor et al. |
| 2023/0350564 A1 | 11/2023 | Chen et al. |
| 2024/0045578 A1 | 2/2024 | Chen et al. |
| 2024/0053878 A1 | 2/2024 | Wilson et al. |
| 2024/0248515 A1 | 7/2024 | Chen et al. |
| 2024/0264721 A1 | 8/2024 | Wilson |
| 2024/0419214 A1 | 12/2024 | Chen et al. |
| 2025/0044932 A1 | 2/2025 | Chen et al. |
| 2025/0165134 A1 | 5/2025 | Wilson et al. |
| 2025/0231531 A1 | 7/2025 | Da Silva Valente Soares et al. |
| 2025/0348194 A1 | 11/2025 | Chen et al. |

FOREIGN PATENT DOCUMENTS

| | | |
|---|---|---|
| AU | 2015101639 A4 | 12/2015 |
| AU | 2020239749 A1 | 11/2021 |
| CA | 2356232 A1 | 3/2002 |
| CA | 2781636 A1 | 7/2010 |
| CA | 2729388 A1 | 9/2011 |
| CA | 2800123 C | 7/2016 |
| CH | 707412 A2 | 6/2014 |
| CN | 1083229 A | 3/1994 |
| CN | 2602404 Y | 2/2004 |
| CN | 1610866 A | 4/2005 |
| CN | 1997957 A | 7/2007 |
| CN | 101059756 A | 10/2007 |
| CN | 101382438 A | 3/2009 |
| CN | 101620494 A | 1/2010 |
| CN | 101627349 A | 1/2010 |
| CN | 101627361 A | 1/2010 |
| CN | 101702112 A | 5/2010 |
| CN | 101819486 A | 9/2010 |
| CN | 101943883 A | 1/2011 |
| CN | 101981987 A | 2/2011 |
| CN | 102375690 A | 3/2012 |
| CN | 102430244 A | 5/2012 |
| CN | 102446435 A | 5/2012 |
| CN | 102455860 A | 5/2012 |
| CN | 202217134 U | 5/2012 |
| CN | 102687176 A | 9/2012 |
| CN | 102750070 A | 10/2012 |
| CN | 102800045 A | 11/2012 |
| CN | 102984342 A | 3/2013 |
| CN | 103191557 A | 7/2013 |
| CN | 103399480 A | 11/2013 |
| CN | 103399750 A | 11/2013 |
| CN | 103562832 A | 2/2014 |
| CN | 103562841 A | 2/2014 |
| CN | 103607660 A | 2/2014 |
| CN | 103649897 A | 3/2014 |
| CN | 103902165 A | 7/2014 |
| CN | 203773233 U | 8/2014 |
| CN | 104281405 A | 1/2015 |
| CN | 104580576 A | 4/2015 |
| CN | 104737114 A | 6/2015 |
| CN | 104898402 A | 9/2015 |
| CN | 105286843 A | 2/2016 |
| CN | 105302468 A | 2/2016 |
| CN | 105335087 A | 2/2016 |
| CN | 105389107 A | 3/2016 |
| CN | 105574378 A | 5/2016 |
| CN | 105607858 A | 5/2016 |
| CN | 205608658 U | 9/2016 |
| CN | 106814886 A | 6/2017 |
| CN | 106909064 A | 6/2017 |
| CN | 107257951 A | 10/2017 |
| CN | 107430489 A | 12/2017 |
| CN | 107561904 A | 1/2018 |
| CN | 107710135 A | 2/2018 |
| CN | 107797657 A | 3/2018 |
| CN | 107870560 A | 4/2018 |
| CN | 108255049 A | 7/2018 |
| CN | 109196469 A | 1/2019 |
| CN | 109313655 A | 2/2019 |
| CN | 107921317 B | 7/2021 |
| CN | 113795815 A | 12/2021 |
| DE | 202017105858 U1 | 3/2018 |
| EP | 0579093 A1 | 1/1994 |
| EP | 0831629 A2 | 3/1998 |
| EP | 1659504 A2 | 5/2006 |
| EP | 1674977 A2 | 6/2006 |
| EP | 1832969 A2 | 9/2007 |
| EP | 1988432 A1 | 11/2008 |
| EP | 2194508 A1 | 6/2010 |
| EP | 2204702 A1 | 7/2010 |
| EP | 2312512 A1 | 4/2011 |
| EP | 2360902 A2 | 8/2011 |
| EP | 2394711 A1 | 12/2011 |
| EP | 2413577 A2 | 2/2012 |
| EP | 2423810 A1 | 2/2012 |
| EP | 2600215 A1 | 6/2013 |
| EP | 2629483 A1 | 8/2013 |
| EP | 2738640 A2 | 6/2014 |
| EP | 2742404 A2 | 6/2014 |
| EP | 2942932 A1 | 11/2015 |
| EP | 2955591 A2 | 12/2015 |
| EP | 2990887 A2 | 3/2016 |

(56)        References Cited

FOREIGN PATENT DOCUMENTS

| EP | 2993602 A1 | 3/2016 |
| EP | 3056949 A1 | 8/2016 |
| EP | 3079044 A1 | 10/2016 |
| EP | 3101958 A1 | 12/2016 |
| EP | 3152643 A1 | 4/2017 |
| EP | 3401770 A1 | 11/2018 |
| EP | 3896560 A1 | 10/2021 |
| EP | 3175344 B1 | 1/2022 |
| EP | 3455696 B1 | 10/2023 |
| GB | 2306020 A | 4/1997 |
| GB | 2475669 A | 6/2011 |
| JP | 49-134364 A | 12/1974 |
| JP | 53-31170 A | 3/1978 |
| JP | 56-621 A | 1/1981 |
| JP | 5-90390 U | 12/1993 |
| JP | 3007616 U | 2/1995 |
| JP | 8-110955 A | 4/1996 |
| JP | 8-285964 A | 11/1996 |
| JP | 9-251084 A | 9/1997 |
| JP | 10-506472 A | 6/1998 |
| JP | 11-109066 A | 4/1999 |
| JP | 11-160470 A | 6/1999 |
| JP | 11-232013 A | 8/1999 |
| JP | 2000-162349 A | 6/2000 |
| JP | 2000-241199 A | 9/2000 |
| JP | 2001-144884 A | 5/2001 |
| JP | 2001-147282 A | 5/2001 |
| JP | 2001-273064 A | 10/2001 |
| JP | 2001-313886 A | 11/2001 |
| JP | 2001-318852 A | 11/2001 |
| JP | 2002-507718 A | 3/2002 |
| JP | 2002-251238 A | 9/2002 |
| JP | 2002-271451 A | 9/2002 |
| JP | 2003-9404 A | 1/2003 |
| JP | 2003-121568 A | 4/2003 |
| JP | 2003-233616 A | 8/2003 |
| JP | 2004-28918 A | 1/2004 |
| JP | 2004-177148 A | 6/2004 |
| JP | 2004-184396 A | 7/2004 |
| JP | 2005-521890 A | 7/2005 |
| JP | 2006-71582 A | 3/2006 |
| JP | 2006-101505 A | 4/2006 |
| JP | 2006-242717 A | 9/2006 |
| JP | 2006-284365 A | 10/2006 |
| JP | 2007-243275 A | 9/2007 |
| JP | 2008-175800 A | 7/2008 |
| JP | 2009-95030 A | 4/2009 |
| JP | 2009-201297 A | 9/2009 |
| JP | 2009-217612 A | 9/2009 |
| JP | 2009-229106 A | 10/2009 |
| JP | 2009-293960 A | 12/2009 |
| JP | 2010-60355 A | 3/2010 |
| JP | 2010-124181 A | 6/2010 |
| JP | 2010-257051 A | 11/2010 |
| JP | 2011-515726 A | 5/2011 |
| JP | 3168099 U | 6/2011 |
| JP | 2011-525648 A | 9/2011 |
| JP | 2011-217000 A | 10/2011 |
| JP | 2012-32306 A | 2/2012 |
| JP | 2012-505478 A | 3/2012 |
| JP | 2012-147432 A | 8/2012 |
| JP | 2012-517630 A | 8/2012 |
| JP | 2012-203832 A | 10/2012 |
| JP | 2012-247283 A | 12/2012 |
| JP | 2012-531607 A | 12/2012 |
| JP | 2013-3671 A | 1/2013 |
| JP | 2013-92989 A | 5/2013 |
| JP | 2013-146557 A | 8/2013 |
| JP | 2013-232230 A | 11/2013 |
| JP | 2014-123197 A | 7/2014 |
| JP | 2014-143575 A | 8/2014 |
| JP | 5630676 B2 | 11/2014 |
| JP | 2015-504619 A | 2/2015 |
| JP | 2015-210587 A | 11/2015 |
| JP | 2016-13151 A | 1/2016 |
| JP | 2017-37599 A | 2/2017 |
| JP | 2017-50003 A | 3/2017 |
| JP | 2017-111083 A | 6/2017 |
| JP | 2017-527026 A | 9/2017 |
| JP | 2017-531225 A | 10/2017 |
| JP | 2017-531230 A | 10/2017 |
| JP | 2017-534934 A | 11/2017 |
| JP | 2018-514838 A | 6/2018 |
| JP | 2018-113544 A | 7/2018 |
| JP | 2018-116067 A | 7/2018 |
| JP | 2018-152073 A | 9/2018 |
| JP | 2019-16251 A | 1/2019 |
| JP | 2019-164825 A | 9/2019 |
| JP | 2020-17285 A | 1/2020 |
| JP | 2020-56745 A | 4/2020 |
| JP | 2020-194555 A | 12/2020 |
| KR | 10-2004-0107489 A | 12/2004 |
| KR | 20-0425314 Y1 | 9/2006 |
| KR | 10-0810379 B1 | 3/2008 |
| KR | 10-2008-0058246 A | 6/2008 |
| KR | 10-2011-0013653 A | 2/2011 |
| KR | 10-2011-0093729 A | 8/2011 |
| KR | 10-2012-0003537 A | 1/2012 |
| KR | 10-2012-0132134 A | 12/2012 |
| KR | 10-1352713 B1 | 1/2014 |
| KR | 10-2014-0064687 A | 5/2014 |
| KR | 10-2014-0074824 A | 6/2014 |
| KR | 10-2015-0008996 A | 1/2015 |
| KR | 10-2015-0081140 A | 7/2015 |
| KR | 10-2015-0140212 A | 12/2015 |
| KR | 10-2016-0026314 A | 3/2016 |
| KR | 10-2017-0006761 | 1/2017 |
| KR | 10-2017-0006761 A | 1/2017 |
| KR | 10-2017-0032471 A | 3/2017 |
| KR | 10-2017-0076452 A | 7/2017 |
| KR | 10-2017-0081391 A | 7/2017 |
| KR | 10-2017-0082698 A | 7/2017 |
| KR | 10-2017-0107572 A | 9/2017 |
| KR | 10-2017-0130417 | 11/2017 |
| KR | 10-2017-0130417 A | 11/2017 |
| KR | 10-2018-0046206 | 5/2018 |
| KR | 10-2018-0046206 A | 5/2018 |
| KR | 10-1875907 B1 | 7/2018 |
| KR | 10-2018-0108531 | 10/2018 |
| KR | 10-2018-0108531 A | 10/2018 |
| KR | 10-2019-0020850 A | 3/2019 |
| KR | 10-2019-0114034 A | 10/2019 |
| SG | 130285 A1 | 4/2007 |
| TW | D144158 S1 | 12/2011 |
| TW | 201419115 A | 5/2014 |
| WO | 1998/40795 A1 | 9/1998 |
| WO | 2001/71433 A1 | 9/2001 |
| WO | 2002/054157 A1 | 7/2002 |
| WO | 2003/048872 A1 | 6/2003 |
| WO | 2003/085460 A2 | 10/2003 |
| WO | 2006/012343 A2 | 2/2006 |
| WO | 2006/112641 A1 | 10/2006 |
| WO | 2007/018881 A2 | 2/2007 |
| WO | 2008/086302 A1 | 7/2008 |
| WO | 2009/053775 A1 | 4/2009 |
| WO | 2009/123428 A2 | 10/2009 |
| WO | 2010/017627 A1 | 2/2010 |
| WO | 2011/000893 A1 | 1/2011 |
| WO | 2011/062871 A2 | 5/2011 |
| WO | 2011/099819 A2 | 8/2011 |
| WO | 2011/128416 A2 | 10/2011 |
| WO | 2012/161434 A2 | 11/2012 |
| WO | 2012/166976 A2 | 12/2012 |
| WO | 2013/051048 A1 | 4/2013 |
| WO | 2013/103570 A1 | 7/2013 |
| WO | 2013/169842 A2 | 11/2013 |
| WO | 2013/169849 A2 | 11/2013 |
| WO | 2013/169875 A2 | 11/2013 |
| WO | 2013/169882 A2 | 11/2013 |
| WO | 2014/078114 A1 | 5/2014 |
| WO | 2014/081181 A1 | 5/2014 |
| WO | 2014/088475 A1 | 6/2014 |
| WO | 2014/105278 A1 | 7/2014 |
| WO | 2014/113937 A1 | 7/2014 |

(56)                References Cited

FOREIGN PATENT DOCUMENTS

| WO | 2015/034960 | A1 |   | 3/2015 |   |   |
|----|-------------|----|---|--------|---|---|
| WO | 2015/065402 | A1 |   | 5/2015 |   |   |
| WO | 2015/084891 | A1 |   | 6/2015 |   |   |
| WO | 2016/022203 | A1 |   | 2/2016 |   |   |
| WO | 2016/022204 | A1 |   | 2/2016 |   |   |
| WO | 2016/022205 | A1 |   | 2/2016 |   |   |
| WO | 2016/025395 | A2 |   | 2/2016 |   |   |
| WO | 2016/032076 | A1 |   | 3/2016 |   |   |
| WO | 2016/057062 | A1 |   | 4/2016 |   |   |
| WO | 2016/144385 | A1 |   | 9/2016 |   |   |
| WO | 2016/144563 | A1 |   | 9/2016 |   |   |
| WO | 2016/144577 | A1 |   | 9/2016 |   |   |
| WO | 2016/144975 | A2 |   | 9/2016 |   |   |
| WO | 2016/144977 | A1 |   | 9/2016 |   |   |
| WO | 2016/204936 | A1 |   | 12/2016 |  |   |
| WO | 2017/030646 | A1 |   | 2/2017 |   |   |
| WO | 2017/062621 | A1 |   | 4/2017 |   |   |
| WO | 2017/213777 | A1 |   | 12/2017 |  |   |
| WO | 2017/213899 | A1 |   | 12/2017 |  |   |
| WO | 2017/213937 | A1 |   | 12/2017 |  |   |
| WO | WO-2018209152 | A1 | * | 11/2018 | ............ | G06F 1/163 |
| WO | 2019/200350 | A1 |   | 10/2019 |  |   |
| WO | 2019/217086 | A2 |   | 11/2019 |  |   |
| WO | 2019/217249 | A2 |   | 11/2019 |  |   |
| WO | 2020/226927 | A1 |   | 11/2020 |  |   |
| WO | 2021/050190 | A1 |   | 3/2021 |   |   |

OTHER PUBLICATIONS

Notice of Allowance received for Korean Patent Application No. 10-2024-7014705, mailed on Jan. 22, 2025, 7 pages (2 pages of English Translation and 5 pages of Official Copy).

Notice of Allowance received for U.S. Appl. No. 17/031,671, mailed on Jan. 29, 2025, 37 pages.

Supplemental Notice of Allowance received for U.S. Appl. No. 17/031,671, mailed on Feb. 12, 2025, 4 pages.

Final Office Action received for U.S. Appl. No. 18/382,248, mailed on Dec. 18, 2024, 52 pages.

Intention to Grant received for European Patent Application No. 19724997.2, mailed on Dec. 3, 2024, 8 pages.

Notice of Allowance received for Japanese Patent Application No. 2023-104475, mailed on Dec. 13, 2024, 4 pages (1 page of English Translation and 3 pages of Official Copy).

Office Action received for Chinese Patent Application No. 202110368164.X, mailed on Nov. 15, 2024, 27 pages (6 pages of English Translation and 21 pages of Official Copy).

Office Action received for Chinese Patent Application No. 202110368460.X, mailed on Nov. 9, 2024, 11 pages (5 pages of English Translation and 6 pages of Official Copy).

Notice of Acceptance received for Australian Patent Application No. 2023229597, mailed on Oct. 8, 2024, 3 pages.

Notice of Allowance received for Chinese Patent Application No. 201980030338.2, mailed on Oct. 12, 2024, 2 pages (1 page of English Translation and 1 page of Official Copy).

Office Action received for Chinese Patent Application No. 202311634654.5, mailed on Sep. 18, 2024, 14 pages (8 pages of English Translation and 6 pages of Official Copy).

Applicant-Initiated Interview Summary received for U.S. Appl. No. 18/196,345, mailed on Apr. 4, 2025, 4 pages.

Applicant-Initiated Interview Summary received for U.S. Appl. No. 18/382,248, mailed on Apr. 1, 2025, 2 pages.

Decision to Grant received for European Patent Application No. 22729905.4, mailed on Mar. 27, 2025, 4 pages.

Notice of Allowance received for Chinese Patent Application No. 202110368460.X, mailed on Mar. 13, 2025, 4 pages (1 page of English Translation and 3 pages of Official Copy).

Office Action received for European Patent Application No. 23201849.9, mailed on Apr. 2, 2025, 6 pages.

Record of Oral Hearing received for U.S. Appl. No. 17/947,530, mailed on Mar. 27, 2025, 14 pages.

Advisory Action received for U.S. Appl. No. 14/815,898, mailed on Aug. 30, 2016, 3 pages.

Advisory Action received for U.S. Appl. No. 15/405,122, mailed on Apr. 18, 2022, 5 pages.

Advisory Action received for U.S. Appl. No. 15/421,865, mailed on Apr. 16, 2020, 7 pages.

Advisory Action received for U.S. Appl. No. 16/582,020, mailed on Aug. 3, 2020, 4 pages.

Advisory Action received for U.S. Appl. No. 16/861,651, mailed on Jul. 29, 2022, 4 pages.

Advisory Action received for U.S. Appl. No. 16/935,002, mailed on May 6, 2022, 3 pages.

Advisory Action received for U.S. Appl. No. 16/943,737, mailed on Jun. 1, 2022, 6 pages.

Advisory Action received for U.S. Appl. No. 17/031,765, mailed on Dec. 12, 2022, 7 pages.

Airshow,"Airshow App for Mobile Devices", 2012, 4 pages.

Android Central,"BeWeather weather app for Android", Available online at: <https://www.youtube.com/watch?v=G2EY2K-XkSI>, Sep. 1, 2011, 1 page.

Android Central, "Changing the watchface on your Android Wear device", Retrieved from: https://www.youtube.com/watch?v=YYwFe2K_gil, Jul. 2, 2014, 4 pages.

Androidika, "Butterfly 3D Live Wallpaper 1.0 APK", Available at: <http://net-suckga-ilauncher2.apk-dl.com/butterfly-3d-live-wallpaper>, Feb. 26, 2013, 7 pages.

Applicant-Initiated Interview Summary received for U.S. Appl. No. 16/582,020, mailed on Jul. 9, 2021, 4 pages.

Applicant-Initiated Interview Summary received for U.S. Appl. No. 16/582,020, mailed on Jul. 14, 2020, 5 pages.

Applicant-Initiated Interview Summary received for U.S. Appl. No. 16/582,020, mailed on Mar. 25, 2020, 5 pages.

Applicant-Initiated Interview Summary received for U.S. Appl. No. 16/585,399, mailed on Mar. 25, 2020, 3 pages.

Applicant-Initiated Interview Summary received for U.S. Appl. No. 17/031,671, mailed on Aug. 2, 2021, 5 pages.

Applicant-Initiated Interview Summary received for U.S. Appl. No. 17/031,671, mailed on Jun. 13, 2022, 7 pages.

Applicant-Initiated Interview Summary received for U.S. Appl. No. 17/031,671, mailed on Nov. 8, 2021, 5 pages.

Applicant-Initiated Interview Summary received for U.S. Appl. No. 17/746,807, mailed on Jun. 9, 2023, 2 pages.

Applicant-Initiated Interview Summary received for U.S. Appl. No. 17/746,807, mailed on Mar. 31, 2023, 2 pages.

Applicant-Initiated Interview Summary received for U.S. Appl. No. 15/405,122, mailed on Dec. 22, 2020, 5 pages.

Applicant-Initiated Interview Summary received for U.S. Appl. No. 15/405,122, mailed on Jul. 7, 2021, 4 pages.

Applicant-Initiated Interview Summary received for U.S. Appl. No. 15/405,122, mailed on Mar. 1, 2022, 4 pages.

Applicant-Initiated Interview Summary received for U.S. Appl. No. 15/405,122, mailed on May 21, 2021, 5 pages.

Applicant-Initiated Interview Summary received for U.S. Appl. No. 15/421,865, mailed on Dec. 15, 2020, 6 pages.

Applicant-Initiated Interview Summary received for U.S. Appl. No. 15/421,865, mailed on Feb. 3, 2020, 5 pages.

Applicant-Initiated Interview Summary received for U.S. Appl. No. 15/421,865, mailed on Feb. 28, 2022, 5 pages.

Applicant-Initiated Interview Summary received for U.S. Appl. No. 15/421,865, mailed on Jun. 30, 2021, 6 pages.

Applicant-Initiated Interview Summary received for U.S. Appl. No. 15/421,865, mailed on Oct. 3, 2023, 6 pages.

Applicant-Initiated Interview Summary received for U.S. Appl. No. 16/401,934, mailed on Feb. 23, 2021, 8 pages.

Applicant-Initiated Interview Summary received for U.S. Appl. No. 16/861,651, mailed on Dec. 29, 2021, 5 pages.

Applicant-Initiated Interview Summary received for U.S. Appl. No. 16/861,651, mailed on Mar. 25, 2021, 6 pages.

Applicant-Initiated Interview Summary received for U.S. Appl. No. 16/935,002, mailed on Sep. 21, 2021, 4 pages.

Applicant-Initialed Interview Summary received for U.S. Appl. No. 16/943,737, mailed on Apr. 29, 2022, 6 pages.

(56) References Cited

OTHER PUBLICATIONS

Applicant-Initialed Interview Summary received for U.S. Appl. No. 16/943,737, mailed on Sep. 7, 2021, 4 pages.
Applicant-Initialed Interview Summary received for U.S. Appl. No. 16/997,588, mailed on Jan. 29, 2021, 3 pages.
Applicant-Initialed Interview Summary received for U.S. Appl. No. 16/997,588, mailed on May 12, 2021, 2 pages.
Applicant-Initialed Interview Summary received for U.S. Appl. No. 17/031,654, mailed on Feb. 1, 2021, 2 pages.
Applicant-Initialed Interview Summary received for U.S. Appl. No. 17/031,671, mailed on Dec. 9, 2022, 5 pages.
Applicant-Initialed Interview Summary received for U.S. Appl. No. 17/031,671, mailed on May 23, 2023, 3 pages.
Applicant-Initialed Interview Summary received for U.S. Appl. No. 17/031,765, mailed on Apr. 17, 2023, 4 pages.
Applicant-Initialed Interview Summary received for U.S. Appl. No. 17/031,765, mailed on Dec. 15, 2021, 4 pages.
Applicant-Initialed Interview Summary received for U.S. Appl. No. 17/031,765, mailed on May 3, 2023, 6 pages.
Applicant-Initialed Interview Summary received for U.S. Appl. No. 17/031,765, mailed on May 23, 2022, 5 pages.
Applicant-Initialed Interview Summary received for U.S. Appl. No. 17/031,765, mailed on Nov. 16, 2022, 5 pages.
Applicant-Initialed Interview Summary received for U.S. Appl. No. 17/031,765, mailed on Sep. 22, 2021, 5 pages.
Applicant-Initialed Interview Summary received for U.S. Appl. No. 17/041,350, mailed on Apr. 18, 2021, 2 pages.
Applicant-Initialed Interview Summary received for U.S. Appl. No. 17/041,350, mailed on Feb. 2, 2022, 2 pages.
Applicant-Initialed Interview Summary received for U.S. Appl. No. 17/373,163, mailed on Apr. 11, 2022, 2 pages.
Applicant-Initialed Interview Summary received for U.S. Appl. No. 17/556,165, mailed on Oct. 28, 2022, 4 pages.
Applicant-Initialed Interview Summary received for U.S. Appl. No. 17/717,275, mailed on Sep. 26, 2023, 6 pages.
Applicant-Initialed Interview Summary received for U.S. Appl. No. 17/738,940, mailed on Mar. 7, 2023, 4 pages.
Applicant-Initialed Interview Summary received for U.S. Appl. No. 17/941,962, mailed on May 30, 2023, 2 pages.
Applicant-Initialed Interview Summary received for U.S. Appl. No. 17/947,530, mailed on Jun. 14, 2023, 2 pages.
Applicant-Initialed Interview Summary received for U.S. Appl. No. 17/947,530, mailed on Sep. 19, 2023, 2 pages.
Applicant-Initialed Interview Summary received for U.S. Appl. No. 17/949,081, mailed on Apr. 28, 2023, 2 pages.
Applicant-Initialed Interview Summary received for U.S. Appl. No. 17/949,081, mailed on Sep. 8, 2023, 2 pages.
Avdonin Nikita, "Astroviewer 3D", Available at <: https:jjwww.youtube.comjwatch?v=zY0tslx3JHY/>, Nov. 5, 2013, 2 pages.
Baar Marius, "Fitbit Ace—Unboxing, Setup and 24 Hour Test", YouTube [online] [video], Retrieved from: <https://youtu.be/ekvkfqOyrls>.See especially 4:44., Oct. 24, 2018, 3 pages.
Bogdanov Alexei, "SKMEI 1016", XP054977588, Available online at <URL: https://www.youtube.com/watch?v=E4q4Fug05Fw>, Jun. 21, 2014, 2 pages (Official Copy only) {See Communication under 37 CFR § 1.98(a) (3)}.
Brief Communication regarding Oral Proceeding received for European Patent Application No. 15730925.3, mailed on Feb. 18, 2020, 7 pages.
Brief Communication regarding Oral Proceeding received for European Patent Application No. 17810723.1, mailed on Nov. 11, 2022, 11 pages.
Castellilni Rick, "Google Earth", Retrieved from <https://www.youtube.com/watch?v=bgjMSBXsFZQ>, How to Use Google Earth for Beginners, Feb. 12, 2013, 3 pages.
Clark Josh, "Designing Great iPhone Apps", O'Reilly Japan Co., O'Reilly Tim, vol. 1, May 24, 2012, 5 pages (Official Copy only) {See Communication under 37 CFR § 1.98(a) (3)}.
Corrected Notice of Allowance received for U.S. Appl. No. 14/815,879, mailed on Jul. 13, 2017, 3 pages.
Corrected Notice of Allowance received for U.S. Appl. No. 14/815,879, mailed on Jul. 28, 2017, 3 pages.
Corrected Notice of Allowance received for U.S. Appl. No. 14/815,879, mailed on Sep. 21, 2017, 2 pages.
Corrected Notice of Allowance received for U.S. Appl. No. 15/355,956, mailed on Jan. 3, 2020, 2 pages.
Corrected Notice of Allowance received for U.S. Appl. No. 15/798,257, mailed on Aug. 26, 2019, 2 pages.
Corrected Notice of Allowance received for U.S. Appl. No. 15/798,257, mailed on Jul. 9, 2019, 2 pages.
Corrected Notice of Allowance received for U.S. Appl. No. 15/798,257, mailed on Jun. 13, 2019, 2 pages.
Corrected Notice of Allowance received for U.S. Appl. No. 16/401,934, mailed on Dec. 23, 2017, 3 pages.
Corrected Notice of Allowance received for U.S. Appl. No. 16/401,934, mailed on Feb. 28, 2022, 3 pages.
Corrected Notice of Allowance received for U.S. Appl. No. 16/582,020, mailed on Aug. 11, 2021, 2 pages.
Corrected Notice of Allowance received for U.S. Appl. No. 16/935,002, mailed on Jul. 17, 2023, 5 pages.
Corrected Notice of Allowance received for U.S. Appl. No. 16/935,002, mailed on Mar. 2, 2023, 2 pages.
Corrected Notice of Allowance received for U.S. Appl. No. 16/935,002, mailed on Mar. 28, 2023, 2 pages.
Corrected Notice of Allowance received for U.S. Appl. No. 17/041,350, mailed on Apr. 4, 2022, 3 pages.
Corrected Notice of Allowance received for U.S. Appl. No. 17/041,350, mailed on Mar. 15, 2022, 3 pages.
Corrected Notice of Allowance received for U.S. Appl. No. 17/373,163, mailed on Jul. 15, 2022, 5 pages.
Corrected Notice of Allowance received for U.S. Appl. No. 17/373,163, mailed on Jul. 27, 2022, 5 pages.
Corrected Notice of Allowance received for U.S. Appl. No. 17/515,143, mailed on Mar. 29, 2023, 2 pages.
Corrected Notice of Allowance received for U.S. Appl. No. 17/941,962, mailed on Apr. 14, 2023, 6 pages.
Corrected Notice of Allowance received for U.S. Appl. No. 17/941,962, mailed on Aug. 3, 2023, 2 pages.
Cyr Jim, "Apple Watch-Customize Modular Watch Face", available online at: https://www.youtube.com/watch?v=02W93HbKIK8, May 13, 2015, 2 pages.
Decision on Acceptance received for Australian Patent Application No. 2015298710, mailed on Jul. 19, 2019, 18 pages.
Decision on Acceptance received for Australian Patent Application No. 2018201089, mailed on Apr. 20, 2021, 28 pages.
Decision on Appeal received for U.S. Appl. No. 14/815,890, mailed on Nov. 24, 2020, 13 pages.
Decision on Appeal received for U.S. Appl. No. 16/861,651, mailed on Sep. 1, 2023, 14 pages.
Decision on Opposition received for Australian Patent Application No. 2015298710, mailed on Aug. 9, 2019, 4 pages.
Decision on Opposition received for Australian Patent Application No. 2015298710, mailed on Aug. 20, 2018, 20 pages.
Decision to Grant received for Danish Patent Application No. PA202070609, mailed on May 3, 2021, 2 pages.
Decision to Grant received for European Patent Application No. 15730925.3, mailed on Dec. 9, 2021, 2 pages.
Decision to Grant received for European Patent Application No. 15747595.5, mailed on Jul. 16, 2020, 2 pages.
Decision to Grant received for European Patent Application No. 17810723.1, mailed on Sep. 21, 2023, 2 pages.
Decision to Grant received for European Patent Application No. 20185974.1, mailed on Aug. 19, 2022, 3 pages.
Decision to Refuse received for European Patent Application No. 15730924.6, mailed on Mar. 15, 2019, 12 pages.
Decision to Refuse received for Japanese Patent Application No. 2020-159824, mailed on Sep. 30, 2022, 6 pages (3 pages of English Translation and 3 pages of Official Copy).
Deluxe Moon-Guide, available online at—https://web.archive.org/web/20130520161057/http://www.lifewaresolutions.com/deluxe_moon_guide_ip.html, May 20, 2013, 5 pages.

(56)          References Cited

OTHER PUBLICATIONS

Droid Life, "20+ Galaxy S9, S9+ Tips and Tricks", Available Online at: https://www.youtube.com/watch?v=sso0mYTfV6w, Mar. 22, 2018, pp. 1-33.

Ebpman Tech Reviews,"LG G3 Tips: How to customize the clock face", Available online at: https://www.youtube.com/watch?v= evraMWFb1fY, Jul. 25, 2014, 1 page.

Ergonomic requirements for office work with visual display terminals (VDTs), Part 13: User guidance, International Standard ISO, Zuerich, CH, vol. 9241-13, Jul. 15, 1998, 40 pages.

Evgenyevich Sergey, "Earth & Moon in HD Gyro 3D", Available at <https://www.youtube.com/watch?v=IRwNcaSYrls/>, Dec. 1, 2013, 2 pages.

Examiner's Answer to Appeal Brief received for U.S. Appl. No. 14/815,890, mailed on Mar. 20, 2020, 16 pages.

Examiner's Answer to Appeal Brief received for U.S. Appl. No. 15/405,122, mailed on Jan. 11, 2023, 16 pages.

Examiner's Answer to Appeal Brief received for U.S. Appl. No. 16/861,651, mailed on Jan. 18, 2023, 16 pages.

Extended European Search Report received for European Patent Application No. 17810723.1, mailed on Nov. 12, 2019, 9 pages.

Extended European Search Report received for European Patent Application No. 20185974.1, mailed on Oct. 28, 2020, 7 pages.

Extended European Search Report received for European Patent Application No. 22188724.3, mailed on Mar. 2, 2023, 14 pages.

Feist Jonathan, "Android customization—how to create a custom clock widget using Zooper Widget", Available Online at: https:// www.androidauthority.com/zooper-widget-clock-366476/, May 15, 2014, 10 pages.

Feldman Ari, "Excerpts from: Designing Arcade Computer Game Graphics", Available online at: http://www.phatcode.net/res/269/ files/dacgg.pdf, Jan. 1, 2001, 35 pages.

Final Office Action received for U.S. Appl. No. 14/815,890, mailed on Feb. 26, 2018, 20 pages.

Final Office Action received for U.S. Appl. No. 14/815,890, mailed on May 14, 2019, 22 pages.

Final Office Action received for U.S. Appl. No. 14/815,890, mailed on Nov. 21, 2016, 18 pages.

Final Office Action received for U.S. Appl. No. 14/815,898, mailed on Jun. 9, 2016, 19 pages.

Final Office Action received for U.S. Appl. No. 15/405,122, mailed on Jan. 21, 2020, 36 pages.

Final Office Action received for U.S. Appl. No. 15/405,122, mailed on Nov. 5, 2021, 45 pages.

Final Office Action received for U.S. Appl. No. 15/421,865, mailed on Dec. 2, 2019, 19 pages.

Final Office Action received for U.S. Appl. No. 15/421,865, mailed on Jul. 12, 2022, 27 pages.

Final Office Action received for U.S. Appl. No. 15/421,865, mailed on Mar. 19, 2021, 20 pages.

Final Office Action received for U.S. Appl. No. 15/881,544, mailed on Jan. 29, 2019, 14 pages.

Final Office Action received for U.S. Appl. No. 16/401,934, mailed on Jun. 14, 2021, 30 pages.

Final Office Action received for U.S. Appl. No. 16/582,020, mailed on Apr. 28, 2020, 31 pages.

Final Office Action received for U.S. Appl. No. 16/861,651, mailed on Apr. 20, 2021, 14 pages.

Final Office Action received for U.S. Appl. No. 16/861,651, mailed on Jan. 26, 2022, 16 pages.

Final Office Action received for U.S. Appl. No. 16/935,002, mailed on Jan. 5, 2022, 25 pages.

Final Office Action received for U.S. Appl. No. 16/943,737, mailed on Feb. 4, 2022, 24 pages.

Final Office Action received for U.S. Appl. No. 16/997,588, mailed on Mar. 30, 2021, 23 pages.

Final Office Action received for U.S. Appl. No. 17/031,671, mailed on Nov. 15, 2022, 27 pages.

Final Office Action received for U.S. Appl. No. 17/031,671, mailed on Sep. 7, 2021, 27 pages.

Final Office Action received for U.S. Appl. No. 17/031,765, mailed on Oct. 29, 2021, 34 pages.

Final Office Action received for U.S. Appl. No. 17/031,765, mailed on Sep. 1, 2023, 37 pages.

Final Office Action received for U.S. Appl. No. 17/031,765, mailed on Sep. 12, 2022, 37 pages.

Final Office Action received for U.S. Appl. No. 17/041,350, mailed on Sep. 17, 2021, 25 pages.

Final Office Action received for U.S. Appl. No. 17/746,807, mailed on Apr. 26, 2023, 16 pages.

Final Office Action received for U.S. Appl. No. 17/947,530, mailed on Jul. 13, 2023, 17 pages.

Final Office Action received for U.S. Appl. No. 17/949,081, mailed on Jun. 5, 2023, 23 pages.

Final Office Action received for U.S. Appl. No. 14/815,879, mailed on Mar. 24, 2016, 46 pages.

First Action Interview received for U.S. Appl. No. 14/815,890, mailed on Aug. 12, 2016, 3 pages.

Fuchphone Extras, "LG G Watch—Designs | Watch Faces", Available online at: https://www.youtube.com/watch?v=yqxzqdi_MSE, Jul. 27, 2014, 1 page.

Fuchphone Extras, "Samsung Gear Live—Designs | Watch Faces", Available online at: https://www.youtube.com/watch?v= fFjtVAxyimE, Jul. 26, 2014, 1 page.

Fukuda Kazuhiro, "Xperia Z1 Perfect Manual", Sotec Co. Ltd., No. 1, Nov. 15, 2013, pp. 217-218.

Gauging Gadgets, "How to Customize Watch Faces—Garmin Venu Tutorial", Online Available at: https://www.youtube.com/watch?v= dxajKKulaP0, Jan. 7, 2020, 14 pages.

Gazer, "iPhone 4S Super Manual", Shuwa System Co., Saito Kazukuni, vol. 1, Jun. 6, 2013, 7 pages (Official Copy only) {See Communication under 37 CFR § 1.98(a) (3)}.

Geary David, "Programming HTML5 Canvas", O'Reilly Japan, Inc., No. 1, Jul. 23, 2014, pp. 327-330.

Geek, "How to Put the Day of the Week into the Windows Taskbar Clock", available online at: https://www.howtogeek.com/194103/ how-to-put-the-day-of-the-week-into-the-windows-taskbar-clock/, 2014, 3 pages.

Google Earth 7.0.1.8244, retrieved from the Internet: http://dl.google. com/dl/earth/client/ge7/release_7_0_1/googleearth-win-bundle~7.0. 1.8244.exe, Oct. 29, 2012, 1 page.

Google Earth on Android13 AndroidCentral.com, Available online at: https://www.youtube.com/watch?v=1WxN1RunrE4, Feb. 22, 2010, 1 page.

Gottabemobile, "How to Change Watch Faces on Android Wear", available online at URL: https://www.youtube.com/watch?v= B8iRGkGq6a8, Jul. 9, 2014, 4 pages.

Ilovex, "Stripe Generator", a tool that makes it easy to create striped materials, Online available at: https://www.ilovex.co.jp/blog/system/ webconsulting/stripe-generator.html, May 2, 2012, 3 pages (Official Copy only) (See Communication under 37 CFR § 1.98(a) (3)).

Instruction Manual, Detailed version, KDDI Corporation, No. 1, vol. 1, Jun. 2014, 4 pages.

Intention to Grant received for Danish Patent Application No. PA 201570496, mailed on Feb. 17, 2016, 6 pages.

Intention to Grant received for Danish Patent Application No. PA202070609, mailed on Jan. 14, 2021, 2 pages.

Intention to Grant received for Danish Patent Application No. PA202070623, mailed on Jul. 20, 2022, 2 pages.

Intention to Grant received for European Patent Application No. 15730925.3, mailed on Aug. 16, 2021, 10 pages,.

Intention to Grant received for European Patent Application No. 15730925.3, mailed on May 28, 2020, 10 pages.

Intention to Grant received for European Patent Application No. 15747595.5, mailed on Feb. 17, 2020, 8 pages.

Intention to Grant received for European Patent Application No. 17810723.1, mailed on Dec. 16, 2022, 9 pages.

Intention to Grant received for European Patent Application No. 17810723.1, mailed on Jun. 12, 2023, 9 pages.

Intention to Grant received for European Patent Application No. 20185974.1, mailed on Apr. 28, 2022, 8 pages.

Intention to Grant received for European Patent Application No. 20729346.5, mailed on Jul. 10, 2023, 9 pages.

(56)                    References Cited

OTHER PUBLICATIONS

International Preliminary Report on Patentability received for PCT Patent Application No. PCT/US2015/034604, mailed on Feb. 16, 2017, 21 pages.

International Preliminary Report on Patentability received for PCT Patent Application No. PCT/US2015/034606, mailed on Feb. 16, 2017, 11 pages.

International Preliminary Report on Patentability received for PCT Patent Application No. PCT/US2015/034607, mailed on Feb. 16, 2017, 18 pages.

International Preliminary Report on Patentability received for PCT Patent Application No. PCT/US2016/035090, mailed on Dec. 14, 2017, 14 pages.

International Preliminary Report on Patentability received for PCT Patent Application No. PCT/US2017/034834, mailed on Dec. 20, 2018, 9 pages.

International Preliminary Report on Patentability received for PCT Patent Application No. PCT/US2019/030770, mailed on Nov. 19, 2020, 14 pages.

International Preliminary Report on Patentability received for PCT Patent Application No. PCT/US2020/030079, mailed on Nov. 18, 2021, 12 pages.

International Preliminary Report on Patentability received for PCT Patent Application No. PCT/US2020/031536, mailed on Nov. 18, 2021, 11 pages.

International Preliminary Report on Patentability received for PCT Patent Application No. PCT/US2020/031575, mailed on Nov. 18, 2021, 9 pages.

International Preliminary Report on Patentability received for PCT Patent Application No. PCT/US2021/031212, mailed on Nov. 24, 2022, 16 pages.

International Search Report and Written Opinion received for PCT Application No. PCT/US2015/034604, mailed on Nov. 9, 2015, 30 pages.

International Search Report and Written Opinion received for PCT Patent Application No. PCT/US2015/034606, mailed on Dec. 2, 2015, 17 pages.

International Search Report and Written Opinion received for PCT Patent Application No. PCT/US2016/035090, mailed on Oct. 4, 2016, 17 pages.

International Search Report and Written Opinion received for PCT Patent Application No. PCT/US2017/034834, mailed on Aug. 23, 2017, 10 pages.

International Search Report and Written Opinion received for PCT Patent Application No. PCT/US2019/030770, mailed on Oct. 31, 2019, 23 pages.

International Search Report and Written Opinion received for PCT Patent Application No. PCT/US2020/030079, mailed on Sep. 4, 2020, 18 pages.

International Search Report and Written Opinion received for PCT Patent Application No. PCT/US2020/031536, mailed on Sep. 23, 2020, 16 pages.

International Search Report and Written Opinion received for PCT Patent Application No. PCT/US2020/031575, mailed on Aug. 20, 2020, 14 pages.

International Search Report and Written Opinion received for PCT Patent Application No. PCT/US2021/031212, mailed on Sep. 21, 2021, 21 pages.

International Search Report and Written Opinion received for PCT Patent Application No. PCT/US2022/029279, mailed on Nov. 9, 2022, 16 pages.

International Search Report and Written Opinion received for PCT Patent Application No. PCT/US2023/011151, mailed on Jul. 5, 2023, 20 pages.

International Search Report and Written Opinion received for PCT Patent Application No. PCT/US2015/034607, mailed on Dec. 1, 2015, 23 pages.

Inventerium, "Tropical Fish 14", Available online at: https://www.turbosquid.com/3d-models/tropical-fish-3d-model/388510, Feb. 4, 2008, 2 pages.

Invitation to Additional Fees and Partial International Search Report received for PCT Patent Application No. PCT/US2015/034604 mailed on Sep. 4, 2015, 6 pages.

Invitation to Additional Fees and Partial International Search Report received for PCT Patent Application No. PCT/US2015/034606 mailed on Sep. 9, 2015, 6 pages.

Invitation to Pay Additional Fee received for European Patent Application No. 15747595.5, mailed on Feb. 9, 2018, 6 pages.

Invitation to Pay Additional Fees and Partial International Search Report received for PCT Patent Application No. PCT/US2022/029279, mailed on Sep. 15, 2022, 9 pages.

Invitation to Pay Additional Fees and Partial International Search Report received for PCT Patent Application No. PCT/US2023/011151, mailed on May 12, 2023, 13 pages.

Invitation to Pay Additional Fees received for PCT Patent Application No. PCT/US2015/034607, mailed on Sep. 30, 2015, 4 pages.

Invitation to Pay Additional Fees received for PCT/US2016/035090, mailed on Jul. 15, 2016, 2 pages.

Invitation to Pay Additional Fees received for PCT/US2019/030770, mailed on Jul. 26, 2019, 12 pages.

Invitation to Pay Additional Fees received for PCT/US2020/030079, mailed on Jul. 14, 2020, 12 pages.

Invitation to Pay Additional Fees received for PCT/US2020/031536, mailed on Jul. 31, 2020, 9 pages.

Invitation to Pay Additional Fees received for PCT/US2021/031212, mailed on Jul. 28, 2021, 19 pages.

Invitation to Pay Search Fees received for European Patebt Application No. 20730136.7, mailed on Jul. 1, 2022, 4 pages.

Jean, "Our Pact Parental Control Review", Available online at: https://www.bewebsmart.com/parental-controls/our-pact-parental-control-review/, Jun. 25, 2016, 25 pages.

Kasai Yoshino, "Apple Watch Absolute Basics—Season 3—The key is to customize the dial", Mynavi Corporation, Online Available at: https://news.mynavi.jp/article/20171104-apple_watch/, Nov. 4, 2017, 5 pages (Official Copy only) {See Communication under 37 CFR § 1.98(a) (3)}.

Kenney Briley, "How To Customize a Smartwatch and other Personalization Questions", Available online at: <https://smartwatches.org/learn/customize-smartwatch/>, Jan. 23, 2014, 3 pages.

Kidizoom Smartwatch, Available online at <URL: https://www.vtechnl.com/media/downloads/Kidizoom-Smart-Watch.pdf>, Jun. 24, 2014, 23 pages.

Lee et al., "Pass: Reducing Redundant Notifications between a Smartphone and a Smartwatch for Energy Saving", IEEE Transactions on Mobile Computing, vol. 19, No. 11, Jul. 23, 2019, pp. 2656-2669.

Lein et al., "Patternizer", Available online at: https://patternizer.com/, Apr. 2016, 5 pages.

Link to Wayback Machine with link to Google Play showing different layouts of complications associated with a clock face, available online at < https://play.google.com/store/apps/details?id=com.levelup.beautifulwidgets.free&hl=da >, Sep. 9, 2013, 6 pages.

Living Earth, available at: http://www.livingearthapp.com/, 2014, 6 pages.

Lyons Kent, "Smartwatch Innovation: Exploring a Watch-First Model", Pervasive Computing, Jan. 2016, pp. 10-13.

Minutes of Oral Proceedings received for European Patent Application No. 15730924.6, mailed on Mar. 13, 2019, 4 pages.

Minutes of Oral Proceedings received for European Patent Application No. 15730925.3. mailed on May 26, 2020, 11 pages.

Minutes of the Oral Proceedings received for European Patent Application No. 17810723.1, mailed on Dec. 9, 2022, 7 pages.

Minutes of the Oral Proceedings received for European Patent Application No. 20729346.5, mailed on Jul. 4, 2023, 6 pages.

MS Excel 2013, Jan. 29, 2013, 2 pages.

My Mate Vince, "Setting up the Fitbit Alta HR Activity Tracker on Apple iOS", Online available at: <https://youtu.be/FdwRF4IfvFc>, Jun. 18, 2017, 3 pages.

Nerdtalk, "The Best Android Clock Widgets", available at: https://www.youtube.com/watch?v=E1bAprWByfU, Apr. 25, 2011, 1 page.

(56)                References Cited

OTHER PUBLICATIONS

New, but unsigned—Easy StopWatch for Symbian, XP55393563, Available online at <http://www.allaboutsymbian.com/flow/item/19490_New_but_unsigned-Easy_StopWatc.php>, Mar. 15, 2014, 15 pages.
Non-Final Office Action received for U.S. Appl. No. 14/815,890, mailed on Jun. 6, 2017. 19 pages.
Non-Final Office Action received for U.S. Appl. No. 14/815,890, mailed on Oct. 19, 2015, 5 pages.
Non-Final Office Action received for U.S. Appl. No. 15/881,544, mailed on Jun. 7, 2018, 15 pages.
Non-Final Office Action received for U.S. Appl. No. 15/421,865, mailed on Mar. 21, 2019, 18 pages.
Non-Final Office Action received for U.S. Appl. No. 14/815,879, mailed on Dec. 15, 2016, 33 pages.
Non-Final Office Action received for U.S. Appl. No. 14/815,890, mailed on Dec. 18, 2018, 21 pages.
Non-Final Office Action received for U.S. Appl. No. 14/839,889, mailed on Mar. 7, 2017, 26 pages.
Non-Final Office Action received for U.S. Appl. No. 15/355,956, mailed on May 31, 2019, 32 pages.
Non-Final Office Action received for U.S. Appl. No. 15/405,122, mailed on Apr. 2, 2021, 35 pages.
Non-Final Office Action received for U.S. Appl. No. 15/405,122, mailed on May 31, 2019, 43 pages.
Non-Final Office Action received for U.S. Appl. No. 15/405,122, mailed on Sep. 24, 2020, 30 pages.
Non-Final Office Action received for U.S. Appl. No. 15/421,865, mailed on Dec. 29, 2021, 23 pages.
Non-Final Office Action received for U.S. Appl. No. 15/421,865, mailed on Jul. 11, 2023, 32 pages.
Non-Final Office Action received for U.S. Appl. No. 15/421,865, mailed on Oct. 7, 2020, 20 pages.
Non-Final Office Action received for U.S. Appl. No. 16/401,934, mailed on Dec. 11, 2020, 26 pages.
Non-Final Office Action received for U.S. Appl. No. 16/582,020, mailed on Apr. 5, 2021, 29 pages.
Non-Final Office Action received for U.S. Appl. No. 16/582,020, mailed on Jan. 13, 2020, 39 pages.
Non-Final Office Action received for U.S. Appl. No. 16/585,399, mailed on Jan. 23, 2020, 28 pages.
Non-Final Office Action received for U.S. Appl. No. 16/861,651, mailed on Nov. 27, 2020, 11 pages.
Non-Final Office Action received for U.S. Appl. No. 16/861,651, mailed on Sep. 30, 2021, 16 pages.
Non-Final Office Action received for U.S. Appl. No. 16/935,002, mailed on Jun. 25, 2021, 20 pages.
Non-Final Office Action received for U.S. Appl. No. 16/943,737, mailed on Jun. 25, 2021, 18 pages.
Non-Final Office Action received for U.S. Appl. No. 16/943,737, mailed on Mar. 28, 2023, 28 pages.
Non-Final Office Action received for U.S. Appl. No. 16/997,588, mailed on Dec. 14, 2020, 21 pages.
Non-Final Office Action received for U.S. Appl. No. 17/031,654, mailed on Nov. 19, 2020, 12 pages.
Non-Final Office Action received for U.S. Appl. No. 17/031,671, mailed on Apr. 1, 2022, 32 pages.
Non-Final Office Action received for U.S. Appl. No. 17/031,671, mailed on Apr. 30, 2021, 27 pages.
Non-Final Office Action received for U.S. Appl. No. 17/031,671, mailed on Mar. 17, 2023, 34 pages.
Non-Final Office Action received for U.S. Appl. No. 17/031,765, mailed on Jun. 28, 2021, 32 pages.
Non-Final Office Action received for U.S. Appl. No. 17/031,765, mailed on Mar. 28, 2023, 31 pages.
Non-Final Office Action received for U.S. Appl. No. 17/031,765, mailed on Mar. 29, 2022, 33 pages.
Non-Final Office Action received for U.S. Appl. No. 17/041,350, mailed on Jun. 10, 2021, 24 pages.

Non-Final Office Action received for U.S. Appl. No. 17/373,163, mailed on Jan. 27, 2022, 14 pages.
Non-Final Office Action received for U.S. Appl. No. 17/556,165, mailed on Sep. 7, 2022, 15 pages.
Non-Final Office Action received for U.S. Appl. No. 17/717,275, mailed on Jul. 3, 2023, 10 pages.
Non-Final Office Action received for U.S. Appl. No. 17/738,940, mailed on Dec. 22, 2022, 31 pages.
Non-Final Office Action received for U.S. Appl. No. 17/746,807, mailed on Feb. 2, 2023, 14 pages.
Non-Final Office Action received for U.S. Appl. No. 17/746,807, mailed on Jul. 20, 2023, 14 pages.
Non-Final Office Action received for U.S. Appl. No. 17/947,530, mailed on Mar. 31, 2023, 14 pages.
Non-Final Office Action received for U.S. Appl. No. 17/949,081, mailed on Feb. 27, 2023, 19 pages.
Non-Final Office Action received for U.S. Appl. No. 14/815,879, mailed on Nov. 6, 2015, 35 pages.
Non-Final Office Action received for U.S. Appl. No. 14/815,898, mailed on Dec. 1, 2015, 22 pages.
Non-Final Office Action received for U.S. Appl. No. 14/815,907, mailed on Jan. 12, 2016, 22 pages.
Non-Final Office Action received for U.S. Appl. No. 14/815,909, mailed on Nov. 27, 2015, 12 pages.
Notice of Acceptance received for Australian Patent Application No. 2015298710, mailed on Oct. 8, 2019, 3 pages.
Notice of Acceptance received for Australian Patent Application No. 2017277813, mailed on Jun. 16, 2020, 3 pages.
Notice of Acceptance received for Australian Patent Application No. 2018201089, mailed on May 28, 2021, 3 pages.
Notice of Acceptance received for Austraiian Patent Application No. 2019262413, maiied on Nov. 23, 2021, 3 pages.
Notice of Acceptance received for Australian Patent Application No. 2020239670, mailed on Jul. 2, 2021, 3 pages.
Notice of Acceptance received for Austraiian Patent Application No. 2020239749, mailed on May 27, 2022, 3 pages.
Notice of Acceptance received for Australian Patent Application No. 2020239774, mailed on Jan. 5, 2022, 3 pages.
Notice of Acceptance received for Australian Patent Application No. 2020250323, mailed on Feb. 28, 2022, 3 pages.
Notice of Acceptance received for Austraiian Patent Application No. 2020269232, mailed on Dec. 18, 2021, 3 pages.
Notice of Acceptance received for Australian Patent Application No. 2021250863, mailed on Jan. 13, 2023, 3 pages.
Notice of Acceptance received for Australian Patent Application No. 2022201419, mailed on May 31, 2023, 3 pages.
Notice of Acceptance received for Australian Patent Application No. 2022202292, mailed on Jul. 6, 2022, 3 pages.
Notice of Acceptance received for Australian Patent Application No. 2022202583, mailed on Aug. 7, 2023, 3 pages.
Notice of Acceptance received for Australian Patent Application No. 2022203957, mailed on Sep. 27, 2023, 3 pages.
Notice of Acceptance received for Australian Patent Application No. 2022220279, mailed on Sep. 27, 2022, 3 pages.
Notice of Acceptance received for Australian Patent Application No. 2022235622, mailed on Sep. 13, 2023, 3 pages.
Notice of Acceptance received for Australian Patent Application No. 2023200039, mailed on Aug. 31, 2023, 3 pages.
Notice of Allowance received for Chinese Patent Application No. 201510479088.4, mailed on Jan. 21, 2021, 2 pages (1 page of Engtish Transiation and 1 page of Official Copy).
Notice of Allowance received for Chinese Patent Application No. 207510481525.6, mailed on May 27, 2019, 2 pages (1 page of English Translation and 1 page of Official Copy).
Notice of Allowance received for Chinese Patent Application No. 201510483268.X, mailed on Nov. 6, 2019, 2 pages (1 page of English translation and 1 page of Official Copy).
Notice of Allowance received for Chinese Patent Application No. 201510483305.7, mailed on Jan. 8, 2019, 3 pages (1 page of English Translation and 2 pages of Official Copy).
Notice of Allowance received for Chinese Patent Application No. 201510484514.3, mailed on Jun. 6, 2019, 2 pages (1 page of English Translation and 1 page of Official Copy).

(56) References Cited

OTHER PUBLICATIONS

Notice of Allowance received for Chinese Patent Application No. 201520594249.X, mailed on Jul. 12, 2016, 4 pages (2 pages of English Translation and 2 pages of Official Copy).

Notice of Allowance received for Chinese Patent Application No. 201780033973.7, mailed on Jul. 7, 2021, 5 pages (1 page of English Translation and 4 pages of Official Copy).

Notice of Allowance received for Chinese Patent Application No. 202111457936.3, mailed on Nov. 7, 2022, 4 pages (1 page of English Translation and 3 pages of Official Copy).

Notice of Allowance received for Danish Patent Application No. PA201570495, mailed on Feb. 22, 2017, 1 page.

Notice of Allowance received for Danish Patent Application No. PA201570496, mailed on Apr. 18, 2016, 2 pages.

Notice of Allowance received for Danish Patent Application No. PA202070623, mailed on Sep. 20, 2022, 2 pages.

Notice of Allowance received for Japanese Patent Application No. 2017-505450, mailed on Mar. 9, 2018, 10 pages (7 pages of English Translation and 3 pages of Official Copy).

Notice of Allowance received for Japanese Patent Application No. 2017-505842, mailed on Mar. 16, 2020, 4 pages (1 page of English Translation and 3 pages of Official Copy).

Notice of Allowance received for Japanese Patent Application No. 2017-505847, mailed on May 20, 2019, 4 pages (1 page of English Translation and 3 pages of Official Copy).

Notice of Allowance received for Japanese Patent Application No. 2018-074971, mailed on Apr. 23, 2019, 4 pages (1 page of English Translation and 3 pages of Official Copy).

Notice of Allowance received for Japanese Patent Application No. 2019-096219, mailed on Jun. 26, 2020, 4 pages (1 page of English Translation and 3 pages of Official Copy).

Notice of Allowance received for Japanese Patent Application No. 2020-124605, mailed on Dec. 5, 2022, 4 pages (1 page of English Translation and 3 pages of Official Copy).

Notice of Allowance received for Japanese Patent Application No. 2020-159823, mailed on Jul. 24, 2023, 23 pages (1 page of English Translation and 22 pages of Official Copy).

Notice of Allowance received for Japanese Patent Application No. 2020-159825, mailed on Mar. 25, 2022, 5 pages (1 page of English Translation and 4 pages of Official Copy).

Notice of Allowance received for Japanese Patent Application No. 2020-551465, mailed on Jun. 28, 2021, 4 pages (1 page of English Translation and 3 pages of Official Copy).

Notice of Allowance received for Japanese Patent Application No. 2020-562622, mailed on Aug. 26, 2022, 4 pages (1 page of English Translation and 3 pages of Official Copy).

Notice of Allowance received for Japanese Patent Application No. 2021-122610, mailed on Aug. 5, 2022, 4 pages (1 page of English Translation and 3 pages of Official Copy).

Notice of Allowance received for Japanese Patent Application No. 2021-565837, mailed on May 16, 2022, 4 pages (1 page of English Translation and 3 pages of Official Copy).

Notice of Allowance received for Japanese Patent Application No. 2022-096730, mailed on Jun. 5, 2023, 4 pages (1 page of English Translation and 3 pages of Official Copy).

Notice of Allowance received for Japanese Patent Application No. 2022-139320, mailed on Jan. 6, 2023, 4 pages (1 page of English Translation and 3 pages of Official Copy).

Notice of Allowance received for Korean Patent Application No. 10-2017-7005939, mailed on Mar. 30, 2018, 5 pages (2 pages of English Translation and 3 pages of Official Copy).

Notice of Allowance received for Korean Patent Application No. 10-2018-7018904, mailed on Jun. 26, 2020, 4 pages (1 page of English Translation and 3 pages of Official Copy).

Notice of Allowance received for Korean Patent Application No. 10-2020-0123852, mailed on Mar. 9, 2023, 7 pages (2 pages of English Translation and 5 pages of Official Copy).

Notice of Allowance received for Korean Patent Application No. 10-2020-0123852, mailed on Nov. 28, 2022, 7 pages (2 pages of English Translation and 5 pages of Official Copy).

Notice of Allowance received for Korean Patent Application No. 10-2020-0123857, mailed on Feb. 21, 2023, 6 pages (1 page of English Translation and 5 pages of Official Copy).

Notice of Allowance received for Korean Patent Application No. 10-2020-0123887, mailed on Nov. 28, 2022, 7 pages (2 pages of English Translation and 5 pages of Official Copy).

Notice of Allowance received for Korean Patent Application No. 10-2020-7026036, mailed on Jul. 26, 2021, 4 pages (1 page of English Translation and 3 pages of Official Copy).

Notice of Allowance received for Korean Patent Application No. 10-2020-7028759, mailed on Oct. 19, 2021, 4 pages (1 page of English Translation and 3 pages of Official Copy).

Notice of Allowance received for Korean Patent Application No. 10-2021-7034748, mailed on Jan. 27, 2022, 6 pages (2 pages of English Translation and 4 pages of Official Copy).

Notice of Allowance received for Korean Patent Application No. 10-2021-7036246, mailed on Mar. 2, 2022, 5 pages (1 page of English Translation and 4 pages of Official Copy).

Notice of Allowance received for Korean Patent Application No. 10-2022-7001721, mailed on Feb. 28, 2022, 5 pages (1 page of English Translation and 4 pages of Official Copy).

Notice of Allowance received for Korean Patent Application No. 10-2022-7014529, mailed on Dec. 13, 2022, 8 pages (2 pages of English Translation and 6 pages of Official Copy).

Notice of Allowance received for Korean Patent Application No. 10-2023-0064928, mailed on Sep. 22, 2023, 7 pages (2 pages of English Translation and 5 pages of Official Copy).

Notice of Allowance received for Taiwanese Patent Application No. 104124962, mailed on Jul. 27, 2017, 3 pages (Official Copy only) {See Communication under 37 CFR § 1.98(a) (3)}.

Notice of Allowance received for Taiwanese Patent Application No. 104124963, mailed on Sep. 28, 2017, 5 pages (1 page of English Translation of Search report and 4 pages of Official Copy).

Notice of Allowance received for Taiwanese Patent Application No. 104124995, mailed on Jul. 27, 2017, 3 pages (Official Copy only) (See Communication under 37 CFR § 1.98(a) (3)}.

Notice of Allowance received for Taiwanese Patent Application No. 104124997, mailed on Jun. 16, 2017, 5 pages (1 page of English Translation of Search report and 4 pages of Official Copy).

Notice of Allowance received for Taiwanese Patent Application No. 104124998, mailed on Mar. 31, 2017, 3 pages (Official Copy only) {See Communication under 37 CFR § 1.98(a) (3)}.

Notice of Allowance received for U.S. Appl. No. 14/815,879, mailed on Jun. 26, 2017, 8 pages.

Notice of Allowance received for U.S. Appl. No. 14/815,890, mailed on Feb. 12, 2021, 8 pages.

Notice of Allowance received for U.S. Appl. No. 14/815,898, mailed on Dec. 5, 2016, 3 pages.

Notice of Allowance received for U.S. Appl. No. 14/815,898, mailed on Oct. 24, 2016, 14 pages.

Notice of Allowance received for U.S. Appl. No. 14/815,907, mailed on Jul. 28, 2016, 9 pages.

Notice of Allowance received for U.S. Appl. No. 14/815,907, mailed on Nov. 30, 2016, 2 pages.

Notice of Allowance received for U.S. Appl. No. 14/815,909, mailed on Jun. 9, 2016, 3 pages.

Notice of Allowance received for U.S. Appl. No. 14/815,909, mailed on May 3, 2016, 12 pages.

Notice of Allowance received for U.S. Appl. No. 14/815,909, mailed on May 20, 2018, 2 pages.

Notice of Allowance received for U.S. Appl. No. 14/815,909, mailed on Sep. 6, 2018, 2 pages.

Notice of Allowance received for U.S. Appl. No. 14/839,889, mailed on Oct. 30, 2017, 16 pages.

Notice of Allowance received for U.S. Appl. No. 15/355,956, mailed on Nov. 22, 2019, 29 pages.

Notice of Allowance received for U.S. Appl. No. 15/798,257, mailed on May 22, 2019, 14 pages.

Notice of Allowance received for U.S. Appl. No. 15/881,544, mailed on Jun. 26, 2019, 6 pages.

Notice of Allowance received for U.S. Appl. No. 15/881,544, mailed on Nov. 7, 2019, 5 pages.

(56) References Cited

OTHER PUBLICATIONS

Notice of Allowance received for U.S. Appl. No. 16/401,934, mailed on Feb. 6, 2022, 8 pages.
Notice of Allowance received for U.S. Appl. No. 16/401,934, mailed on Nov. 1, 2021, 11 pages.
Notice of Allowance received for U.S. Appl. No. 16/582,020, mailed on Jul. 27, 2021, 29 pages.
Notice of Allowance received for U.S. Appl. No. 16/585,366, mailed on Jan. 2, 2020, 6 pages.
Notice of Allowance received for U.S. Appl. No. 16/585,399, mailed on Jul. 21, 2020, 9 pages.
Notice of Allowance received for U.S. Appl. No. 16/867,002, mailed on Aug. 20, 2021, 12 pages.
Notice of Allowance received for U.S. Appl. No. 16/867,002, mailed on Mar. 1, 2022, 7 pages.
Notice of Allowance received for U.S. Appl. No. 16/935,002, mailed on Feb. 15, 2023, 15 pages.
Notice of Allowance received for U.S. Appl. No. 16/935,002, mailed on Jun. 28, 2023, 8 pages.
Notice of Allowance received for U.S. Appl. No. 16/997,588, mailed on Mar. 18, 2022, 9 pages.
Notice of Allowance received for U.S. Appl. No. 16/997,588, mailed on Sep. 30, 2021, 12 pages.
Notice of Allowance received for U.S. Appl. No. 17/031,654, mailed on Feb. 10, 2021, 9 pages.
Notice of Allowance received for U.S. Appl. No. 17/031,654, mailed on May 27, 2021, 8 pages.
Notice of Allowance received for U.S. Appl. No. 17/041,350, mailed on Feb. 24, 2022, 6 pages.
Notice of Allowance received for U.S. Appl. No. 17/373,163, mailed on Jul. 27, 2022, 8 pages.
Notice of Allowance received for U.S. Appl. No. 17/373,163, mailed on May 11, 2022, 8 pages.
Notice of Allowance received for U.S. Appl. No. 17/515,143, mailed on Dec. 16, 2022, 11 pages.
Notice of Allowance received for U.S. Appl. No. 17/515,143, mailed on Mar. 13, 2023, 10 pages.
Notice of Allowance received for U.S. Appl. No. 17/556,165, mailed on Feb. 21, 2023, 12 pages.
Notice of Allowance received for U.S. Appl. No. 17/738,940, mailed on Jun. 22, 2023, 9 pages.
Notice of Allowance received for U.S. Appl. No. 17/738,940, mailed on Oct. 2, 2023, 9 pages.
Notice of Allowance received for U.S. Appl. No. 17/941,962, mailed on Jul. 3, 2023, 9 pages.
Notice of Allowance received for U.S. Appl. No. 17/941,962, mailed on Mar. 10, 2023, 11 pages.
Notice of Allowance received for U.S. Appl. No. 17/941,962, mailed on May 3, 2023, 10 pages.
Nova, "Tour of the Solar System", Retrieved from <http://www.pbs.org/wgbh/nova/space/tour~solar~system.html>, May 24, 2013, 14 pages.
Obara Yuuta, "iPhone Application Selection for Univesity Students", Shuwa System Co., Saito Kazukuni, vol. 1, May 16, 2013, 4 pages (Official Copy only) {See Communication under 37 CFR § 1.98(a) (3)}.
Octoba, "Just Install It—Utilizing Method for Android Application Business", ASCII Media Works Co. Takano Kiyoshi, vol. 1, Apr. 25, 2013, 6 pages (Official Copy only) {See Communication under 37 CFR § 1.98(a) (3)}.
Office Action received for Australian Patent Application No. 2015101020, mailed on Oct. 26, 2015, 8 pages.
Office Action received for Danish Patent Application No. PA201570499, mailed on Nov. 1, 2017, 6 pages.
Office Action received for European Patent Application No. 15730924.6, mailed on Dec. 12, 2017, 8 pages.
Office Action received for Australian Patent Application No. 2015101019, issued on Oct. 14, 2015, 3 pages.
Office Action received for Australian Patent Application No. 2015101019, issued on Apr. 7, 2016, 4 pages.

Office Action received for Australian Patent Application No. 2015101021, issued on Apr. 26, 2016, 4 pages.
Office Action received for Australian Patent Application No. 2015101021, issued on Oct. 28, 2015, 10 pages.
Office Action received for Australian Patent Application No. 2015298710, mailed on Apr. 13, 2017, 3 pages.
Office Action received for Australian Patent Application No. 2015298710, mailed on Feb. 15, 2017, 2 pages.
Office Action received for Australian Patent Application No. 2015298710, mailed on Nov. 6, 2018, 4 pages.
Office Action received for Australian Patent Application No. 2015298710, mailed on Sep. 24, 2018, 4 pages.
Office Action received for Australian Patent Application No. 2016100411, mailed on Jun. 10. 2016, 3 pages.
Office Action received for Australian Patent Application No. 2016100476, mailed on Jun. 9, 2016, 4 pages.
Office Action received for Australian Patent Application No. 2016100765, issued on Aug. 5, 2016, 2 pages.
Office Action received for Australian Patent Application No. 2016100765, mailed on Dec. 16, 2016, 3 pages.
Office Action received for Australian Patent Application No. 2017277813, mailed on Jun. 11, 2019, 3 pages.
Office Action received for Australian Patent Application No. 2017277813, mailed on Mar. 20, 2020, 4 pages.
Office Action received for Australian Patent Application No. 2018201089, mailed on Jul. 23, 2020, 4 pages.
Office Action received for Australian Patent Application No. 2018201089, mailed on Oct. 11, 2019, 4 pages.
Office Action received for Australian Patent Application No. 2019267413, mailed on Jun. 29, 2021, 3 pages.
Office Action received for Australian Patent Application No. 2020239670, mailed on Mar. 3, 2021, 4 pages.
Office Action received for Australian Patent Application No. 2020239749, mailed on Jan. 21, 2022, 4 pages.
Office Action received for Australian Patent Application No. 2020239749, mailed on Jul. 16, 2021, 5 pages.
Office Action received for Australian Patent Application No. 2020239774, mailed on Jun. 28, 2021, 8 pages.
Office Action received for Australian Patent Application No. 2020239774, mailed on Oct. 5, 2021, 3 pages.
Office Action received for Australian Patent Application No. 2020250323, mailed on Dec. 14, 2021, 2 pages.
Office Action received for Australian Patent Application No. 2021250863, mailed on Oct. 6, 2022, 6 pages.
Office Action received for Australian Patent Application No. 2022201419, mailed on Mar. 20, 2023, 3 pages.
Office Action received for Australian Patent Application No. 2022202292, mailed on May 10, 2022, 2 pages.
Office Action received for Australian Patent Application No. 2022202583, mailed on Mar. 24, 2023, 4 pages.
Office Action received for Australian Patent Application No. 2022203957, mailed on May 12, 2023, 5 pages.
Office Action received for Australian Patent Application No. 2022235622, mailed on Jun. 27, 2023, 3 pages.
Office Action received for Australian Patent Application No. 2022235622, mailed on May 22, 2023, 2 pages.
Office Action received for Australian Patent Application No. 2023200039, mailed on Jul. 4, 2023, 2 pages.
Office Action received for Australian Patent Application No. 2015101019, mailed on Feb. 12, 2016, 4 pages.
Office Action received for Chinese Patent Application No. 201520595384.6, mailed on Mar. 25, 2016, 3 pages (1 page of English Translation and 2 pages of Official Copy).
Office Action received for Chinese Patent Application No. 201510479088.4, mailed on Apr. 22, 2020, 7 pages (3 pages of English Translation and 4 pages of Official Copy).
Office Action received for Chinese Patent Application No. 201510479088.4, mailed on Mar. 12, 2018, 20 pages (6 pages of English Translation and 14 pages of Qfficial Copy).
Office Action received for Chinese Patent Appiication No. 201510479088.4, mailed on May 7, 2019, 6 pages (3 pages of English Translation and 3 pages of Official Copy).

(56) References Cited

OTHER PUBLICATIONS

Office Action received for Chinese Patent Application No. 201510481525.6, mailed on Aug. 29, 2018, 10 pages (5 pages of English Translation and 5 pages of Official Copy).

Office Action received for Chinese Patent Application No. 201510481525.6, mailed on Nov. 29, 2017, 9 pages (3 pages of English Transtation and 6 pages of Official Copy).

Office Action received for Chinese Patent Application No. 201510483268.X, mailed on Apr. 16, 2019, 6 pages (3 pages of English Translation and 3 pages of Official Copy).

Office Action received for Chinese Patent Application No. 201510483268.X, mailed on Dec. 1, 2017, 11 pages (5 pages of Engliish Translation and 6 pages of Official Copy).

Office Action received for Chinese Patent Application No. 201510483268.X, mailed on Oct. 19, 2018, 10 pages (5 pages of English Translation and 5 pages of Official Copy).

Office Action received for Chinese Patent Application No. 201510483305.7, mailed on Aug. 31, 2018, 10 pages (5 pages of English Translation and 5 pages of Official Copy).

Office Action received for Chinese Patent Application No. 201510483305.7, mailed on Dec. 1, 2017, 13 pages (5 pages of English Translation and 8 pages of Official Copy).

Office Action received for Chinese Patent Application No. 201510484514.3, mailed on Apr. 4, 2018, 12 pages (5 pages of English Translation and 7 pages of Official Copy).

Office Action received for Chinese Patent Application No. 201510484514.3, mailed on Dec. 24, 2018, 13 pages (6 pages of English Translation and 7 pages of Official Copy).

Office Action received for Chinese Patent Application No. 201520594249.X, mailed on Mar. 25, 2016, 3 pages (1 page of Engiisn Translation and 2 pages of Official Copy).

Office Action received for Chinese Patent Application No. 201520595384.6 mailed on Dec. 30, 2018, 2 pages (Official Copy only) {See Communication under 37 CFR § 1.98(a) (3)}.

Office Action received for Chinese Patent Application No. 201520595384.6, mailed on Jul. 22, 2016, 3 pages (1 page of English Translation and 2 pages of Official Copy).

Office Action received for Chinese Patent Application No. 201520595385.0, mailed on Dec. 30, 2016, 2 pages (Official Copy only) {See Communication under 37 CFR § 1.98(a) (3)}.

Office Aciion received for Chinese Patent Appiication No. 201520595385.0, mailed on Jul. 22, 2016, 3 pages (1 page of Engiish Translation and 2 pages of Offcial Copy).

Office Action received for Chinese Patent Application No. 201520595385.0, mailed on Mar. 25, 2016, 3 pages (1 page of English Translation and 2 pages of Official Copy).

Office Action Received for Chinese Patent Application No. 201520595408.8, mailed on Dec. 9, 2015, 4 pages. (2 pages of English Translation and 2 pages of Official Copy).

Office Action Received for Chinese Patent Application No. 201520595408.8, mailed on Dec. 30, 2016, 2 pages (Official Copy only) {See Communication under 37 CFR § 1.98(a) (3)}.

Office Action received for Chinese Patent Application No. 201520595408.8, mailed on Jul. 25, 2016, 3 pages (1 page of English Translation and 2 pages of Official Copy).

Office Action received for Chinese Patent Application No. 201520595408.8, mailed on Mar. 25, 2016, 3 pages (1 page of English Translation and 2 pages of Official Copy).

Office Action received for Chinese Patent Application No. 201520595538.1, mailed on Dec. 30, 2016, 2 pages (Official Copy only) {See Communication under 37 CFR § 1.98(a) (3)}.

Office Action received for Chinese Patent Application No. 201520595538.1, mailed on Jul. 22, 2016, 3 pages (1 page of English Translation and 2 pages of Official Copy).

Office Action received for Chinese Patent Application No. 201520595538.1, mailed on Mar. 25, 2016, 3 pages (1 page of English Translation and 2 pages of Official Copy).

Office Action received for Chinese Patent Application No. 201780033973.7, mailed on Jan. 22, 2021, 27 pages (11 pages of English Translation and 16 pages of Official Copy).

Office Action received for Chinese Patent Application No. 202111457936.3, mailed on Jul. 5, 2022, 18 pages (9 pages of English Translation and 9 pages of Official Copy).

Office Action Received for Chinese Patent Application No. 201520594249.X, mailed on Dec. 9, 2015, 4 pages (2 pages of English Translation and 2 pages of Official Copy).

Office Action Received for Chinese Patent Application No. 201520595384.6, mailed on Dec. 9, 2015, 4 pages (2 pages of English Translation and 2 pages of Official Copy).

Office Action Received for Chinese Patent Application No. 201520595385.0, mailed on Dec. 9, 2015, 4 pages (2 pages of English Translation and 2 pages of Official Copy).

Office Action Received for Chinese Patent Application No. 201520595538.1, mailed on Dec. 9, 2015, 4 pages (2 pages of English Translation and 2 pages of Official Copy).

Office Action received for Danish Patent Application No. PA201570495, mailed on Dec. 9, 2016, 2 pages.

Office action received for Danish Patent Application No. PA201570495, mailed on May 4, 2016, 8 pages.

Office Action received for Danish Patent Application No. PA201570495, mailed on Oct. 29, 2015, 7 pages.

Office Action received for Danish Patent Application No. PA201570497, mailed on Feb. 21, 2017, 3 pages.

Office Action received for Danish Patent Application No. PA201570497, mailed on May 17, 2016, 6 pages.

Office Action received for Danish Patent Application No. PA201570497, mailed on Nov. 15, 2016, 2 pages.

Office Action received for Danish Patent Application No. PA201570497, mailed on Oct. 24, 2017, 2 pages.

Office Action received for Danish Patent Application No. PA201570498, mailed on Feb. 6, 2017, 2 pages.

Office Action received for Danish Patent Application No. PA201570498, mailed on Jun. 2, 2016, 8 pages.

Office Action received for Danish Patent Application No. PA201570498, mailed on Oct. 26, 2017, 5 pages.

Office Action received for Danish Patent Application No. PA201570498, mailed on Oct. 30, 2015, 7 pages.

Office Action received for Danish Patent Application No. PA201570499, mailed on Feb. 14, 2017, 2 pages.

Office Action received for Danish Patent Application No. PA201570499, mailed on Jun. 16, 2016, 8 pages.

Office Action received for Danish Patent Application No. PA201570499, mailed on Jun. 19, 2018, 4 pages.

Office Action received for Danish Patent Application No. PA201570499, mailed on Nov. 3, 2015, 7 pages.

Office Action received for Danish Patent Application No. PA202070609, mailed on Dec. 10, 2020, 8 pages.

Office Action received for Danish Patent Application No. PA202070610, mailed on Jun. 18, 2021, 8 pages.

Office Action received for Danish Patent Application No. PA202070610, mailed on Mar. 14, 2022, 7 pages.

Office Action received for Danish Patent Application No. PA202070623, mailed on Aug. 24, 2021, 3 pages.

Office Action received for Danish Patent Application No. PA202070623, mailed on May 23, 2022, 3 pages.

Office Action received for Danish Patent Application No. PA202070624, mailed on Feb. 4, 2022, 4 pages.

Office Action received for Danish Patent Application No. PA202070624, mailed on Jun. 16, 2021, 5 pages.

Office Action received for Danish Patent Application No. PA202070625, mailed on Feb. 8, 2022, 2 pages.

Office Action received for Danish Patent Application No. PA202070625, mailed on Jun. 16, 2021, 3 pages.

Office Action received for Danish Patent Application No. PA202070625, mailed on Sep. 23, 2022, 4 pages.

Office Action received for Danish Patent Application No. PA201570496, mailed on Oct. 29, 2015, 6 pages.

Office Action received for Danish Patent Application No. PA201570497, mailed on Oct. 30, 2015, 6 pages.

Office Action received for European Patent Application No. 15730925.3, mailed on Apr. 12, 2018, 8 pages.

Office Action received for European Patent Application No. 15747595.5, mailed on Apr. 15, 2019, 4 pages.

(56) References Cited

OTHER PUBLICATIONS

Office Action received for European Patent Application No. 15747595.5, mailed on Jun. 27, 2018, 8 pages.

Office Action received for European Patent Application No. 17810723.1, mailed on Jul. 9, 2021, 8 pages.

Office Action received for European Patent Application No. 19724997.2, mailed on Oct. 27, 2022, 5 pages.

Office Action received for European Patent Application No. 20729346.5, mailed on Jan. 17, 2022, 8 pages.

Office Action received for European Patent Application No. 20729346.5, mailed on Jul. 28, 2022, 9 pages.

Office Action received for European Patent Application No. 20730136.7, mailed on Jan. 19, 2023, 4 pages.

Office Action received for European Patent Application No. 20730136.7, mailed on Jun. 27, 2023, 5 pages.

Office Action received for European Patent Application No. 20730136.7, mailed on Oct. 6, 2022, 11 pages.

Office Action received for European Patent Application No. 21728746.5, mailed on Aug. 21, 2023, 4 pages.

Office Action received for European Patent Application No. 15730925.3, mailed on Feb. 27, 2019, 5 pages.

Office Action received for German Patent Application No. 112015003083.2, mailed on Mar. 9, 2018, 12 pages (5 pages of English Translation and 7 pages of Official Copy).

Office Action received for Indian Patent Application No. 202017041557, mailed on Dec. 8, 2021, 8 pages.

Office Action received for Indian Patent Application No. 202017048447, mailed on Sep. 5, 2022, 6 pages.

Office Action received for Japanese Patent Application No. 2017-505450, mailed on Jun. 20, 2017, 8 pages (4 pages of English Translation and 4 pages of Official Copy).

Office Action received for Japanese Patent Application No. 2017-505842, mailed on Feb. 22, 2019, 11 pages (6 pages of English Translation and 5 pages of Official Copy).

Office Action received for Japanese Patent Application No. 2017-505842, mailed on Sep. 9, 2019, 7 pages (3 pages of English Translation and 4 pages of Official Copy).

Office Action received for Japanese Patent Application No. 2017-505847, mailed on Feb. 12, 2019, 13 pages (6 pages of English Translation and 7 pages of Official Copy).

Office Action received for Japanese Patent Application No. 2018-074971, mailed on Jan. 28, 2019, 6 pages (3 pages of English Translation and 3 pages of Official Copy).

Office Action received for Japanese Patent Application No. 2020-124605, mailed on Dec. 17, 2021, 2 pages (1 page of English Translation and 1 page of Official Copy).

Office Action received for Japanese Patent Application No. 2020-124605, mailed on May 13, 2022, 6 pages (3 pages of English Translation and 3 pages of Official Copy).

Office Action received for Japanese Patent Application No. 2020-124605, mailed on Sep. 3, 2021, 5 pages (2 pages of English Translation and 3 pages of Official Copy).

Office Action received for Japanese Patent Application No. 2020-159823, mailed on Aug. 15, 2022, 6 pages (3 pages of English Translation and 3 pages of Official Copy).

Office Action received for Japanese Patent Application No. 2020-159823, mailed on Dec. 23, 2021, 8 pages (4 pages of English Translation and 4 pages of Official Copy).

Office Action received for Japanese Patent Application No. 2020-159824, mailed on Dec. 17, 2021, 13 pages (7 pages of English Translation and 6 pages of Official Copy).

Office Action received for Japanese Patent Application No. 2020-159825, mailed on Dec. 10, 2021, 4 pages (2 pages of English Translation and 2 pages of Official Copy).

Office Action received for Japanese Patent Application No. 2020-562622, mailed on Jan. 7, 2022, 13 pages (6 pages of English Translation and 7 pages of Official Copy).

Office Action received for Korean Patent Application No. 10-2017-7005939, mailed on Jun. 30, 2017, 6 pages (2 pages of English Translation and 4 pages of Official Copy).

Office Action received for Korean Patent Application No. 10-2018-7018904, mailed on Aug. 20, 2019, 8 pages (3 pages of English Translation and 5 pages of Official Copy).

Office Action received for Korean Patent Application No. 10-2020-0123852, mailed on Jun. 9, 2022, 10 pages (4 pages of English Translation and 6 pages of Official Copy).

Office Action received for Korean Patent Application No. 10-2020-0123857, mailed on Dec. 16, 2022, 8 pages (4 pages of English Translation and 4 pages of Official Copy).

Office Action received for Korean Patent Application No. 10-2020-0123857, mailed on Jun. 9, 2022, 12 pages (5 pages of English Translation and 7 pages of Official Copy).

Office Action received for Korean Patent Application No. 10-2020-0123887, mailed on Jun. 9, 2022, 5 pages (2 pages of English Translation and 3 pages of Official Copy).

Office Action received for Korean Patent Application No. 10-2020-7026036, mailed on Dec. 7, 2020, 8 pages (3 pages of English Translation and 5 pages of Official Copy).

Office Action received for Korean Patent Application No. 10-2020-7028759, mailed on Jun. 29, 2021, 12 pages (5 pages of English Translation and 7 pages of Official Copy).

Office Action received for Korean Patent Application No. 10-2020-7032187, mailed on Jun. 10, 2022, 16 pages (7 pages of English Translation and 9 pages of Official Copy).

Office Action received for Korean Patent Application No. 10-2021-7036246, mailed on Nov. 26, 2021, 5 pages (2 pages of English Translation and 3 pages of Official Copy).

Office Action received for Korean Patent Application No. 10-2022-7019034, mailed on Sep. 18, 2023, 6 pages (2 pages of English Translation and 4 pages of Official Copy).

Office Action received for Korean Patent Application No. 10-2023-0064928, mailed on Jun. 9, 2023, 6 pages (2 pages of English Translation and 4 pages of Official Copy).

Office Action received for Netherland Patent Application No. 2015245, mailed on Jan. 24, 2017, 11 pages (1 page of English Translation and 10 pages of Official Copy).

Office Action received for Netherlands Patent Application No. 2015239, mailed on Oct. 28, 2016, 13 pages (5 pages of English Translation and 8 pages of Official Copy).

Office Action Received for Taiwanese Patent Application No. 104124962, issued on Nov. 29, 2016, 6 pages (3 pages of English Translation and 3 pages of Official Copy).

Office Action received for Taiwanese Patent Application No. 104124998, mailed on Nov. 29, 2016, 6 pages (3 pages of English Translation and 3 pages of Official Copy).

Office Action received for Taiwanese Patent Application No. 104124963, mailed on Jan. 5, 2017, 11 pages (5 pages of English Translation and 6 pages of Official Copy).

Office Action received for Taiwanese Patent Application No. 104124995, issued on Dec. 1, 2016, 6 pages (3 pages of English Translation and 3 pages of Official Copy).

Office Action received for Taiwanese Patent Application No. 104124997, issued on Dec. 8, 2016, 12 pages (5 pages of English Translation and 7 pages of Official Copy).

Omar Romero, "Sony Smartwatch 2 Custom Watchfaces Tutoriai", Retrieved From <https://www.youtube.com/watch?v=8odbxqwSQR8>, May 1, 2014, 2 pages.

Pentax K20D Operating Manuai, http://www.ricoh-imaging.eu/en/operating-manuais-downtoad.html, Pentax Corporation, 2008, pp. 173-174.

Phlam Dev, "Clockwork Tomato Presentation", Retrieved from the Internet: URL: https://www.youtube.com/watch48 v32 2IQDx9REn0E. Apr. 29, 2016, 6 pages.

Phonebuff, "Hybrid Stopwatch & Timer Android App Review", Available Online at: http://www.youtube.com/watch?v=B43oCFPiWvY, Apr. 4, 2012, 7 pages.

Poppinga et al., "Sensor-Based identification of Opportune Moments for Triggering Notifications", IEEE CS, Mar. 14, 2014, pp. 22-29.

Pradhan et al., "Understanding and Managing Notifications", IEEE INFOCOM 2017—IEEE Conference on Computer Communications, May 1, 2017, 9 pages.

(56) References Cited

OTHER PUBLICATIONS

Pre-Appeal Review Report received for Japanese Patent Application No. 20120-159823, mailed on Jan. 12, 2023, 4 pages (2 pages of English Translation and 2 pages of Official Copy).
Pre-Interview First Office Action received for U.S. Appl. No. 14/815,890, mailed on May 26, 2016, 4 pages.
Record of Oral Hearing received for U.S. Appl. No. 14/815,890, mailed on Nov. 20, 2020, 18 pages.
Record of Oral Hearing received for U.S. Appl. No. 15/405,122, mailed on Sep. 12, 2023, 20 pages.
Record of Oral Hearing received for U.S. Appl. No. 16/861,651, mailed on Sep. 5, 2023, 16 pages.
Rehman A, "Install Android 4.2 Gesture-Based Keyboard & Clock App On Jelly Bean 4.1 Or Higher", Excerpts From, Available online at <http://www.addictivetips.com/android/install~android~4~2~keyboard~clock~app~apk~on~jelly~bean~4~1~x/>, Nov. 3, 2012, 4 pages.
Restriction Requirement received for U.S. Appl. No. 14/815,890, mailed on Feb. 22, 2016, 5 pages.
Restriction Requirement received for U.S. Appl. No. 17/949,081, mailed on Dec. 2, 2022, 6 pages.
Restriction Requirement received for U.S. Appl. No. 17/949,081, mailed on Jan. 3, 2023, 6 pages.
Result of Consultation received for European Patent Application No. 17810723.1, mailed on Nov. 30, 2022, 3 pages.
Result of Consultation received for European Patent Application No. 20185974.1, mailed on Apr. 4, 2022, 4 pages.
Result of Consultation received for European Patent Application No. 20729346.5, mailed on Jun. 21, 2023, 3 pages.
Result of Consultation received for European Patent Application No. 15730925.3, mailed on Nov. 24, 2020, 4 pages.
Rosa et al., "Stripe Generator—a Free Tool for the Web Design Community", Available online at: http://www.stripegenerator.com/, Mar. 28, 2019, 10 pages.
Rowinski Dan, "Why The All-In-One Smartwatch Isn't Happening Any Time Soon", Online available at: https://web.archive.org/web/20140123074218if_/https://readwrite.com/2014/01/20/smartwatch-wearable-fitness-remote-control/, Jan. 20, 2014, 6 pages.
Rozario Hamlin, "How to Edit Photos on iPhone & iPad", Online Available at: https://osxdaily.com/2020/01/23/how-to-edit-photos-on-iphone-ipad/, Jan. 23, 2020, 10 pages.
Search Report and Opinion received for Danish Patent Application No. PA202070610, mailed on Jan. 8, 2021, 9 pages.
Search Report and Opinion received for Danish Patent Application No. PA202070623, mailed on Dec. 21, 2020, 9 pages.
Search Report and Opinion received for Danish Patent Application No. PA202070624, mailed on Dec. 10, 2020, 10 pages.
Search Report and Opinion received for Danish Patent Application No. PA202070625, mailed on Dec. 17, 2020, 9 pages.
Search Report and Opinion Received for Netherland Patent Application No. 2015232, mailed on Jan. 25, 2017, 9 pages (1 page of English Translation and 8 pages of Official Copy).
Search Report and Opinion received for Netherlands Patent Application No. 2015242, issued on Jul. 4, 2017., 20 pages (10 pages of English Translation of Search Opinion and 10 pages of official Copy).
Search Report and Opinion received for Netherlands Patent Application No. 2018531, issued on Jul. 27, 2017, 14 pages (6 pages of English Translation and 8 pages of Official Copy).
Search Report received for Netherland Patent Application No. 2015236, mailed on Apr. 21, 2021, 19 pages (13 pages of English Translation and 6 pages of Official Copy).
Shiota Shinji, "Windows 7 Dojo", Weekly ASCII, Ascii Mediaworks Inc., vol. 798, Aug. 31, 2010, 3 pages.
Singh Lovepreet, "Samsung Galaxy Watch: How to Change Watch Face—Tips and Tricks", Online available at :<https://www.youtube.com/watch?pp=desktop&v=IN7gPxTZ1qU>, Dec. 4, 2018, 80 pages.
Smartwatch, "App Earth Space HD Live Wallpaper APK for Smart Watch", Version 1.7, Android version 2.2, Aug. 27, 2013, 1 page.
Solar Walk Free, Vito Technology, Jun. 19, 2014, 9 pages.
Sony Smartwatch 2 update—new features and watchface creator!!! New!!!, Online available at: https://www.youtube.com/watch?v=k3jjBv7QZSk, May 8, 2014, 3 pages.
Sony, "Live View_micro display", Extended User Guide, Aug. 2010, 27 pages.
Sony, "Sony SmartWatch", User Guide, Dec. 2011, 18 pages.
Stateoftech, "Samsung Galaxy Gear Tips—Installing and Customizing Clock Faces", Online available at: https://www.youtube.com/watch?v=p2GzpL3xlUo, Dec. 12, 2013, 3 pages.
Stateoftech, "Samsung Galaxy Gear Tips—Change the Clock Face", Retrieved from: https://www.youtube.com/watch?v=GOom7AZUAjY. Dec. 11, 2013, 2 pages.
Summons to Attend Oral Proceedings received for European Patent Application No. 15730924.6, mailed on Jun. 13, 2018, 10 pages.
Summons to Attend Oral Proceedings received for European Patent Application No. 15730925.3, mailed on Oct. 2, 2019, 8 pages.
Summons to Attend Oral Proceedings received for European Patent Application No. 17810723.1, mailed on Jul. 5, 2022, 8 pages.
Summons to Attend Oral Proceedings received for European Patent Application No. 20729346.5, mailed on Jan. 23, 2023, 11 pages.
Sun Set, "Sun Set solar image clock", Available at <https://web.archive.orgjweb/20140719005410/http://www.sunsetclock.com/>, 2013, 5 pages.
Supplemental Notice of Allowance received for U.S. Appl. No. 14/815,890, mailed on Mar. 10, 2021, 2 pages.
Supplemental Notice of Allowance received for U.S. Appl. No. 16/585,399, mailed on Aug. 26, 2020, 2 pages.
Supplemental Notice of Allowance received for U.S. Appl. No. 16/867,002, mailed on Mar. 16, 2022, 2 pages.
Supplemental Notice of Allowance received for U.S. Appl. No. 16/867,002, mailed on Sep. 9, 2021, 2 pages.
Supplemental Notice of Allowance received for U.S. Appl. No. 16/997,588, mailed on Apr. 20, 2022, 4 pages.
Supplemental Notice of Allowance received for U.S. Appl. No. 16/997,588, mailed on Oct. 22, 2021, 4 pages.
Talkandroid, "Android Wear walkthrough", Available online at: https://www.youtube.com/watch?v=4xntpZac4sw, Jun. 30, 2014, 1 page.
Techcloud, "How to Create Custom Watch Face for Samsung Galaxy Gear Smartwatch just in Few Seconds", Online available at: https://www.youtube.com/watch?v=6rO-_SREDjQ, Oct. 9, 2013, 3 pages.
Theunlockr, "How to Change the Watch Face on the Galaxy Gear", Online available at: https://www.youtube.com/watch?v=Z7EBG5aBiZg, Jan. 3, 2014, 3 pages.
UIKit User Interface Catalog: Page Controls, Available online at https://web.archive.org/web/20140703123442/https://developer.apple.com/library/ios/documentation/userexperience/conceptual/UIKitUICatalog/UIPageControl.html, Dec. 16, 2013, 4 pages.
Vidstube, "Bitmoji Clockface on Fitbit Versa Sense/Versa 3/Versa 2", Available online at:<https://www.youtube.com/watch?v=4V_xDnSLeHE>, Retrieved on Dec. 3, 2020, Jun. 30, 2019, 1 page.
Viticci Frederico, "Checking Time Zones with Living Earth—MacStories", Available at <https://www.macstories.net/reviews/checking-time-zones-with-living-earth/>, Dec. 11, 2013, pp. 1-5.
Watchophilia, "Mickey Mouse Watches", Online Available at: https://web.archive.org/web/20130929065422/https://www.watchophilia.com/photogallery/mickey-mouse/, Sep. 29, 2013, 16 pages.
Watchuseek, "The watch every father needs: M~I~C~K~E~Y, M~O~U~S~E. Mickey Mouse . . . ?", Online Available at: https://forums.watchuseek.com/f2/watch~every~father~needs~m~i~c-k-e-y-m-o-u-s-e-mickey-mouse-855069.html, 2013, 3 pages.
Wearablezone, "How To Set Up Your Fitbit Profile", Online available at: <https://youtu.be/jsWPtcDWiJM>, Jun. 6, 2016, 3 pages.
Woolsey Amanda, "How To Customize The Clock on the Apple Watch", Available online at:<https://www.youtube.com/watch?v=t-3Bckdd9B4>, Retrieved on Dec. 11, 2020, Apr. 25, 2015, 1 page.
Xdream, "TickTalk Video User Manual", YouTube [online] [video], Online available at: <https://youtu.be/jYhq3DwmVzo>, Mar. 17, 2017, 3 pages.
Zelgadis, "Reuse Animations-Synfig Animation Studio", Available online at: https://wiki.synfig.org/index.php?title=Doc:Reuse_Animations&oldid=18173, May 20, 2013, 5 pages.

(56)                References Cited

OTHER PUBLICATIONS

Zukerman Erez, "6 Beautiful, Interesting & Versatile Timer Apps [Android]", available at: http://www.makeuseof.com/tag/beautiful-interesting-versatile-timer-apps-android/, May 18, 2012, 5 pages.

Intention to Grant received for European Patent Application No. 22729905.4, mailed on Nov. 14, 2024, 9 pages.

Notice of Allowance received for Chinese Patent Application No. 202110369341.6, mailed on Nov. 4, 2024, 4 pages (1 page of English Translation and 3 pages of Official Copy).

Notice of Allowance received for Korean Patent Application No. 10-2023-0189466, mailed on Nov. 5, 2024, 10 pages (2 pages of English Translation and 8 pages of Official Copy).

Notice of Allowance received for U.S. Appl. No. 17/746,807, mailed on Nov. 14, 2024, 6 pages.

Applicant-Initiated Interview Summary received for U.S. Appl. No. 18/618,920, mailed on Jan. 17, 2025, 6 pages.

Final Office Action received for U.S. Appl. No. 18/196,345, mailed on Jan. 10, 2025, 15 pages.

Notice of Allowance received for Chinese Patent Application No. 202110367834.6, mailed on Jan. 2, 2025, 4 pages (1 page of English Translation and 3 pages of Official Copy).

Office Action received for Chinese Patent Application No. 202110367769.7, mailed on Dec. 27, 2024, 22 pages (7 pages of English Translation and 15 pages of Official Copy).

Office Action received for Chinese Patent Application No. 202110369265.9, mailed on Dec. 27, 2024, 16 pages (5 pages of English Translation and 11 pages of Official Copy).

Xuetao, Yang, "WP7 version of the desktop clock literary style Metro Time trial", Online available at: https://tech.sina.com.cn/s/s/2012-02-24/09216764878.shtml, Feb. 24, 2012, 10 pages (6 pages of English Translation and 4 pages of Official Copy).

Applicant-Initiated Interview Summary received for U.S. Appl. No. 18/196,345, mailed on Sep. 16, 2024, 4 pages.

Minority_14, "The Ultimate Beautiful Holo Stopwatch: Ultimate Stopwatch & Timer", Available online at: https://sspai.com/post/21699, Mar. 1, 2013, 4 pages (Official Copy only). {See Communication under Rule 37 CFR § 1.98(a) (3)}.

Non-Final Office Action received for U.S. Appl. No. 18/382,248, mailed on Sep. 28, 2024, 43 pages.

Notice of Allowance received for Chinese Patent Application No. 202110369387.8, mailed on Aug. 30, 2024, 2 pages (1 page of English Translation and 1 page of Official Copy).

Notice of Allowance received for Japanese Patent Application No. 2023-559823, mailed on Aug. 19, 2024, 5 pages (1 page of English Translation and 4 pages of Official Copy).

Notice of Allowance received for U.S. Appl. No. 15/421,865, mailed on Sep. 30, 2024, 6 pages.

Office Action received for Australian Patent Application No. 2023229597, mailed on Jul. 30, 2024, 3 pages.

Office Action received for Australian Patent Application No. 2023285972, mailed on Aug. 19, 2024, 2 pages.

Office Action received for Chinese Patent Application No. 202010697187.0, mailed on Jul. 25, 2024, 16 pages (5 pages of English Translation and 11 pages of Official Copy).

Office Action received for Chinese Patent Application No. 202110368426.2, mailed on Aug. 23, 2024, 17 pages (8 pages of English Translation and 9 pages of Official Copy).

Office Action received for Chinese Patent Application No. 202110369265.9, mailed on Jul. 31, 2024, 18 pages (6 pages of English Translation and 12 pages of Official Copy).

Office Action received for Chinese Patent Application No. 202110369341.6, mailed on Jul. 24, 2024, 11 pages (5 pages of English Translation and 6 pages of Official Copy).

Office Action received for Chinese Patent Application No. 202110369363.2, mailed on Jul. 9, 2024, 14 pages (6 pages of English Translation and 8 pages of Official Copy).

Office Action received for Japanese Patent Application No. 2022-194369, mailed on Sep. 20, 2024, 5 pages (2 pages of English Translation and 3 pages of Official Copy).

Office Action received for Japanese Patent Application No. 2023-104475, mailed on Sep. 17, 2024, 6 pages (3 pages of English Translation and 3 pages of Official Copy).

Record of Oral Hearing received for U.S. Appl. No. 17/031,671, mailed on Aug. 27, 2024, 17 pages.

Applicant-Initiated Interview Summary received for U.S. Appl. No. 18/618,920, mailed on Apr. 22, 2025, 6 pages.

Decision to Grant received for European Patent Application No. 19724997.2, mailed on Apr. 10, 2025, 4 pages.

Extended European Search Report received for European Patent Application No. 24215123.1, mailed on Apr. 8, 2025, 9 pages.

International Preliminary Report on Patentability received for PCT Patent Application No. PCT/US2023/032899, mailed on Mar. 27, 2025, 16 pages.

Notice of Allowance received for U.S. Appl. No. 18/382,248, mailed on Apr. 30, 2025, 9 pages.

Office Action received for Chinese Patent Application No. 202110369265.9, mailed on Mar. 27, 2025, 16 pages (4 pages of English Translation and 12 pages of Official Copy).

Advisory Action received for U.S. Appl. No. 17/713,005, mailed on Jul. 19, 2024, 3 pages.

Applicant-Interview Summary received for U.S. Appl. No. 17/713,005, mailed on Jun. 18, 2024, 2 pages.

Applicant-Interview Summary received for U.S. Appl. No. 17/746,807, mailed on May 21, 2024, 2 pages.

Applicant-Interview Summary received for U.S. Appl. No. 18/196,345, mailed on Apr. 8, 2024, 4 pages.

Corrected Notice of Allowance received for U.S. Appl. No. 17/949,081, mailed on Apr. 24, 2024, 3 pages.

Corrected Notice of Allowance received for U.S. Appl. No. 18/220,715, mailed on Apr. 8, 2024, 2 pages.

Corrected Notice of Allowance received for U.S. Appl. No. 18/220,715, mailed on Apr. 25, 2024, 2 pages.

Corrected Notice of Allowance received for U.S. Appl. No. 18/220,715, mailed on Jul. 23, 2024, 2 pages.

Corrected Notice of Allowance received for U.S. Appl. No. 18/220,715, mailed on Jun. 24, 2024, 2 pages.

Examiner's Answer to Appeal Brief received for U.S. Appl. No. 17/947,530, mailed on May 21, 2024, 34 pages.

Final Office Action received for U.S. Appl. No. 17/713,005, mailed on Apr. 30, 2024, 22 pages. vol. 8.

Hayakawa, Atsushi, "An On-Line Wear Club", Mac People, ASCII Corp, Japan, No. 20., Oct. 15, 2002, 4 pages (Official copy Only) {See Communication Under Rule 37 CFR § 1.98(a)(3)}.

Intention to Grant received for European Patent Application No. 19724997.2, mailed on Jul. 25, 2024, 9 pages.

Intention to Grant received for European Patent Application No. 20730136.7, mailed on Jul. 15, 2024, 8 pages.

Intention to Grant received for European Patent Application No. 21728746.5, mailed on Jul. 12, 2024, 10 pages. International Preliminary Report on Patentability received for PCT Patent Application No. PCT/US2023/011151, mailed on Aug. 8, 2024, 13 pages.

International Preliminary Report on Patentability received for PCT Patent Application No. PCT/US2023/011151, mailed on Aug. 8, 2024, 13 pages.

Non-Final Office Action received for U.S. Appl. No. 18/196,345, mailed on Jul. 16, 2024, 14 pages.

Notice of Acceptance received for Australian Patent Application No. 2023282284, mailed on Jul. 18, 2024, 3 pages.

Notice of Allowance received for Chinese Patent Application No. 202110369386.3, mailed on Jul. 9, 2024, 5 pages (1 page of English Translation and 4 pages of Official Copy).

Notice of Allowance received for Japanese Patent Application No. 2022-205934, mailed on Jun. 10, 2024, 4 pages (1 page of English Translation and 3 pages of Official Copy).

Notice of Allowance received for Korean Patent Application No. 10-2023-0189466, mailed on Jul. 22, 2024, 8 pages (2 pages of English Translation and 6 pages of Official Copy).

Notice of Allowance received for Korean Patent Application No. 10-2023-7008379, mailed on Jun. 12, 2024, 7 pages (2 pages of English Translation and 5 pages of Official Copy).

(56) References Cited

OTHER PUBLICATIONS

Notice of Allowance received for Korean Patent Application No. 10-2023-7008854, mailed on Jul. 26, 2024, 8 pages (2 pages of English Translation and 6 pages of Official Copy).

Notice of Allowance received for Korean Patent Application No. 10-2023-7033642, mailed on Apr. 18, 2024, 7 pages (2 pages of English Translation and 5 pages of Official Copy).

Notice of Allowance received for U.S. Appl. No. 15/421,865, mailed on Apr. 15, 2024, 12 pages.

Notice of Allowance received for U.S. Appl. No. 17/031,765, mailed on Apr. 2, 2024, 34 pages.

Notice of Allowance received for U.S. Appl. No. 17/746,807, mailed on Jul. 3, 2024, 23 pages.

Notice of Allowance received for U.S. Appl. No. 17/949,081, mailed on Apr. 12, 2024, 8 pages.

Notice of Allowance received for U.S. Appl. No. 18/220,715, mailed on Jun. 13, 2024, 10 pages.

Office Action received for Chinese Patent Application No. 202110369387.8, mailed on Jul. 2, 2024, 10 pages (4 pages of English Translation and 6 pages of Official Copy).

Office Action received for Chinese Patent Application No. 202110957983.8, mailed on Jul. 6, 2024, 17 pages (11 pages of English Translation and 6 pages of Official Copy).

Office Action received for Chinese Patent Application No. 202110957983.8, mailed on May 13, 2024, 18 pages (12 pages of English Translation and 6 pages of Official Copy).

Office Action received for Chinese Patent Application No. 202311634654.5, mailed on Apr. 28, 2024, 19 pages (9 pages of English Translation and 10 pages of Official Copy).

Office Action received for European Patent Application No. 22729905.4, mailed on Mar. 22, 2024, 8 pages.

Office Action received for Indian Patent Application No. 202218027229, mailed on Jun. 13, 2024, 8 pages.

Office Action received for Japanese Patent Application No. 2022-194369, mailed on Mar. 15, 2024, 11 pages (5 pages of English Translation and 6 pages of Official Copy).

Office Action received for Japanese Patent Application No. 2022-205934, mailed on Mar. 11, 2024, 4 pages (2 pages of English Translation and 2 pages of Official Copy).

Office Action received for Japanese Patent Application No. 2023-559823, mailed on Jun. 10, 2024, 6 pages (3 pages of English Translation and 3 pages of Official Copy).

Office Action received for Japanese Patent Application No. 2023-559823, mailed on Mar. 4, 2024, 6 pages (3 pages of English Translation and 3 pages of Official Copy).

Office Action received for Korean Patent Application No. 10-2024-7014705, mailed on May 17, 2024, 10 pages (4 pages of English Translation and 6 pages of Official Copy).

Supplemental Notice of Allowance received for U.S. Appl. No. 15/421,865, mailed on Jun. 20, 2024, 3 pages.

Supplemental Notice of Allowance received for U.S. Appl. No. 17/031,765, mailed on Apr. 9, 2024, 2 pages.

Supplemental Notice of Allowance received for U.S. Appl. No. 17/031,765, mailed on Apr. 19, 2024, 3 pages.

Supplemental Notice of Allowance received for U.S. Appl. No. 17/031,765, mailed on May 2, 2024, 3 pages.

Corrected Notice of Allowance received for U.S. Appl. No. 17/031,671, mailed on Mar. 19, 2025, 3 pages.

Decision on Appeal received for U.S. Appl. No. 17/947,530, mailed on Mar. 21, 2025, 16 pages.

Non-Final Office Action received for U.S. Appl. No. 17/946,993, mailed on Mar. 12, 2025, 21 pages.

Non-Final Office Action received for U.S. Appl. No. 18/375,448, mailed on Mar. 20, 2025, 16 pages.

Notice of Allowance received for Chinese Patent Application No. 202110368164.X, mailed on Mar. 13, 2025, 4 pages (1 page of English Translation and 3 pages of Official Copy).

Office Action received for Chinese Patent Application No. 202110368426.2, mailed on Feb. 24, 2025, 9 pages (5 pages of English Translation and 4 pages of Official Copy).

Office Action received for Japanese Patent Application No. 2024-034095, mailed on Mar. 7, 2025, 8 pages (4 pages of English Translation and 4 pages of Official Copy).

Shaqtech, "The FitBit Charge HR hands-on", Available Online at: https://www.youtube.com/watch?v=uWo04yzJpdg, Sep. 19, 2015, 6 pages.

Corrected Notice of Allowance received for U.S. Appl. No. 17/746,807, mailed on Feb. 26, 2025, 3 pages.

Decision on Appeal received for U.S. Appl. No. 16/943,737, mailed on Mar. 4, 2025, 10 pages.

Dyna Logix, "Smart Stand up reminder for Wear OS (and Android Wear 2.x / 1.x)", Available online at: <https://www.youtube.com/watch?v=dQdMEZ6tJLY>, Apr. 4, 2017, 2 pages.

Extended European Search Report received for European Patent Application No. 24212853.6, mailed on Feb. 24, 2025, 9 pages.

Extended European Search Report received for European Patent Application No. 24216681.7, mailed on Mar. 4, 2025, 8 pages.

Record of Oral Hearing received for U.S. Appl. No. 16/943,737, mailed on Feb. 24, 2025, 22 pages.

Supplemental Notice of Allowance received for U.S. Appl. No. 17/031,671, mailed on Feb. 27, 2025, 3 pages.

Decision on Appeal received for U.S. Appl. No. 17/031,671, mailed on Nov. 1, 2024, 24 pages.

Non-Final Office Action received for U.S. Appl. No. 18/618,920, mailed on Nov. 5, 2024, 17 pages.

Office Action received for Chinese Patent Application No. 202110367769.7, mailed on Sep. 30, 2024, 21 pages (6 pages of English Translation and 15 pages of Official Copy).

Office Action received for Chinese Patent Application No. 202110367834.6, mailed on Nov. 4, 2024, 10 pages (5 pages of English Translation and 5 pages of Official Copy).

Decision to Grant received for European Patent Application No. 20730136.7, mailed on Nov. 28, 2024, 3 pages.

Intention to Grant received for European Patent Application No. 21728746.5, mailed on Dec. 6, 2024, 8 pages.

Notice of Allowance received for Chinese Patent Application No. 202010697187.0, mailed on Nov. 18, 2024, 6 pages (1 page of English Translation and 5 pages of Official Copy).

Notice of Allowance received for Chinese Patent Application No. 202110369363.2, mailed on Nov. 22, 2024, 4 pages (1 page of English Translation and 3 pages of Official Copy).

Office Action received for Australian Patent Application No. 2023285972, mailed on Nov. 27, 2024, 4 pages.

Summons to Attend Oral Proceedings received for German Patent Application No. 112015003083.2, mailed on Oct. 28, 2024, 7 pages (3 pages of English Translation and 4 pages of Official Copy).

Hayakawa, Atsushi, "An On-Line Wear Club", Mac People, ASCII Corp, Japan, vol. 8, No. 20., Oct. 15, 2002, 4 pages, Cited by the Japanese Patent Office in an Office Action for related Patent Application No. 2022-205934 on Mar. 11, 2024.

Examiner's Answer to Appeal Brief received for U.S. Appl. No. 17/713,005, mailed on Feb. 25, 2025, 14 pages.

Final Office Action received for U.S. Appl. No. 18/618,920, mailed on Feb. 19, 2025, 12 pages.

Notice of Allowance received for Korean Patent Application No. 10-2023-0189466, mailed on Feb. 17, 2025, 10 pages (2 pages of English Translation and 8 pages of Official Copy).

Office Action received for Australian Patent Application No. 2023285972, mailed on Feb. 12, 2025, 4 pages.

Office Action received for European Patent Application No. 23705794.8, mailed on Feb. 12, 2025, 8 pages.

Advisory Action received for U.S. Appl. No. 17/031,765, mailed on Nov. 13, 2023, 5 pages.

Advisory Action received for U.S. Appl. No. 17/947,530, mailed on Oct. 13, 2023, 3 pages.

Applicant-Initiated Interview Summary received for U.S. Appl. No. 17/031,765, mailed on Oct. 31, 2023, 5 pages.

Applicant-Initiated Interview Summary received for U.S. Appl. No. 17/713,005, mailed on Feb. 29, 2024, 2 pages.

Applicant-Initiated Interview Summary received for U.S. Appl. No. 17/746,807, mailed on Nov. 3, 2023, 2 pages.

Corrected Notice of Allowance received for U.S. Appl. No. 16/861,651, mailed on Jan. 18, 2024, 3 pages.

(56) References Cited

OTHER PUBLICATIONS

Corrected Notice of Allowance received for U.S. Appl. No. 17/738,940, mailed on Jan. 24, 2024, 3 pages.

Decision on Appeal received for U.S. Appl. No. 15/405,122, mailed on Dec. 12, 2023, 18 pages.

Decision to Grant received for European Patent Application No. 20729346.5, mailed on Nov. 16, 2023, 2 pages.

Examiner's Answer to Appeal Brief received for U.S. Appl. No. 16/943,737, mailed on Feb. 2, 2024, 15 pages.

Examiner's Answer to Appeal Brief received for U.S. Appl. No. 17/031,671, mailed on Dec. 8, 2023, 16 pages.

Extended European Search Report received for European Patent Application No. 23201849.9, mailed on Oct. 26, 2023, 9 pages.

Final Office Action received for U.S. Appl. No. 15/421,865, mailed on Mar. 7, 2024, 27 pages.

Final Office Action received for U.S. Appl. No. 17/746,807, mailed on Feb. 20, 2024, 24 pages.

Intention to Grant received for European Patent Application No. 20730136.7, mailed on Mar. 1, 2024, 9 pages.

International Preliminary Report on Patentability received for PCT Patent Application No. PCT/US2022/029279, mailed on Nov. 23, 2023, 11 pages.

International Search Report and Written Opinion received for PCT Patent Application No. PCT/US2023/032899, mailed on Feb. 26, 2024, 22 pages.

Invitation to Pay Additional Fees and Partial International Search Report received for PCT Patent Application No. PCT/US2023/032899, mailed on Jan. 3, 2024, 14 pages.

Non-Final Office Action received for U.S. Appl. No. 17/713,005, mailed on Jan. 19, 2024, 17 pages.

Non-Final Office Action received for U.S. Appl. No. 18/196,345, mailed on Jan. 23, 2024, 17 pages.

Notice of Acceptance received for Australian Patent Application No. 2023201920, mailed on Feb. 9, 2024, 3 pages.

Notice of Allowance received for Chinese Patent Application No. 202310124087.2, mailed on Jan. 25, 2024, 4 pages (1 page of English Translation and 3 pages of Official Copy).

Notice of Allowance received for Japanese Patent Application No. 2022-152693, mailed on Feb. 5, 2024, 4 pages (1 page of English Translation and 3 pages of Official Copy).

Notice of Allowance received for Korean Patent Application No. 10-2022-7019034, mailed on Feb. 1, 2024, 7 pages (2 pages of English Translation and 5 pages of Official Copy).

Notice of Allowance received for U.S. Appl. No. 16/861,651, mailed on Jan. 9, 2024, 6 pages.

Notice of Allowance received for U.S. Appl. No. 17/717,275, mailed on Dec. 26, 2023, 8 pages.

Notice of Allowance received for U.S. Appl. No. 18/220,715, mailed on Mar. 7, 2024, 11 pages.

Office Action received for Australian Patent Application No. 2023201920, mailed on Nov. 10, 2023, 2 pages.

Office Action received for Australian Patent Application No. 2023282284, mailed on Jan. 19, 2024, 6 pages.

Office Action received for Chinese Patent Application No. 201980030338.2, mailed on Feb. 7, 2024, 20 pages (12 pages of English Translation and 8 pages of Official Copy).

Office Action received for Chinese Patent Application No. 202110957983.8, mailed on Dec. 27, 2023, 23 pages (13 pages of English Translation and 10 pages of Official Copy).

Office Action received for Chinese Patent Application No. 202310124087.2, mailed on Sep. 9, 2023, 24 pages (13 pages of English Translation and 11 pages of Official Copy).

Office Action received for European Patent Application No. 20730136.7, mailed on Nov. 3, 2023, 5 pages.

Office Action received for European Patent Application No. 21728746.5, mailed on Jan. 11, 2024, 4 pages.

Office Action received for Japanese Patent Application No. 2022-152693, mailed on Oct. 27, 2023, 6 pages (3 pages of English Translation and 3 pages of Official Copy).

Office Action received for Korean Patent Application No. 10-2023-7008379, mailed on Nov. 13, 2023, 15 pages (7 pages of English Translation and 8 pages of Official Copy).

Office Action received for Korean Patent Application No. 10-2023-7008854, mailed on Nov. 15, 2023, 6 pages (2 pages of English Translation and 4 pages of Official Copy).

Office Action received for Korean Patent Application No. 10-2023-7033642, mailed on Dec. 4, 2023, 5 pages (2 pages of English Translation and 3 pages of Official Copy).

Examiner-Initiated Interview Summary received for U.S. Appl. No. 17/031,671, mailed on Jan. 6, 2025, 2 pages.

Office Action received for Australian Patent Application No. 2023285697, mailed on Dec. 16, 2024, 2 pages.

Applicant-Initiated Interview Summary received for U.S. Appl. No. 17/946,993, mailed on May 29, 2025, 4 pages.

Applicant-Initiated Interview Summary received for U.S. Appl. No. 18/375,448, mailed on Jul. 23, 2025, 4 pages.

Board Decision received for Chinese Patent Application No. 202110368426.2, mailed on Jul. 2, 2025, 2 pages (1 page of English Translation and 1 page of Official Copy).

Corrected Notice of Allowance received for U.S. Appl. No. 16/943,737, mailed on Jun. 20, 2025, 3 pages.

Corrected Notice of Allowance received for U.S. Appl. No. 17/031,671, mailed on Aug. 18, 2025, 3 pages.

Corrected Notice of Allowance received for U.S. Appl. No. 18/382,248, mailed on May 16, 2025, 2 pages.

Extended European Search Report received for European Patent Application No. 25164661.8, mailed on Jul. 28, 2025, 9 pages.

International Search Report and Written Opinion received for PCT Patent Application No. PCT/US2025/011749, mailed on Jun. 23, 2025, 20 pages.

Invitation to Pay Additional Fees and Partial International Search Report received for PCT Patent Application No. PCT/US2025/011749, mailed on Apr. 29, 2025, 13 pages.

Non-Final Office Action received for U.S. Appl. No. 17/713,005, mailed on Jun. 11, 2025, 27 pages.

Non-Final Office Action received for U.S. Appl. No. 18/618,920, mailed on May 20, 2025, 14 pages.

Non-Final Office Action received for U.S. Appl. No. 18/893,427, mailed on Jul. 7, 2025, 13 pages.

Notice of Allowance received for Chinese Patent Application No. 202110368426.2, mailed on Jul. 7, 2025, 4 pages (1 page of English Translation and 3 pages of Official Copy).

Notice of Allowance received for Japanese Patent Application No. 2022-194369, mailed on Jul. 7, 2025, 3 pages (1 page of English Translation and 2 pages of Official Copy).

Notice of Allowance received for Japanese Patent Application No. 2024-034095, mailed on Jul. 25, 2025, 4 pages (1 page of English Translation and 3 pages of Official Copy).

Notice of Allowance received for U.S. Appl. No. 16/943,737, mailed on Jun. 3, 2025, 6 pages.

Notice of Allowance received for U.S. Appl. No. 17/031,671, mailed on Aug. 6, 2025, 7 pages.

Notice of Allowance received for U.S. Appl. No. 17/946,993, mailed on Jul. 8, 2025, 5 pages.

Notice of Allowance received for U.S. Appl. No. 18/196,345, mailed on Jul. 7, 2025, 13 pages.

Office Action received for Australian Patent Application No. 2023285972, mailed on Aug. 18, 2025, 4 pages.

Office Action received for Australian Patent Application No. 2023285972, mailed on Jun. 19, 2025, 6 pages.

Office Action received for Chinese Patent Application No. 202110481400.9, mailed on Apr. 23, 2025, 24 pages (14 pages of English Translation and 10 pages of Official Copy).

Office Action received for European Patent Application No. 22188724.3, mailed on Jul. 24, 2025, 10 pages.

Office Action received for Japanese Patent Application No. 2024-110376, mailed on Jul. 18, 2025, 6 pages (3 pages of English Translation and 3 pages of Official Copy).

Supplemental Notice of Allowance received for U.S. Appl. No. 17/946,993, mailed on Jul. 22, 2025, 2 pages.

Supplemental Notice of Allowance received for U.S. Appl. No. 18/196,345, mailed on Jul. 15, 2025, 2 pages.

(56) References Cited

OTHER PUBLICATIONS

Office Action received for Indian Patent Application No. 202318038127, mailed on Dec. 18, 2025, 6 pages.

Office Action received for Indian Patent Application No. 202318038128, mailed on Dec. 18, 2025, 6 pages.

Applicant-Initiated Interview Summary received for U.S. Appl. No. 17/713,005, mailed on Sep. 23, 2025, 4 pages.

Applicant-Initiated Interview Summary received for U.S. Appl. No. 18/618,920, mailed on Aug. 28, 2025, 6 pages.

Applicant-Initiated Interview Summary received for U.S. Appl. No. 18/893,427, mailed on Oct. 1, 2025, 2 pages.

Final Office Action received for U.S. Appl. No. 18/618,920, mailed on Nov. 4, 2025, 16 pages.

Notice of Allowance received for U.S. Appl. No. 16/943,737, mailed on Aug. 25, 2025, 5 pages.

Notice of Allowance received for U.S. Appl. No. 17/713,005, mailed on Oct. 28, 2025, 9 pages.

Notice of Allowance received for U.S. Appl. No. 17/946,993, mailed on Nov. 4, 2025, 5 pages.

Notice of Allowance received for U.S. Appl. No. 18/382,248, mailed on Sep. 10, 2025, 9 pages.

Office Action received for Chinese Patent Application No. 202411593986.8, mailed on Aug. 2, 2025, 10 pages (5 pages of English Translation and 5 pages of Official Copy).

Office Action received for European Patent Application No. 23705794.8, mailed on Aug. 20, 2025, 5 pages.

Office Action received for Japanese Patent Application No. 2024-110376, mailed on Oct. 27, 2025, 5 pages (2 pages of English Translation and 3 pages of Official Copy).

Office Action received for Japanese Patent Application No. 2024-156798, mailed on Aug. 15, 2025, 10 pages (5 pages of English Translation and 5 pages of Official Copy).

Supplemental Notice of Allowance received for U.S. Appl. No. 17/946,993, mailed on Sep. 19, 2025, 2 pages.

Corrected Notice of Allowance received for U.S. Appl. No. 18/893,427, mailed on Dec. 18, 2025, 2 pages.

Office Action received for Indian Patent Application No. 202318038125, mailed on Dec. 18, 2025, 6 pages.

Office Action received for Indian Patent Application No. 202318038130, mailed on Dec. 18, 2025, 6 pages.

Final Office Action received for U.S. Appl. No. 18/375,448, mailed on Dec. 2, 2025, 21 pages.

Notice of Acceptance received for Australian Patent Application No. 2023285697, mailed on Dec. 5, 2025, 3 pages.

Notice of Allowance received for U.S. Appl. No. 18/893,427, mailed on Dec. 3, 2025, 8 pages.

Office Action received for Chinese Patent Application No. 202110481400.9, mailed on Nov. 6, 2025, 28 pages (17 pages of English Translation and 11 pages of Official Copy).

Office Action received for European Patent Application No. 23201849.9, mailed on Dec. 9, 2025, 9 pages.

\* cited by examiner

Portable Multifunction Device 100

210

212

208

206

Speaker 111

Optical Sensor 164

Proximity Sensor 166

200

208

210 is SIM card slot
212 is headphone jack

202

Touch Screen 112

Contact Intensity Sensor(s) 165

Tactile Output Generator(s) 167

203

Microphone 113

Home 204

Accelerometer(s) 168

External Port 124

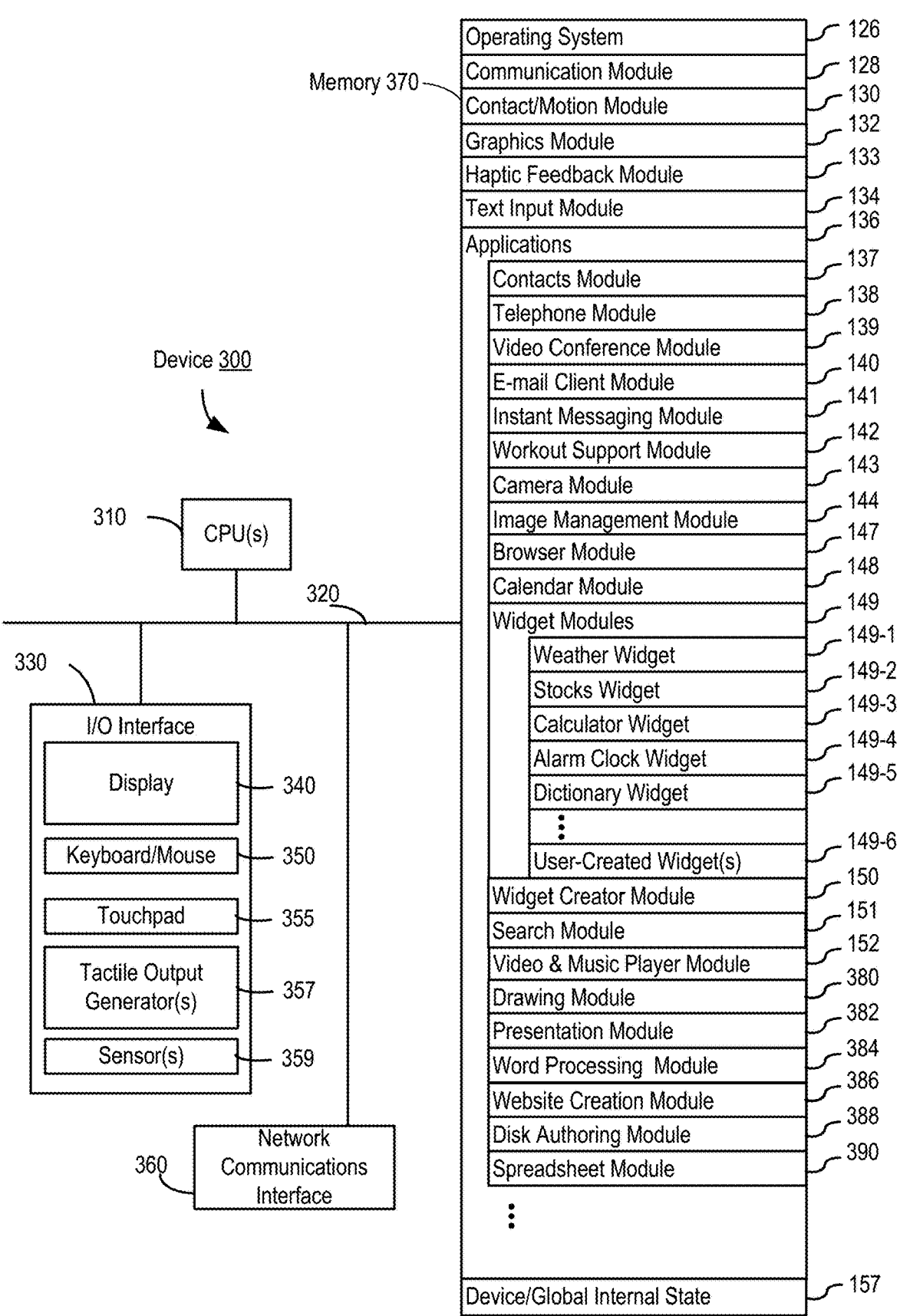

Memory 370

| | |
|---|---|
| Operating System | 126 |
| Communication Module | 128 |
| Contact/Motion Module | 130 |
| Graphics Module | 132 |
| Haptic Feedback Module | 133 |
| Text Input Module | 134 |
| Applications | 136 |
| Contacts Module | 137 |
| Telephone Module | 138 |
| Video Conference Module | 139 |
| E-mail Client Module | 140 |
| Instant Messaging Module | 141 |
| Workout Support Module | 142 |
| Camera Module | 143 |
| Image Management Module | 144 |
| Browser Module | 147 |
| Calendar Module | 148 |
| Widget Modules | 149 |
| Weather Widget | 149-1 |
| Stocks Widget | 149-2 |
| Calculator Widget | 149-3 |
| Alarm Clock Widget | 149-4 |
| Dictionary Widget | 149-5 |
| ⋮ | |
| User-Created Widget(s) | 149-6 |
| Widget Creator Module | 150 |
| Search Module | 151 |
| Video & Music Player Module | 152 |
| Drawing Module | 380 |
| Presentation Module | 382 |
| Word Processing  Module | 384 |
| Website Creation Module | 386 |
| Disk Authoring Module | 388 |
| Spreadsheet Module | 390 |
| ⋮ | |
| Device/Global Internal State | 157 |

Device 300

310 — CPU(s)

320

330

I/O Interface
- Display — 340
- Keyboard/Mouse — 350
- Touchpad — 355
- Tactile Output Generator(s) — 357
- Sensor(s) — 359

360 — Network Communications Interface

*FIG. 3*

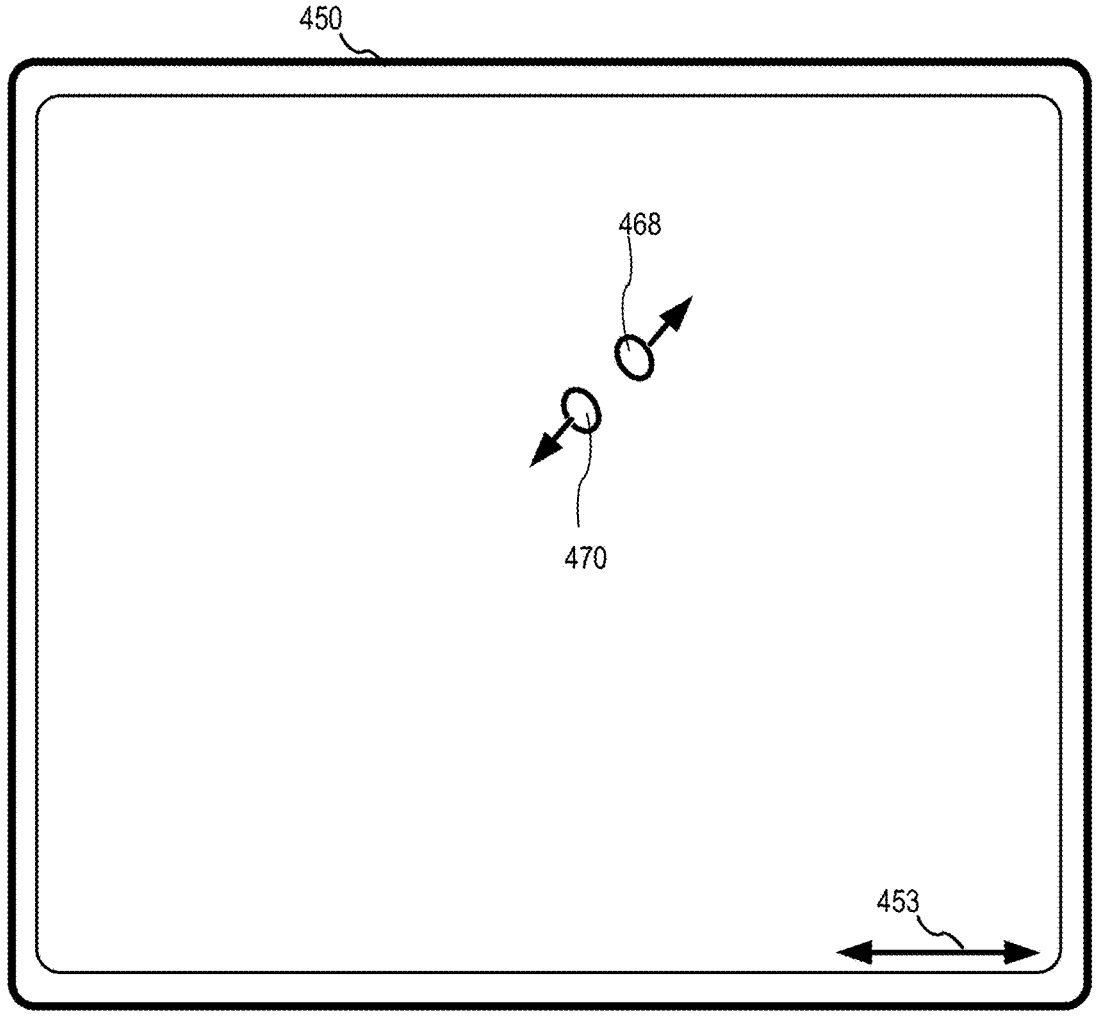
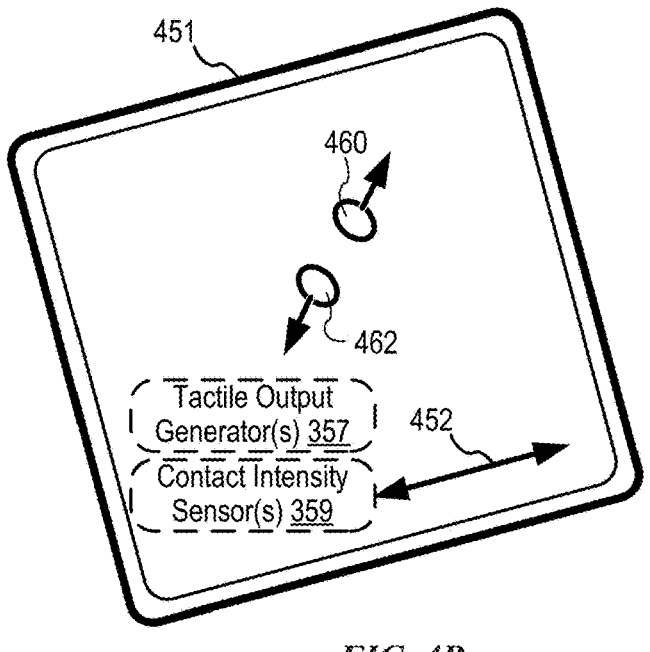
*FIG. 4B*

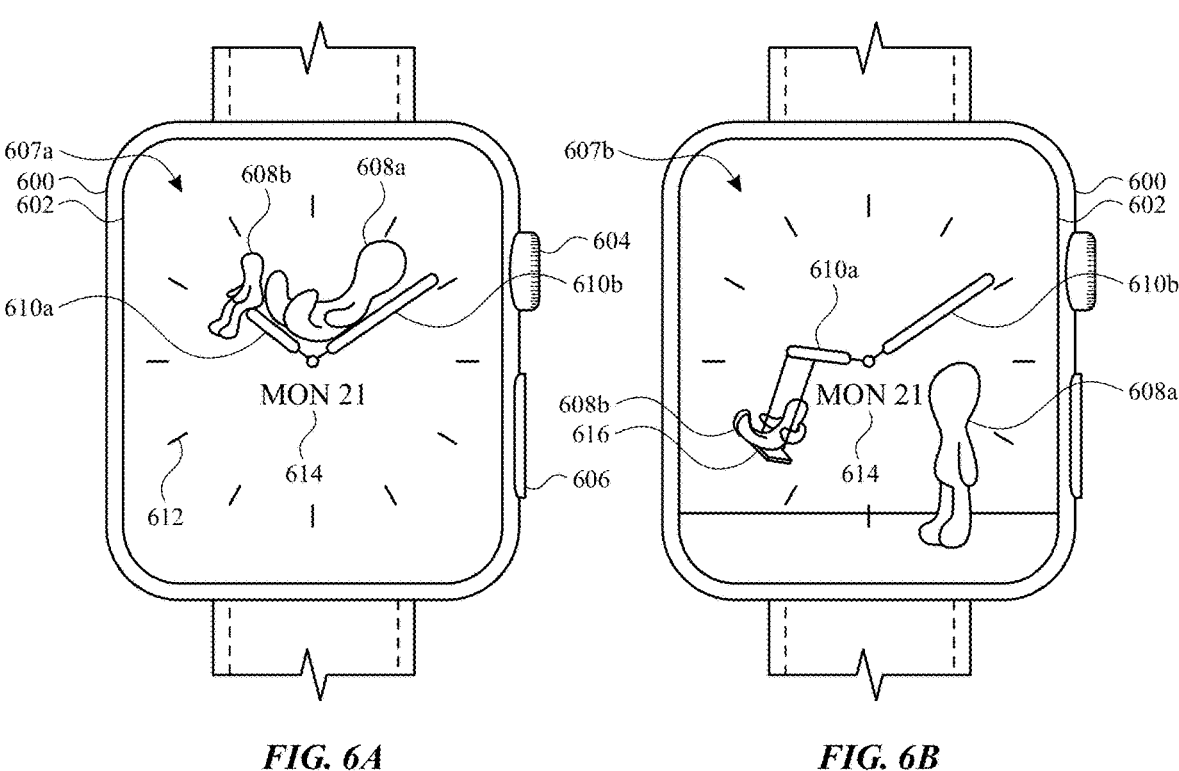
FIG. 6A          FIG. 6B
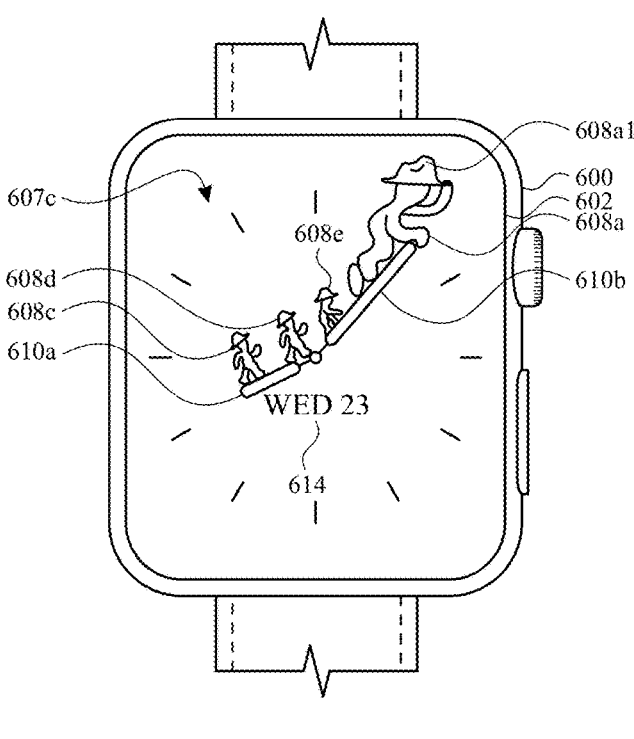
FIG. 6C

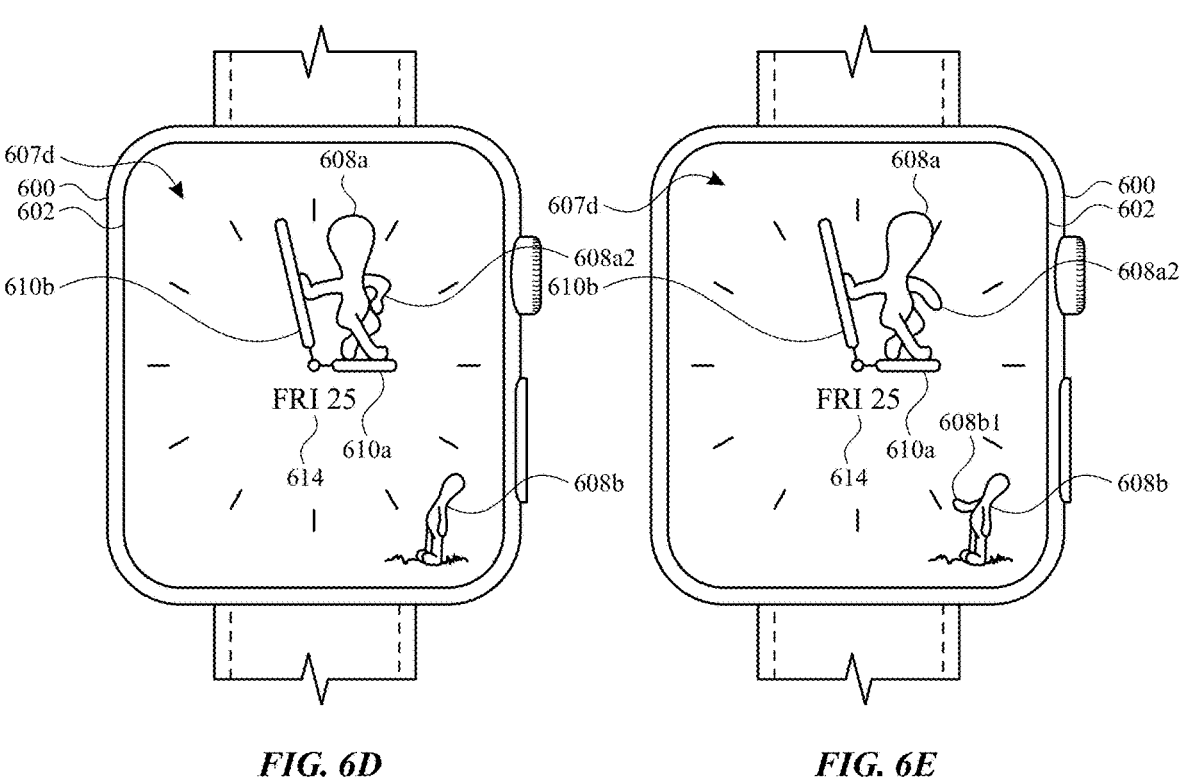
*FIG. 6D*          *FIG. 6E*
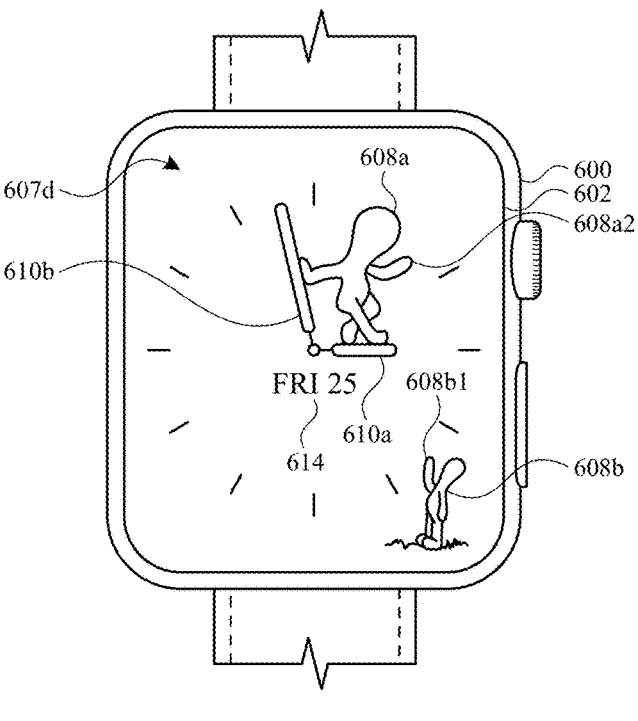
*FIG. 6F*

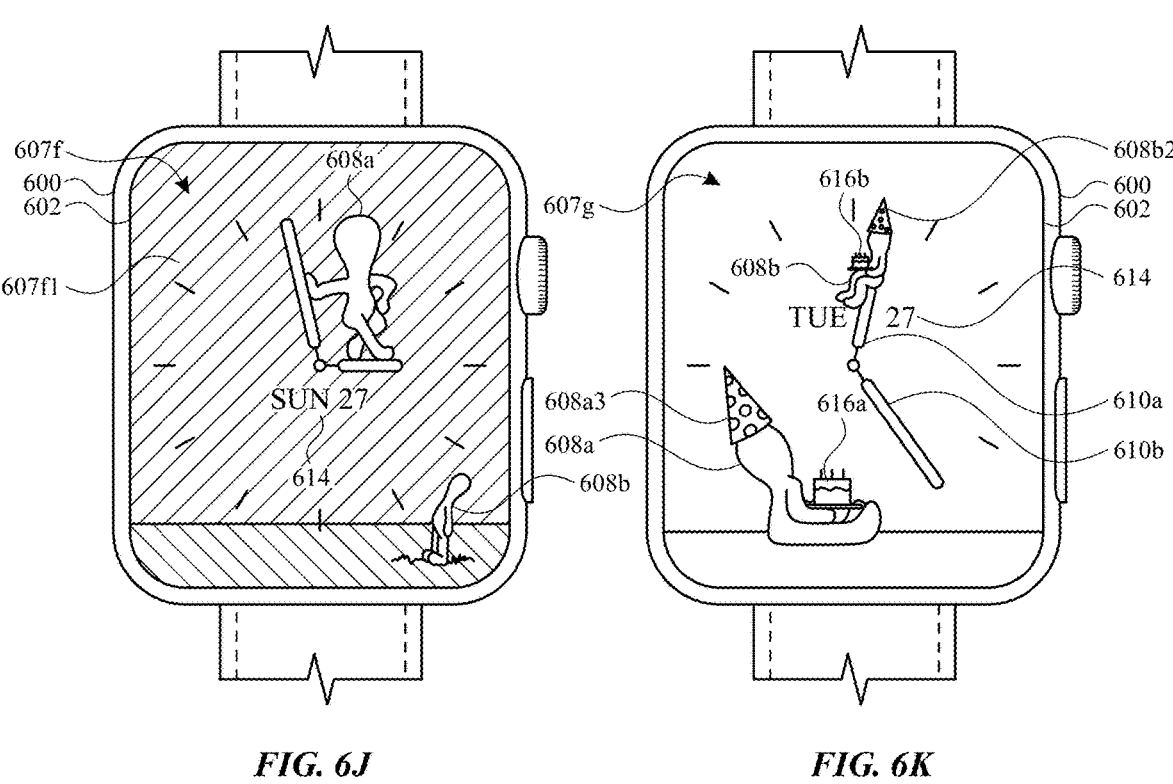
FIG. 6J                    FIG. 6K
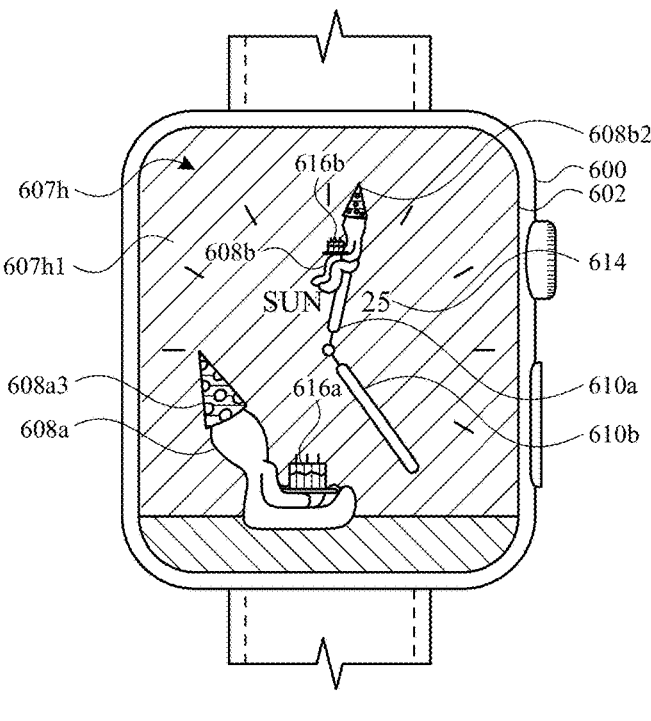
FIG. 6L

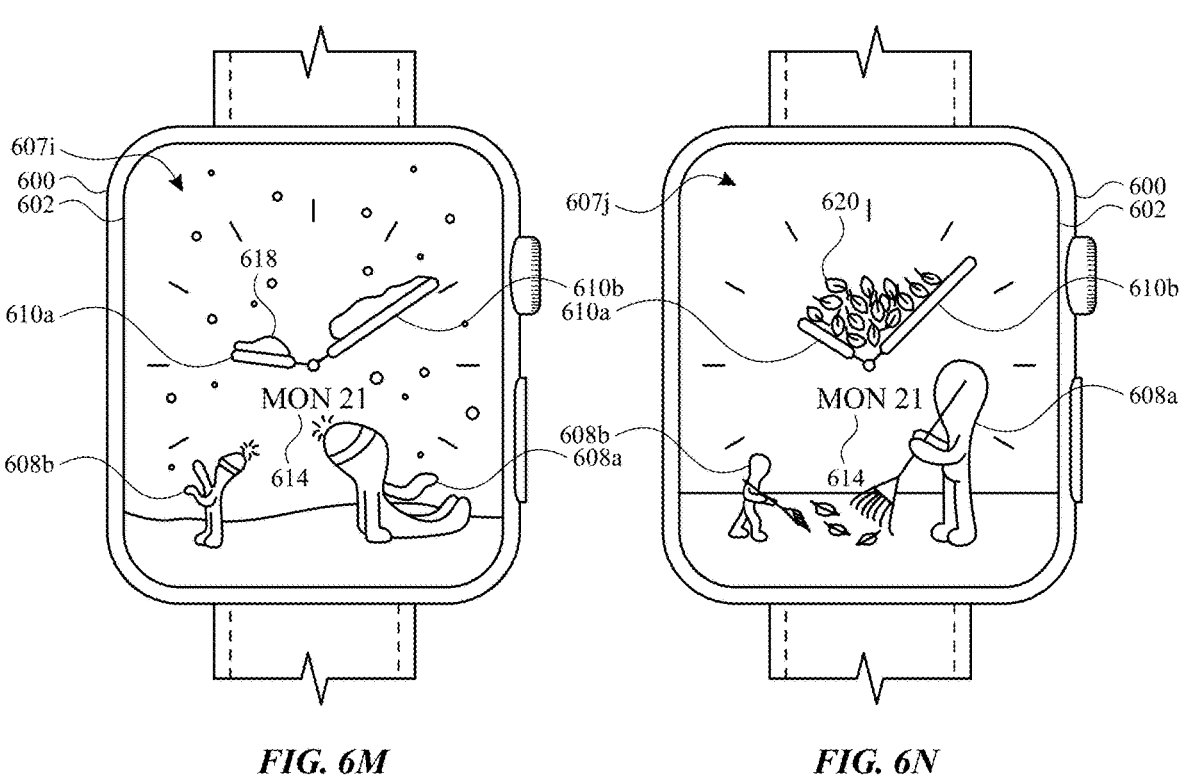
FIG. 6M                    FIG. 6N
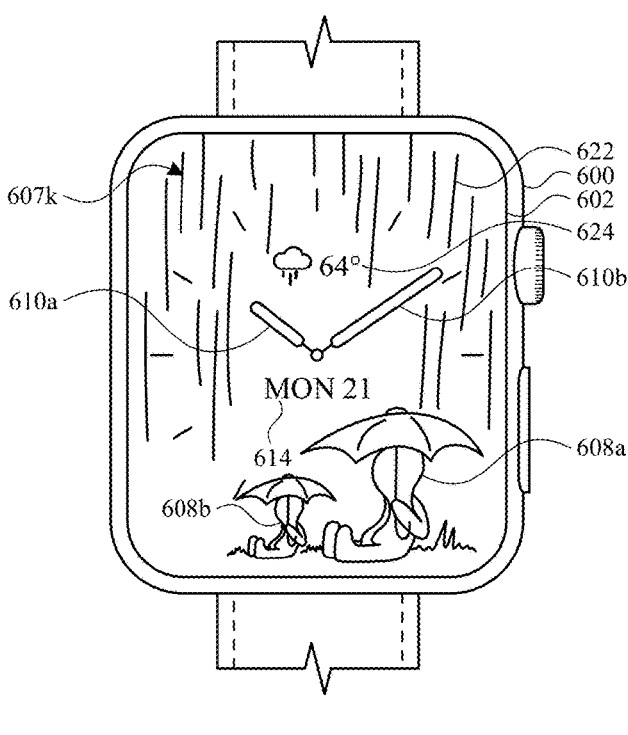
FIG. 6O

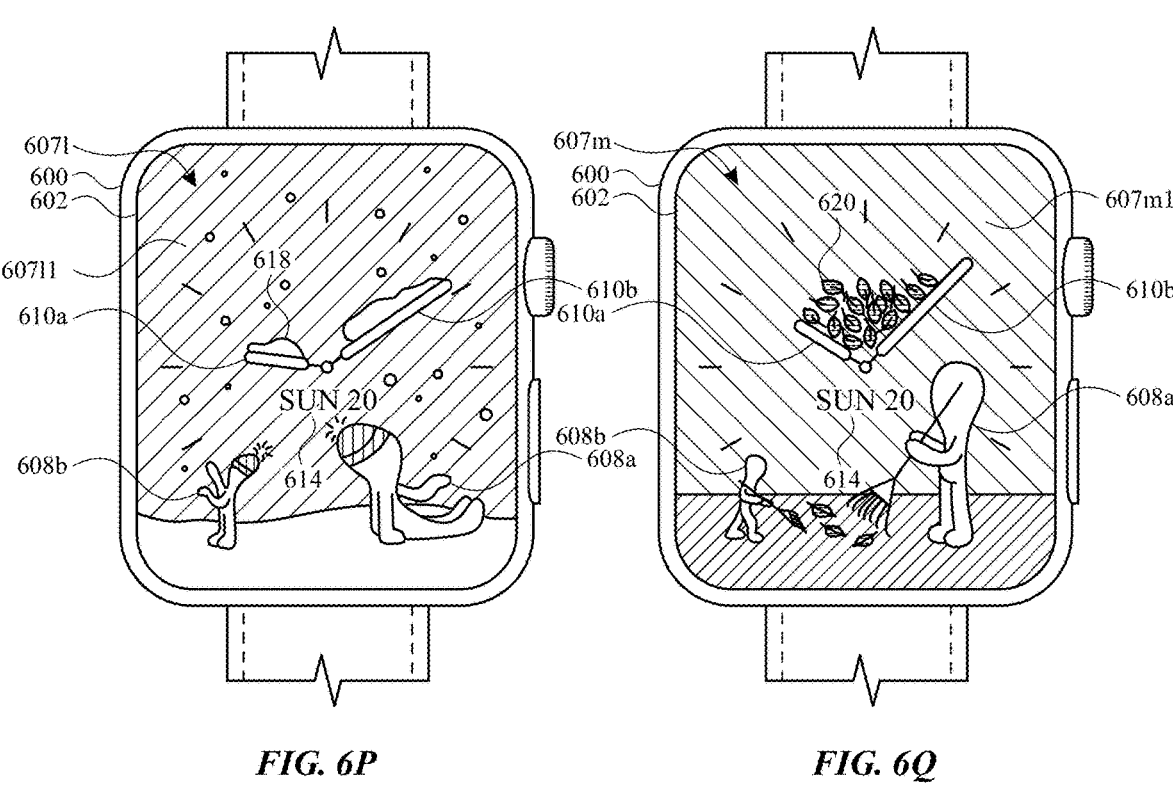
*FIG. 6P*            *FIG. 6Q*
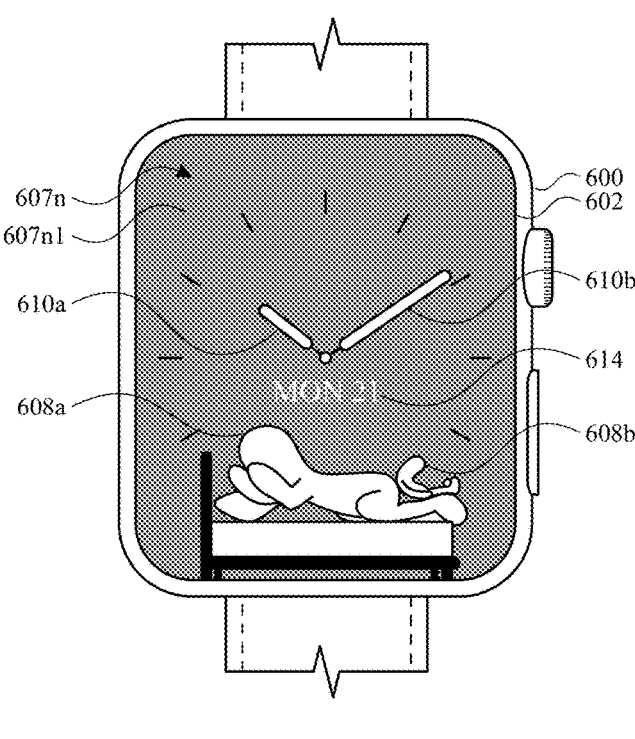
*FIG. 6R*

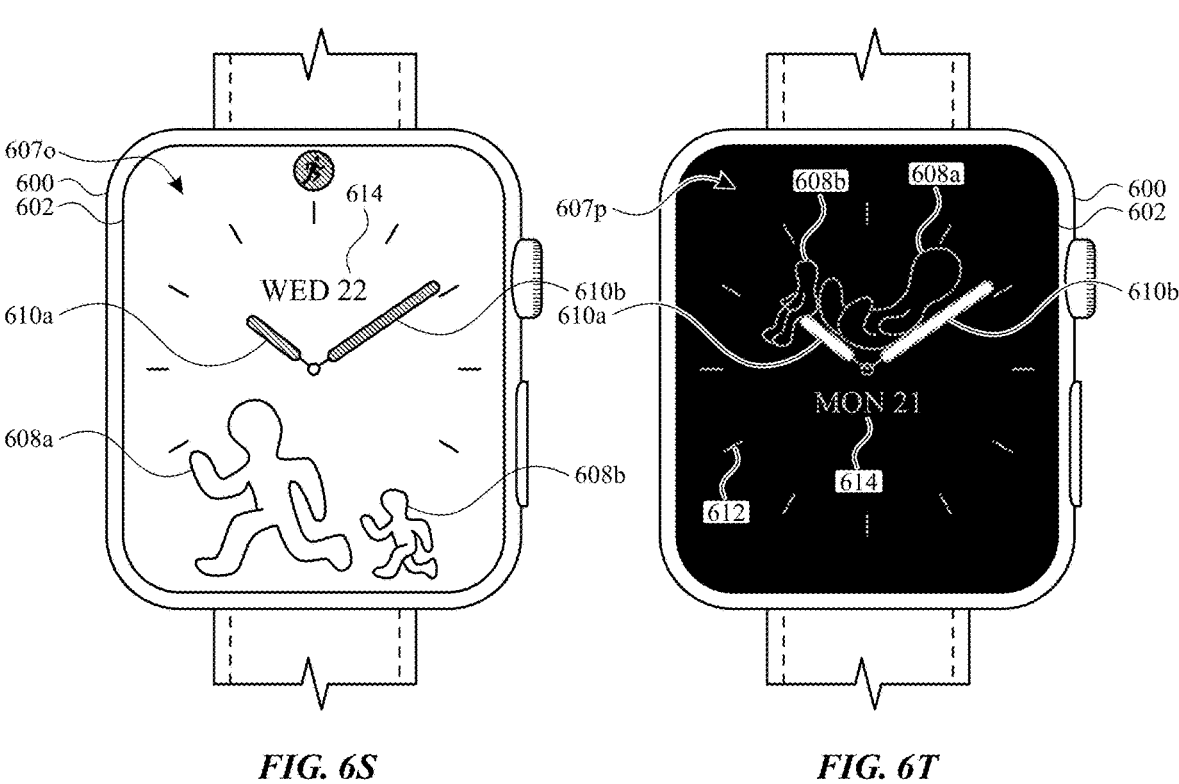
*FIG. 6S*                    *FIG. 6T*
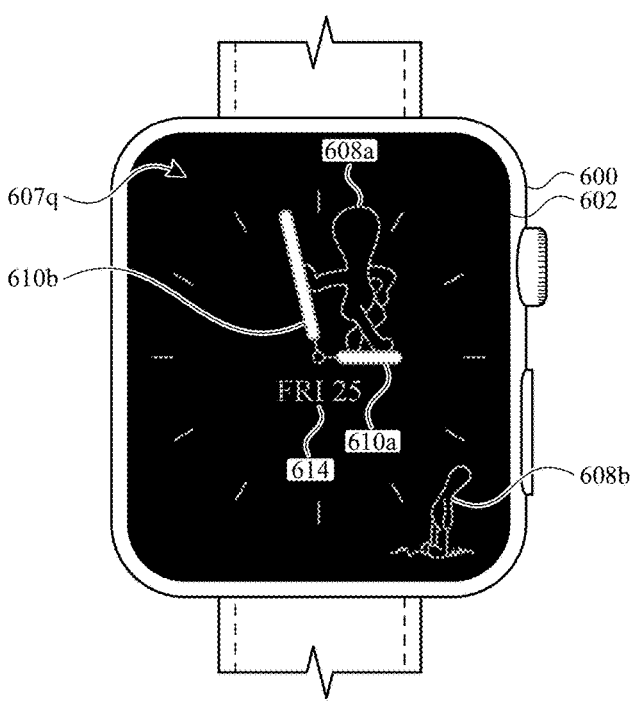
*FIG. 6U*

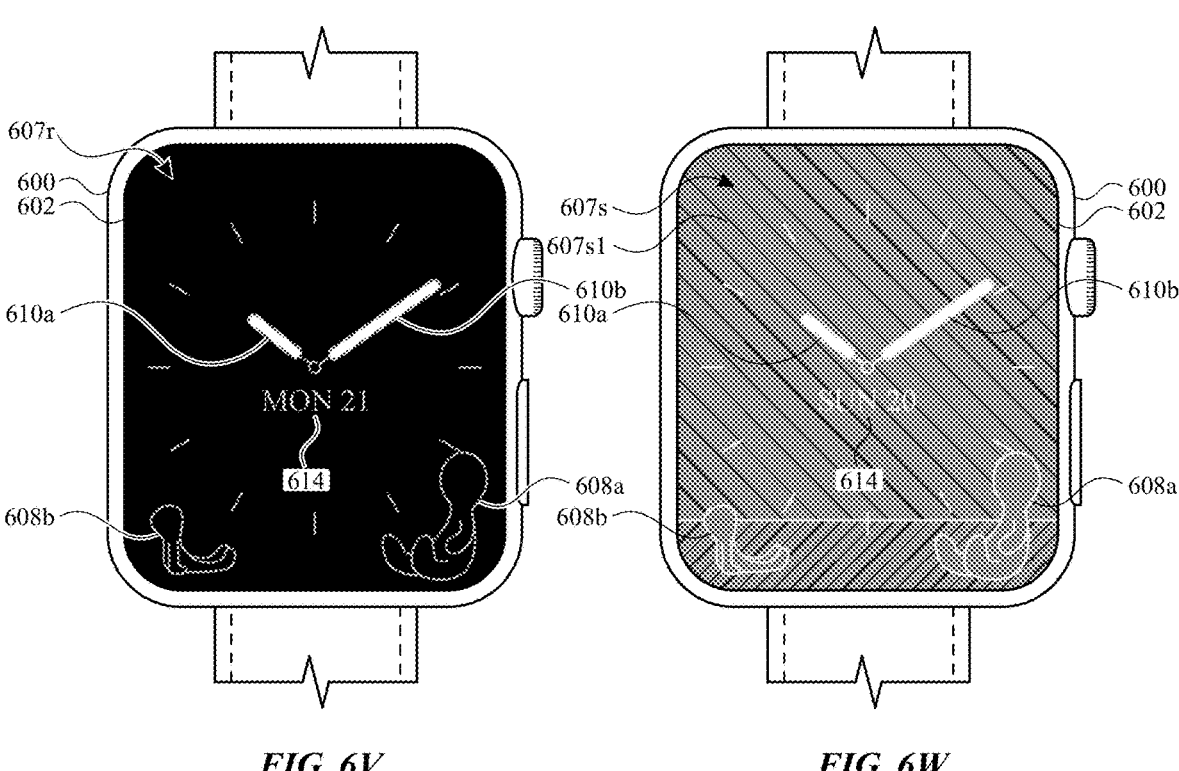
FIG. 6V              FIG. 6W
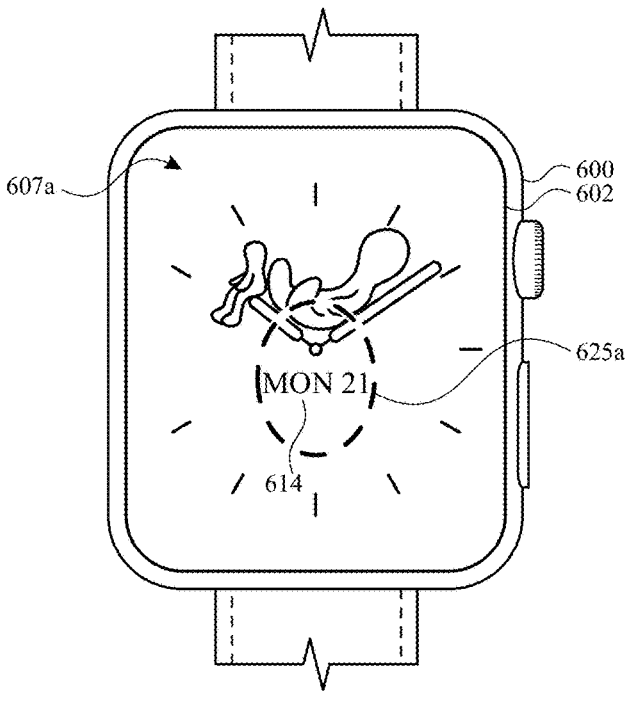
FIG. 6X

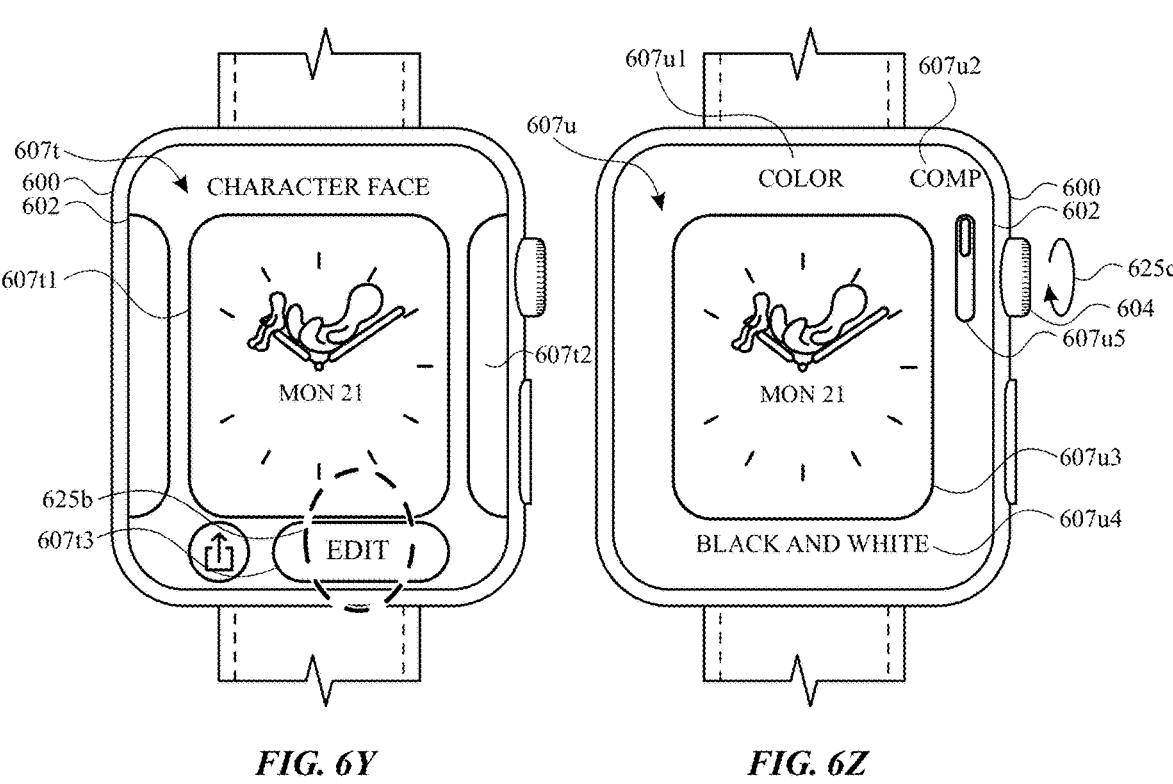
FIG. 6Y                    FIG. 6Z
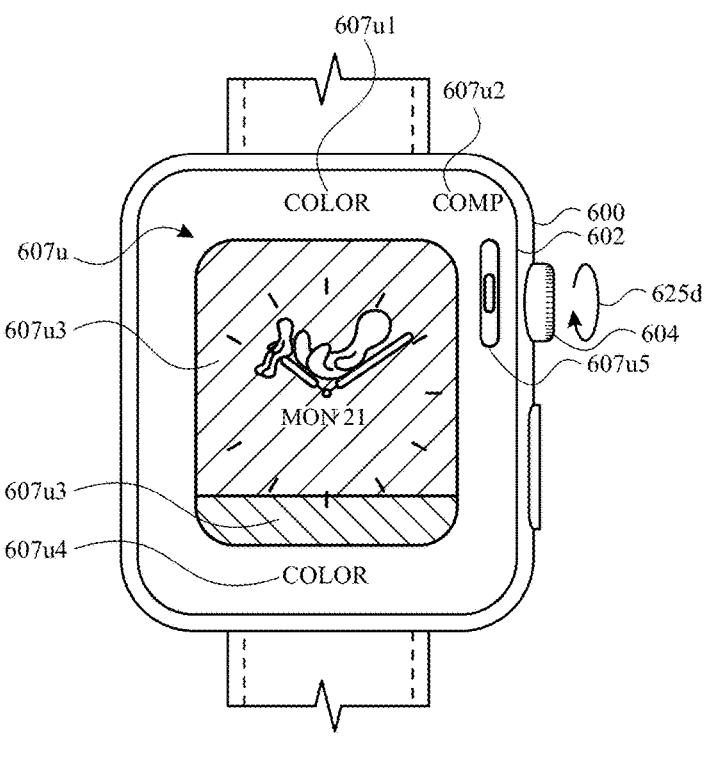
FIG. 6AA

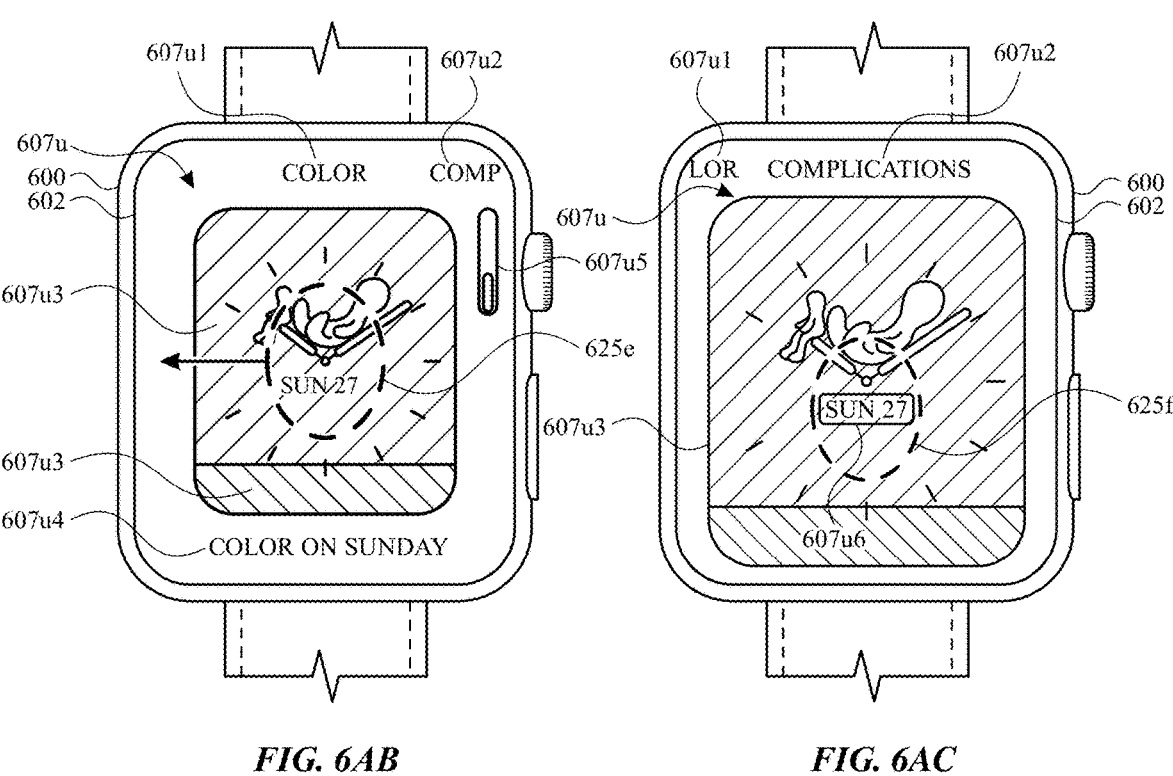
FIG. 6AB               FIG. 6AC
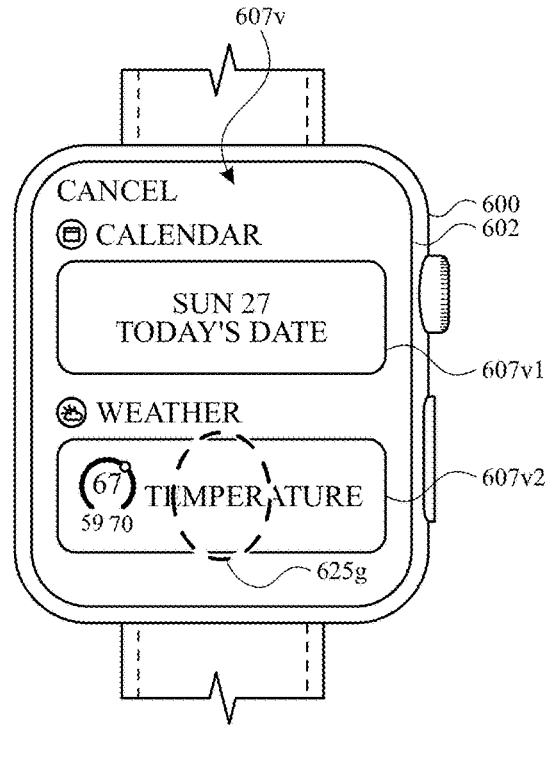
FIG. 6AD

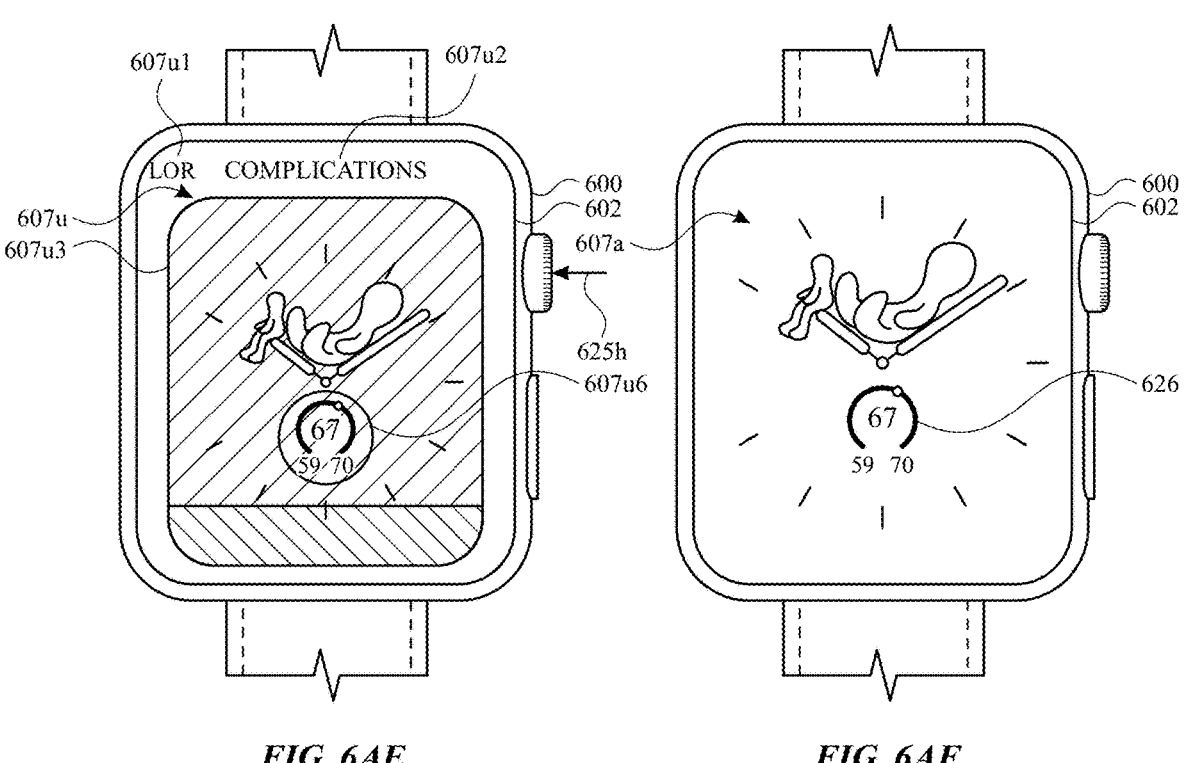
FIG. 6AE                         FIG. 6AF
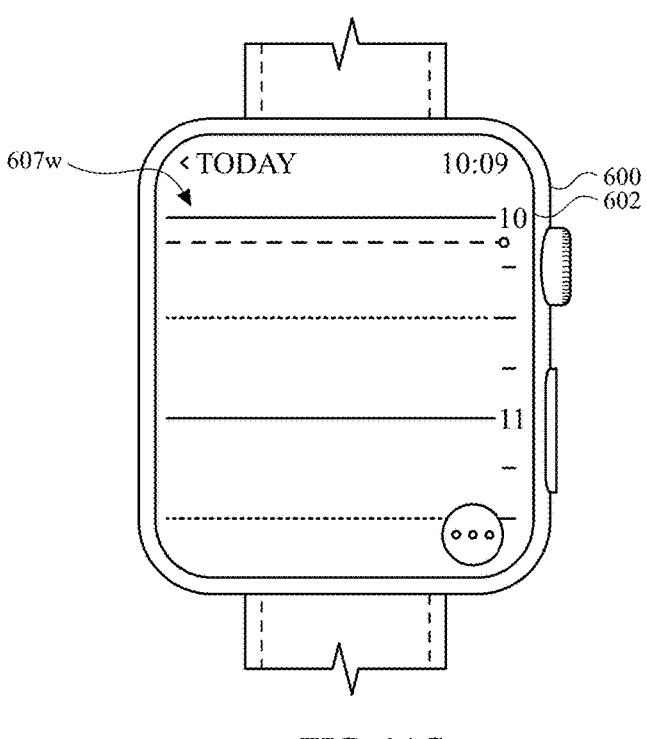
FIG. 6AG

700

---

702
Detect, via one or more input devices, a first request to display a user interface.

↓

704
In response to detecting the first request to display the user interface, display, via a display generation component, the user interface.

706
Display an indication of time indicating a first time, wherein the indication of time includes one or more clock hands including a first clock hand indicating the first time, wherein displaying the first clock hand indicating the first time includes displaying the first clock hand at a first position in the user interface and a first character in a first state that represents a first interaction between the first character and the first clock hand at the first position.

↓

708
After displaying the user interface in response to detecting the first request to display the user interface, detect, via the one or more input devices, a second request to display the user interface.

↓

710
In response to detecting the second request to display the user interface, display the user interface.

712
Display the indication of time, including the first clock hand indicating a second time that is different from the first time, wherein displaying the first clock hand indicating the second time includes displaying the first clock hand at a second position in the user interface that is different from the first position and the first character in a second state that is different from the first state and that represents a second interaction between the first character and the first clock hand at the second position that is different from the first interaction between the first character and the first clock hand at the first position.

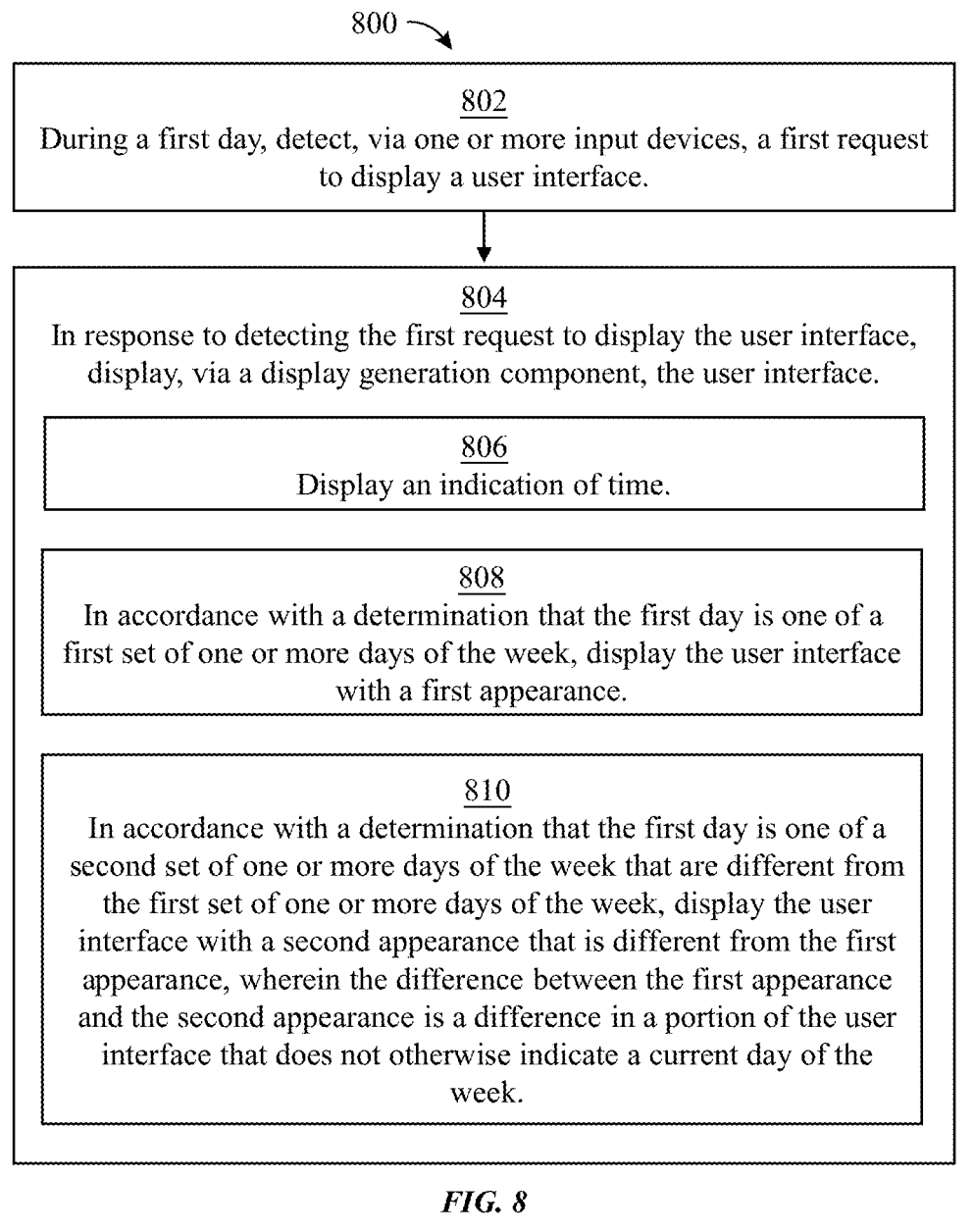

802
During a first day, detect, via one or more input devices, a first request to display a user interface.

---

804
In response to detecting the first request to display the user interface, display, via a display generation component, the user interface.

> 806
> Display an indication of time.

> 808
> In accordance with a determination that the first day is one of a first set of one or more days of the week, display the user interface with a first appearance.

> 810
> In accordance with a determination that the first day is one of a second set of one or more days of the week that are different from the first set of one or more days of the week, display the user interface with a second appearance that is different from the first appearance, wherein the difference between the first appearance and the second appearance is a difference in a portion of the user interface that does not otherwise indicate a current day of the week.

*FIG. 8*

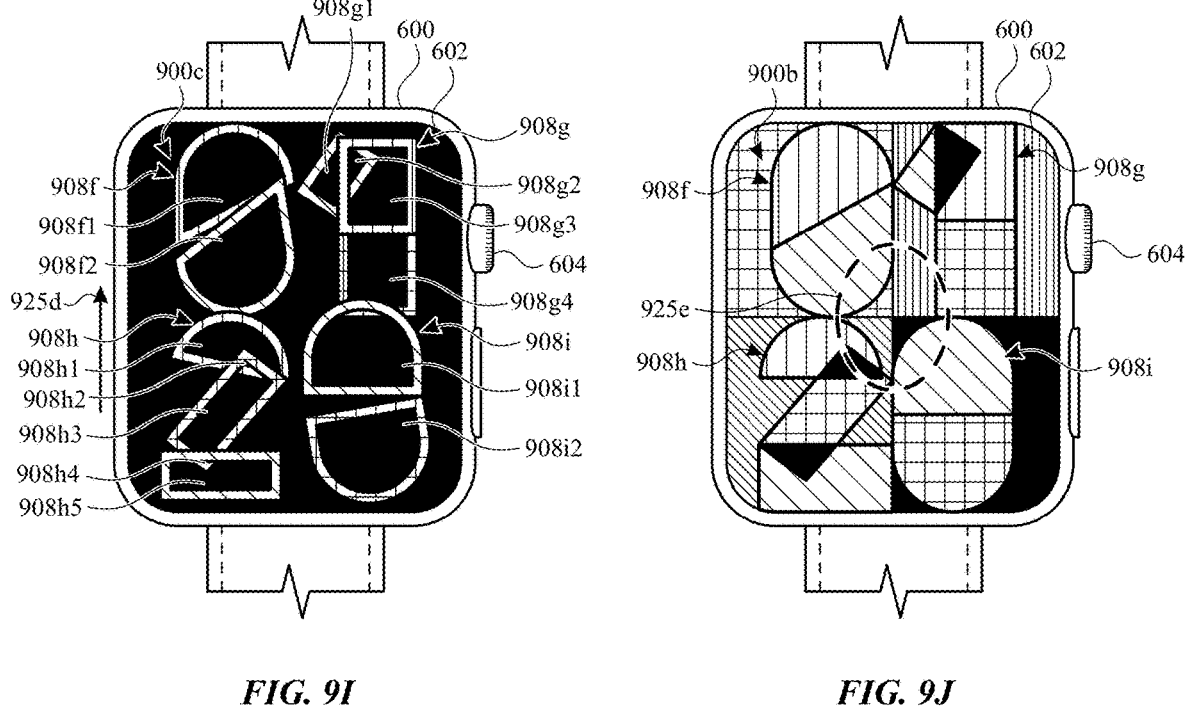
*FIG. 9I*                            *FIG. 9J*

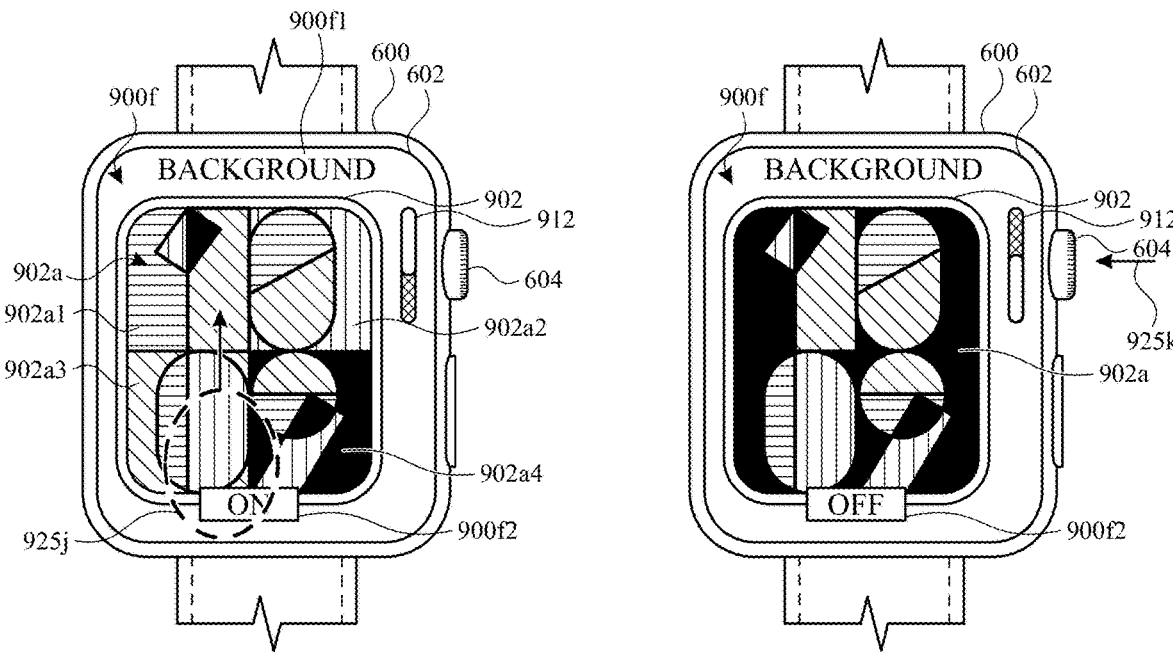
*FIG. 9O*             *FIG. 9P*
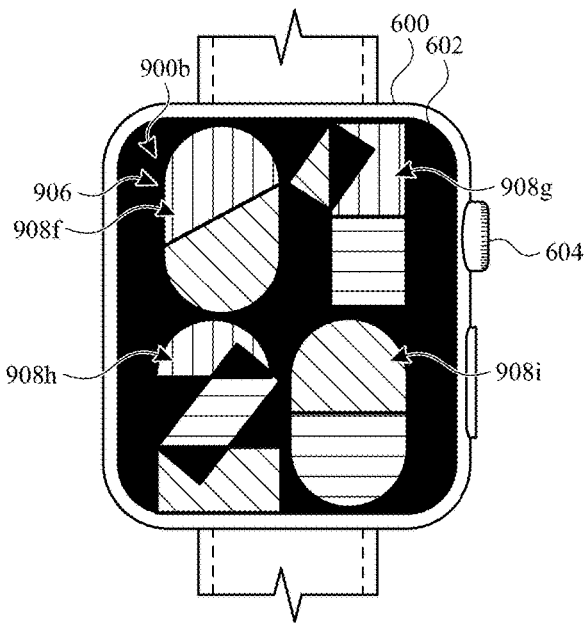
*FIG. 9Q*

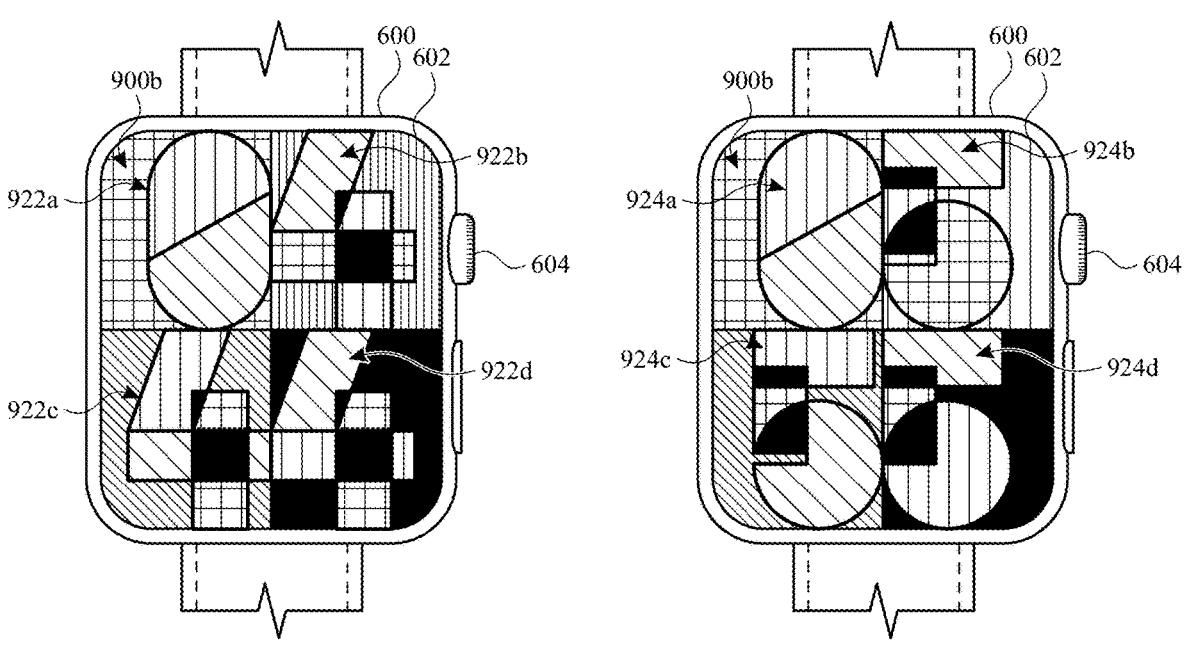
FIG. 9V                    FIG. 9W
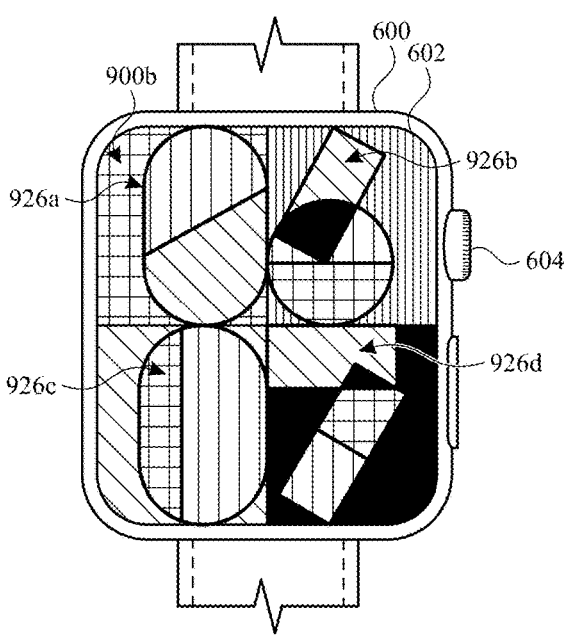
FIG. 9X

1000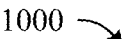

---

1002
Detect, via the one or more input devices, a request to display a user interface that includes one or more text characters that are part of a dynamic text string that changes based on a context of the computer system.

---

1004
In response to detecting the request to display the user interface, display, via the display generation component, the user interface.

1006
Display a first text character of the dynamic text string in the user interface.

1008
In accordance with a determination that the first text character of the dynamic text string is displayed at a first location in the user interface, display the first text character having a first appearance that includes a first distribution of colors.

1010
In accordance with a determination that the first text character of the dynamic text string is displayed at a second location in the user interface that is different from the first location in the user interface, display the first text character having a second appearance that is different from the first appearance that includes a second distribution of colors that is different from the first distribution of colors.

*FIG. 10*

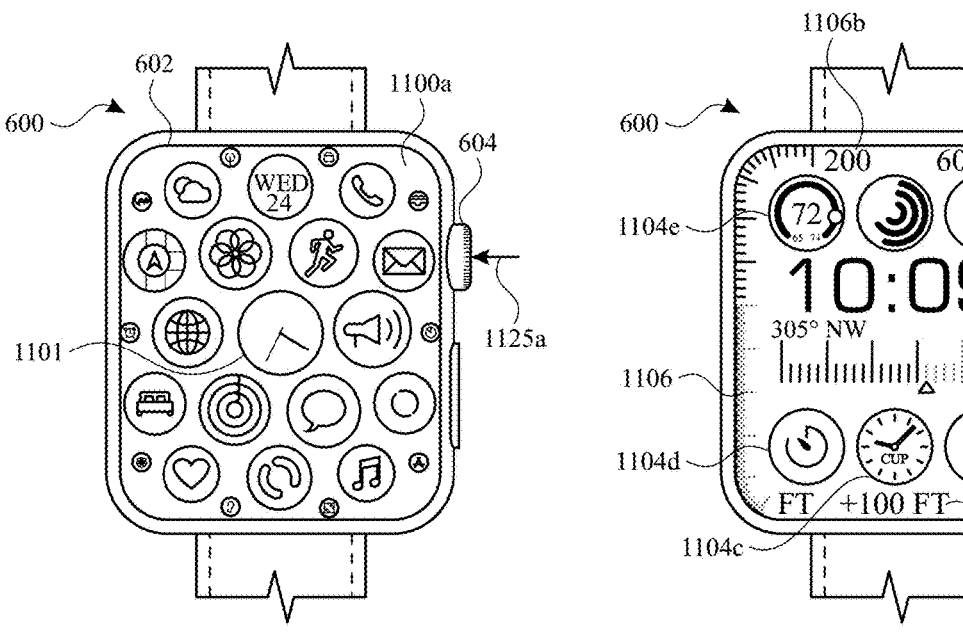
FIG. 11A
FIG. 11B
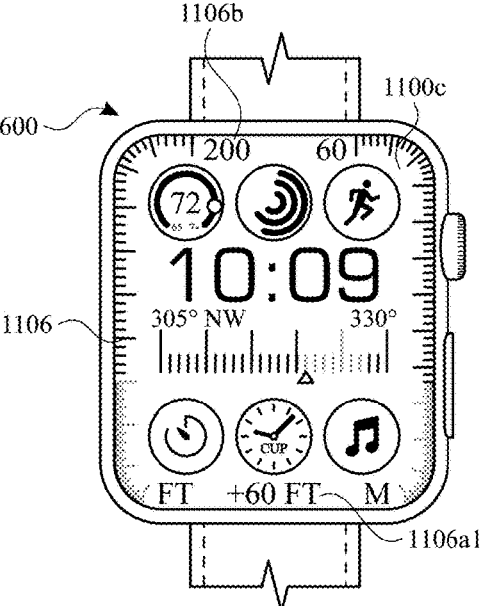
FIG. 11C
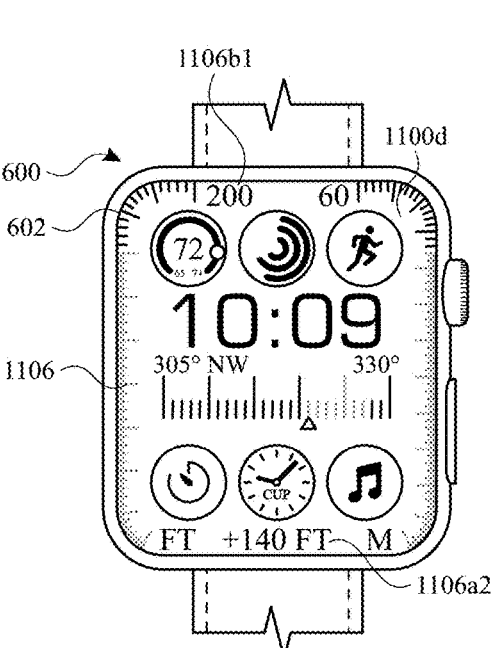
FIG. 11D

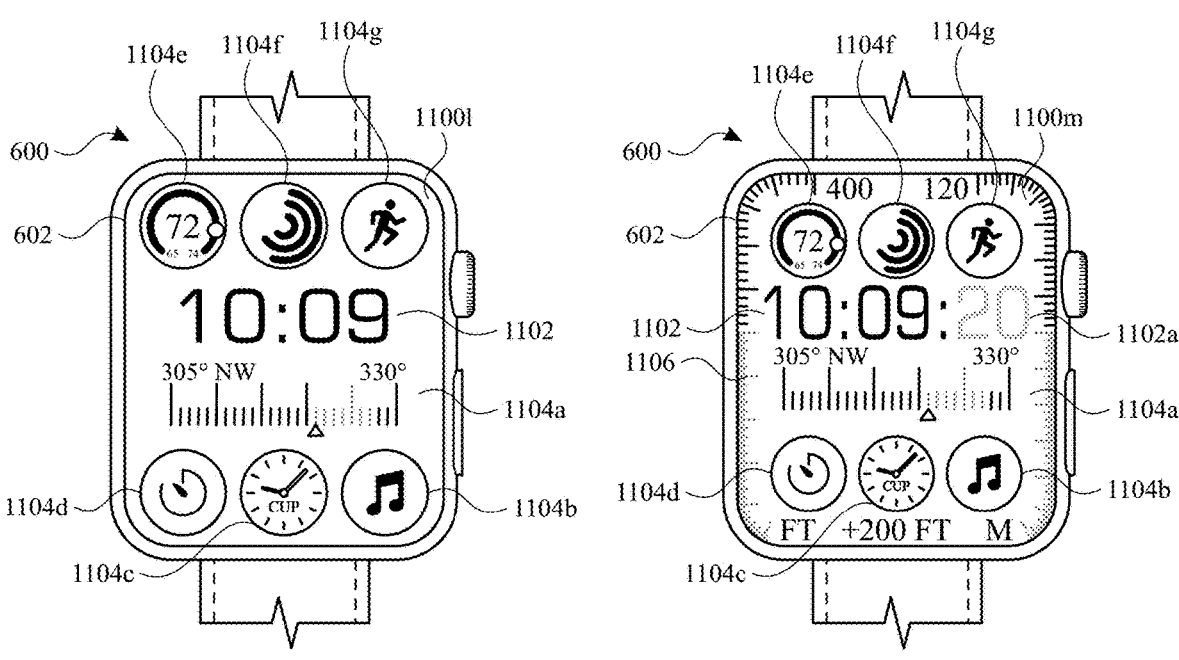
FIG. 11L                   FIG. 11M
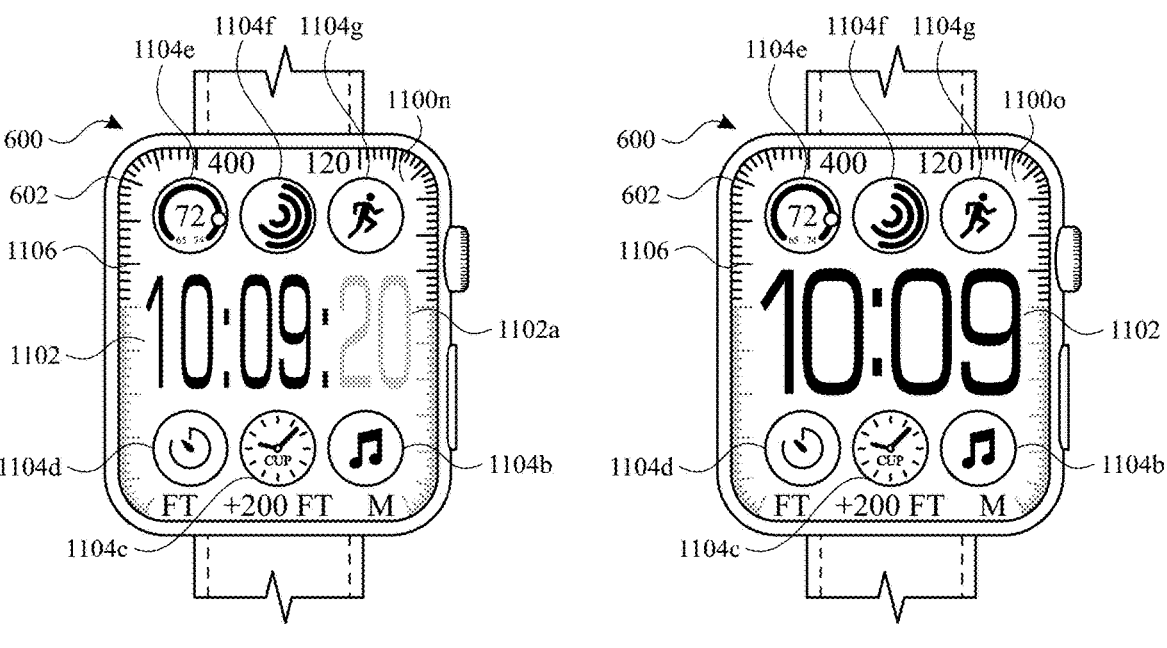
FIG. 11N                   FIG. 11O

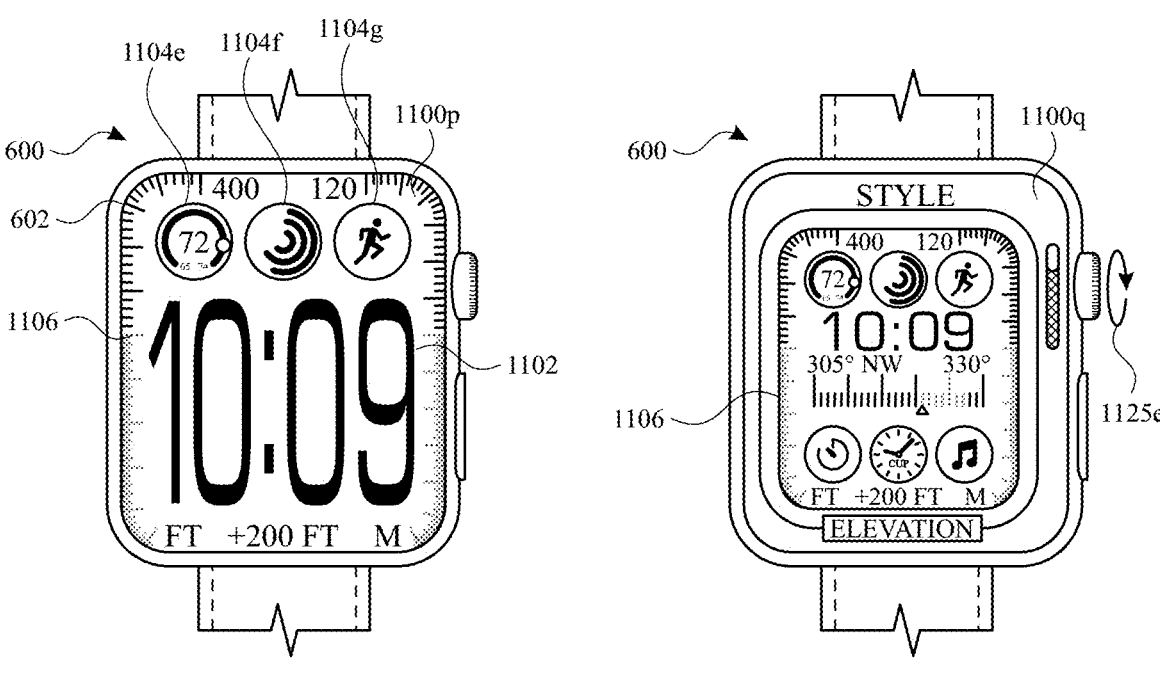
FIG. 11P
FIG. 11Q
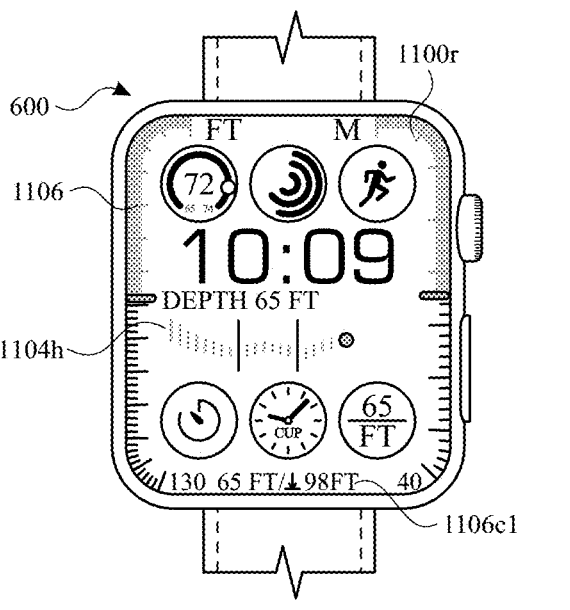
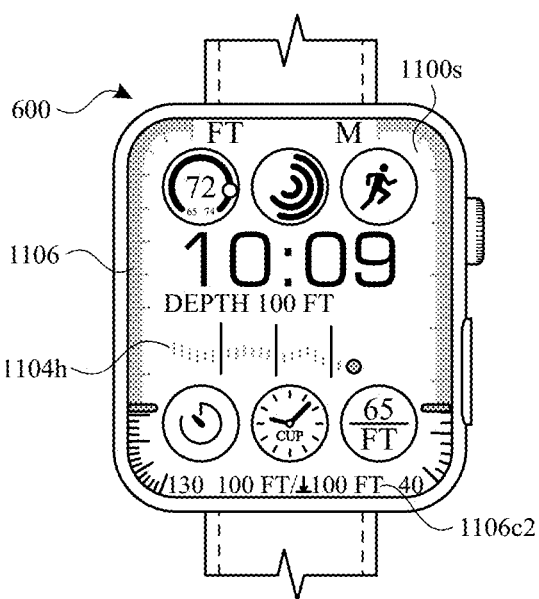
FIG. 11R
FIG. 11S

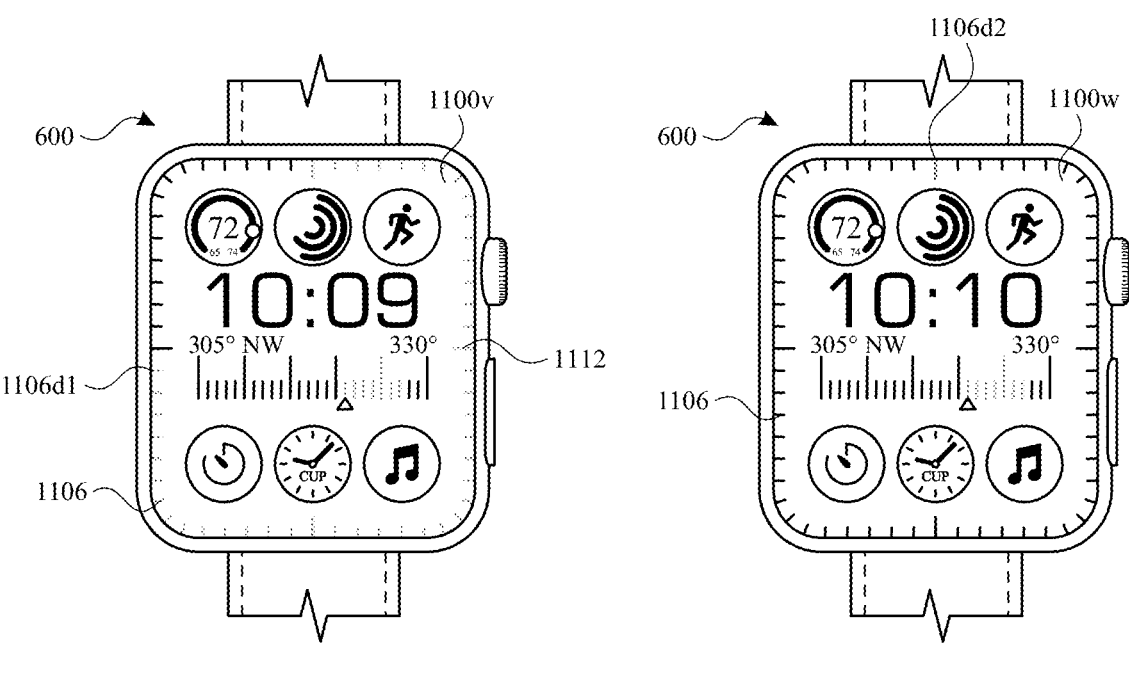
FIG. 11V                                     FIG. 11W
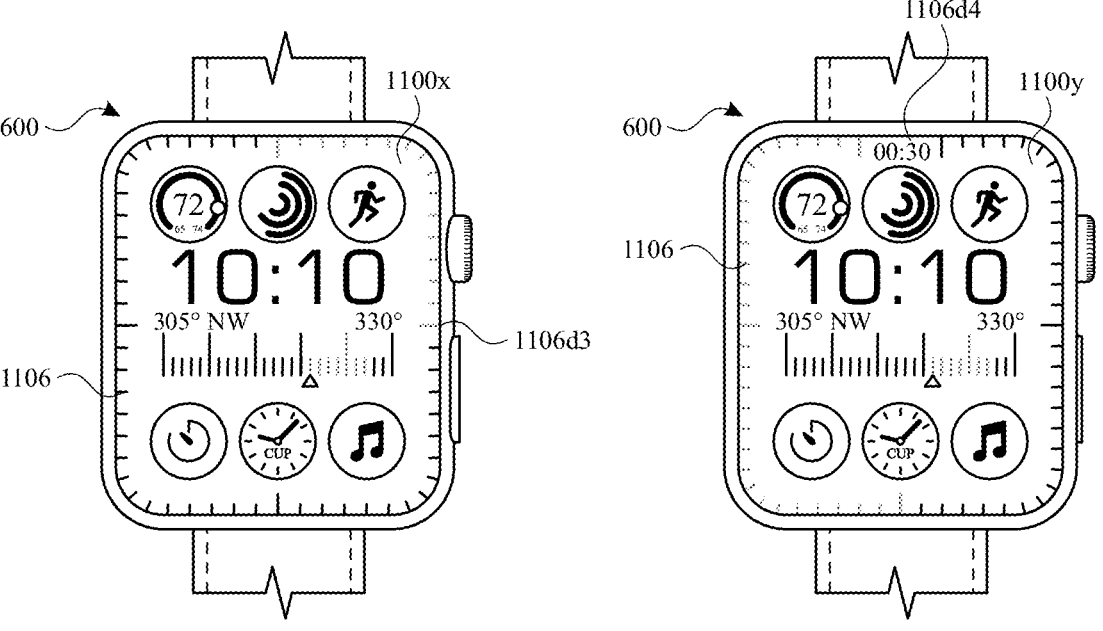
FIG. 11X                                     FIG. 11Y

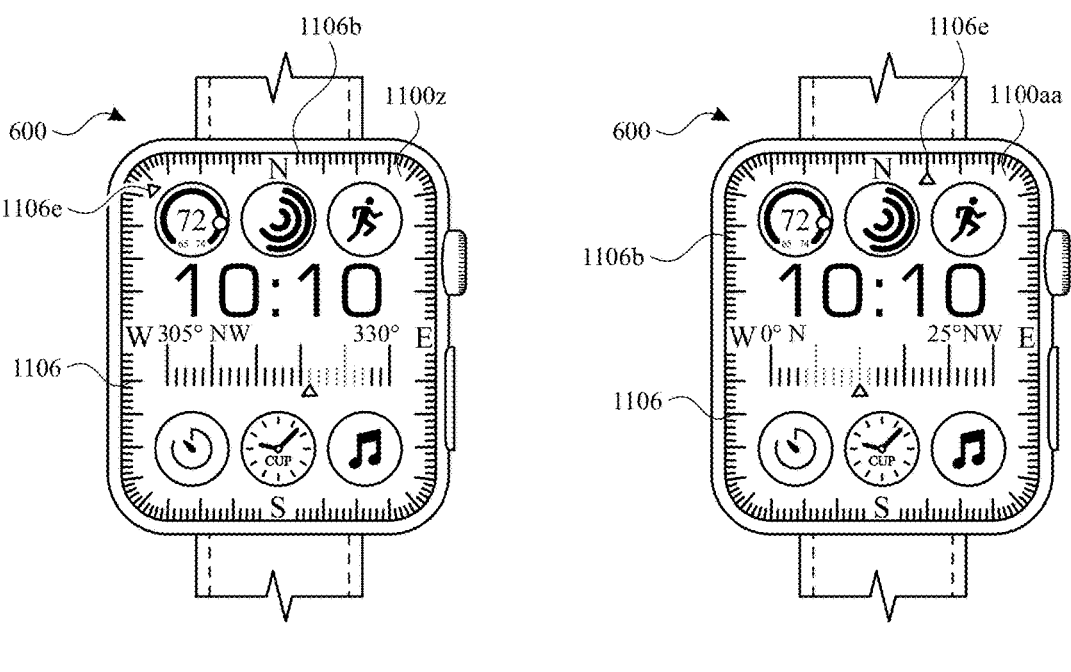
FIG. 11Z
FIG. 11AA
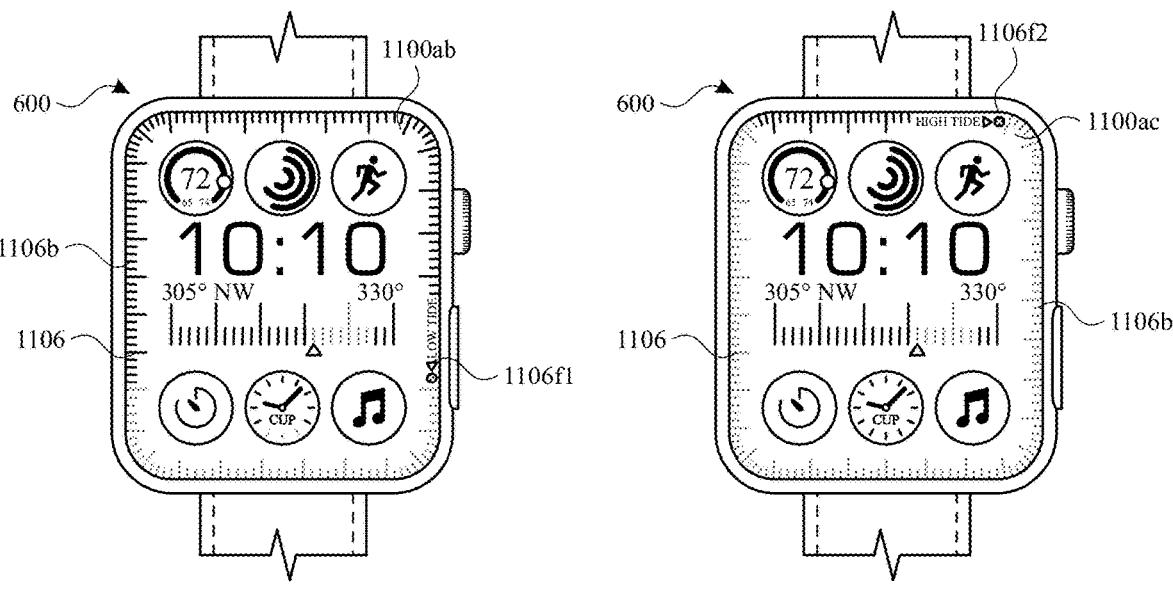
FIG. 11AB
FIG. 11AC

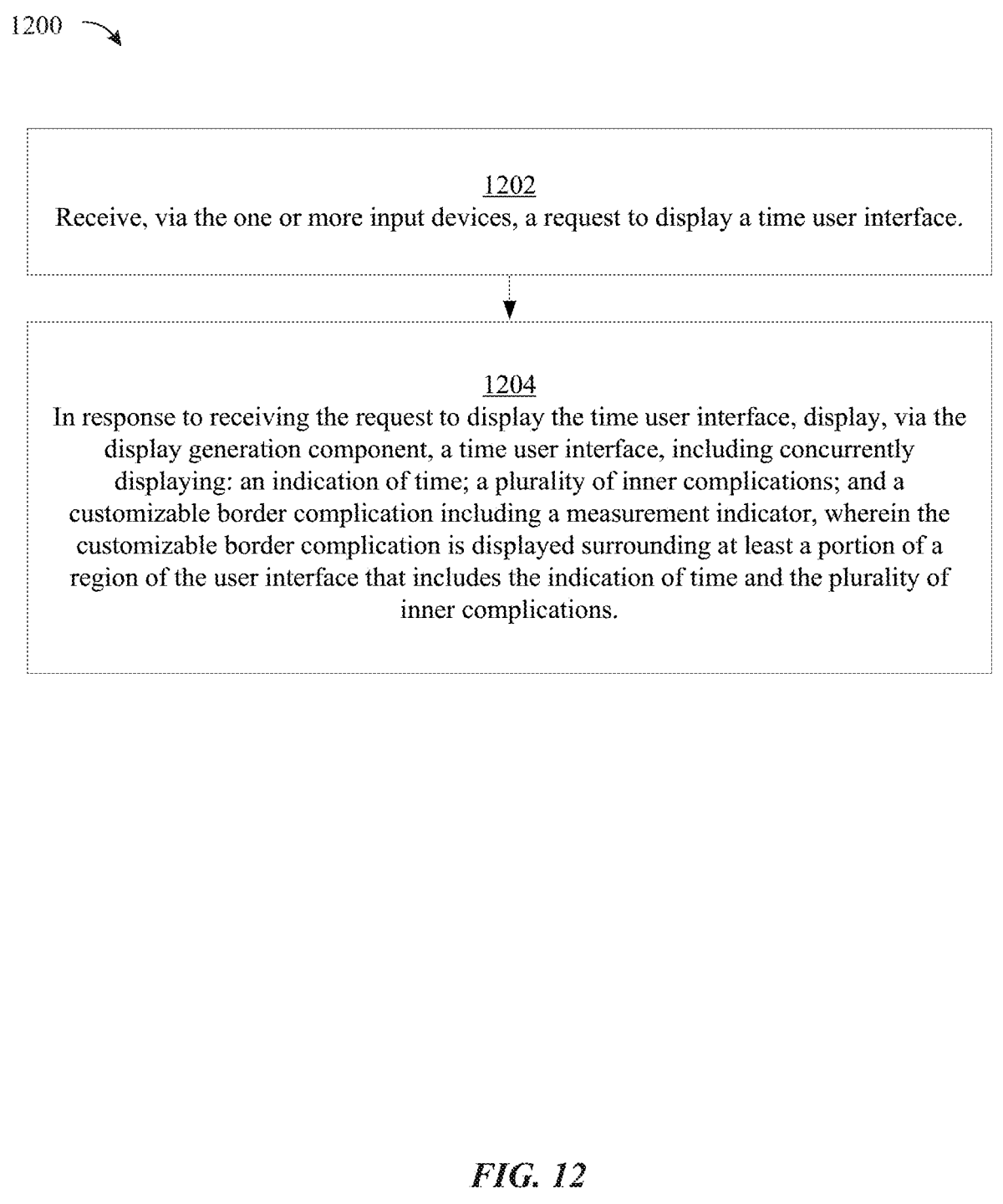

1200 ⟍

<u>1202</u>
Receive, via the one or more input devices, a request to display a time user interface.

<u>1204</u>
In response to receiving the request to display the time user interface, display, via the display generation component, a time user interface, including concurrently displaying: an indication of time; a plurality of inner complications; and a customizable border complication including a measurement indicator, wherein the customizable border complication is displayed surrounding at least a portion of a region of the user interface that includes the indication of time and the plurality of inner complications.

*FIG. 12*

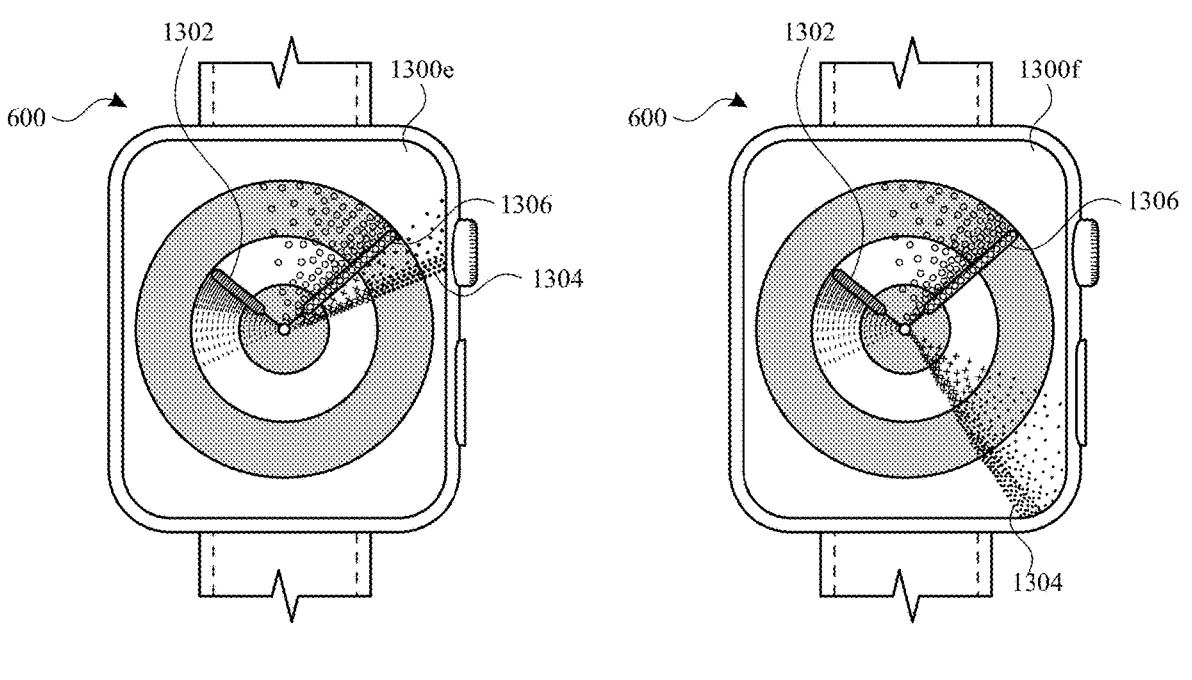
FIG. 13E
FIG. 13F
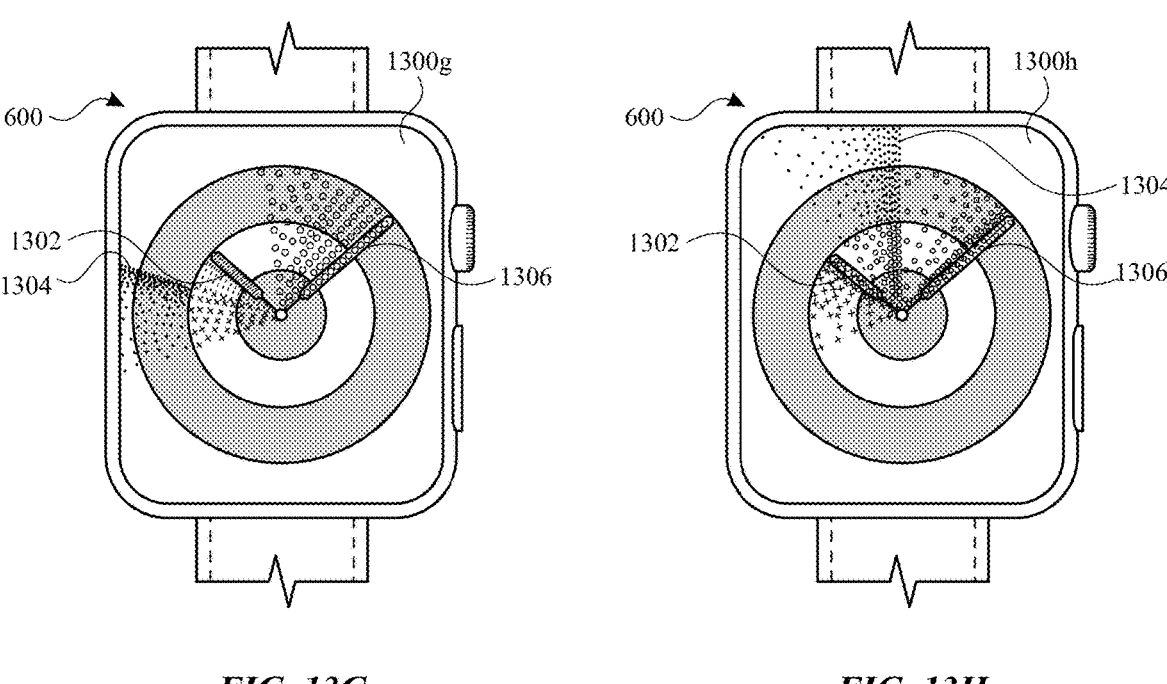
FIG. 13G
FIG. 13H

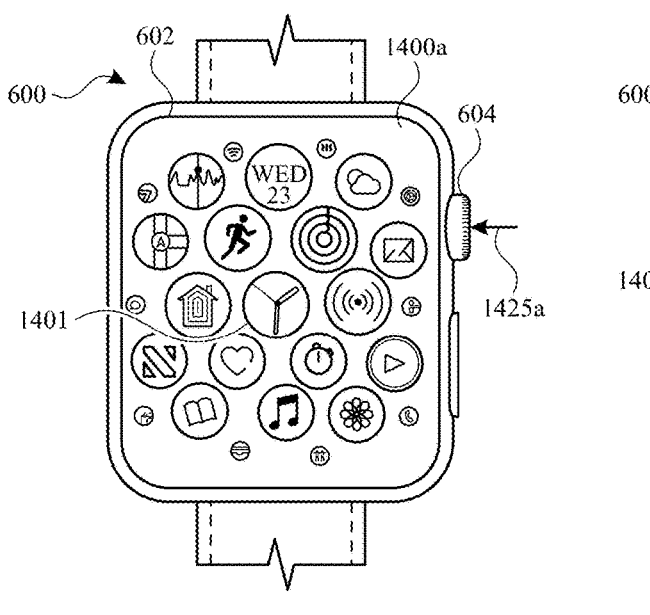
*FIG. 14A*
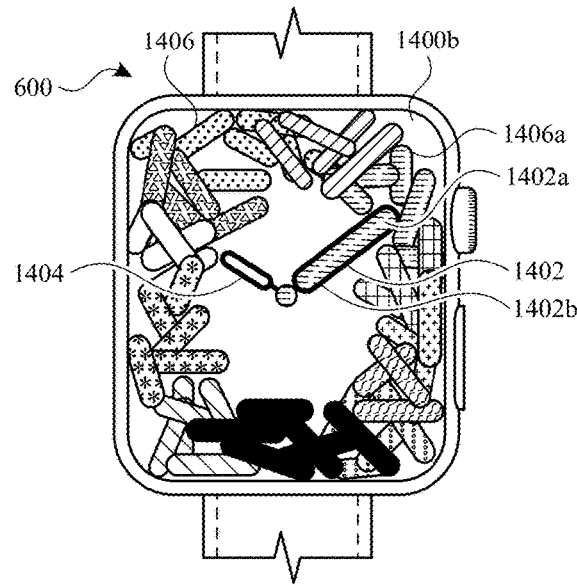
*FIG. 14B*
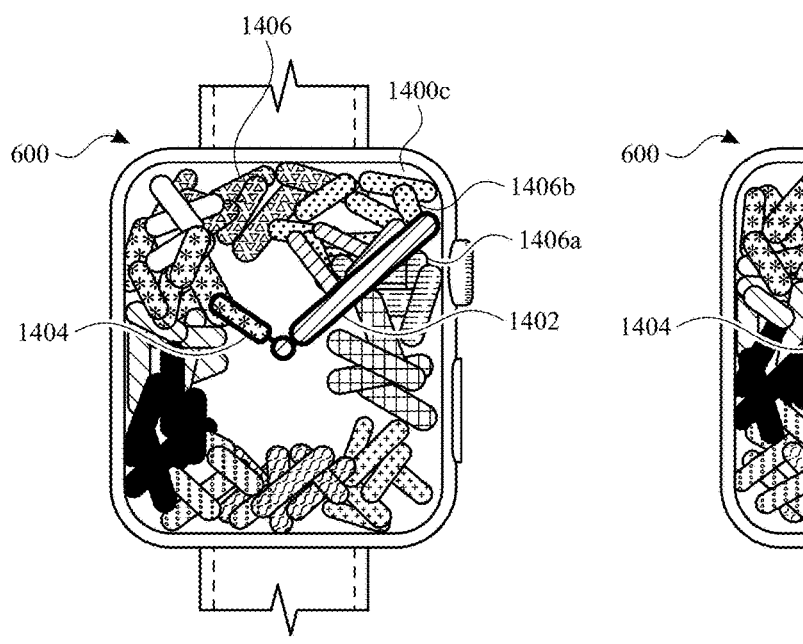
*FIG. 14C*
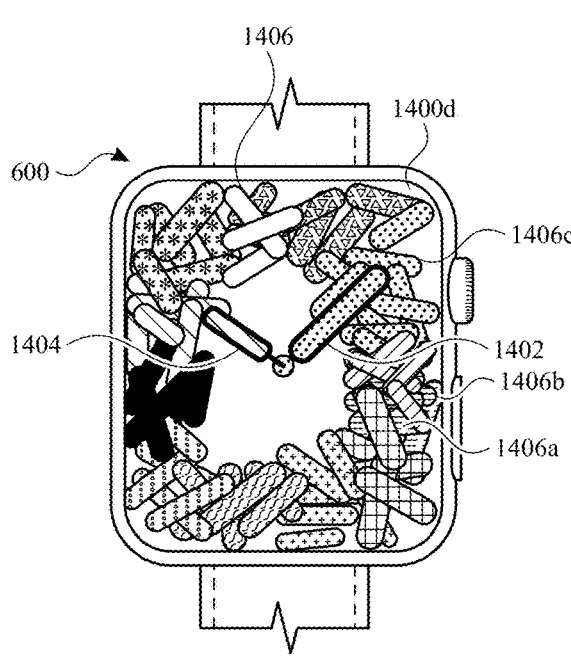
*FIG. 14D*

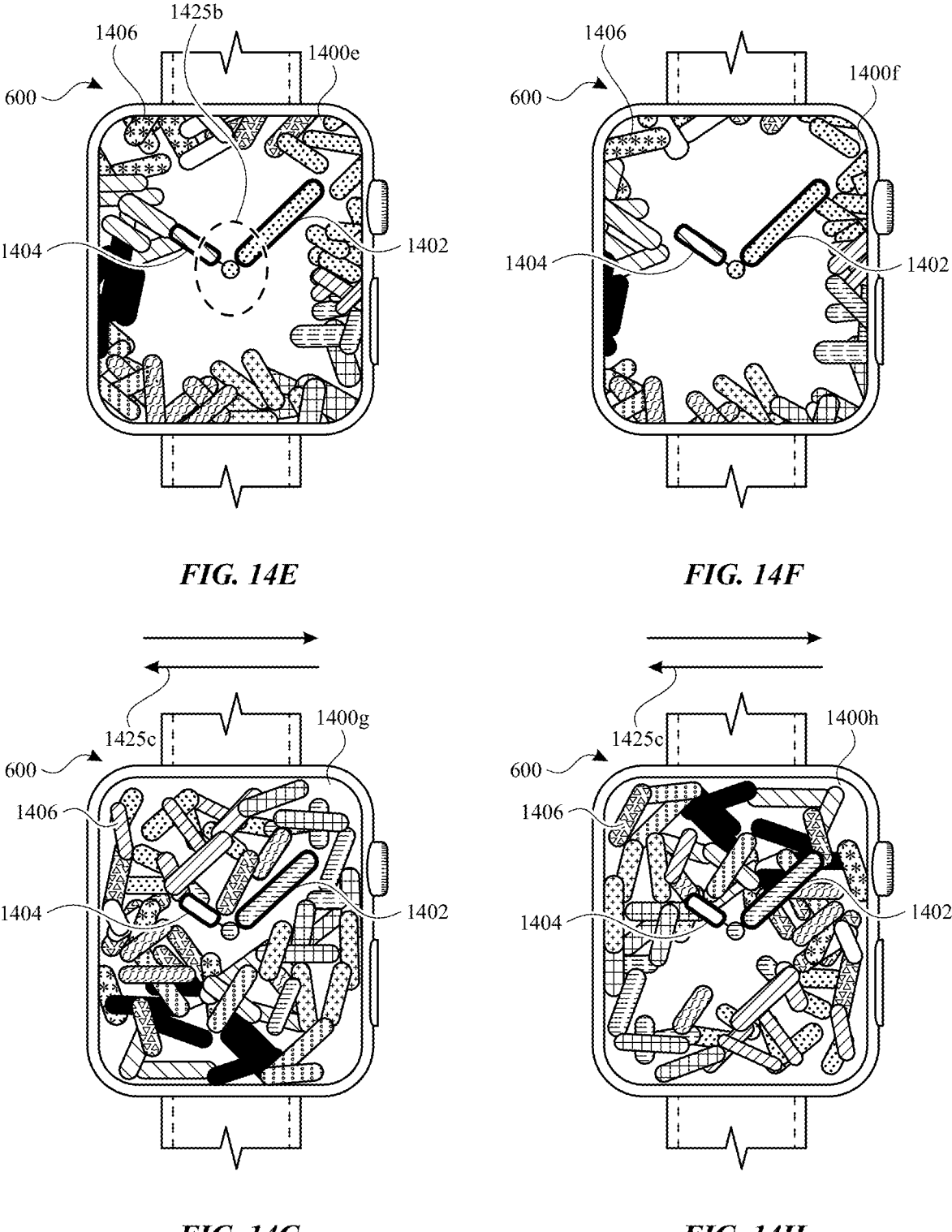
*FIG. 14E*                    *FIG. 14F*
*FIG. 14G*                    *FIG. 14H*

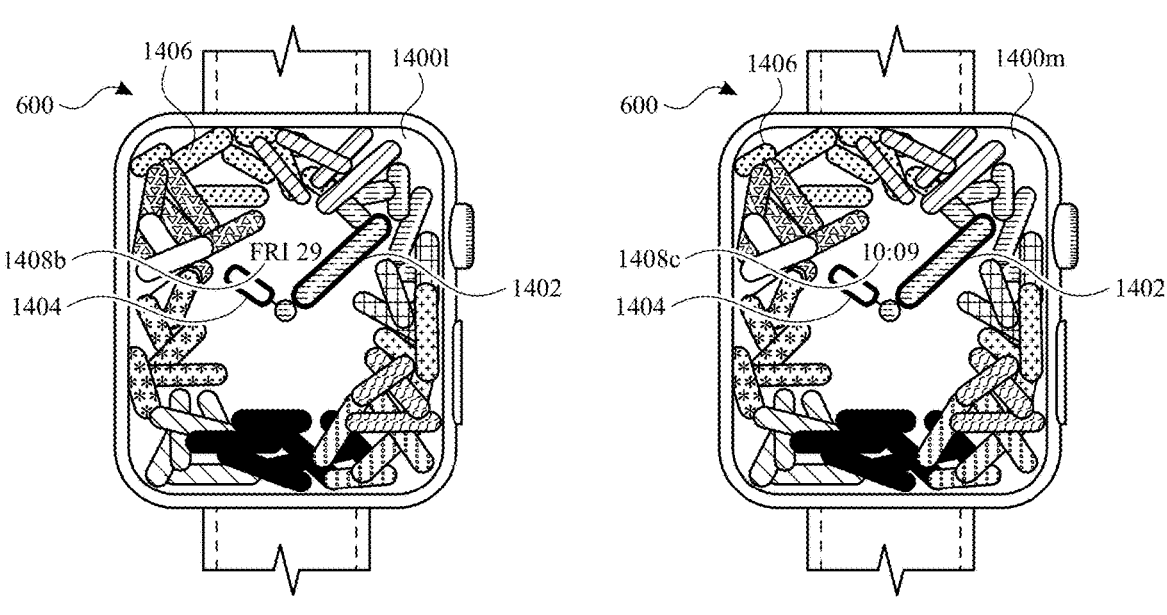
FIG. 14L
FIG. 14M
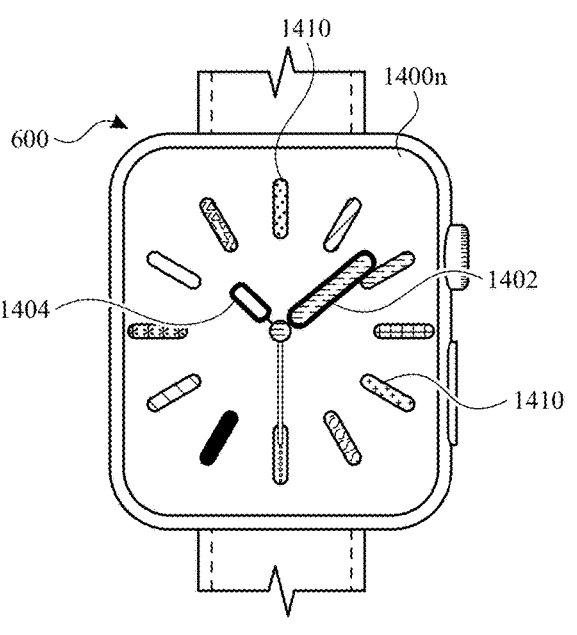
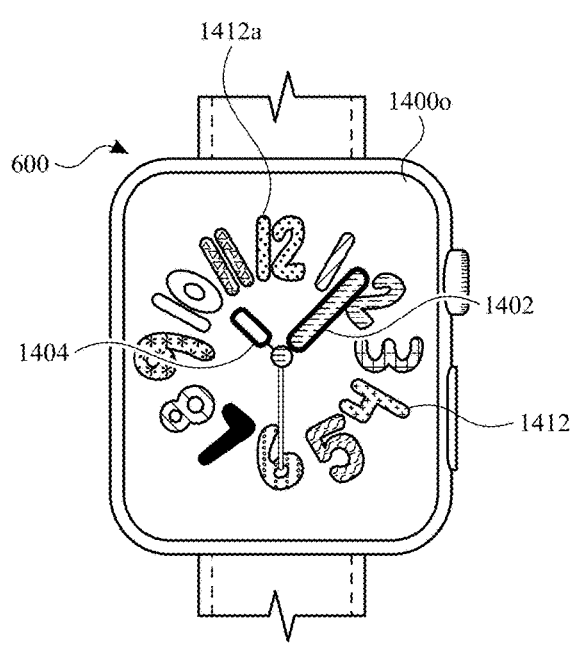
FIG. 14N
FIG. 14O

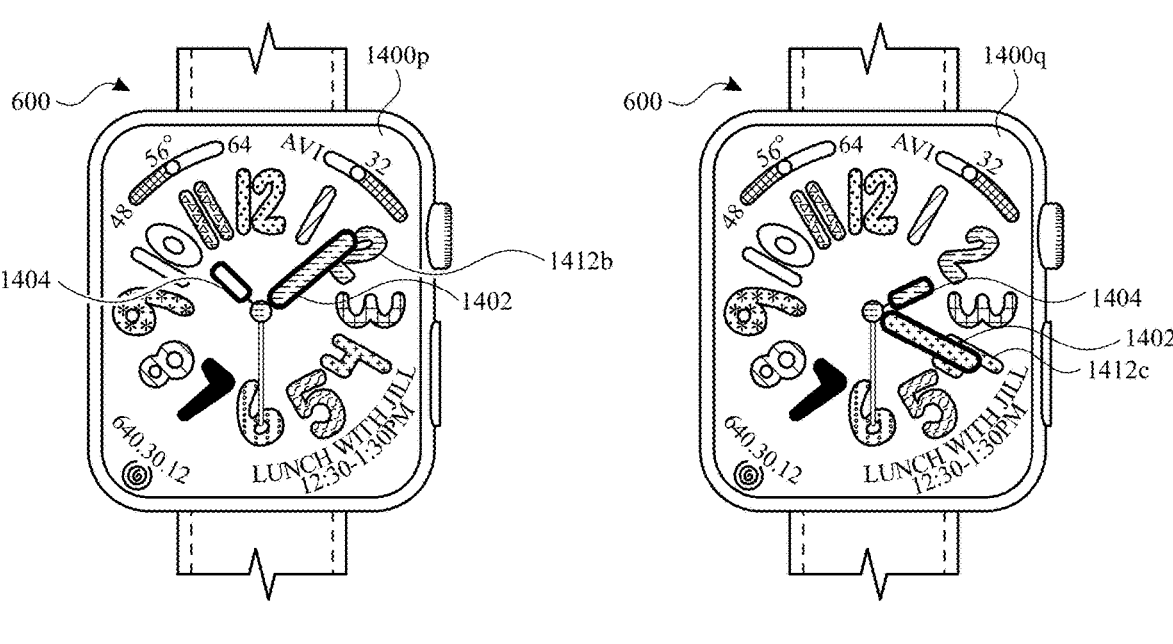
FIG. 14P                          FIG. 14Q
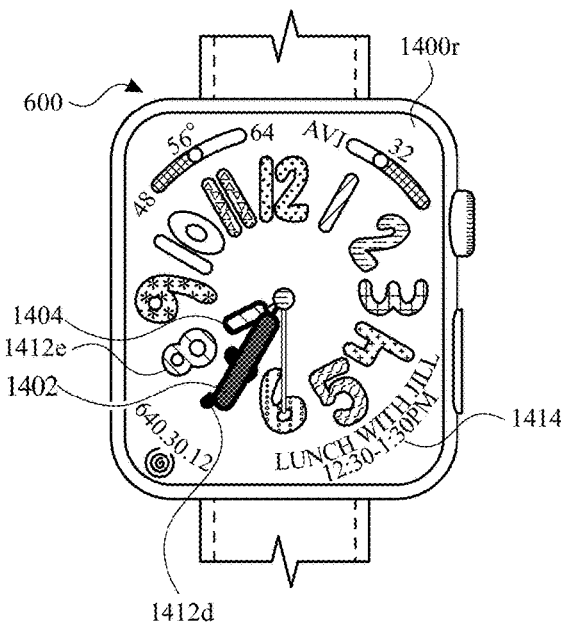
FIG. 14R

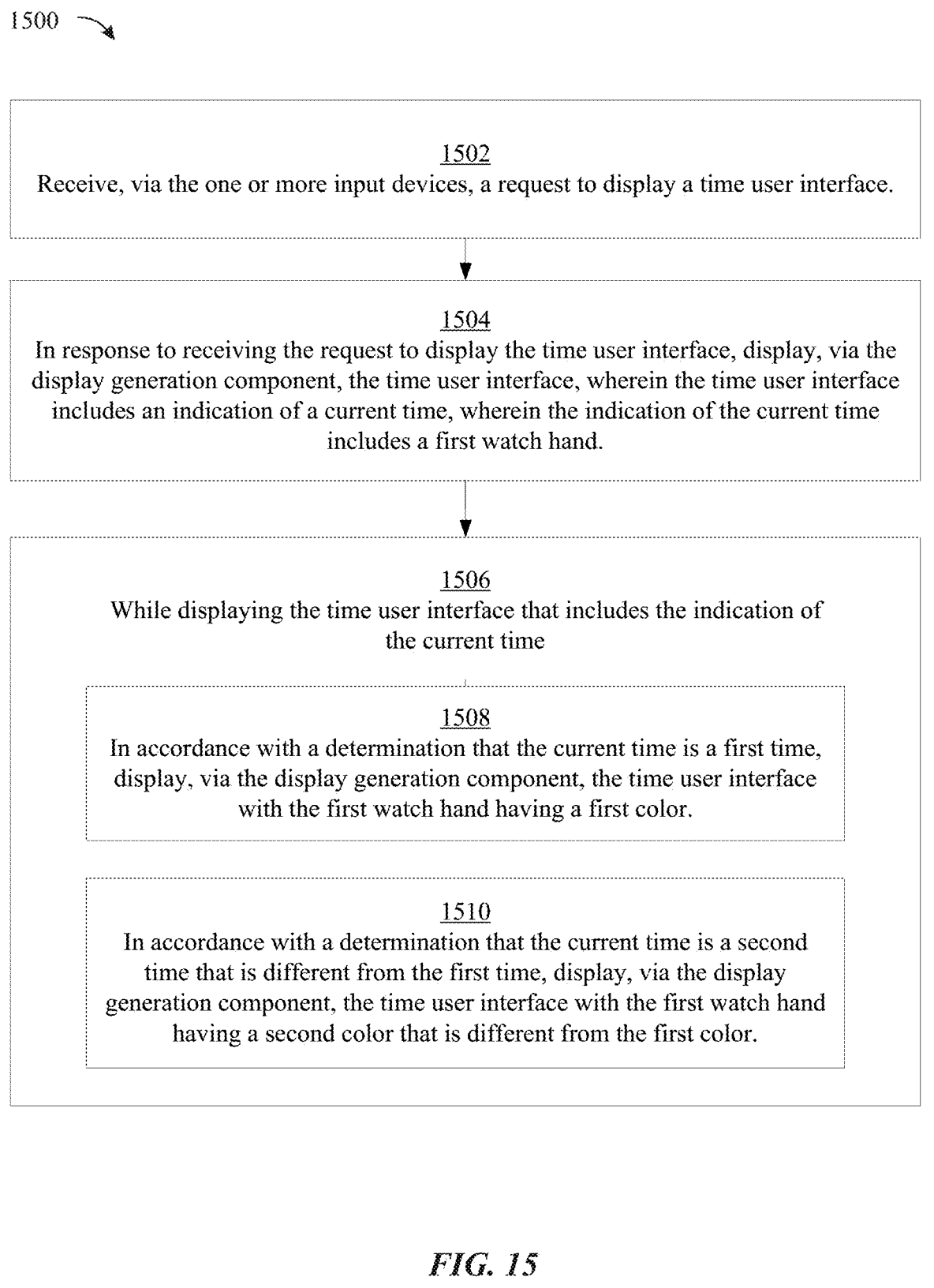

1500

1502
Receive, via the one or more input devices, a request to display a time user interface.

1504
In response to receiving the request to display the time user interface, display, via the display generation component, the time user interface, wherein the time user interface includes an indication of a current time, wherein the indication of the current time includes a first watch hand.

1506
While displaying the time user interface that includes the indication of the current time 1508
In accordance with a determination that the current time is a first time, display, via the display generation component, the time user interface with the first watch hand having a first color.

1510
In accordance with a determination that the current time is a second time that is different from the first time, display, via the display generation component, the time user interface with the first watch hand having a second color that is different from the first color.

*FIG. 15*

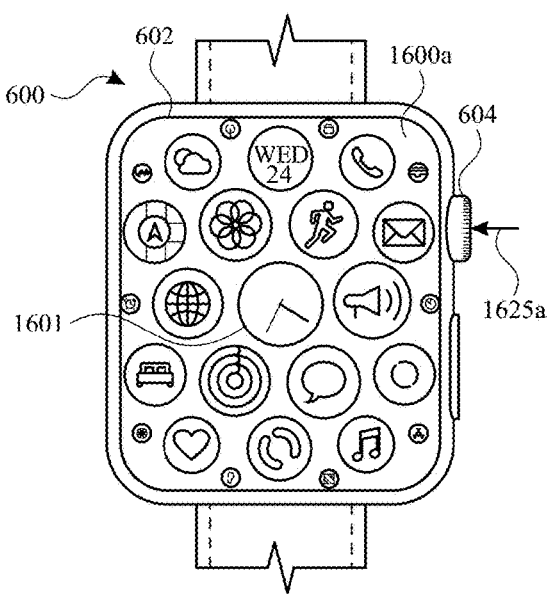
FIG. 16A
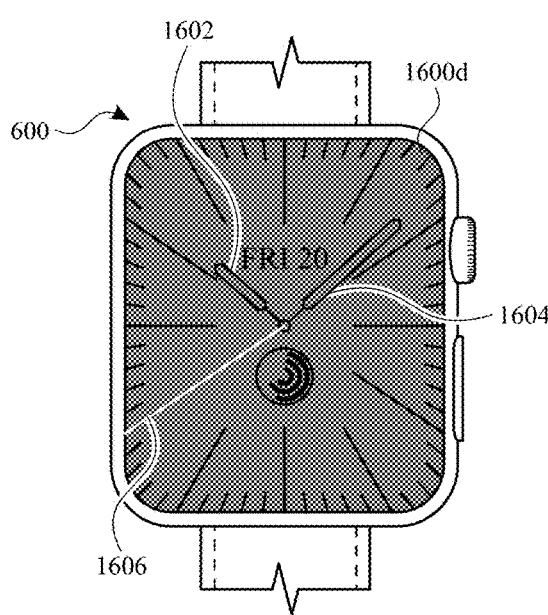
FIG. 16B
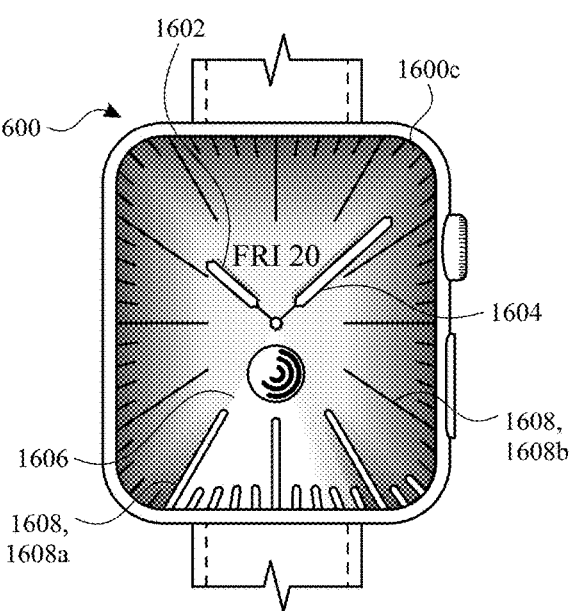
FIG. 16C
FIG. 16D

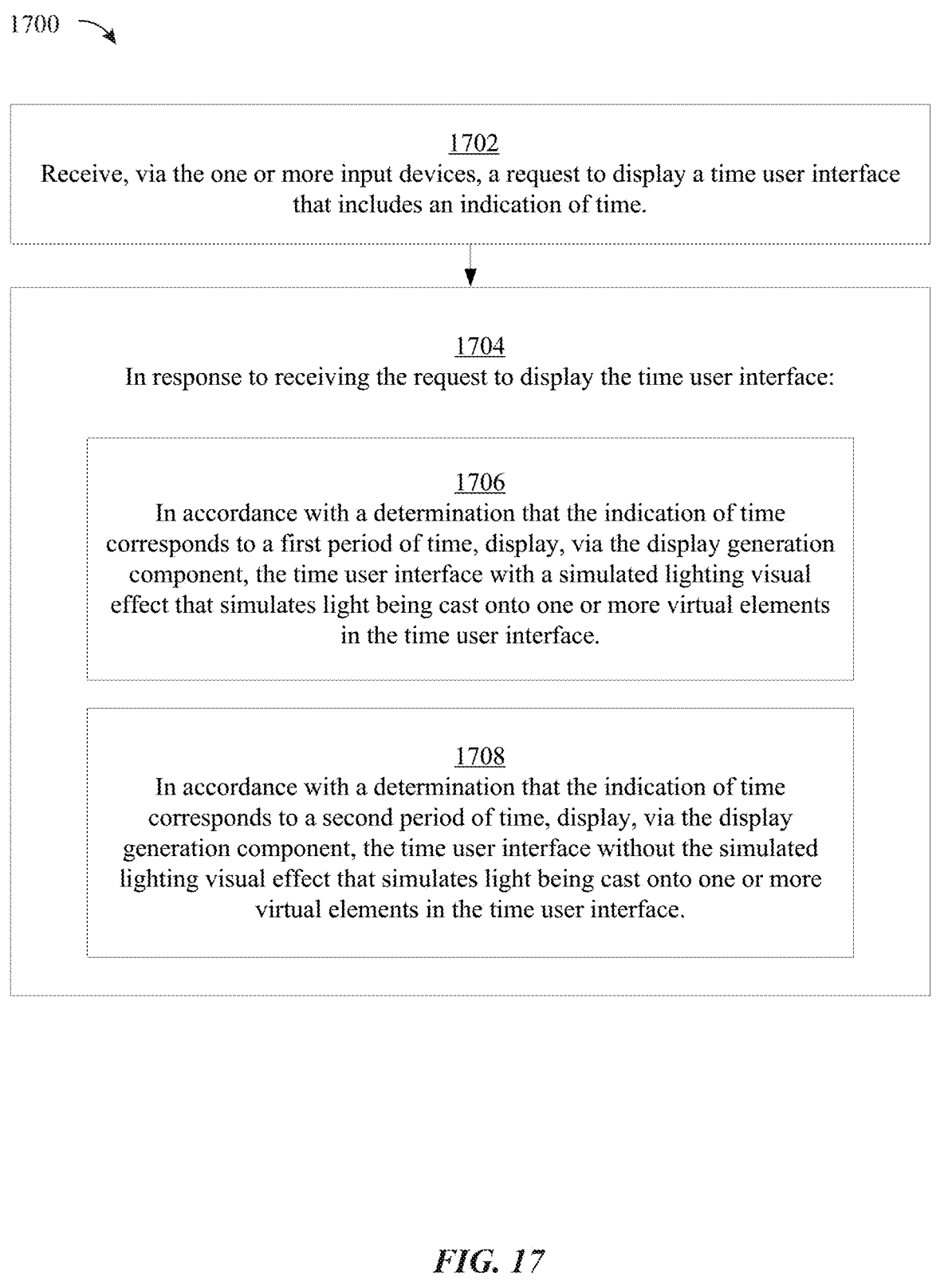

1700

1702
Receive, via the one or more input devices, a request to display a time user interface that includes an indication of time.

1704
In response to receiving the request to display the time user interface:

1706
In accordance with a determination that the indication of time corresponds to a first period of time, display, via the display generation component, the time user interface with a simulated lighting visual effect that simulates light being cast onto one or more virtual elements in the time user interface.

1708
In accordance with a determination that the indication of time corresponds to a second period of time, display, via the display generation component, the time user interface without the simulated lighting visual effect that simulates light being cast onto one or more virtual elements in the time user interface.

FIG. 17

USER INTERFACES FOR INDICATING TIME

CROSS-REFERENCE TO RELATED APPLICATIONS

This application claims priority to U.S. Provisional Patent Application No. 63/537,809, entitled "USER INTERFACES FOR INDICATING TIME," filed Sep. 11, 2023; U.S. Provisional Patent Application No. 63/470,929, entitled "USER INTERFACES FOR INDICATING TIME," filed Jun. 4, 2023; U.S. Provisional Patent Application No. 63/462,216, entitled "USER INTERFACES FOR INDICATING TIME," filed Apr. 26, 2023; U.S. Provisional Patent Application No. 63/439,512, entitled "USER INTERFACES FOR INDICATING TIME," filed Jan. 17, 2023; and U.S. Provisional Patent Application No. 63/407,123, entitled "USER INTERFACES FOR INDICATING TIME," filed Sep. 15, 2022, the contents of all of which are hereby incorporated by reference in their entirety.

FIELD

The present disclosure relates generally to computer user interfaces, and more specifically to techniques for indicating time.

BACKGROUND

Electronic devices include displays that can be used to display various types of content and to provide information to a user. Some electronic devices, such as smartphones and smartwatches, can display an indication of time to provide a user with the current time.

BRIEF SUMMARY

Some techniques for indicating time using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for indicating time. Such methods and interfaces optionally complement or replace other methods for indicating time. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method comprises: at a computer system that is in communication with a display generation component and one or more input devices: detecting, via the one or more input devices, a first request to display a user interface; in response to detecting the first request to display the user interface, displaying, via the display generation component, the user interface, including displaying: an indication of time indicating a first time, wherein the indication of time includes one or more clock hands including a first clock hand indicating the first time, wherein displaying the first clock hand indicating the first time includes displaying the first clock hand at a first position in the user interface; and a first character in a first state that represents a first interaction between the first character and the first clock hand at the first position; after displaying the user interface in response to detecting the first request to display the user interface, detecting, via the one or more input devices, a second request to display the user interface; and in response to detecting the second request to display the user interface, displaying the user interface, including displaying: the indication of time, including the first clock hand indicating a second time that is different from the first time, wherein displaying the first clock hand indicating the second time includes displaying the first clock hand at a second position in the user interface that is different from the first position; and the first character in a second state that is different from the first state and that represents a second interaction between the first character and the first clock hand at the second position that is different from the first interaction between the first character and the first clock hand at the first position.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: detecting, via the one or more input devices, a first request to display a user interface; in response to detecting the first request to display the user interface, displaying, via the display generation component, the user interface, including displaying: an indication of time indicating a first time, wherein the indication of time includes one or more clock hands including a first clock hand indicating the first time, wherein displaying the first clock hand indicating the first time includes displaying the first clock hand at a first position in the user interface; and a first character in a first state that represents a first interaction between the first character and the first clock hand at the first position; after displaying the user interface in response to detecting the first request to display the user interface, detecting, via the one or more input devices, a second request to display the user interface; and in response to detecting the second request to display the user interface, displaying the user interface, including displaying: the indication of time, including the first clock hand indicating a second time that is different from the first time, wherein displaying the first clock hand indicating the second time includes displaying the first clock hand at a second position in the user interface that is different from the first position; and the first character in a second state that is different from the first state and that represents a second interaction between the first character and the first clock hand at the second position that is different from the first interaction between the first character and the first clock hand at the first position.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: detecting, via the one or more input devices, a first request to display a user interface; in response to detecting the first request to display the user interface, displaying, via the display generation component, the user interface, including displaying: an indication of time indicating a first time, wherein the indication of time includes one or more clock hands including a first clock hand indicating the first time, wherein displaying the first clock hand indicating the first time includes displaying the first clock hand at a first position in the user interface; and a first character in a first state that represents a first interaction between the first character and the first clock hand at the first position; after displaying the user interface in response to detecting the first request to display the user interface, detecting, via the one or more input devices, a second request to display the user interface; and in response to detecting the second request to display the user interface, displaying the user interface, including displaying: the indication of time, including the first clock hand indicating a second time that is different from the first time, wherein displaying the first clock hand indicating the second time includes displaying the first clock hand at a second position in the user interface that is different from the first position; and the first character in a second state that is different from the first state and that represents a second interaction between the first character and the first clock hand at the second position that is different from the first interaction between the first character and the first clock hand at the first position.

In accordance with some embodiments, a computer system configured to communicate with a display generation component and one or more input devices is described. The computer system comprises: one or more processors; and memory storing one or more programs configured to be executed by the one or more processors, the one or more programs including instructions for: detecting, via the one or more input devices, a first request to display a user interface; in response to detecting the first request to display the user interface, displaying, via the display generation component, the user interface, including displaying: an indication of time indicating a first time, wherein the indication of time includes one or more clock hands including a first clock hand indicating the first time, wherein displaying the first clock hand indicating the first time includes displaying the first clock hand at a first position in the user interface; and a first character in a first state that represents a first interaction between the first character and the first clock hand at the first position; after displaying the user interface in response to detecting the first request to display the user interface, detecting, via the one or more input devices, a second request to display the user interface; and in response to detecting the second request to display the user interface, displaying the user interface, including displaying: the indication of time, including the first clock hand indicating a second time that is different from the first time, wherein displaying the first clock hand indicating the second time includes displaying the first clock hand at a second position in the user interface that is different from the first position; and the first character in a second state that is different from the first state and that represents a second interaction between the first character and the first clock hand at the second position that is different from the first interaction between the first character and the first clock hand at the first position.

In accordance with some embodiments, a computer system configured to communicate with a display generation component and one or more input devices is described. The computer system comprises: means for detecting, via the one or more input devices, a first request to display a user interface; means for, in response to detecting the first request to display the user interface, displaying, via the display generation component, the user interface, including displaying: an indication of time indicating a first time, wherein the indication of time includes one or more clock hands including a first clock hand indicating the first time, wherein displaying the first clock hand indicating the first time includes displaying the first clock hand at a first position in the user interface; and a first character in a first state that represents a first interaction between the first character and the first clock hand at the first position; means for, after displaying the user interface in response to detecting the first request to display the user interface, detecting, via the one or more input devices, a second request to display the user interface; and means for, in response to detecting the second request to display the user interface, displaying the user interface, including displaying: the indication of time, including the first clock hand indicating a second time that is different from the first time, wherein displaying the first clock hand indicating the second time includes displaying the first clock hand at a second position in the user interface that is different from the first position; and the first character in a second state that is different from the first state and that represents a second interaction between the first character and the first clock hand at the second position that is different from the first interaction between the first character and the first clock hand at the first position.

In accordance with some embodiments, a computer program product is described. The computer program product comprises one or more programs configured to be executed by one or more processors of a computer system that is in communication with a display generation component and one or more input devices, the one or more programs including instructions for: detecting, via the one or more input devices, a first request to display a user interface; in response to detecting the first request to display the user interface, displaying, via the display generation component, the user interface, including displaying: an indication of time indicating a first time, wherein the indication of time includes one or more clock hands including a first clock hand indicating the first time, wherein displaying the first clock hand indicating the first time includes displaying the first clock hand at a first position in the user interface; and a first character in a first state that represents a first interaction between the first character and the first clock hand at the first position; after displaying the user interface in response to detecting the first request to display the user interface, detecting, via the one or more input devices, a second request to display the user interface; and in response to detecting the second request to display the user interface, displaying the user interface, including displaying: the indication of time, including the first clock hand indicating a second time that is different from the first time, wherein displaying the first clock hand indicating the second time includes displaying the first clock hand at a second position in the user interface that is different from the first position; and the first character in a second state that is different from the first state and that represents a second interaction between the first character and the first clock hand at the second position that is different from the first interaction between the first character and the first clock hand at the first position.

In accordance with some embodiments, a method is described. The method comprises: at a computer system that is in communication with a display generation component and one or more input devices: during a first day, detecting, via the one or more input devices, a first request to display a user interface; and in response to detecting the first request to display the user interface, displaying, via the display generation component, the user interface, including displaying an indication of time, wherein displaying the user interface in response to detecting the first request to display the user interface includes: in accordance with a determination that the first day is one of a first set of one or more days of the week, displaying the user interface with a first appearance; and in accordance with a determination that the first day is one of a second set of one or more days of the week that are different from the first set of one or more days of the week, displaying the user interface with a second appearance that is different from the first appearance, wherein the difference between the first appearance and the second appearance is a difference in a portion of the user interface that does not otherwise indicate a current day of the week.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: during a first day, detecting, via the one or more input devices, a first request to display a user interface; and in response to detecting the first request to display the user interface, displaying, via the display generation component, the user interface, including displaying an indication of time, wherein displaying the user interface in response to detecting the first request to display the user interface includes: in accordance with a determination that the first day is one of a first set of one or more days of the week, displaying the user interface with a first appearance; and in accordance with a determination that the first day is one of a second set of one or more days of the week that are different from the first set of one or more days of the week, displaying the user interface with a second appearance that is different from the first appearance, wherein the difference between the first appearance and the second appearance is a difference in a portion of the user interface that does not otherwise indicate a current day of the week.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: during a first day, detecting, via the one or more input devices, a first request to display a user interface; and in response to detecting the first request to display the user interface, displaying, via the display generation component, the user interface, including displaying an indication of time, wherein displaying the user interface in response to detecting the first request to display the user interface includes: in accordance with a determination that the first day is one of a first set of one or more days of the week, displaying the user interface with a first appearance; and in accordance with a determination that the first day is one of a second set of one or more days of the week that are different from the first set of one or more days of the week, displaying the user interface with a second appearance that is different from the first appearance, wherein the difference between the first appearance and the second appearance is a difference in a portion of the user interface that does not otherwise indicate a current day of the week.

In accordance with some embodiments, a computer system configured to communicate with a display generation component and one or more input devices is described. The computer system comprises: one or more processors; and memory storing one or more programs configured to be executed by the one or more processors, the one or more programs including instructions for: during a first day, detecting, via the one or more input devices, a first request to display a user interface; and in response to detecting the first request to display the user interface, displaying, via the display generation component, the user interface, including displaying an indication of time, wherein displaying the user interface in response to detecting the first request to display the user interface includes: in accordance with a determination that the first day is one of a first set of one or more days of the week, displaying the user interface with a first appearance; and in accordance with a determination that the first day is one of a second set of one or more days of the week that are different from the first set of one or more days of the week, displaying the user interface with a second appearance that is different from the first appearance, wherein the difference between the first appearance and the second appearance is a difference in a portion of the user interface that does not otherwise indicate a current day of the week.

In accordance with some embodiments, a computer system configured to communicate with a display generation component and one or more input devices is described. The computer system comprises: means for, during a first day, detecting, via the one or more input devices, a first request to display a user interface; and means for, in response to detecting the first request to display the user interface, displaying, via the display generation component, the user interface, including displaying an indication of time, wherein displaying the user interface in response to detecting the first request to display the user interface includes: in accordance with a determination that the first day is one of a first set of one or more days of the week, displaying the user interface with a first appearance; and in accordance with a determination that the first day is one of a second set of one or more days of the week that are different from the first set of one or more days of the week, displaying the user interface with a second appearance that is different from the first appearance, wherein the difference between the first appearance and the second appearance is a difference in a portion of the user interface that does not otherwise indicate a current day of the week.

In accordance with some embodiments, a computer program product is described. The computer program product comprises one or more programs configured to be executed by one or more processors of a computer system that is in communication with a display generation component and one or more input devices, the one or more programs including instructions for: during a first day, detecting, via the one or more input devices, a first request to display a user interface; and in response to detecting the first request to display the user interface, displaying, via the display generation component, the user interface, including displaying an indication of time, wherein displaying the user interface in response to detecting the first request to display the user interface includes: in accordance with a determination that the first day is one of a first set of one or more days of the week, displaying the user interface with a first appearance; and in accordance with a determination that the first day is one of a second set of one or more days of the week that are different from the first set of one or more days of the week, displaying the user interface with a second appearance that is different from the first appearance, wherein the difference between the first appearance and the second appearance is a difference in a portion of the user interface that does not otherwise indicate a current day of the week.

In accordance with some embodiments, a method is described. The method comprises: at a computer system that is in communication with a display generation component and one or more input devices: detecting, via the one or more input devices, a request to display a user interface that includes one or more text characters that are part of a dynamic text string that changes based on a context of the computer system; and in response to detecting the request to display the user interface, displaying, via the display generation component, the user interface, including displaying a first text character of the dynamic text string in the user interface, wherein displaying the first text character includes: in accordance with a determination that the first text character of the dynamic text string is displayed at a first location in the user interface, displaying the first text character having a first appearance that includes a first distribution of colors; and in accordance with a determination that the first text character of the dynamic text string is displayed at a second location in the user interface that is different from the first location in the user interface, displaying the first text character having a second appearance that is different from the first appearance that includes a second distribution of colors that is different from the first distribution of colors.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: detecting, via the one or more input devices, a request to display a user interface that includes one or more text characters that are part of a dynamic text string that changes based on a context of the computer system; and in response to detecting the request to display the user interface, displaying, via the display generation component, the user interface, including displaying a first text character of the dynamic text string in the user interface, wherein displaying the first text character includes: in accordance with a determination that the first text character of the dynamic text string is displayed at a first location in the user interface, displaying the first text character having a first appearance that includes a first distribution of colors; and in accordance with a determination that the first text character of the dynamic text string is displayed at a second location in the user interface that is different from the first location in the user interface, displaying the first text character having a second appearance that is different from the first appearance that includes a second distribution of colors that is different from the first distribution of colors.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: detecting, via the one or more input devices, a request to display a user interface that includes one or more text characters that are part of a dynamic text string that changes based on a context of the computer system; and in response to detecting the request to display the user interface, displaying, via the display generation component, the user interface, including displaying a first text character of the dynamic text string in the user interface, wherein displaying the first text character includes: in accordance with a determination that the first text character of the dynamic text string is displayed at a first location in the user interface, displaying the first text character having a first appearance that includes a first distribution of colors; and in accordance with a determination that the first text character of the dynamic text string is displayed at a second location in the user interface that is different from the first location in the user interface, displaying the first text character having a second appearance that is different from the first appearance that includes a second distribution of colors that is different from the first distribution of colors.

In accordance with some embodiments, a computer system configured to communicate with a display generation component and one or more input devices is described. The computer system comprises: one or more processors; and memory storing one or more programs configured to be executed by the one or more processors, the one or more programs including instructions for: detecting, via the one or more input devices, a request to display a user interface that includes one or more text characters that are part of a dynamic text string that changes based on a context of the computer system; and in response to detecting the request to display the user interface, displaying, via the display generation component, the user interface, including displaying a first text character of the dynamic text string in the user interface, wherein displaying the first text character includes: in accordance with a determination that the first text character of the dynamic text string is displayed at a first location in the user interface, displaying the first text character having a first appearance that includes a first distribution of colors; and in accordance with a determination that the first text character of the dynamic text string is displayed at a second location in the user interface that is different from the first location in the user interface, displaying the first text character having a second appearance that is different from the first appearance that includes a second distribution of colors that is different from the first distribution of colors.

In accordance with some embodiments, a computer system configured to communicate with a display generation component and one or more input devices is described. The computer system comprises: means for detecting, via the one or more input devices, a request to display a user interface that includes one or more text characters that are part of a dynamic text string that changes based on a context of the computer system; and means for, in response to detecting the request to display the user interface, displaying, via the display generation component, the user interface, including displaying a first text character of the dynamic text string in the user interface, wherein displaying the first text character includes: in accordance with a determination that the first text character of the dynamic text string is displayed at a first location in the user interface, displaying the first text character having a first appearance that includes a first distribution of colors; and in accordance with a determination that the first text character of the dynamic text string is displayed at a second location in the user interface that is different from the first location in the user interface, displaying the first text character having a second appearance that is different from the first appearance that includes a second distribution of colors that is different from the first distribution of colors.

In accordance with some embodiments, a computer program product is described. The computer program product comprises one or more programs configured to be executed by one or more processors of a computer system that is in communication with a display generation component and one or more input devices, the one or more programs including instructions for: detecting, via the one or more input devices, a request to display a user interface that includes one or more text characters that are part of a dynamic text string that changes based on a context of the computer system; and in response to detecting the request to display the user interface, displaying, via the display generation component, the user interface, including displaying a first text character of the dynamic text string in the user interface, wherein displaying the first text character includes: in accordance with a determination that the first text character of the dynamic text string is displayed at a first location in the user interface, displaying the first text character having a first appearance that includes a first distribution of colors; and in accordance with a determination that the first text character of the dynamic text string is displayed at a second location in the user interface that is different from the first location in the user interface, displaying the first text character having a second appearance that is different from the first appearance that includes a second distribution of colors that is different from the first distribution of colors.

In accordance with some embodiments, a method is described. The method comprises: at a computer system that is in communication with a display generation component and one or more input devices: receiving, via the one or more input devices, a request to display a time user interface; and in response to receiving the request to display the time user interface, displaying, via the display generation component, a time user interface, including concurrently displaying: an indication of time; a plurality of inner complications; and a customizable border complication including a measurement indicator, wherein the customizable border complication is displayed surrounding at least a portion of a region of the user interface that includes the indication of time and the plurality of inner complications.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: receiving, via the one or more input devices, a request to display a time user interface; and in response to receiving the request to display the time user interface, displaying, via the display generation component, a time user interface, including concurrently displaying: an indication of time; a plurality of inner complications; and a customizable border complication including a measurement indicator, wherein the customizable border complication is displayed surrounding at least a portion of a region of the user interface that includes the indication of time and the plurality of inner complications.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: receiving, via the one or more input devices, a request to display a time user interface; and in response to receiving the request to display the time user interface, displaying, via the display generation component, a time user interface, including concurrently displaying: an indication of time; a plurality of inner complications; and a customizable border complication including a measurement indicator, wherein the customizable border complication is displayed surrounding at least a portion of a region of the user interface that includes the indication of time and the plurality of inner complications.

In accordance with some embodiments, a computer system configured to communicate with a display generation component and one or more input devices is described. The computer system comprises: one or more processors; and memory storing one or more programs configured to be executed by the one or more processors, the one or more programs including instructions for: receiving, via the one or more input devices, a request to display a time user interface; and in response to receiving the request to display the time user interface, displaying, via the display generation component, a time user interface, including concurrently displaying: an indication of time; a plurality of inner complications; and a customizable border complication including a measurement indicator, wherein the customizable border complication is displayed surrounding at least a portion of a region of the user interface that includes the indication of time and the plurality of inner complications.

In accordance with some embodiments, a computer system configured to communicate with a display generation component and one or more input devices is described. The computer system comprises: means for receiving, via the one or more input devices, a request to display a time user interface; and means for, in response to receiving the request to display the time user interface, displaying, via the display generation component, a time user interface, including concurrently displaying: an indication of time; a plurality of inner complications; and a customizable border complication including a measurement indicator, wherein the customizable border complication is displayed surrounding at least a portion of a region of the user interface that includes the indication of time and the plurality of inner complications.

In accordance with some embodiments, a computer program product is described. The computer program product comprises one or more programs configured to be executed by one or more processors of a computer system that is in communication with a display generation component and one or more input devices, the one or more programs including instructions for: receiving, via the one or more input devices, a request to display a time user interface; and in response to receiving the request to display the time user interface, displaying, via the display generation component, a time user interface, including concurrently displaying: an indication of time; a plurality of inner complications; and a customizable border complication including a measurement indicator, wherein the customizable border complication is displayed surrounding at least a portion of a region of the user interface that includes the indication of time and the plurality of inner complications.

In accordance with some embodiments, a method is described. The method comprises: at a computer system that is in communication with a display generation component and one or more input devices: receiving, via the one or more input devices, a request to display a time user interface; and in response to receiving the request to display the time user interface, displaying, via the display generation component, the time user interface, wherein the time user interface includes an indication of a current time, wherein the indication of the current time includes a first watch hand; and while displaying the time user interface that includes the indication of the current time: in accordance with a determination that the current time is a first time, displaying, via the display generation component, the time user interface with the first watch hand having a first color; and in accordance with a determination that the current time is a second time that is different from the first time, displaying, via the display generation component, the time user interface with the first watch hand having a second color that is different from the first color.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: receiving, via the one or more input devices, a request to display a time user interface; and in response to receiving the request to display the time user interface, displaying, via the display generation component, the time user interface, wherein the time user interface includes an indication of a current time, wherein the indication of the current time includes a first watch hand; and while displaying the time user interface that includes the indication of the current time: in accordance with a determination that the current time is a first time, displaying, via the display generation component, the time user interface with the first watch hand having a first color; and in accordance with a determination that the current time is a second time that is different from the first time, displaying, via the display generation component, the time user interface with the first watch hand having a second color that is different from the first color.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: receiving, via the one or more input devices, a request to display a time user interface; and in response to receiving the request to display the time user interface, displaying, via the display generation component, the time user interface, wherein the time user interface includes an indication of a current time, wherein the indication of the current time includes a first watch hand; and while displaying the time user interface that includes the indication of the current time: in accordance with a determination that the current time is a first time, displaying, via the display generation component, the time user interface with the first watch hand having a first color; and in accordance with a determination that the current time is a second time that is different from the first time, displaying, via the display generation component, the time user interface with the first watch hand having a second color that is different from the first color.

In accordance with some embodiments, a computer system configured to communicate with a display generation component and one or more input devices is described. The computer system comprises: one or more processors; and memory storing one or more programs configured to be executed by the one or more processors, the one or more programs including instructions for: receiving, via the one or more input devices, a request to display a time user interface; and in response to receiving the request to display the time user interface, displaying, via the display generation component, the time user interface, wherein the time user interface includes an indication of a current time, wherein the indication of the current time includes a first watch hand; and while displaying the time user interface that includes the indication of the current time: in accordance with a determination that the current time is a first time, displaying, via the display generation component, the time user interface with the first watch hand having a first color; and in accordance with a determination that the current time is a second time that is different from the first time, displaying, via the display generation component, the time user interface with the first watch hand having a second color that is different from the first color.

In accordance with some embodiments, a computer system configured to communicate with a display generation component and one or more input devices is described. The computer system comprises: means for receiving, via the one or more input devices, a request to display a time user interface; and means for, in response to receiving the request to display the time user interface, displaying, via the display generation component, the time user interface, wherein the time user interface includes an indication of a current time, wherein the indication of the current time includes a first watch hand; and means for, while displaying the time user interface that includes the indication of the current time: in accordance with a determination that the current time is a first time, displaying, via the display generation component, the time user interface with the first watch hand having a first color; and in accordance with a determination that the current time is a second time that is different from the first time, displaying, via the display generation component, the time user interface with the first watch hand having a second color that is different from the first color.

In some embodiments, a computer program product is described. The computer program product comprises one or more programs configured to be executed by one or more processors of a computer system that is in communication with a display generation component and one or more input devices, the one or more programs including instructions for: receiving, via the one or more input devices, a request to display a time user interface; and in response to receiving the request to display the time user interface, displaying, via the display generation component, the time user interface, wherein the time user interface includes an indication of a current time, wherein the indication of the current time includes a first watch hand; and while displaying the time user interface that includes the indication of the current time: in accordance with a determination that the current time is a first time, displaying, via the display generation component, the time user interface with the first watch hand having a first color; and in accordance with a determination that the current time is a second time that is different from the first time, displaying, via the display generation component, the time user interface with the first watch hand having a second color that is different from the first color.

In some embodiments, a method is described. The method comprises: at a computer system that is in communication with a display generation component and one or more input devices: receiving, via the one or more input devices, a request to display a time user interface that includes an indication of time; and in response to receiving the request to display the time user interface: in accordance with a determination that the indication of time corresponds to a first period of time, displaying, via the display generation component, the time user interface with a simulated lighting visual effect that simulates light being cast onto one or more virtual elements in the time user interface; and in accordance with a determination that the indication of time corresponds to a second period of time, displaying, via the display generation component, the time user interface without the simulated lighting visual effect that simulates light being cast onto one or more virtual elements in the time user interface.

In some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: receiving, via the one or more input devices, a request to display a time user interface that includes an indication of time; and in response to receiving the request to display the time user interface: in accordance with a determination that the indication of time corresponds to a first period of time, displaying, via the display generation component, the time user interface with a simulated lighting visual effect that simulates light being cast onto one or more virtual elements in the time user interface; and in accordance with a determination that the indication of time corresponds to a second period of time, displaying, via the display generation component, the time user interface without the simulated lighting visual effect that simulates light being cast onto one or more virtual elements in the time user interface.

In some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: receiving, via the one or more input devices, a request to display a time user interface that includes an indication of time; and in response to receiving the request to display the time user interface: in accordance with a determination that the indication of time corresponds to a first period of time, displaying, via the display generation component, the time user interface with a simulated lighting visual effect that simulates light being cast onto one or more virtual elements in the time user interface; and in accordance with a determination that the indication of time corresponds to a second period of time, displaying, via the display generation component, the time user interface without the simulated lighting visual effect that simulates light being cast onto one or more virtual elements in the time user interface.

In some embodiments, a computer system configured to communicate with a display generation component and one or more input devices is described. The computer system comprises: one or more processors; and memory storing one or more programs configured to be executed by the one or more processors, the one or more programs including instructions for: receiving, via the one or more input devices, a request to display a time user interface that includes an indication of time; and in response to receiving the request to display the time user interface: in accordance with a determination that the indication of time corresponds to a first period of time, displaying, via the display generation component, the time user interface with a simulated lighting visual effect that simulates light being cast onto one or more virtual elements in the time user interface; and in accordance with a determination that the indication of time corresponds to a second period of time, displaying, via the display generation component, the time user interface without the simulated lighting visual effect that simulates light being cast onto one or more virtual elements in the time user interface.

In some embodiments, a computer system configured to communicate with a display generation component and one or more input devices is described. The computer system comprises: means for receiving, via the one or more input devices, a request to display a time user interface that includes an indication of time; and means for, in response to receiving the request to display the time user interface: in accordance with a determination that the indication of time corresponds to a first period of time, displaying, via the display generation component, the time user interface with a simulated lighting visual effect that simulates light being cast onto one or more virtual elements in the time user interface; and in accordance with a determination that the indication of time corresponds to a second period of time, displaying, via the display generation component, the time user interface without the simulated lighting visual effect that simulates light being cast onto one or more virtual elements in the time user interface.

In some embodiments, a computer program product is described. The computer program product comprises one or more programs configured to be executed by one or more processors of a computer system that is in communication with a display generation component and one or more input devices, the one or more programs including instructions for: receiving, via the one or more input devices, a request to display a time user interface that includes an indication of time; and in response to receiving the request to display the time user interface: in accordance with a determination that the indication of time corresponds to a first period of time, displaying, via the display generation component, the time user interface with a simulated lighting visual effect that simulates light being cast onto one or more virtual elements in the time user interface; and in accordance with a determination that the indication of time corresponds to a second period of time, displaying, via the display generation component, the time user interface without the simulated lighting visual effect that simulates light being cast onto one or more virtual elements in the time user interface.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for indicating time, thereby increasing the effectiveness, efficiency, and user satisfaction with such devices. Such methods and interfaces may complement or replace other methods for indicating time.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 3 is a block diagram of an exemplary multifunction device with a display and a touch-sensitive surface in accordance with some embodiments.

FIG. 4B illustrates an exemplary user interface for a multifunction device with a touch-sensitive surface that is separate from the display in accordance with some embodiments.

FIG. 7 is a flow diagram illustrating methods for displaying an interaction between a character and a clock hand in accordance with some embodiments.

FIG. 8 is a flow diagram illustrating methods for displaying a user interface based on the day of the week in accordance with some embodiments.

FIG. 10 is a flow diagram illustrating methods for displaying a user interface that includes a dynamic text string in accordance with some embodiments.

FIG. 12 is a flow diagram illustrating methods for displaying a user interface that includes a customizable border complication in accordance with some embodiments.

FIGS. 13A-13L illustrate exemplary user interfaces that include a watch hand that changes color at predetermined times in accordance with some embodiments.

FIG. 15 is a flow diagram illustrating methods for displaying a user interface that includes a watch hand that changes color at predetermined times in accordance with some embodiments.

FIGS. 16A-16L illustrate exemplary user interfaces that include a simulated lighting visual effect in accordance with some embodiments.

FIG. 17 is a flow diagram illustrating methods for displaying a user interface that includes a simulated lighting visual effect in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for displaying user interfaces that indicate time. In some embodiments, a computer system displays a user interface with an interaction between a clock hand and a character. In some embodiments, a computer system displays a user interface with an appearance that is based on the day of the week. In some embodiments, a computer system displays a user interface that includes a dynamic text string. Such techniques can reduce the cognitive burden on a user who displays user interfaces that indicate time, thereby enhancing productivity. Further, such techniques can reduce processor and battery power otherwise wasted on redundant user inputs.

Figures 9A, 9B, 9C, 9D:
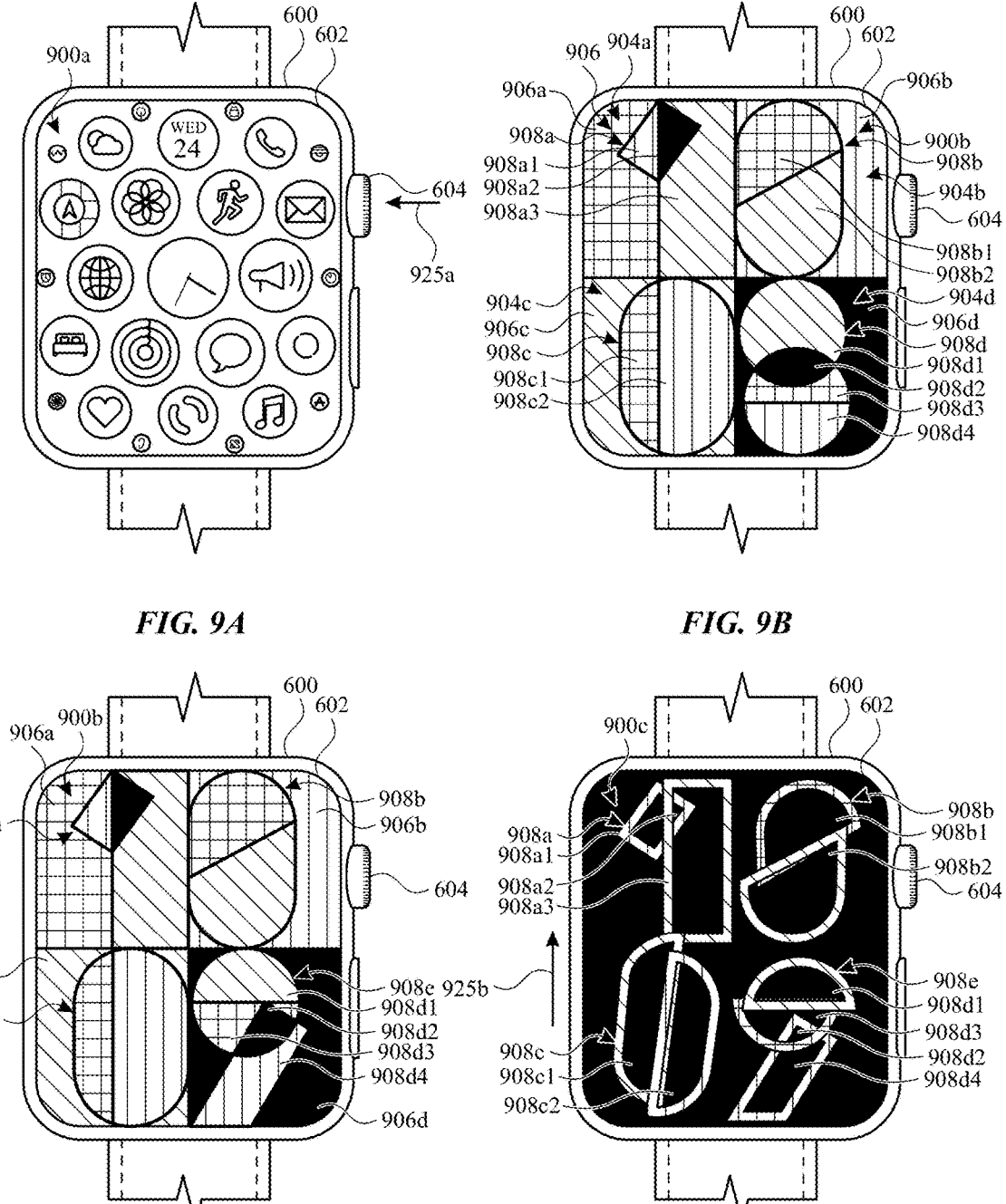
FIGS. 9A-9Y illustrate exemplary user interfaces that include a dynamic text string in accordance with some embodiments.

Below, FIGS. 1A-1B, 2, 3, 4A-4B, and 5A-5B provide a description of exemplary devices for performing the techniques for displaying user interfaces that indicate time. FIGS. 6A-6AG illustrate exemplary user interfaces for displaying user interfaces that indicate time. FIG. 7 is a flow diagram illustrating methods of displaying an interaction between a character and a clock hand in accordance with some embodiments. FIG. 8 is a flow diagram illustrating methods of displaying a user interface based on the day of the week in accordance with some embodiments. The user interfaces in FIGS. 6A-6AG are used to illustrate the processes described below, including the processes in FIGS. 7 and 8. FIGS. 9A-9Y illustrate exemplary user interfaces that include a dynamic text string in accordance with some embodiments. FIG. 10 is a flow diagram illustrating methods for displaying a user interface that includes a dynamic text string in accordance with some embodiments. The user interfaces in FIGS. 9A-9Y are used to illustrate the processes described below, including the processes in FIG. 10. FIGS. 11A-11AC illustrate exemplary user interfaces that include a customizable border complication in accordance with some embodiments. FIG. 12 is a flow diagram illustrating methods of displaying a user interface that includes a customizable border complication in accordance with some embodiments. The user interfaces FIGS. 11A-11AC are used to illustrate the processes described below, including the process in FIG. 12. FIGS. 13A-13L and FIGS. 14A-14R illustrate exemplary user interfaces that include a watch hand that changes color at predetermined times in accordance with some embodiments. FIG. 15 is a flow diagram illustrating methods of displaying a user interface that includes a watch hand that changes color at predetermined times in accordance with some embodiments. The user interfaces in FIGS. 13A-13L and FIGS. 14A-14R are used to illustrate the processes described below, including the process in FIG. 15. FIGS. 16A-16L illustrate exemplary user interfaces that include a simulated lighting visual effect in accordance with some embodiments. FIG. 17 is a flow diagram illustrating methods of displaying a user interface that includes a simulated lighting visual effect in accordance with some embodiments. The user interfaces in FIGS. 16A-16L are used to illustrate the processes described below, including the process in FIG. 17.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
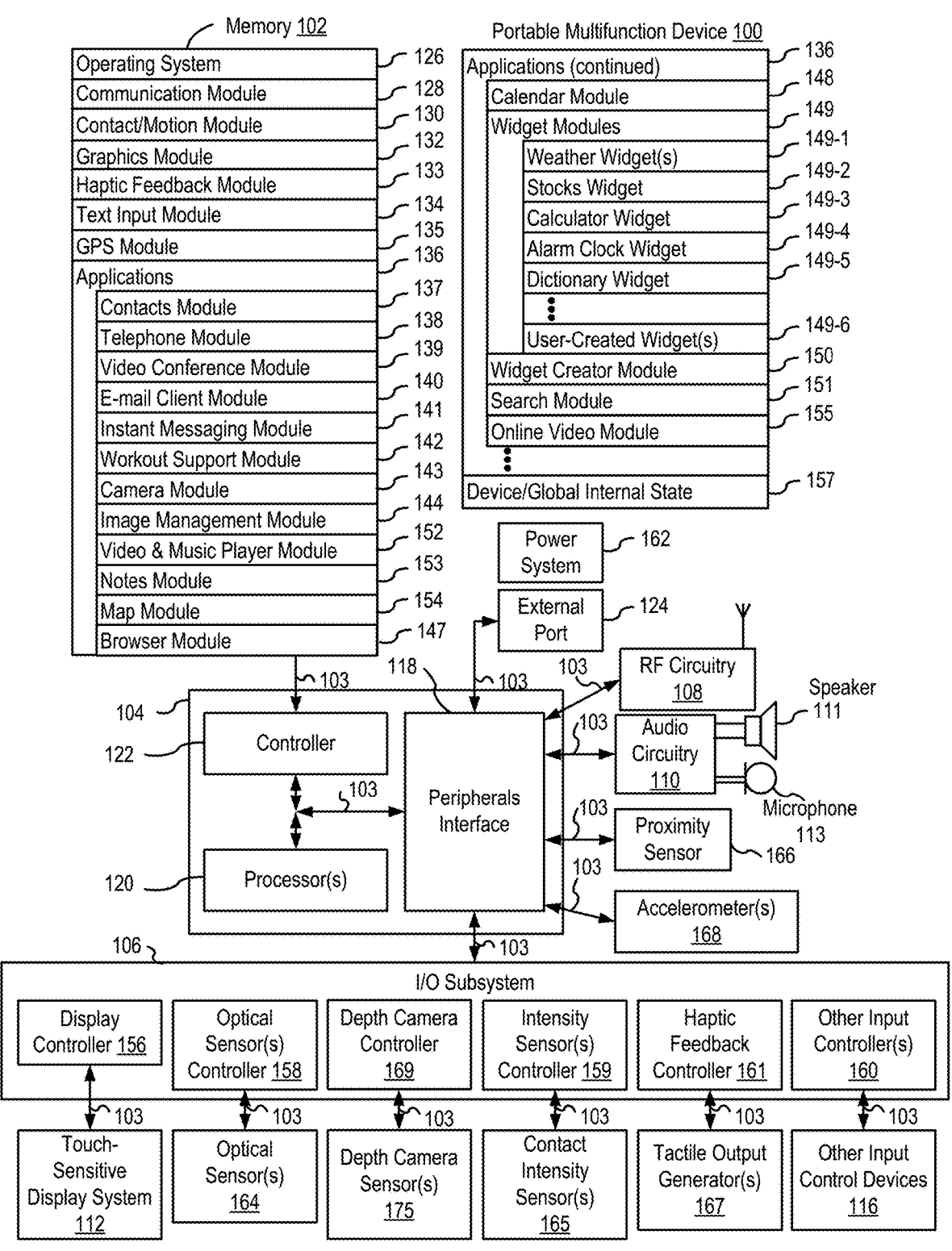
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);

Telephone module 138;

Video conference module 139;

E-mail client module 140;

Instant messaging (IM) module 141;

Workout support module 142;

Camera module 143 for still and/or video images;

Image management module 144;

Video player module;

Music player module;

Browser module 147;

Calendar module 148;

Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
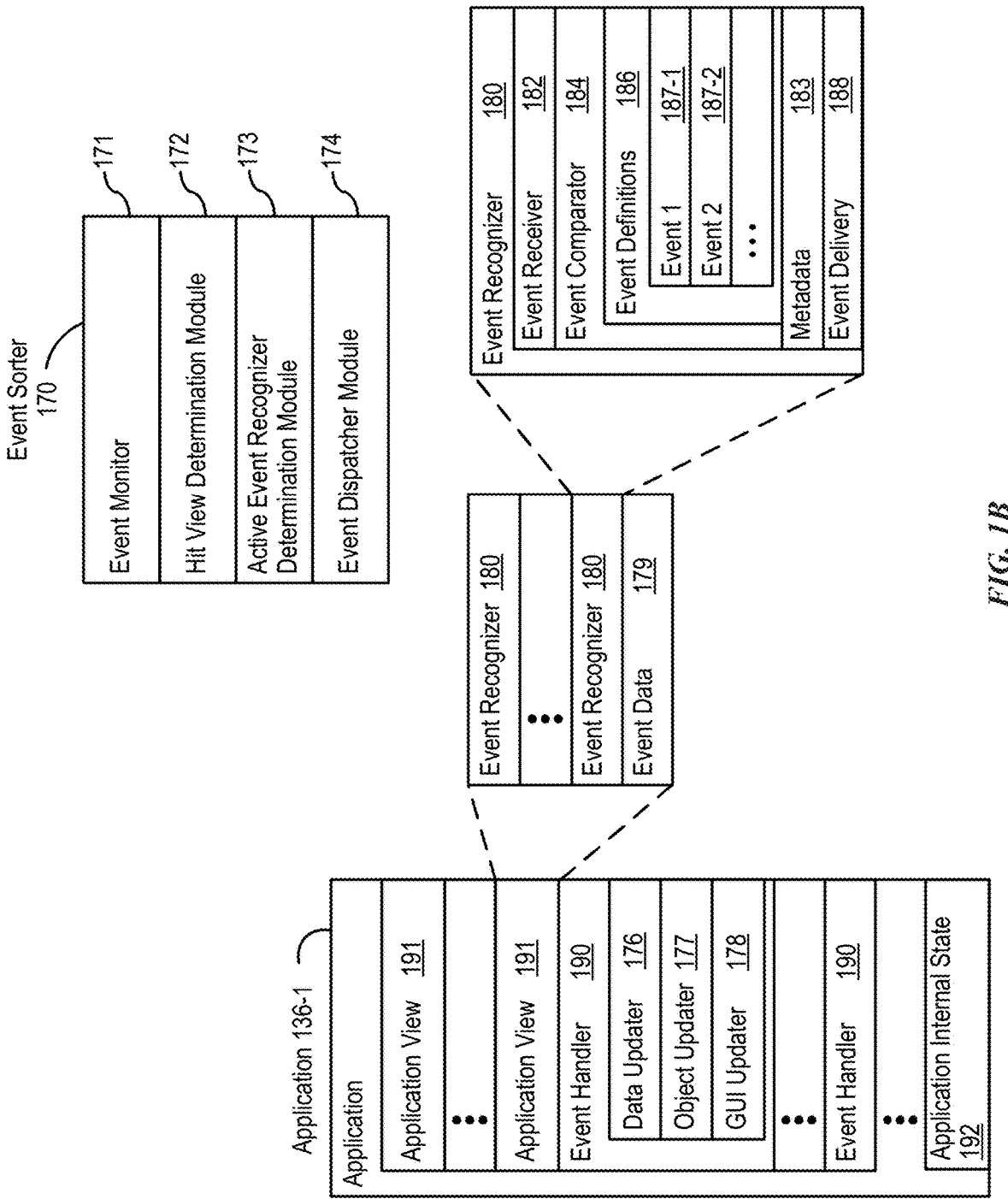
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
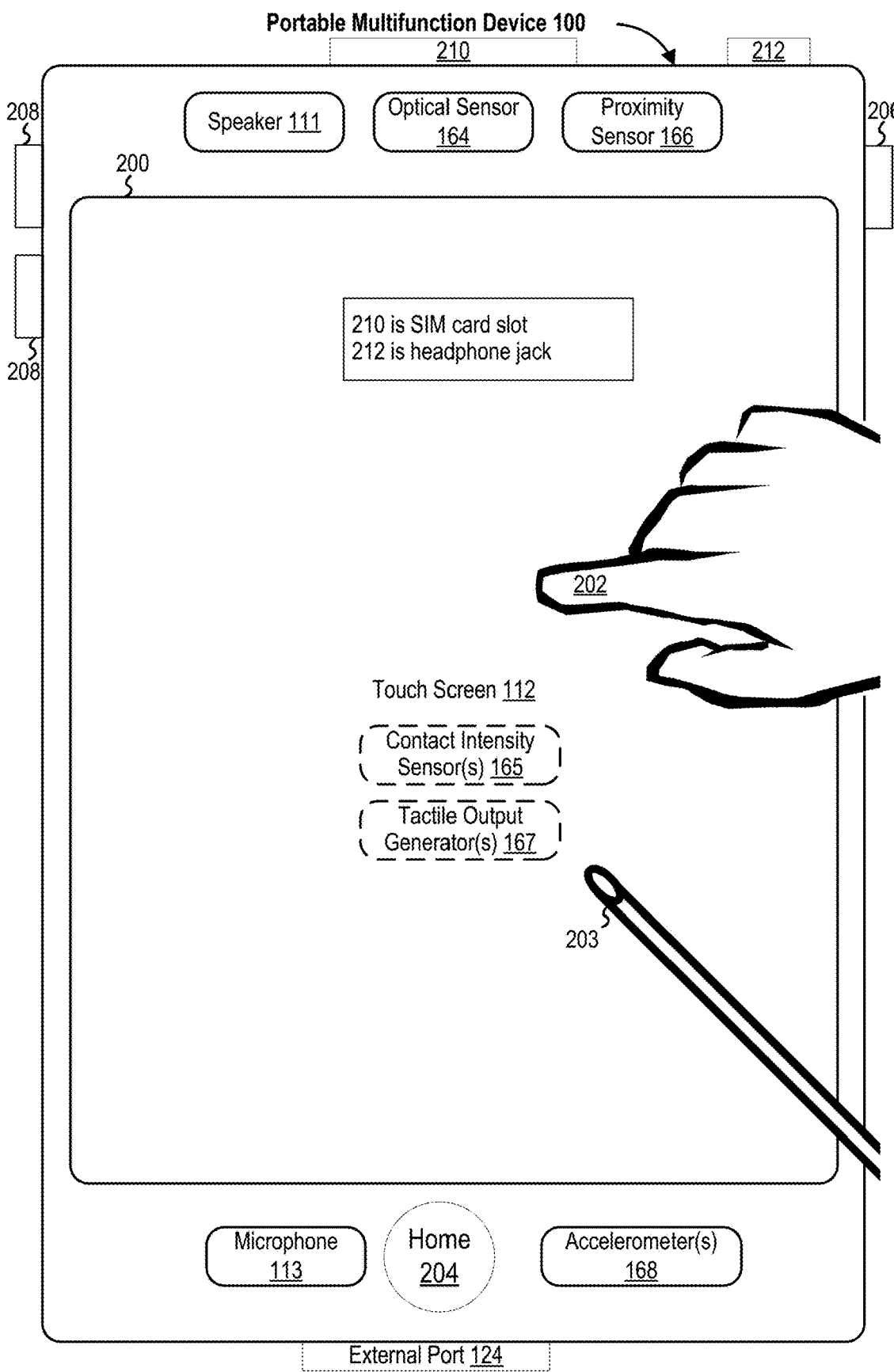
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
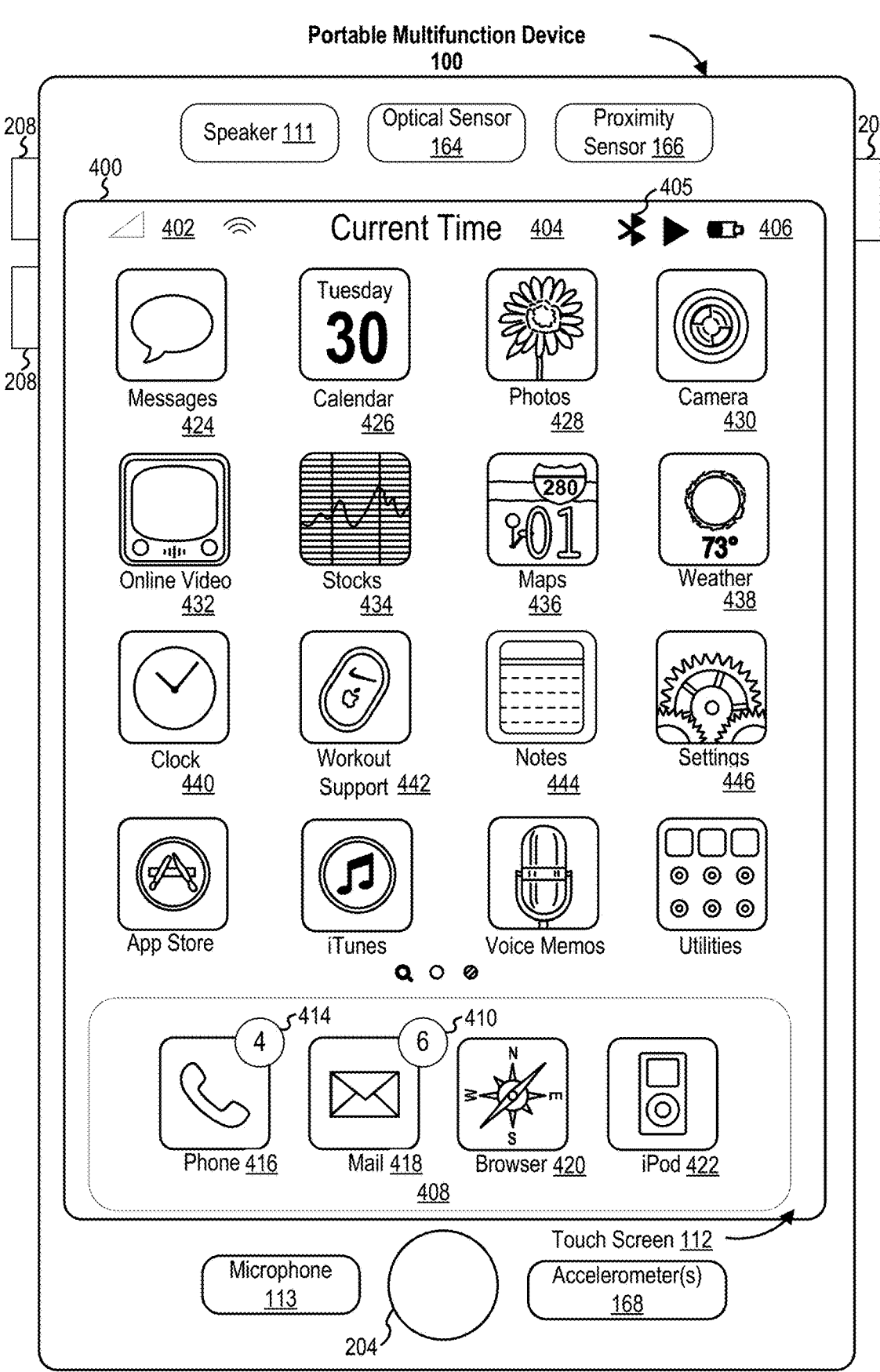
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface

451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
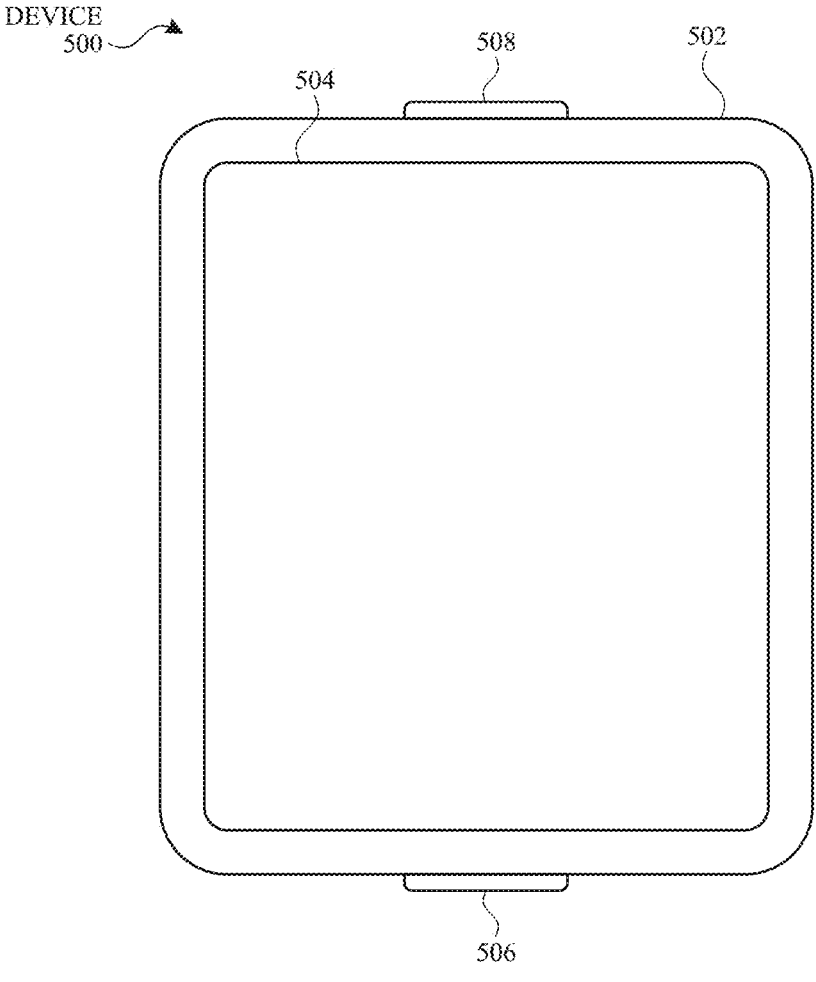
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
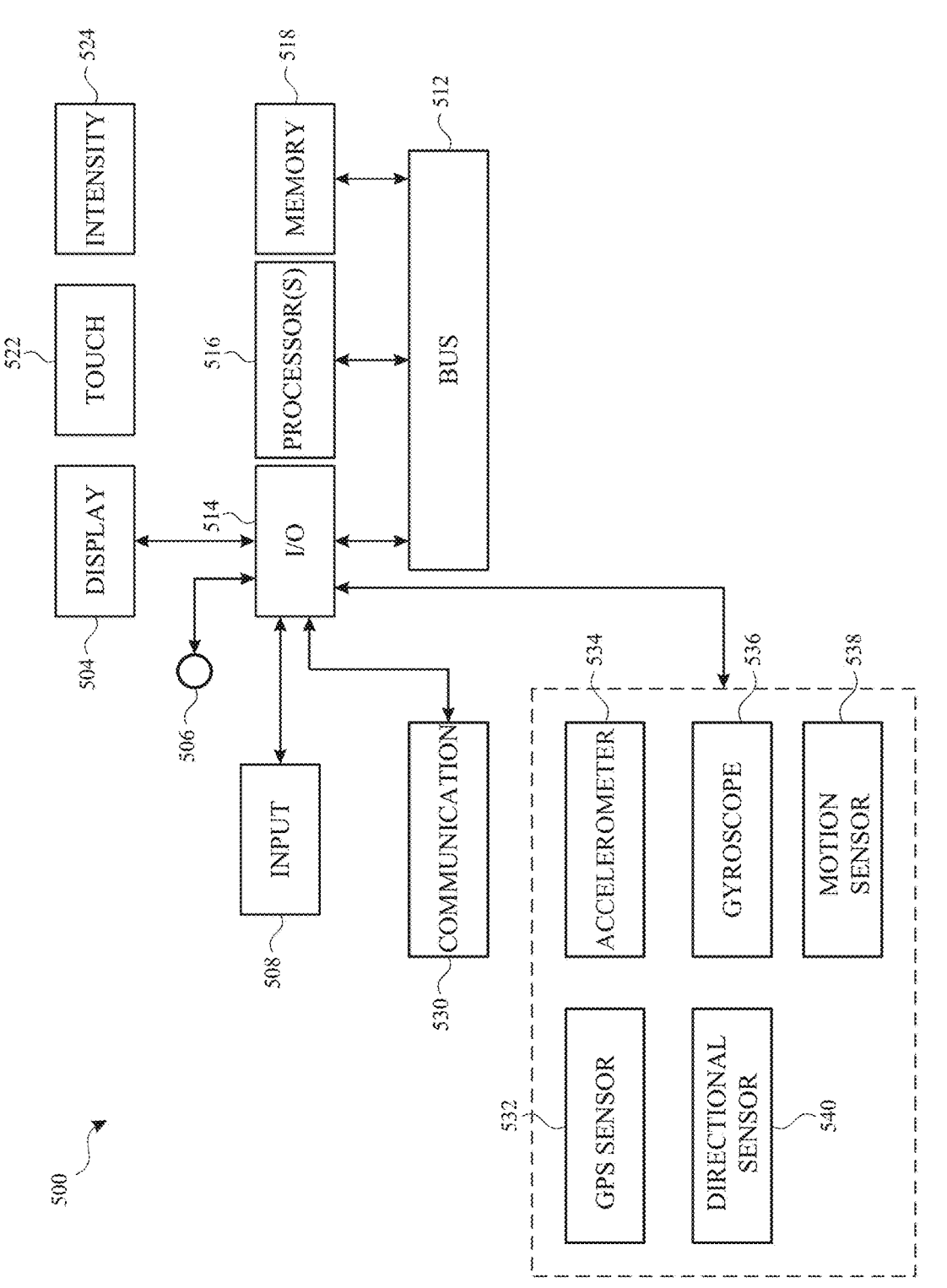
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including methods 700, 800, 1000, 1200, 1500, and 1700 (FIGS. 7, 8, 10, 12, 15, and 17). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, the computer system is in a locked state or an unlocked state. In the locked state, the computer system is powered on and operational but is prevented from performing a predefined set of operations in response to user input. The predefined set of operations optionally includes navigation between user interfaces, activation or deactivation of a predefined set of functions, and activation or deactivation of certain applications. The locked state can be used to prevent unintentional or unauthorized use of some functionality of the computer system or activation or deactivation of some functions on the computer system. In some embodiments, in the unlocked state, the computer system is powered on and operational and is not prevented from performing at least a portion of the predefined set of operations that cannot be performed while in the locked state. When the computer system is in the locked state, the computer system is said to be locked. When the computer system is in the unlocked state, the computer is said to be unlocked. In some embodiments, the computer system in the locked state optionally responds to a limited set of user inputs, including input that corresponds to an attempt to transition the computer system to the unlocked state or input that corresponds to powering the computer system off.

Attention is now directed towards embodiments of user interfaces ("UI") and associated processes that are implemented on a computer system, such as portable multifunction device 100, device 300, or device 500.

FIGS. 6A-6AG illustrate exemplary user interfaces for indicating time and/or displaying a user interface based on a day of the week, in accordance with some embodiments. The user interfaces in these figures are used to illustrate the processes described below, including the methods in FIGS. 7 and 8.

FIG. 6A illustrates computer system 600, which includes display 602 (e.g., a touch-sensitive display), rotatable and depressible input mechanism 604, and button 606. In FIG. 6A, computer system 600 is a smartwatch. In some embodiments, computer system 600 is a smartphone, a tablet computer, a laptop computer, or a desktop computer. In FIG. 6A, computer system 600 displays, on display 602, user interface 607a. In some embodiments, computer system 600 displays user interface 607a in response to detecting a request to display a user interface (e.g., a time user interface, a watch face user interface, a wake screen, a lock screen, a home screen, and/or a clock user interface) that displays an indication of time. In some embodiments, a wake screen is a displayed user interface (e.g., a lock screen and/or an initial user interface) that the computer system displays when coming out of an inactive state (e.g., a low-power state, a reduced-power state, a sleep state, and/or a dimmed state). In some embodiments, a home screen is a displayed user interface (e.g., user interface 400) that includes user interface objects corresponding to respective applications and, optionally, an indication of time. When a user interface object on the home screen is activated, the computer system displays the respective application corresponding to the activated user interface object. In some embodiments, in response to detecting a request to display a user interface that displays an indication of time, compute system 600 displays user interface 607a, 607b, 607c, 607d, 607e, 607f, 607g, 607h, 607i, 607j, 607k, 607l, 607m, 607n, or 607o, depending on the context, as described herein.

User interface 607a includes first character 608a, second character 608b, an indication of time (e.g., hour hand 610a and minute hand 610b), analog dial 612, and user interface element 614 (e.g., a complication). First character 608a and second character 608b are referred to collectively as characters 608. Hour hand 610a and minute hand 610b are in a first position relative to analog dial 612 that indicates a current time (e.g., 10:09). Hour hand 610a and minute hand 610b are referred to collectively as clock hands 610.

In FIG. 6A, user interface element 614 displays date information (e.g., from a calendar application), including a representation of the day of the week (e.g., "MON" for Monday) and the day of the month (e.g., the 21st day of the month). In some embodiments, as described with reference to FIGS. 6X and 6AG, user interface element 614 can be selected to open a corresponding calendar application. In user interface 607a, user interface element 614 is located in a first position below the point around which hour hand 610a and minute hand 610b rotate.

First character 608a and second character 608b interact with hour hand 610a and minute hand 610b based on the position of hour hand 610a and minute hand 610b. In user interface 607a, because of the position of hour hand 610a and minute hand 610b, first character 608a and second character 608b are in a first state in which first character 608a lies (or sits lying back) on hour hand 610a and minute hand 610b and second character 608b sits upright on an end of hour hand 610a.

In some embodiments, because the day of the week (e.g., Monday) is not one of a set (e.g., a predetermined set, a user-defined set, and/or a system-defined set) of one or more days of the week, computer system 600 displays user interface 607a in greyscale (e.g., black and white or a tone between black and white, without a color that is not greyscale). In some embodiments, user interface 607a is in greyscale except for first character 608a and/or second character 608b. User interfaces 607b, 607c, 607d, 607g, 607i, 607j, 607k, and 607n (described below) are displayed in greyscale because they are displayed on a day of the week that is not one of a set of one or more days of the week. User interfaces 607e, 607f, 607h, 607l, and/or 607m (described below) are displayed with one or more colors (e.g., other than greyscale colors) because they are displayed on a day of the week that is one of the days in the set of one or more days of the week.

FIG. 6B illustrates user interface 607b with hour hand 610a and minute hand 610b in a second position that indicates a second time (e.g., 9:04) in the same day as user interface 607a (e.g., Monday the 21st). Based on the position of hour hand 610a and minute hand 610b, computer system 600 displays first character 608a and second character 608b in a second state in which second character 608b interacts with hour hand 610a by swinging on a swing that is hung from hour hand 610a while first character 608a appears to be watching second character 608b.

FIG. 6C illustrates user interface 607c with hour hand 610a and minute hand 610b in a third position that indicates a third time (e.g., 8:05). User interface 608c includes first character 608a, third character 608c, fourth character 608d, and fifth character 608e. Based on the position of hour hand 610a and minute hand 610b, computer system 600 displays first character 608a, third character 608c, fourth character 608d, and fifth character 608e in a state in which they are interacting with hour hand 610a and minute hand 610b by climbing hour hand 610a and minute hand 610b (e.g., because hour hand 610a and minute hand 610b form an incline).

In some embodiments, a user interface includes one or more elements that are related to the time of day, the day of the week, the interaction of a character with the indication of time, and/or an activity of a character. For example, in user interface 607c, first character 608a is wearing hat 608a1 associated with climbing, exploring, and/or being outdoors.

In user interface 607c, user interface element 614 indicates that the day of the week is Wednesday and that it is the 23rd day of the month. In some embodiments, because the day of the week (e.g., Wednesday) is not one of a set (e.g., a predetermined set, a user-defined set, and/or a system-defined set) of one or more days of the week, computer system 600 displays user interface 607a in greyscale (e.g., black and white, without a color that is not greyscale). In some embodiments, user interface 607a is in greyscale except for first character 608a, third character 608c, fourth character 608d, and/or fifth character 608e.

FIGS. 6D-6F illustrate user interface 607d on a day of the week that is different from user interfaces 607a, 607b, and 607c (e.g., Friday the 25th day of the month, as indicated by user interface element 614). In user interface 607d, hour hand 610a and 610b are in a fourth position that indicates a fourth time (e.g., 2:57). Based on the fourth position of hour hand 610a and minute hand 610b, first character 608a and second character 608b are in a state in which first character 608a is interacting with hour hand 610a and minute hand 610b by standing on hour hand 610a (e.g., because hour hand 610a is substantially horizontal) and leaning against minute hand 610b (e.g., because minute hand 610b is substantially vertical), and second character 608b is in the bottom right corner of user interface 607d and is looking up at first character 608a.

In some embodiments, a user interface includes an animation over time of one or more characters. FIGS. 6D-6F illustrate first character 608a and second character 608b in an animated state that includes an animation in which first character 608a waves at second character 608b by moving arm 608a2 and second character 608b waves at first character 608a by moving arm 608b1.

In some embodiments, computer system 600 displays a user interface differently based on a day of the week. For example, in FIG. 6G, computer system 600 displays user interface 607e, which is displayed at the same time of day (e.g., 10:09) as user interface 607a except user interface 607e is displayed on a Sunday instead of a Monday. Because user interface 607e is displayed at the same time of day, hour hand 610a and minute hand 610b are in the same position as in user interface 607a, and first character 608a and second character 608b are in the same state as in user interface 607a. Because user interface is displayed on a Sunday, user interface 607e (e.g., background 607e1 of user interface 607e) is displayed with one or more colors (e.g., red, orange, yellow, green, blue, purple, brown, or a combination thereof) other than greyscale (e.g., black, white, or a tone between black and white). In user interface 607e, first character 608a and second character 608b are displayed in the same color as in user interface 607a. In some embodiments, because user interface 607e is displayed on a Sunday, first character 608a and second character 608b are displayed in a different color than in user interface 607a.

Figures 6G, 6H:
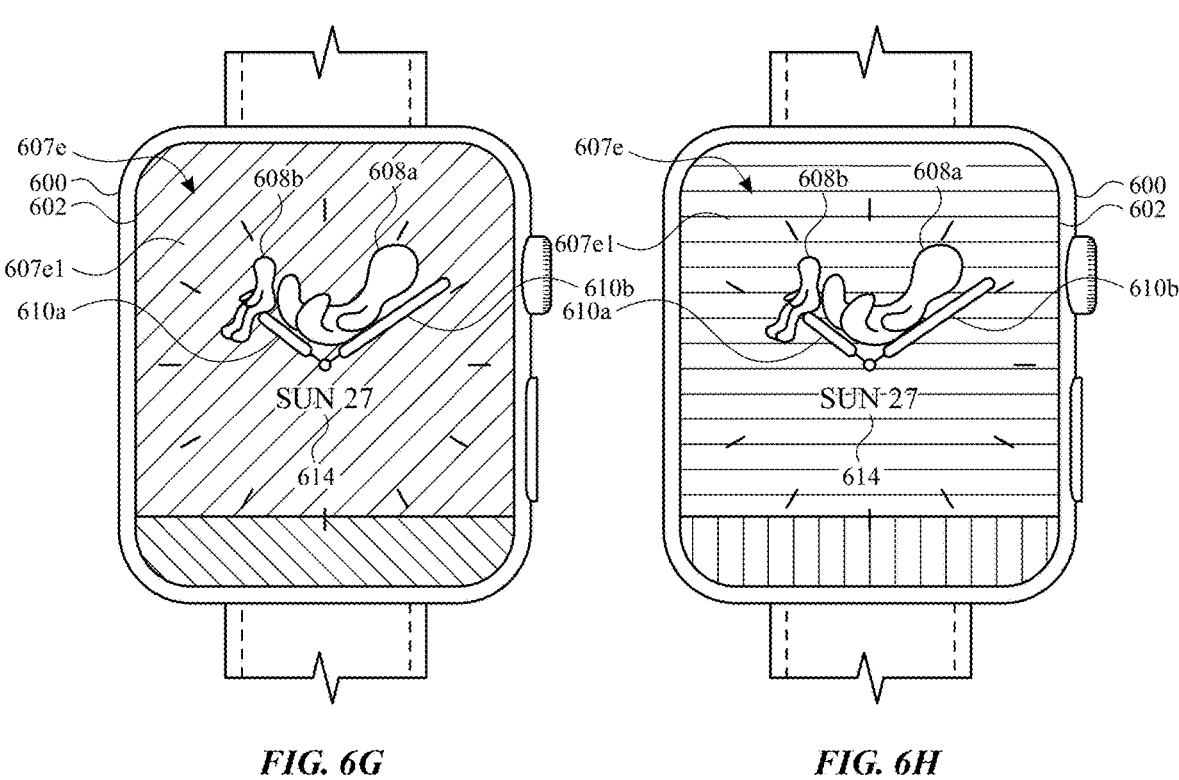
FIGS. 6A-6AG illustrate exemplary user interfaces that indicate time in accordance with some embodiments.
Figure 6I:
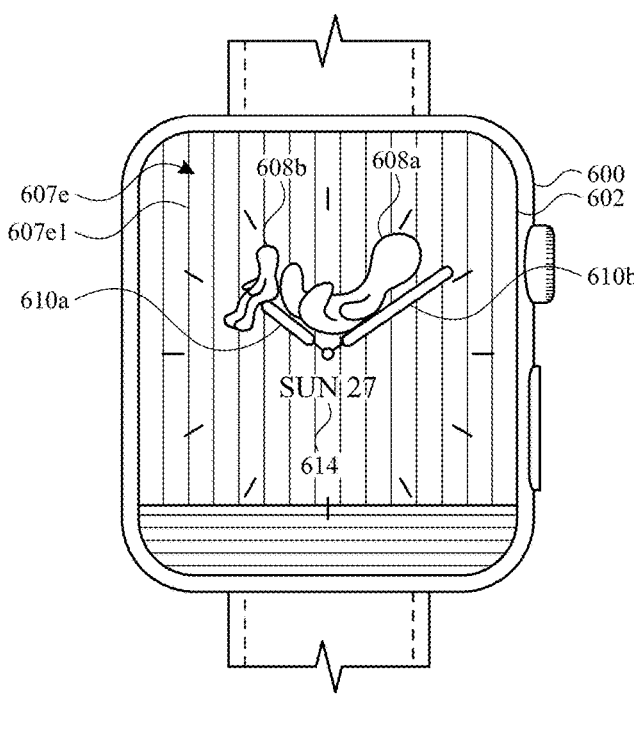

FIGS. 6H-6I illustrate user interface 607e with different color backgrounds. In some embodiments, on Sunday, computer system 600 displays a different color background for different instances of user interface 607e (e.g., in response to separate requests to display user interface 607e). For example, in response to detecting a first request to display user interface 607e (e.g., at 10:09 and 10 seconds), computer system 600 displays user interface 607e with a first set of one or more colors (e.g., as shown in FIG. 6G); in response to detecting a second request to display user interface 607e (e.g., at 10:09 and 30 seconds), computer system 600 displays user interface 607e with a second set of one or more colors (e.g., as shown in FIG. 6H); and in response to detecting a third request to display user interface 607e (e.g., at 10:09 and 45 seconds), computer system 600 displays user interface 607e with a third set of one or more colors (e.g., as shown in FIG. 6I).

In some embodiments, computer system 600 displays user interfaces with color (other than greyscale) throughout a particular day (e.g., Sunday). FIG. 6J illustrates computer system 600 displaying user interface 607f, which is displayed at the same time of day (e.g., 2:57) as user interface 607d except user interface 607f is displayed on a Sunday instead of a Friday. Because user interface 607f is displayed at the same time of day, hour hand 610a and minute hand 610b are in the same position as in user interface 607d, and first character 608a and second character 608b are in the same state as in user interface 607d. Because user interface is displayed on a Sunday, user interface 607f (e.g., background 607f1 of user interface 6070 is displayed with one or more colors other than greyscale.

In some embodiments, the state of one or more characters is based on a holiday or an event. FIG. 6K illustrates computer system 600 displaying user interface 607g. Because user interface 607g is displayed on a birthday (e.g., the birthday of a user associated with computer system 600 or a birthday that is in a calendar application of the user associated with computer system 600), first character 608a and second character 608b include objects associated with a birthday. For example, in user interface 607g, first character 608a and second character 608b are wearing party hats and holding birthday items (e.g., birthday cakes and/or birthday presents).

In user interface 607g, the state of first character 608a and second character 608b is based on the position of hour hand 610a and minute hand 610b. For example, based on the position of hour hand 610a and minute hand 610b, computer system 600 displays second character 608b interacting with hour hand 610b by sitting on top of (or being perched on top of) an end of hour hand 610a (e.g., because hour hand 610a is pointed substantially upward and minute hand 610b is out of the way). Because minute hand 610b is near the 25-minute position (e.g., oriented downward and to the right), computer system 600 displays first character 608a in a bottom left portion of user interface 607g (e.g., so that first character 608a does not interfere with minute hand 610b). In some embodiments, computer system 600 displays an object (e.g., a present, a ball, or a nest) other than a character on top of a clock hand (e.g., hour hand 610a and/or minute hand 610b).

In some embodiments, computer system 600 displays user interface element 614 based on a position of hour hand 610a, minute hand 610*b*, first character 608*a*, and/or second character 608*b*. In user interface 607*g*, computer system 600 displays user interface element 614 in a different location than in, e.g., user interfaces 607*a*, 607*b*, 607*c*, 607*d*, 607*e*, and 607*f*. In user interface 607*g*, computer system 600 displays user interface element 614 above the point around which hour hand 610*a* and minute hand 610*b* rotate, with hour hand 610*a* separating the indication of the day of the week (e.g., "TUE") from the day of the month (e.g., "27").

FIG. 6L illustrates computer system 600 displaying user interface 607*h*, which is displayed on the same event (e.g., a birthday) as user interface 607*g* and at the same time of day (e.g., about 12:25) as user interface 607*g*, except the event on a Sunday instead of a Tuesday, as indicated by user interface element 614. Because user interface 607*h* is displayed at the same time of day, hour hand 610*a* and minute hand 610*b* are in the same position as in user interface 607*g*, and first character 608*a* and second character 608*b* are in the same state as in user interface 607*g*. Because user interface is displayed on a Sunday, user interface 607*h* (e.g., background 607*h*1 of user interface 6070 is displayed with one or more colors other than greyscale.

In some embodiments, computer system 600 displays a user interface based on a season of the year (e.g., spring, summer, fall, or winter). For example, in some embodiments, the user interface includes one or more elements (e.g., a season element) that indicate the current season of the year. For example, FIG. 6M illustrates computer system 600 displaying user interface 607*i* during winter. Because user interface 607*i* is displayed during winter, user interface 607*i* includes an indication of winter, such as snow element 618. Snow element 618 appears to be falling from the sky and interacts with the indication of time by piling up on hour hand 610*a* and minute hand 610*b*. In some embodiments, the interaction between the season element and the indication of time is based on the position of the indication of time. For example, in user interface 607*i*, snow element 618 piles up on surfaces of hour hand 610*a* and minute hand 610*b* that are substantially horizontal.

In some embodiments, a character interacts with the season element. For example, in user interface 607*i*, first character 608*a* and/or second character 608*b* are sitting in and/or catching snow element 618. The state of first character 608*a* and second character 608*b*, and the interaction of first character 608*a* and/or second character 608*b* with hour hand 610*a* and/or minute hand 610*b* is based on the position of hour hand 610*a* and minute hand 610*b* and the season of the year. For example, in user interface 607*i*, first character 608*a* is underneath minute hand 610*b* such that minute hand 610*b* protects first character 608*a* from snow element 618, and second character 608*b* is underneath hour hand 610*a* such that hour hand 610*a* protects second character 608*b* from snow element 618. As another example, character 608*a* and second character 608*b* are wearing winter hats because it is winter.

FIG. 6N illustrates computer system 600 displaying user interface 607*j* during a fall season (e.g., autumn). Because user interface 607*j* is displayed during fall, user interface 607*j* includes an indication of fall, such as leaves element 620. Leaves element 620 appears to be on the ground and interacts with the indication of time by piling up on hour hand 610*a* and minute hand 610*b* (e.g., because hour hand 610*a* and minute hand 610*b* are positioned in a state that is able to hold leaves element 620). In user interface 607*j*, first character 608*a* and/or second character 608*b* interact with leaves element 620 by raking leaves element 620 (e.g., a portion of leaves element 620 that are on the ground).

In some embodiments, a season of the year is based on a geographic location and a time of year. For example, the month of April is in spring in the Northern hemisphere and is in fall in the Southern Hemisphere. In some embodiments, an appearance of the user interface that indicates a season is based on a distance from the equator (e.g., a latitude of the geographic location). For example, in some embodiments, if a geographic location is within a threshold distance of the equator, an indication of fall does not include a representation of falling leaves, and a representation of snow is not displayed for any season (e.g., even in winter). In some embodiments, a representation of snow is displayed (e.g., to indicate winter or fall) for a larger range of dates for locations that are further from the equator (e.g., closer to the North Pole or the South Pole) than for locations that are closer to the equator. In some embodiments, the geographic location is based on a geographic location associated with computer system 600, such as, e.g., a physical location of computer system 600 and/or a geographic location setting of computer system 600.

In some embodiments, computer system 600 displays a user interface based on a weather condition. For example, in some embodiments, the user interface includes one or more elements (e.g., a weather element) that indicate the weather condition. For example, returning to FIG. 6M, in some embodiments, computer system 600 displays snow element 618 because it is snowing (e.g., snow element 618 acts as a weather element instead of or in addition to a season element). As another example, in user interface 607*k* shown in FIG. 6O, computer system 600 displays rain element 622 because it is raining.

In some embodiments, the interaction between the weather element and the indication of time is based on the position of the indication of time. For example, in user interface 607*i*, snow element 618 piles up on surfaces of hour hand 610*a* and minute hand 610*b* that are substantially horizontal. In user interface 607*k*, rain element 622 appears to fall on hour hand 610*a* and minute hand 610*b*.

In some embodiments, a character interacts with the weather element. For example, in user interface 607*i*, first character 608*a* and/or second character 608*b* are sitting in and/or catching snow element 618. In some embodiments, rain element 622 lands on first character 608*a* and/or second character 608*b*. The state of first character 608*a* and second character 608*b*, and the interaction of first character 608*a* and/or second character 608*b* with hour hand 610*a* and/or minute hand 610*b* is based on the position of hour hand 610*a* and minute hand 610*b* and the weather condition. For example, in user interface 607*i*, first character 608*a* is underneath minute hand 610*b* such that minute hand 610*b* protects first character 608*a* from snow element 618, and second character 608*b* is underneath hour hand 610*a* such that hour hand 610*a* protects second character 608*b* from snow element 618. In some embodiments, character 608*a* and second character 608*b* are wearing winter hats because of the weather condition (e.g., because it is snowing). In user interface 607*k*, first character 608*a* is underneath minute hand 610*b* such that minute hand 610*b* protects first character 608*a* from rain element 622, and second character 608*b* is underneath hour hand 610*a* such that hour hand 610*a* protects second character 608*b* from rain element 622. As another example, character 608*a* and second character 608*b* are holding umbrellas because of the weather condition (e.g., because it is raining).

In some embodiments, computer system 600 displays user interfaces based on a weather condition and the day of the week. For example, in FIG. 6P, computer system 600 displays user interface **607*l* at the same time of day and during the same weather condition as user interface 607*i*, except user interface 607*l* is displayed on a Sunday instead of a Monday. Because user interface 607*l* is displayed on a Sunday, computer system 600 displays user interface 607*l* (e.g., a portion of user interface 607*l* and/or an aspect of first character 608*a* and/or second character 608*b*) in a color other than greyscale. For example, in user interface 607*l* (and in contrast to user interface 607*i*) background 607*l*1 includes a color other than greyscale and hats worn by first character 608*a* and second character 608*b*** include a color other than greyscale.

In some embodiments, computer system 600 displays user interfaces based on the season of the year and the day of the week. For example, in FIG. 6Q, computer system 600 displays user interface **607*m* at the same time of day and during the same season of the year as user interface 607*j*, except user interface 607*m* is displayed on a Sunday instead of a Monday. Because user interface 607*m* is displayed on a Sunday, computer system 600 displays user interface 607*m* (e.g., a portion of user interface 607*m* and/or an aspect of first character 608*a* and/or second character 608*b*) in a color other than greyscale. For example, in user interface 607*m* (and in contrast to user interface 607*j*) background 607*m*1** includes a color other than greyscale.

Although computer system 600 is described as displaying a user interface (e.g., a watch face, a wake screen, a lock screen, and/or a home screen) with non-greyscale color on Sunday, in some embodiments, computer system 600 displays the user interface with non-greyscale color on one or more other days of the week instead of or in addition to Sunday (e.g., on Saturday and Sunday). In some embodiments, a user can select (e.g., in editing user interface **607*u*) days of the week on which computer system 600** displays the user interface with non-greyscale color.

In some embodiments, computer system 600 displays a user interface based on the time of day (or time period of the day), such as daytime, nighttime, sunrise, sunset, dawn, and/or dusk. For example, in some embodiments, FIGS. 6A-6Q illustrate user interfaces that are displayed during daytime. In some embodiments, the appearance of the user interfaces in FIGS. 6A-6Q (e.g., the background appearance, appearance of the indication of time, state of first character **608*a* and/or second character 608*b*, and/or presence or absence of graphical elements) is based on the user interfaces being displayed during daytime. For example, the user interfaces displayed by computer system 600 in FIGS. 6A-6Q include a white or non-black background. FIG. 6R illustrates computer system 600 displaying user interface 607*n* during nighttime. Because user interface 607*n* is displayed during nighttime, background 607*n*1 is black (or dark grey), characters 608 are displayed in a state such that they appear to be sleeping, and user interface 607*n* includes a representation of a bed for characters 608** to sleep on.

In some embodiments, computer system 600 displays a user interface based on an activity of a user, such as a workout activity, sport, and/or hobby. For example, FIG. 6S illustrates computer system 600 displaying user interface **607*o* during a workout activity (e.g., running or jogging). Because user interface 607*o* is displayed during a workout activity, characters 608 are displayed in a state such that they appear to be running In some embodiments, computer system 600 displays characters 608 underneath clock hands 610 in user interface 607*o* because of the position of clock hands 610 (e.g., because clock hands 610 are pointing upward). In some embodiments, Wednesday is designated as a day to display an element of a user interface in color, and clock hands 610 are displayed in color, as shown in FIG. 6S, because user interface 607*o*** is displayed on Wednesday (e.g., for motivation in the middle of the week).

In some embodiments, computer system 600 displays a user interface based on a state of computer system 600. In some embodiments, computer system 600 is configured to operate in a reduced-power state that consumes (e.g., on average over time) less energy than other operating states (e.g., the operating state of computer system in FIGS. 6A-6S). In some embodiments, computer system 600 enters a reduced-power state in response to a determination that a user of computer system 600 is inactive and/or is not looking at display 602 (e.g., the user lowers computer system 600 and/or does not interact with display 602 (or other input device of computer system 600) for a threshold amount of time).

FIGS. 6T-6W illustrate computer system 600 operating in a reduced-power state and displaying user interface **607*p*, user interface 607*q*, user interface 607*r*, and user interface 607*s*, respectively (e.g., because computer system 600 is in the reduced-power state). User interface 607*p* in FIG. 6T is an example of a user interface displayed at the same time of day (e.g., 10:09) and the same day of the week (e.g., Monday) as user interface 607*a*, except that computer system 600 displays user interface 607*p* while in a reduced-power state and displays user interface 607*a* while in a non-reduced-power state (e.g., a normal or standard operating state). In user interface 607*p*, characters 608 and clock hands 610 are in the same position as in user interface 607*a* (e.g., characters 608 are sitting on clock hands 610, and clock hands 610 are positioned to indicate a time of 10:09). In user interface 607*p*, a background and an interior portion of characters 608 are black, in contrast to user interface 607*a* in which the background and interior portion of characters 608 are white. Also, in user interface 607*p*, user interface element 614, the marks of dial 612, and the outline of characters 608 are white, in contrast to user interface 607*a* in which user interface element 614, the marks of dial 612, and the outline of characters 608 are black. In some embodiments, displaying an element (e.g., a background and/or characters 608) in black (e.g., as in user interface 607*p*, user interface 607*q*, and/or user interface 607*r***) consumes less energy than displaying an element in white or a non-greyscale color.

In some embodiments, computer system 600 can display characters 608 in different states while in a reduced-power state. For example, user interface **607*q* in FIG. 6U is an example of a user interface displayed at the same time of day (e.g., 2:57) and the same day of the week (e.g., Friday) as user interface 607*d*, except that computer system 600 displays user interface 607*q* while in a reduced-power state and displays user interface 607*d* while in a non-reduced-power state. In user interface 607*q*, characters 608 and clock hands 610 are in the same position as in user interface 607*d* (e.g., first character 608*a* is standing on hour hand 610*a* and leaning on minute hand 610*b*, second character 608*b* is in a lower right corner of user interface 607*q* looking up at first character 608*a*, and clock hands 610 are positioned to indicate a time of 2:57). Similar to user interface 607*p*, in user interface 607*q*, a background and an interior portion of characters 608 are black, in contrast to user interface 607*d* in which the background and interior portion of characters 608 are white. Also, in user interface 607*q*, user interface element 614, the marks of dial 612, and the outline of characters 608 are white, in contrast to user interface 607*d* in which user interface element 614, the marks of dial 612, and the outline of characters 608** are black. In some embodiments, user interface 607*q* does not include an animation (e.g., characters 608 are not animated in user interface 607*q*). In some embodiments, characters 608 are animated in user interface 607*q* in the same manner as in user interface 607*d*.

In some embodiments, when computer system 600 is in a reduced-power state, computer system 600 displays characters 608 in a particular state, such as a resting state, a predetermined state, and/or a state that is specific to the reduced-power state. In some embodiments, when computer system 600 is in a reduced-power state, computer system 600 displays characters 608 in a state that is not based on a position of clock hands 610, a day of the week, a season of the year, a weather condition, an activity of a user, and/or an event (e.g., the state is the same regardless of a position of clock hands 610, a day of the week, a season of the year, a weather condition, an activity of a user, and/or an event). FIG. 6V illustrates computer system 600 displaying user interface 607*r*, which is an example of a user interface in which characters 608 are displayed in a state that is specific to the reduced-power state of computer system 600. User interface 607*r* corresponds to the same time of day and day of the week as user interface 607*p*, except characters 608 are in a state in which they are positioned in the bottom corners of the user interface instead of, e.g., in the state shown in user interface 607*p*.

In some embodiments, when computer system 600 is in a reduced-power state, computer system 600 displays a user interface based on a day of the week. For example, in FIG. 6W, computer system 600 displays user interface 607*s* at the same time of day as user interface 607*r*, except user interface 607*s* is displayed on a different day of the week (e.g., Sunday instead of Monday). Because computer system 600 displays user interface 607*s* on a Sunday, computer system 600 displays a background (e.g., background 607*s*1) that is different from the background of user interfaces that are displayed when computer system 600 is in the reduced-power state on other days of the week (e.g., user interface 607*p*, user interface 607*q*, and/or user interface 607*r*). For example, in the embodiment illustrated in FIG. 6W, background 607*s*1 includes a representation of a scene (e.g., characters 608 appear to be sitting on a ground that is not shown in user interface 607*p*, user interface 607*q*, or user interface 607*r*) and includes a different color (e.g., a color other than black, a non-greyscale color, and/or a different greyscale color) than the color of the background displayed on other days (e.g., the color of the background in user interface 607*p*, user interface 607*q*, or user interface 607*r*).

In some embodiments, computer system 600 transitions from displaying user interface 607*r* to displaying, e.g., user interface 607*a*, user interface 607*b*, user interface 607*i*, user interface 607*j*, or user interface 607*k* in response to detecting an input (e.g., lifting or raising computer system 600, a lift gesture, a wrist raise gesture, an input on display 602, a press of 604, a rotation of 604, a press of 606). In some embodiments, the input corresponds to a request to exit the reduced-power state, to enter a non-reduced-power state, and/or to display a user interface. In some embodiments, computer system 600 transitions from displaying, e.g., user interface 607*a*, user interface 607*b*, user interface 607*i*, user interface 607*j*, or user interface 607*k* to displaying user interface 607*r* in response to entering the reduced-power state.

In some embodiments, computer system 600 transitions from displaying user interface 607*p* to displaying user interface 607*a* in response to detecting an input (e.g., lifting or raising computer system 600, a lift gesture, a wrist raise gesture, an input on display 602, a press of 604, a rotation of 604, a press of 606). In some embodiments, the input corresponds to a request to exit the reduced-power state, to enter a non-reduced-power state, and/or to display a user interface. In some embodiments, computer system 600 transitions from displaying user interface 607*a*, user interface 607*p* in response to entering the reduced-power state.

In some embodiments, computer system 600 transitions from displaying user interface 607*q* to displaying user interface 607*d* in response to detecting an input (e.g., lifting or raising computer system 600, a lift gesture, a wrist raise gesture, an input on display 602, a press of 604, a rotation of 604, a press of 606). In some embodiments, the input corresponds to a request to exit the reduced-power state, to enter a non-reduced-power state, and/or to display a user interface. In some embodiments, computer system 600 transitions from displaying user interface 607*d*, user interface 607*q* in response to entering the reduced-power state.

In some embodiments, computer system 600 transitions from displaying user interface 607*s* to displaying, e.g., user interface 607*e*, user interface 607*f*, user interface 607*h*, user interface 607*l*, or user interface 607*m* in response to detecting an input (e.g., lifting or raising computer system 600, a lift gesture, a wrist raise gesture, an input on display 602, a press of 604, a rotation of 604, or a press of 606). In some embodiments, the input corresponds to a request to exit the reduced-power state, to enter a non-reduced-power state, and/or to display a user interface. In some embodiments, computer system 600 transitions from displaying, e.g., user interface 607*e*, user interface 607*f*, user interface 607*h*, user interface 607*l*, or user interface 607*m* to displaying user interface 607*s* in response to entering the reduced-power state.

In some embodiments, computer system 600 displays an element of a user interface based on a day of the week, where the element of the user interface does not indicate (e.g., inherently indicate) a day of the week (e.g., the element of the user interface is not a representation such as "MON," "TUES," or "SUN" that indicates the day of the week or a numerical representation such as "1", "14", or "23$^{rd}$", that indicates a day of a month).

In some embodiments, computer system 600 displays a user interface based on a day of the week in accordance with a system parameter and/or a user preference. For example, in some embodiments, computer system 600 provides a capability for a user to select a color scheme and/or a complication for a user interface. In some embodiments, a complication is a user interface element, such as user interface element 614, that displays information from a corresponding application and can be selected to open the corresponding application. FIGS. 6X-6AF illustrate exemplary techniques and user interfaces for editing a user interface (e.g., a time user interface, a clock user interface, and/or a watch user interface). In FIG. 6X, computer system 600 displays user interface 607*a* described with reference to FIG. 6A. While displaying user interface 607*a*, computer system 600 detects input 625*a* (e.g., a tap gesture or tap and hold gesture on display 602). Input 625*a* corresponds to a location of user interface element 614. In response to detecting input 625*a*, if input 625*a* is a first type of input (e.g., a tap and/or a contact with a duration that does not exceed a non-zero threshold amount of time), computer system 600 displays user interface 607*w* of a calendar application corresponding to user interface element 614 (e.g., opens the calendar application).

In response to detecting input 625*a*, if input 625*a* is a second type of input (e.g., touch and hold and/or a contact with a duration that exceeds a non-zero threshold amount of time), computer system 600 displays selection user interface 607*t*, as shown in FIG. 6Z. Selection user interface 607*t* includes representation 607*t*1 of user interface 607*a*, representation 607*t*2 of a different user interface, and edit element 607*a*3.

Selection user interface 607*t* allows a user to select a different user interface. For example, in response to a left swipe on selection user interface 607*t*, computer system 600 displays representation 607*t*2 in the center of selection user interface 607*t* and displays the user interface represented by representation 607*t*2 in response to a user input (e.g., a tap on representation 607*t*2 and/or a press of 604).

In response to selection 625*b* of edit element 607*t*3 (e.g., a tap or other input selecting edit element 607*t*3), computer system 600 displays editing user interface 607*u*. Editing user interface 607*u* includes color category indicator 607*u*1, complication category indicator 607*u*2, representation 607*u*3 of the user interface that is being edited (e.g., user interface 607*a*), option indicator 607*u*4, and position indicator 607*u*5. Color category indicator 607*u*1 is displayed above representation 607*u*3 to indicate that a color setting of the user interface is selected for editing. Option indicator 607*u*4 indicates that a "Black and White" option is currently selected for the color setting (e.g., user interface 607*a* will be displayed only in black and white (e.g., regardless of the day of the week). Position indicator 607*u*5 includes a pill such that the position of the pill indicates a position of the currently selected option in a set of color options. In FIG. 6Z, the pill is located at the top of position indicator 607*u*5, which indicates that "Black and White" is the first color option.

In FIG. 6Z, computer system 600 detects request 625*c* to change the color option. In FIG. 6Z, request 625*c* includes a rotation of rotatable input mechanism 604. In some embodiments, request 625*c* is a swipe gesture (e.g., an upward swipe gesture) on display 602. In response to detecting request 625*c* to change the color option, computer system 600 changes the currently selected color option to "Color" as indicated by option indicator 607*u*4 in FIG. 6AA. In FIG. 6AA, representation 607*u*3 is updated to include non-greyscale color and position indicator is updated such that the pill is moved to a middle of position indicator 607*u*5 to indicate that color option "Color" is in the middle of set of color options. In some embodiments, the "Color" option corresponds to a setting in which the user interface (e.g., 607*a*) is displayed with non-greyscale color (e.g., regardless of the day of the week).

In FIG. 6AA, computer system 600 detects request 625*d* to change the color option (e.g., another request to change the color option and/or a continuation of request 625*c*). In FIG. 6AA, request 625*d* includes a rotation of rotatable input mechanism 604. In some embodiments, request 625*d* is a swipe gesture (e.g., an upward swipe gesture) on display 602. In response to detecting request 625*d* to change the color option, computer system 600 changes the currently selected color option to "Color on Sunday" as indicated by option indicator 607*u*4 in FIG. 6AB. In FIG. 6AB, representation 607*u*3 is updated such that a representation of user interface element 614 shows the day of the week as Sunday to indicate that user interface 607*a* will be displayed with non-greyscale color on Sunday. In some embodiments, when the "Color on Sunday" option is selected, computer system 600 displays user interface 607*a* in non-greyscale color only on Sundays. In FIG. 6AB, position indicator is updated such that the pill is moved to a bottom of position indicator 607*u*5 to indicate that color option "Color on Sunday" is the last option in the set of color options.

In FIG. 6AB, computer system 600 detects request 625*e* to change the feature of user interface 607*a* that is selected for editing. In FIG. 6AB, request 625*e* includes a swipe gesture (e.g., a left swipe). As shown in FIG. 6AC, in response to detecting request 625*e*, computer system 600 selects "Complications" as the feature that is currently selected for editing, as indicated by displaying 607*u*2 above representation 607*u*3, and visually distinguishes (e.g., outlines and/or highlights) complication representation 607*u*6 to indicate the feature that is selected for editing.

In FIG. 6AC, computer system 600 detects input 625*f* (e.g., a tap input or other input selecting the representation of the complication). In response to detecting input 625*f*, compute system 600 displays complication options in user interface 607*v* shown in FIG. 6AD. User interface 607*v* includes complication option 607*v*1 corresponding to a calendar application (e.g., the currently selected complication option corresponding to user interface element 614) and complication option 607*v*2 corresponding to a weather application. In FIG. 6AD, computer system 600 detects selection 625*g* (e.g., a tap and/or other selection input) of complication option 607*v*2. In response to detecting selection 625*g*, computer system displays (e.g., returns to) editing user interface 607*u*, where complication representation 607*u*6 in representation 607*u*3 is updated to show a representation of a complication corresponding to the weather application (e.g., instead of a representation of the previously selected complication corresponding to the calendar application).

In FIG. 6AE, computer system 600 detects request 625*h* to exit the editing user interface. In FIG. 6AE, request 625*h* includes a press of rotatable input mechanism 604. In some embodiments, request 625*h* includes a press of button 606 and/or an input (e.g., a tap) on display 602. In some embodiments, in response to detecting request 625*h* to exit the editing user interface, computer system 600 displays selection user interface 607*t*, with representation 607*t*1 updated to represent options selected in editing user interface 607*u* and/or user interface 607*v*. In some embodiments, in response to detecting request 625*h* to exit the editing user interface, computer system 600 displays user interface 607*a* according to the options selected editing user interface 607*u* and/or user interface 607*v*, as shown in FIG. 6AF. For example, in FIG. 6AF, user interface 607*a* is displayed in black and white (e.g., without non-greyscale color) because the "Color on Sunday" option was selected (e.g., in FIG. 6AB) and the current day of the week is Monday (e.g., as indicated in FIG. 6X). Also, user interface 607*a* is displayed with complication 626 corresponding to the weather application because complication option 607*v*2 was selected (e.g., in FIG. 6AD).

FIG. 7 is a flow diagram illustrating a method for displaying an interaction between a character and a clock hand using a computer system in accordance with some embodiments. Method 700 is performed at a computer system (e.g., 100, 300, 500, 600, a smartphone, a smartwatch, a tablet computer, a laptop computer, a desktop computer, and/or a head mounted device, such as, e.g., a head mounted augmented reality and/or extended reality device) that is in communication with a display generation component (e.g., 602, a display controller, a display, a touch-sensitive display system, a touchscreen, a monitor, and/or a head mounted display system) and one or more input devices (e.g., 602, 604, 606, a touch-sensitive surface, a physical button, a rotatable input mechanism, a rotatable and depressible input mechanism, a motion sensor, an accelerometer, a gyroscope, a keyboard, a controller, and/or a mouse). Some operations in method 700 are, optionally, combined, the orders of some operations are, optionally, changed, and some operations are, optionally, omitted.

As described below, method 700 provides an intuitive way for displaying an interaction between a character and a clock hand. The method reduces the cognitive burden on a user for displaying an interaction between a character and a clock hand, thereby creating a more efficient human-machine interface. For battery-operated computing devices, enabling a user to display an interaction between a character and a clock hand faster and more efficiently conserves power and increases the time between battery charges.

The computer system detects (702), via the one or more input devices, a first request to display a user interface (e.g., a clock face user interface, a watch face user interface, a wake screen, and/or a lock screen). In some embodiments, a wake screen is a user interface that is displayed (e.g., initially displayed) when the computer system transitions from an inactive state, low-power state, off state, and/or sleep state to an active state, full-power state, on state, and/or awake state. In some embodiments, the first request includes a contact (e.g., a tap, swipe, or other gesture) on a touch-sensitive surface. In some embodiments, the first request includes motion (e.g., change in position, rotation, and/or change in orientation) of at least a portion of the computer system (e.g., motion that satisfies a set of motion criteria, such as motion that is indicative of a wrist raise gesture, picking up the computer system, an intent to view the display generation component, and/or an intent to interact with the computer system). In some embodiments, the first request includes a press of a button (e.g., a physical button) and/or a depressible input mechanism (e.g., a rotatable and depressible input mechanism). In some embodiments, the first request includes rotation of a rotatable input mechanism (e.g., a rotatable and depressible input mechanism). In some embodiments, the first request includes an audio input (e.g., a voice command). In some embodiments, the first request includes a gesture (e.g., an air gesture, a wrist raise gesture, a wrist rotation gesture, covering the display generation component, and/or uncovering the display generation component). In some embodiments, a wrist raise gesture is identified, at least in part, based on a change in position of computer system 600, such as a change in angle, orientation, and/or height, and/or a rate of change in the position of computer system 600, such as a rate of change in angle, orientation, and/or height.

In response to detecting the first request to display the user interface, the computer system displays (704), via the display generation component, the user interface (e.g., 607a, 607b, 607c, 607d, 607e, 607f, 607g, 607h, 607i, 607j, 607k, 607l, 607m, 607n, or 607o), including displaying (706) (e.g., concurrently displaying): an indication of time (e.g., 610a, 610b, an analog indication of time, a digital indication of time, and/or an indication of a current time) indicating a first time, wherein the indication of time includes one or more clock hands (e.g., 610a and/or 610b) including a first clock hand (e.g., an hour hand such as 610a) indicating the first time (and, optionally, a second clock hand, such as a minute hand (e.g., 610b) or a seconds hand)), wherein displaying the first clock hand indicating the first time includes displaying the first clock hand at a first position in the user interface; and a first character (e.g., 608a, 608b, 608c, 608d, 608e, a static character, an animated character, a non-alphanumeric character, a cartoon character, a fictional character, and/or an animal character) in a first state (e.g., position, location, orientation, configuration, expression, size, shape, color, animation, activity, clothing, and/or accessory; e.g., a state relative to the indication of time) that represents a first interaction between the first character and the first clock hand at the first position (e.g., an interaction between the first character and the first clock hand and/or the second clock hand) In some embodiments, displaying the indication of time and the first character in response to detecting the first request to display the clock face includes displaying the first interaction between the indication of time and the first character.

After displaying the user interface in response to detecting the first request to display the user interface, the computer system detects (708), via the one or more input devices, a second request to display the user interface (e.g., a request that is separate and distinct from the first request to display the user interface). In some embodiments, the second request includes a same type of input as the first request (e.g., a contact, motion of at least a portion of the computer system, a press of a button, a rotation of a rotatable input mechanism, an audio input, and/or a gesture). In some embodiments, the second request includes a different type of input from the first request. In response to detecting the second request to display the user interface, the computer system displays (710) the user interface (e.g., 607a, 607b, 607c, 607d, 607e, 607f, 607g, 607h, 607i, 607j, 607k, 607l, 607m, 607n, or 607o), including displaying (712) (e.g., concurrently displaying): the indication of time (e.g., 610a and/or 610b), including the first clock hand (e.g., 610a) indicating a second time that is different from the first time, wherein displaying the first clock hand indicating the second time includes displaying the first clock hand at a second position in the user interface that is different from the first position; and the first character in a second state that is different from the first state and that represents a second interaction between the first character and the first clock hand at the second position that is different from the first interaction between the first character and the first clock hand at the first position.

In some embodiments, an interaction (e.g., the first interaction and/or the second interaction) includes a character (e.g., the first character) acting on (e.g., leaning on, sitting on, climbing, standing on, standing under, running on, jumping on, playing on, laying on, and/or looking at) the indication of time, the indication of time acting on the character (e.g., protecting the character from rain and/or snow), and/or the indication of time influencing the character (e.g., influencing a state, position, location, orientation, configuration, expression, size, shape, color, animation, activity, clothing, and/or accessory of the character). In some embodiments, an interaction (e.g., the first interaction and/or the second interaction) includes communication and/or direct involvement (e.g., contact) between a character (e.g., the first character) and the indication of time (e.g., the first clock hand and/or a second clock hand) In some embodiments, a state (e.g., position, location, orientation, configuration, expression, size, shape, color, animation, activity, clothing, and/or accessory) of a character (e.g., the first character) is based on (e.g., determined by) a state of the indication of time (e.g., the position of the first clock hand and/or a second clock hand) In some embodiments, an interaction (e.g., the first interaction and/or the second interaction) includes a character (e.g., the first character) touching the indication of time (e.g., touching the first clock hand and/or a second clock hand) Displaying a first character in a first state representing a first interaction between the first character and a first clock hand in response to detecting the first request to display the user interface and displaying the first character in a second state that is different from the first state and representing a second interaction between the first character and the first clock hand in response to detecting a second request to display the user interface provides a user with feedback regarding a change in time, thereby providing the user with improved visual feedback. Displaying a first character in a first state representing a first interaction between the first character and a first clock hand in response to detecting the first request to display the user interface and displaying the first character in a second state that is different from the first state and representing a second interaction between the first character and the first clock hand in response to detecting a second request to display the user interface reduces the number of inputs required to display the first character having different interactions with the first watch hand, thereby reducing the number of inputs needed to perform an operation.

In some embodiments, the first interaction includes the first character leaning on the first clock hand (e.g., 608*a* in FIGS. 6D-6F and/or 6J; a hand, arm, shoulder, and/or back of the first character leaning on the first clock hand) In some embodiments, the second interaction includes the first character leaning on the first clock hand (and/or the second clock hand) In some embodiments, the second interaction includes the first character not leaning on the first clock hand (and/or the second clock hand) Displaying the first interaction including the first character leaning on the first clock hand provides the user with an indication of the first time, thereby providing the user with improved visual feedback.

In some embodiments, the first interaction includes the first character sitting on the first clock hand (e.g., 608*a* and/or 608*b* in FIGS. 6A and/or 6G-6I; 608*b* in FIGS. 6K-6L; and/or the first character sitting on the first clock hand with a back of the first character leaning or lying on a second clock hand) In some embodiments, the second interaction includes the first character sitting on the first clock hand (and/or the second clock hand). In some embodiments, the second interaction includes the first character not sitting on the first clock hand (and/or the second clock hand) Displaying the first interaction including the first character sitting on the first clock hand provides the user with an indication of the first time, thereby providing the user with improved visual feedback.

In some embodiments, the first interaction includes an element (e.g., a graphical user interface element, the first character, a portion of the first character, and/or an element other than the first character) on top of the first clock hand (e.g., 608*b* in FIGS. 6K-6L; and/or the element perched on the first clock hand, on an end of the first clock hand, and/or on an upper end of the first clock hand when the first clock hand is oriented at least partially in a vertical direction). In some embodiments, the second interaction includes an element on top of the first clock hand In some embodiments, the second interaction does not include an element on top of the first clock hand In some embodiments, the computer system displays the element concurrently with the indication of time and the first clock hand Displaying the first interaction including an element on top of the first clock hand provides the user with an indication of the first time, thereby providing the user with improved visual feedback.

In some embodiments, displaying the first character (e.g., in the first state and/or the second state) includes displaying an animation that includes at least a portion of the first character moving over time (e.g., the animation of 608*a* and/or 608*b* in FIGS. 6D-6F). Displaying an animation that includes at least a portion of the first character moving over time provides the user with an indication of time changing, thereby providing the user with improved visual feedback.

In some embodiments, the computer system displays, concurrently with the indication of time and the first character, a second character (e.g., 608*a*, 608*b*, 608*c*, 608*d*, or 608*e*) that is different from the first character (e.g., a static character, an animated character, a non-alphanumeric character, a cartoon character, a fictional character, and/or an animal character). In some embodiments, the second character interacts with the first clock hand In some embodiments, the second character interacts with the first character. In some embodiments, a state of the second character depends on a state of the first character. In some embodiments, a state of the second character depends on a state (e.g., position) of the first clock hand Displaying a second character that is different from the first character provides the user with additional information associated with the interaction of the second character, thereby providing the user with improved visual feedback. In some embodiments, displaying the second character includes displaying an animation of at least a portion of the second character moving over time (e.g., the animation of 608*a* and/or 608*b* in FIGS. 6D-6F). Displaying an animation that includes at least a portion of the second character moving over time provides the user with an indication of time changing, thereby providing the user with improved visual feedback.

In some embodiments, detecting the first request to display the user interface includes detecting the first request while the computer system is in a reduced-power state (e.g., the state of 600 in FIGS. 6T-6W, a state with reduced power consumption compared to a normal operating state, a low-power state or mode of operation, a sleep state, an inactive state, a resting state, and/or a state in which the display generation component is dimmed, off, inactive, de-energized, and/or in a state of reduced brightness compared to a normal operating state). In some embodiments, the first request includes a request to transition the computer system from the reduced-power state to a higher-power state (e.g., a state in which the computer system uses more power, on average, than in the reduced-power state). In some embodiments, the first request includes a tap input (e.g., on a touch-sensitive surface of the computer system), lifting the computer system, and/or a wrist raise gesture. In some embodiments, in response to detecting the first request, the computer system transitions from the reduced-power state to a higher-power state. In some embodiments, detecting the second request to display the user interface includes detecting the second request while the computer system is in the reduced-power state. In some embodiments, the second request includes a request to transition the computer system from the reduced-power state to a higher-power state. In some embodiments, the second request includes a tap input, lifting the computer system, and/or a wrist raise gesture. In some embodiments, in response to detecting the second request, the computer system transitions from the reduced-power state to a higher-power state. In some embodiments, the computer system enters (e.g., transitions to) the reduced-power state in response to detecting an input such as, e.g., a press of a button (e.g., a physical button and/or a graphical button), a gesture (e.g., an air gesture and/or a gesture on a touch-sensitive surface), and/or motion of the computer system (e.g., lowering the computer system, putting the computer system down, and/or a wrist-down gesture). In some embodiments, the computer system enters the reduced-power state in response to a time threshold being met (e.g., a threshold amount of time passing without receiving a input and/or without receiving an input that satisfies an input threshold). Detecting the first request to display the user interface while the computer system is in a reduced-power state performs an operation when a set of conditions has been met without requiring further user input.

In some embodiments, the computer system displays, concurrently with the first clock hand (e.g., indicating the first time and/or the second time), a weather element (e.g., 618, 622, a graphical representation of a weather condition, such as snow, rain, clouds, lightning, and/or sunshine) that is based on a current weather condition, wherein displaying the weather element includes displaying the weather element interacting with the first clock hand (e.g., 618 in FIGS. 6M and/or 6P, 622 in FIG. 6O, snow piled up on the first clock hand, the first clock hand blocking falling rain, and/or the first clock hand blocking sunlight to create a shadow). Displaying a weather element that is based on a current weather condition provides the user with an indication of the current weather conditions, thereby providing the user with improved visual feedback.

In some embodiments, the computer system displays, concurrently with the first clock hand (e.g., indicating the first time and/or the second time), a seasonal element (e.g., 618, 620, a graphical representation of a season, such as snow for winter, rain for spring, sunshine for summer, and/or leaves for fall) that is based on a current season (e.g., spring, summer, fall, or winter), wherein displaying the seasonal element includes displaying the seasonal element interacting with the first clock hand (e.g., 618 in FIGS. 6M and/or 6P, 620 in FIGS. 6N and/or 6Q, snow piled up on the first clock hand, leaves piled up on the first clock hand, the first clock hand blocking falling rain, and/or the first clock hand blocking sunlight to create a shadow). Displaying a seasonal element that is based on a current season provides the user with an indication of the current season, thereby providing the user with improved visual feedback.

In some embodiments, displaying the user interface (e.g., in response to detecting the first request and/or in response to detecting the second request) includes displaying the user interface with one or more appearances (e.g., a background color and/or a position of a user interface element, such as a complication) other than the indication of time (and/or, in some embodiments, other than the first character). Displaying the user interface with one or more appearances other than the indication of time and the first character provides the user with additional information associated with the one or more appearances, thereby providing the user with improved visual feedback.

In some embodiments, displaying the user interface with the one or more appearances includes: in accordance with a determination that a current time corresponds to a first time of day (e.g., daytime, nighttime, sunrise, sunset, dusk, and/or dawn), displaying the user interface with a first time-based appearance (e.g., background 607n1, character 608a, and/or 608b in 607n) other than the indication of time (and/or, in some embodiments, other than the first character); and in accordance with a determination that the current time of day corresponds to a second time of day that is different from the first time of day, displaying the user interface with a second time-based appearance (e.g., the background, 608a, and/or 608b in 607a) other than the indication of time (and/or, in some embodiments, other than the first character), wherein the second time-based appearance is different from the first time-based appearance. For example, in some embodiments, in nighttime, the time-based appearance (e.g., the first time-based appearance and/or the second time-based appearance) includes a dark background and/or the first character sleeping, with eyes closed, snoring, dreaming, and/or lying on a bed. For example, in some embodiments, in daytime, the time-based appearance (e.g., the first time-based appearance and/or the second time-based appearance) includes a light background and/or the first character awake and/or performing an activity. For example, in some embodiments, at sunrise, the time-based appearance (e.g., the first time-based appearance and/or the second time-based appearance) includes a representation of the sun rising and/or the first character waking up, getting out of bed, drinking coffee, and/or having breakfast. For example, in some embodiments, at sunset, the time-based appearance (e.g., the first time-based appearance and/or the second time-based appearance) includes a representation of the sun setting and/or the first character getting ready for bed and/or watching the sunset. Displaying the user interface with a first time-based appearance in accordance with a determination that the current time corresponds to a first time of day and displaying the user interface with a second time-based appearance in accordance with a determination that the current time corresponds to a second time of day provides the user with an indication of the time of day, thereby providing the user with improved visual feedback.

In some embodiments, displaying the user interface with the one or more appearances includes: in accordance with a determination that a current date corresponds to a first season (e.g., spring, summer, fall, or winter), displaying the user interface with a first season-based appearance (e.g., 618, 620, 608a in FIGS. 6M, 6N, 6P, and/or 6O, and/or 608b in FIGS. 6M, 6N, 6P, and/or 6O) other than the indication of time (and/or, in some embodiments, other than the first character); and in accordance with a determination that the current date corresponds to a second season that is different from the first season, displaying the user interface with a second season-based appearance (e.g., 618, 620, 608a in FIGS. 6M, 6N, 6P, and/or 6O, and/or 608b in FIGS. 6M, 6N, 6P, and/or 6O) other than the indication of time (and/or, in some embodiments, other than the first character), wherein the second season-based appearance is different from the first season-based appearance. For example, in some embodiments, during spring, the season-based appearance (e.g., the first season-based appearance and/or the second season-based appearance) includes a representation of flowers and/or rain falling and/or the first character watering flowers, playing baseball, and/or standing in the rain. For example, in some embodiments, during summer, the season-based appearance (e.g., the first season-based appearance and/or the second season-based appearance) includes a representation of the sun and/or the first character at a beach, at a pool, at a picnic, sunbathing, and/or cooking on a grill. For example, in some embodiments, during fall, the season-based appearance (e.g., the first season-based appearance and/or the second season-based appearance) includes leaves falling and/or the first character raking leaves, playing football, carving a pumpkin, and/or trick-or-treating. For example, in some embodiments, during winter, the season-based appearance (e.g., the first season-based appearance and/or the second season-based appearance) includes a representation of snow and/or the first character in the snow, ice skating, sledding, and/or putting up holiday decorations. Displaying the user interface with a first season-based appearance in accordance with a determination that the current date corresponds to a first season and displaying the user interface with a second season-based appearance in accordance with a determination that the current date corresponds to a second season provides the user with an indication of the season, thereby providing the user with improved visual feedback.

In some embodiments, displaying the user interface with the one or more appearances includes: in accordance with a determination that a current date (and/or time) corresponds to a first event (e.g., birthday and/or holiday), displaying the user interface with a first event-based appearance (e.g., 608a, 608b, the hats, and/or the cakes in FIGS. 6K and/or 6L) other than the indication of time (and/or, in some embodiments, other than the first character); and in accordance with a determination that the current date (and/or time) corresponds to a second event that is different from the first event (or corresponds to no event), displaying the user interface with a second event-based appearance (or no event-based appearance if there is no event) (e.g., not displaying the hats and/or cakes shown in FIGS. 6K and/or 6L when there is no event) other than the indication of time (and/or, in some embodiments, other than the first character), wherein the second event-based appearance is different from the first event-based appearance. For example, in some embodiments, on a birthday, the event-based appearance (e.g., the first event-based appearance and/or the second event-based appearance) includes the first character wearing a birthday hat, at a birthday party, blowing out candles on a cake, and/or opening a present. For example, in some embodiments, on a holiday, the event-based appearance (e.g., the first event-based appearance and/or the second event-based appearance) includes the first character watching and/or setting off fireworks (e.g., on the Fourth of July), hugging and/or kissing (e.g., on Valentine's Day), opening a present and/or decorating a tree (e.g., on Christmas Day), and/or having a meal with a group (e.g., on Thanksgiving Day). Displaying the user interface with a first event-based appearance in accordance with a determination that the current date corresponds to a first event and displaying the user interface with a second event-based appearance in accordance with a determination that the current date corresponds to a second event provides the user with an indication that the current date corresponds to an event, thereby providing the user with improved visual feedback.

In some embodiments, displaying the user interface with the one or more appearances includes: in accordance with a determination that a current day corresponds to a first day of the week (e.g., Monday, Tuesday, Wednesday, Thursday, Friday, Saturday, or Sunday), displaying the user interface with a first day-based appearance (e.g., white background in 607a-607d, 607g, 607i, 607j, 607k, and/or 607o) other than the indication of time (and/or, in some embodiments, other than the first character); and in accordance with a determination that the current day corresponds to a second day of the week that is different from the first day of the week, displaying the user interface with a second day-based appearance (e.g., non-greyscale color background in 607e, 607f, 607h, 607l, and/or 607m) other than the indication of time (and/or, in some embodiments, other than the first character), wherein the second day-based appearance is different from the first day-based appearance. For example, in some embodiments, on a weekend (e.g., Saturday and/or Sunday), the day-based appearance (e.g., the first day-based appearance and/or the second day-based appearance) includes a background with a color (e.g., other than greyscale and/or black and white). For example, in some embodiments, on a weekday (e.g., Monday, Tuesday, Wednesday, Thursday, and/or Friday), the day-based appearance (e.g., the first day-based appearance and/or the second day-based appearance) includes a greyscale background (e.g., without a color other than greyscale and/or black and white). For example, in some embodiments, on a designated day of the week (e.g., a day designated by a user preference), the day-based appearance (e.g., the first day-based appearance and/or the second day-based appearance) includes an element of the user interface being emphasized and/or exaggerated (e.g., displaying a background, clock hands, and/or a dial in a bright color for motivation on Wednesday). Displaying the user interface with a first day-based appearance in accordance with a determination that the current date corresponds to a first day of the week and displaying the user interface with a second day-based appearance in accordance with a determination that the current date corresponds to a second day of the week provides the user with an indication that the current date corresponds to a day of the week, thereby providing the user with improved visual feedback. Displaying the user interface with a first day-based appearance provides the user with motivation on the first day of the week.

In some embodiments, displaying the user interface with the one or more appearances includes: in accordance with a determination that a first activity (e.g., workout activity, running, walking, hiking, swimming, resting, and/or not working out) is being performed (e.g., by a user of the computer system), displaying the user interface with a first activity-based appearance (e.g., background 607n1, state of 608a, and/or state of 608b in 607n when the user is sleeping, state of 608a and/or 608b in 607o when the user is working out, or 608a1 and/or the state of 608a, 608c, 608d, and/or 608e in 607c when the user is hiking) other than the indication of time (and/or, in some embodiments, other than the first character); and in accordance with a determination that the current date corresponds to a second activity is being performed that is different from the first activity, displaying the user interface with a second activity-based appearance other than the indication of time (and/or, in some embodiments, other than the first character), wherein the second activity-based appearance is different from the first activity-based appearance. For example, in some embodiments, when a user is working out, the activity-based appearance (e.g., the first activity-based appearance and/or the second activity-based appearance) includes the first character running (e.g., if the user is determined to be running), lifting weights (e.g., if the user is determined to be lifting weights), swimming (e.g., if the user is determined to be swimming), riding a bike (e.g., if the user is determined to be cycling), and/or performing yoga (e.g., if the user is determined to be performing yoga). Displaying the user interface with a first activity-based appearance in accordance with a determination that a first activity is being performed and displaying the user interface with a second activity-based appearance in accordance with a determination that a second activity is being performed provides the user with an indication that the computer system has determined that an activity is being performed, thereby providing the user with improved visual feedback. Displaying the user interface with a first activity-based appearance in accordance with a determination that a first activity is being performed provides the user with motivation to perform the first activity in order to see the first activity-based appearance.

In some embodiments, detecting the first request to display the user interface includes detecting the first request while displaying the first character in a third state (e.g., the state of 608a and/or 608b in 607p, 607q, 607r, and/or 607s; and/or a character state corresponding to a reduced-power state of the computer system) that is different from the first state and the second state (e.g., the first character switches from the third state to the first state in response to detecting the first request to display the user interface). In some embodiments, the computer system is in a reduced-power state while displaying the first character in the third state. In some embodiments, detecting the second request to display the user interface includes detecting the second request while displaying the first character in the third state (e.g., a character state corresponding to a reduced-power state of the computer system) that is different from the first state and the second state (e.g., the first character switches from the third state to the second state in response to detecting the second request to display the user interface). Detecting the first request to display the user interface while displaying the first character in a third state performs an operation when a set of conditions has been met without requiring further user input.

In some embodiments, in accordance with a determination that the computer system is in a reduced-power state (e.g., in response to the computer system entering the reduced-power state), the computer system displays the first character in a respective state (e.g., the state of 608a and/or 608b in 607r and/or 607s, a state unique to the reduced-power state, a state designated for the reduced-power state, and/or a state in which the first character is displayed only when the computer system is in the reduced-power state). In some embodiments, the computer system displays the first character in the respective state whenever the computer system is in the reduced-power state (e.g., at different times of day, on different days of the week, when different weather conditions exist, and/or in different seasons). In some embodiments, the first character returns (e.g., repeatedly returns) to the respective state whenever the computer system enters (e.g., re-enters) the reduced-power state. Displaying the first character in a respective state in accordance with a determination that the computer system is in a reduced-power state provides the user with an indication that the computer system is in the reduced-power state, thereby providing the user with improved visual feedback.

In some embodiments, in response to detecting the first request to display the user interface, the computer system displays an indication of a date (e.g., 614, a representation of a day of a month, a month, and/or a year) at a third position in the user interface, wherein the third position in the user interface at which the indication of a date is displayed is based on the first state of the first character (e.g., a position in the user interface at which the first character is displayed). For example, the position of 614 is based on the state of 608a and/or 608b (and/or, in some embodiments, on the position of 610a and/or 610b). In some embodiments, in response to detecting the second request to display the user interface, the computer system displays the indication of a date at a fourth position in the user interface that is different from the third position in the user interface. In some embodiments, displaying the indication of a date includes: in accordance with a determination that the first character is displayed in a first character position in the user interface, displaying the indication of a date in a first date location in the user interface; and in accordance with a determination that the first character is displayed in a second character location in the user interface that is different from the first character location in the user interface, displaying the indication of a date in a second date location in the user interface that is different from the first date location. Displaying an indication of a date at a third position based on the first state of the character in response to detecting the first request to display the user interface reduces the number of inputs required to display the indication of the date at the third position, thereby performing an operation when a set of conditions has been met without requiring further user input and reducing the number of inputs needed to perform an operation. Displaying an indication of a date at a third position based on the first state of the character in response to detecting the first request to display the user interface keeps the user interface less cluttered, thereby providing the user with improved visual feedback.

Note that details of the processes described above with respect to method 700 (e.g., FIG. 7) are also applicable in an analogous manner to the methods described below. For example, methods 800, 1000, 1200, 1500, and/or 1700 optionally include one or more of the characteristics of the various methods described above with reference to method 700. For example, the user interface in method 800 can display a first clock hand and first character, with an interaction between the first clock hand and first character, as described in method 700. For brevity, these details are not repeated below.

FIG. 8 is a flow diagram illustrating a method for displaying a user interface based on the day of the week using a computer system in accordance with some embodiments. Method 800 is performed at a computer system (e.g., 100, 300, 500, 600, a smartphone, a smartwatch, a tablet computer, a laptop computer, a desktop computer, and/or a head mounted device such as, e.g., a head mounted augmented reality and/or extended reality device) that is in communication with a display generation component (e.g., 602, a display controller, a touch-sensitive display system, a monitor, and/or a head mounted display system) and one or more input devices (e.g., 602, 604, 606, a touch-sensitive surface, a physical button, a rotatable input mechanism, a rotatable and depressible input mechanism, a motion sensor, an accelerometer, a gyroscope, a keyboard, a controller, and/or a mouse). Some operations in method 800 are, optionally, combined, the orders of some operations are, optionally, changed, and some operations are, optionally, omitted.

As described below, method 800 provides an intuitive way for displaying a user interface based on the day of the week. The method reduces the cognitive burden on a user for displaying a user interface based on the day of the week, thereby creating a more efficient human-machine interface. For battery-operated computing devices, enabling a user to display a user interface based on the day of the week faster and more efficiently conserves power and increases the time between battery charges.

During a first day, the computer system detects (802), via the one or more input devices, a first request to display a user interface (e.g., a clock face user interface, a watch face user interface, a wake screen, and/or a lock screen). In some embodiments, a wake screen is a user interface that is displayed (e.g., initially displayed) when the computer system transitions from an inactive state, low-power state, off state, and/or sleep state to an active state, full-power state, on state, and/or awake state. In some embodiments, the first request includes a contact (e.g., a tap, swipe, or other gesture) on a touch-sensitive surface. In some embodiments, the first request includes motion (e.g., change in position, rotation, and/or change in orientation) of at least a portion of the computer system (e.g., motion that satisfies a set of motion criteria, such as motion that is indicative of a wrist raise gesture, picking up the computer system, an intent to view the display generation component, and/or an intent to interact with the computer system). In some embodiments, the first request includes a press of a button (e.g., a physical button) and/or a depressible input mechanism (e.g., a rotatable and depressible input mechanism). In some embodiments, the first request includes rotation of a rotatable input mechanism (e.g., a rotatable and depressible input mechanism). In some embodiments, the first request includes an audio input (e.g., a voice command). In some embodiments, the first request includes a gesture (e.g., an air gesture, a wrist raise gesture, a wrist rotation gesture, covering the display generation component, and/or uncovering the display generation component).

In response to detecting the first request to display the user interface, the computer system displays (804), via the display generation component, the user interface (e.g., 607a, 607b, 607c, 607d, 607e, 607f, 607g, 607h, 607i, 607j, 607k, 607l, 607m, 607n, or 607o, a first occurrence of the user interface, and/or a first instance of the user interface), including displaying (806) (e.g., in or on the user interface) an indication of time (e.g., 610a, 610b, an analog indication of time that includes a dial, an hour hand, a minute hand, and/or a seconds hand, a digital indication of time, and/or an indication of a current time). Displaying the user interface in response to detecting the first request to display the user interface includes: in accordance with a determination that the first day is one of a first set of one or more days of the week (e.g., one of a predetermined set of one or more days of the week, a weekend day, and/or one particular day of the week), displaying (808) the user interface with a first appearance (e.g., the appearance of 607e, 607f, 607h, 607l, and/or 607m; and/or changing an appearance of the user interface to the first appearance); and in accordance with a determination that the first day is one of a second set of one or more days of the week that are different from the first set of one or more days of the week, displaying (810) the user interface with a second appearance (e.g., the appearance of 607a-607d, 607g, 607i-607k, 607n, and/or 607o) that is different from the first appearance, wherein the difference between the first appearance and the second appearance is a difference in a portion of the user interface that does not otherwise indicate a current day of the week. In some embodiments, an appearance (e.g., the first appearance and/or the second appearance) includes an aspect of the user interface and/or one or more elements of the user interface, such as a color, a brightness, a font, a size, a position, a location, an orientation, a background, and/or an animation. Displaying a user interface with a first appearance in accordance with a determination that the first day is one of a first set of one or more days of the week and displaying the user interface with a second appearance in accordance with a determination that the first day is one of a second set of one or more days provides a user with an indication of the current day of the week, thereby providing the user with improved visual feedback. Displaying a user interface with a first appearance in accordance with a determination that the first day is one of a first set of one or more days of the week and displaying the user interface with a second appearance in accordance with a determination that the first day is one of a second set of one or more days reduces the number of inputs required to display the user interface having different appearances, thereby reducing the number of inputs needed to perform an operation.

In some embodiments, the first set of one or more days of the week includes a first day of the week and a second day of the week that is different from the first day of the week (e.g., the computer system displays the user interface with the first appearance on multiple different days of the week, including the first day of the week and the second day of the week; a color background is displayed on Saturday and Sunday, and/or a white background is displayed in, for example, 607a (on Monday), 607g (on Tuesday), 607c (on Wednesday), and 607d (on Friday)). In some embodiments, the first appearance persists for multiple different days of the week (e.g., Monday through Friday or Saturday and Sunday). Displaying a user interface with a first appearance in accordance with a determination that the first day is one of a first set of one or more days of the week that includes a first day of the week and a second day of the week provides the user with an indication that the current date is a day of the week in the first set of days of the week that includes the first day of the week and the second day of the week, thereby providing the user with improved visual feedback.

In some embodiments, displaying the user interface with the first appearance includes displaying the user interface (or, in some embodiments, a portion of the user interface, such as a background) with a first color palette (e.g., a first set of one or more colors; e.g., the set of colors in 607e) and displaying the user interface with the second appearance includes displaying the user interface (or, in some embodiments, the portion of the user interface) with a second color palette (e.g., a second set of one or more colors; e.g., a black and white, as in 607a) that is different from the first color palette. For example, in some embodiments, when the user interface is displayed with the first appearance, the user interface (or a portion of the user interface, such as a background) includes a set of one or more colors that are not included in the user interface (or the portion of the user interface) when the user interface is displayed with the second appearance. Displaying a user interface with a first color palette in accordance with a determination that the first day is one of a first set of one or more days of the week and displaying the user interface with a second color palette in accordance with a determination that the first day is one of a second set of one or more days provides a user with an indication of the current day of the week, thereby providing the user with improved visual feedback. Displaying a user interface with a first color palette in accordance with a determination that the first day is one of a first set of one or more days of the week and displaying the user interface with a second color palette in accordance with a determination that the first day is one of a second set of one or more days reduces the number of inputs required to display the user interface having different color palettes, thereby reducing the number of inputs needed to perform an operation.

In some embodiments, displaying the user interface with the first appearance includes displaying the user interface (or, in some embodiments, a portion of the user interface, such as a background) in a color other than greyscale (e.g., as in 607e, 607f, 607h, 607l, and/or 607m; and/or in a color other than black and white or in multiple levels of tone between black and white), and wherein displaying the user interface with the second appearance includes displaying the user interface (or, in some embodiments, the portion of the user interface) in greyscale (e.g., as in 607a-607d, 607g, 607i-607k, 607n, and/or 607o; and/or only black and white or a in a level of tone between black and white, without the color other than greyscale). Displaying a user interface in a color other than greyscale in accordance with a determination that the first day is one of a first set of one or more days of the week and displaying the user interface in greyscale in accordance with a determination that the first day is one of a second set of one or more days provides a user with an indication of the current day of the week, thereby providing the user with improved visual feedback. Displaying a user interface with a color other than greyscale in accordance with a determination that the first day is one of a first set of one or more days of the week and displaying the user interface in greyscale in accordance with a determination that the first day is one of a second set of one or more days reduces the number of inputs required to display the user interface having different color schemes, thereby reducing the number of inputs needed to perform an operation.

In some embodiments, displaying the user interface with the first appearance includes displaying a background of the user interface with a color other than greyscale (e.g., as in 607*e*, 607*f*, 607*h*, 607*l*, and/or 607*m*; and/or a color other than in black and white or in multiple levels of tone between black and white), and wherein displaying the user interface with the second appearance includes displaying the background of the user interface in greyscale (e.g., as in 607*a*-607*d*, 607*g*, 607*i*-607*k*, 607*n*, and/or 607*o*; and/or black and white or in multiple levels of tone between black and white) (e.g., only black and white, or optionally greyscale, without the color other than greyscale). In some embodiments, the computer system displays a character in the user interface and displays the character in the same color when displaying the user interface with the first appearance and when displaying the user interface with the second appearance. Displaying a user interface in a color other than black and white in accordance with a determination that the first day is one of a first set of one or more days of the week and displaying the user interface in black and white in accordance with a determination that the first day is one of a second set of one or more days provides a user with an indication of the current day of the week, thereby providing the user with improved visual feedback. Displaying a user interface with a color other than black and white in accordance with a determination that the first day is one of a first set of one or more days of the week and displaying the user interface in black and white in accordance with a determination that the first day is one of a second set of one or more days reduces the number of inputs required to display the user interface having different color schemes, thereby reducing the number of inputs needed to perform an operation.

In some embodiments, the first set of one or more days of the week is Saturday and Sunday. In some embodiments, the second set of one or more days of the week is Monday, Tuesday, Wednesday, Thursday, and Friday. Displaying a user interface with a first appearance in accordance with a determination that the first day is Saturday or Sunday provides a user with an indication of that the current day is a weekend day, thereby providing the user with improved visual feedback. Displaying a user interface with a first appearance in accordance with a determination that the first day is Saturday or Sunday reduces the number of inputs required to display the user interface having different appearances, thereby reducing the number of inputs needed to perform an operation. In some embodiments, the first set of one or more days of the week is one weekend day (e.g., only Saturday or only Sunday). In some embodiments, the second set of one or more days of the week is Monday, Tuesday, Wednesday, Thursday, Friday, and Saturday. Displaying a user interface with a first appearance in accordance with a determination that the first day is one weekend day provides a user with an indication of that the current day is the particular weekend day, thereby providing the user with improved visual feedback. Displaying a user interface with a first appearance in accordance with a determination that the first day is one weekend day reduces the number of inputs required to display the user interface having different appearances, thereby reducing the number of inputs needed to perform an operation.

In some embodiments, the computer system detects a set of one or more inputs (e.g., 625*a*-625*h*) that includes selection (e.g., 625*c*, 625*d*, and/or 625*e*) of an option (e.g., "Black and White" in FIG. 6Z) to disable displaying the user interface with the first appearance; after detecting the set of one or more inputs that includes selection of the option to disable displaying the user interface with the first appearance, the computer system detects, during a second day, a second request to display the user interface (e.g., a request that is separate and distinct from the first request to display the user interface); and in response to detecting the second request to display the user interface, the computer system displays the user interface (e.g., a second occurrence of the user interface and/or a second instance of the user interface), including displaying (e.g., in or on the user interface) the indication of time, wherein displaying the user interface in response to detecting the second request to display the user interface includes: in accordance with a determination that the second day is one of the first set of one or more days of the week, displaying the user interface with the second appearance (e.g., displaying the user interface in black and white on Sunday). In some embodiments, the second request includes a same type of input as the first request (e.g., a contact, motion of at least a portion of the computer system, a press of a button, a rotation of a rotatable input mechanism, an audio input, and/or a gesture). In some embodiments, the second request includes a different type of input from the first request. Displaying the user interface with a second appearance in accordance with a determination that the second day is one of the first set of one or more days of the week after detecting a set of one or more inputs that includes selection of an option to disable displaying the user interface with a first appearance provides improved feedback and allows a user to select the manner in which the time user interface is displayed.

In some embodiments, displaying the user interface in response to detecting the first request to display the user interface includes displaying, at a first time (e.g., a day or a time of a day), the user interface with a third appearance (e.g., 607*a*). In some embodiments, the user interface is displayed with the third appearance concurrently with the first appearance or the second appearance. In some embodiments, the computer system displays, at a second time (e.g., a day or a time of a day) that is different from the first time (e.g., in response to a request to display the user interface; the second time is a different time during the same day as the first time; and/or the second time is in a different day from the first time), the user interface with a fourth appearance (e.g., 607*b*) that is different from the third appearance (e.g., display of the user interface changes over time), wherein the difference between the third appearance and the fourth appearance is a difference in a portion of the user interface that does not otherwise indicate a current day of the week. Displaying the user interface with a third appearance at a first time and with a fourth appearance at a second time provides the user with an indication of a change in time, thereby providing the user with improved visual feedback.

In some embodiments, displaying, at the first time, the user interface with the third appearance includes: in accordance with a determination that the first day is one of the first set of one or more days of the week, displaying the user interface with the third appearance and the first appearance (e.g., the user interface concurrently includes the third appearance and the first appearance); and in accordance with a determination that the first day is one of the second set of one or more days of the week, displaying the user interface with the third appearance and the second appearance (e.g., the user interface concurrently includes the third appearance and the second appearance). For example, computer system 600 displays snow element 618 in user interface 607*i* (e.g., on Tuesday with a black and white palette) and in user interface 607*l* (e.g., on Sunday with a color palette). For example, computer system 600 displays 607*a* on Monday and 607*e* on Sunday. In some embodiments, displaying, at the second time, the user interface with the fourth appearance includes: in accordance with a determination that the first day is one of the first set of one or more days of the week, displaying the user interface with the fourth appearance and the first appearance (e.g., the user interface concurrently includes the fourth appearance and the first appearance); and in accordance with a determination that the first day is one of the second set of one or more days of the week, displaying the user interface with the fourth appearance and the second appearance (e.g., the user interface concurrently includes the fourth appearance and the second appearance). Displaying the time user interface with a third appearance and a first appearance in accordance with a determination that the first day is one of the first set of one or more days of the week and displaying the user interface with the third appearance and the second appearance in accordance with a determination that the first day is one of the second set of one or more days of the week provides a user with an indication of the current day of the week, thereby providing the user with improved visual feedback. Displaying the time user interface with a third appearance and a first appearance in accordance with a determination that the first day is one of the first set of one or more days of the week and displaying the user interface with the third appearance and the second appearance in accordance with a determination that the first day is one of the second set of one or more days of the week reduces the number of inputs required to display the user interface having different appearances, thereby reducing the number of inputs needed to perform an operation.

In some embodiments, the third appearance (e.g., 607*a*) is based on the first time being during a first time of day (e.g., nighttime or daytime) and the fourth appearance (e.g., 607*n*) is based on the second time being during a second time of day that is different from the first time of day. In some embodiments, displaying the user interface with the third appearance includes: in accordance with a determination that the first time is during a first time of day, displaying the third appearance with a first characteristic (e.g., color, pattern, font, and/or size); and in accordance with a determination that the first time is during a second time of day that is different from the first time of day, displaying the third appearance with a second characteristic that is different from the first characteristic. In some embodiments, displaying the user interface with the fourth appearance includes: in accordance with a determination that the second time is during a first time of day, displaying the fourth appearance with a first characteristic (e.g., color, pattern, font, and/or size); and in accordance with a determination that the second time is during a second time of day that is different from the first time of day, displaying the fourth appearance with a second characteristic that is different from the first characteristic. Displaying the user interface with a third appearance at a first time of day and with a fourth appearance at a second time of day provides the user with an indication of a change in time, thereby providing the user with improved visual feedback.

In some embodiments, the third appearance (e.g., 607*i* and/or 607*l*) is based on the first time being in a first season (e.g., spring, summer, fall, or winter) and the fourth appearance (e.g., 607*j* and/or 607*m*) is based on the second time being in a second season that is different from the first season. In some embodiments, displaying the user interface with the third appearance includes: in accordance with a determination that the first time is in a first season, displaying the third appearance with a first characteristic (e.g., color, pattern, font, and/or size); and in accordance with a determination that the first time is in a second season that is different from the first season, displaying the third appearance with a second characteristic that is different from the first characteristic. In some embodiments, displaying the user interface with the fourth appearance includes: in accordance with a determination that the second time is in a first season, displaying the fourth appearance with a first characteristic (e.g., color, pattern, font, and/or size); and in accordance with a determination that the second time is in a second season that is different from the first season, displaying the fourth appearance with a second characteristic that is different from the first characteristic. Displaying the user interface with a third appearance based on the first time being a first season and with a fourth appearance based on the second time being a second season provides the user with an indication of a change in time, thereby providing the user with improved visual feedback.

In some embodiments, the third appearance (e.g., 607*g* and/or 607*h*) is based on the first time corresponding to a first event (e.g., a birthday or holiday) and the fourth appearance (e.g., 607*a*) is based on the second time corresponding to a second event (or, in some embodiments, a lack of an event) that is different from the first event. In some embodiments, displaying the user interface with the third appearance includes: in accordance with a determination that the first time corresponds to a first event, displaying the third appearance with a first characteristic (e.g., color, pattern, font, and/or size); and in accordance with a determination that the first time corresponds to a second event (or, in some embodiments, no event) that is different from the first event, displaying the third appearance with a second characteristic that is different from the first characteristic. In some embodiments, displaying the user interface with the fourth appearance includes: in accordance with a determination that the second time corresponds to a first event, displaying the fourth appearance with a first characteristic (e.g., color, pattern, font, and/or size); and in accordance with a determination that the second time corresponds to a second event (or, in some embodiments, no event) that is different from the first event, displaying the fourth appearance with a second characteristic that is different from the first characteristic. Displaying the user interface with a third appearance based on the first time corresponding to a first event and with a fourth appearance based on the second time corresponding to a second event provides the user with an indication of a change in time, thereby providing the user with improved visual feedback.

In some embodiments, displaying the user interface includes displaying the user interface (or, in some embodiments, a portion of the user interface) with a first color (e.g., black and while, a greyscale color, or a color in FIG. 6G) (and, in some embodiments, without a second color). In some embodiments, during the first day and after displaying the user interface with the first color, the computer system detects, while the computer system is in a reduced-power state (e.g., the state of 600 in FIGS. 6T-6W, a reduced-power state compared to a normal operating state, a low-power state or mode of operation, a sleep state, an inactive state, a resting state, and/or a state in which the display generation component is dimmed, off, inactive, de-energized, and/or in a state of reduced brightness compared to a normal operating state), a third request to display the user interface (e.g., a request that is separate and distinct from the first request to display the user interface); and in response to detecting the third request to display the user interface while the computer system is in a reduced-power state: in accordance with a determination that the first day is one of the first set of one or more days of the week, displaying the user interface (or, in some embodiments, the portion of the user interface) with a second color (e.g., a color in FIG. 6H or FIG. 6I) that is different from the first color (and, in some embodiments, without the first color), including displaying (e.g., in or on the user interface) the indication of time. For example, in some embodiments, the computer system changes the color of the user interface in response to a wake event if the current day is one of the first set of one or more days of the week (e.g., on Saturday and/or Sunday). In some embodiments, the third request includes a same type of input as the first request (e.g., a contact, motion of at least a portion of the computer system, a press of a button, a rotation of a rotatable input mechanism, an audio input, and/or a gesture). In some embodiments, the third request includes a different type of input from the first request. In some embodiments, the third request includes a request to transition the computer system from the reduced-power state to a higher-power state (e.g., a state in which the computer system uses more power, on average, than in the reduced-power state). In some embodiments, the third request includes a tap input (e.g., on a touch-sensitive surface of the computer system), lifting the computer system, and/or a wrist raise gesture. In some embodiments, in response to detecting the third request, the computer system transitions from the reduced-power state to a higher-power state. Displaying the user interface with a second color in accordance with a determination that the first day is one of the first set of one or more days of the week and in response to detecting the third request to display the user interface while the computer system is in a reduced-power state provides a user with feedback regarding the day of the week, thereby providing the user with improved visual feedback. Displaying the user interface with a second color in accordance with a determination that the first day is one of the first set of one or more days of the week and in response to detecting the third request to display the user interface while the computer system is in a reduced-power state reduces the number of inputs required to display the use interface with the second color, thereby reducing the number of inputs needed to perform an operation.

In some embodiments, in response to detecting the third request to display the user interface while the computer system is in a reduced-power state (e.g., the state of 600 in FIGS. 6T-6W): in accordance with a determination that the first day is one of the second set of one or more days of the week, the computer system displays the user interface (or, in some embodiments, the portion of the user interface) with the first color, including displaying (e.g., in or on the user interface) the indication of time. For example, in some embodiments, the computer system does not change the color of the user interface in response to a wake event if the current day is one of the second set of one or more days of the week (e.g., on Monday through Friday). In some embodiments, the third request includes a request to transition the computer system from the reduced-power state to a higher-power state (e.g., a state in which the computer system uses more power, on average, than in the reduced-power state). In some embodiments, the third request includes a tap input (e.g., on a touch-sensitive surface of the computer system), lifting the computer system, and/or a wrist raise gesture. In some embodiments, in response to detecting the third request, the computer system transitions from the reduced-power state to a higher-power state. Displaying the user interface with a first color in accordance with a determination that the first day is one of the second set of one or more days of the week and in response to detecting the third request to display the user interface while the computer system is in a reduced-power state provides a user with feedback regarding the day of the week, thereby providing the user with improved visual feedback. Displaying the user interface with a first color in accordance with a determination that the first day is one of the second set of one or more days of the week and in response to detecting the third request to display the user interface while the computer system is in a reduced-power state reduces the number of inputs required to display the use interface with the first color, thereby reducing the number of inputs needed to perform an operation.

In some embodiments, displaying the user interface includes displaying an element of the user interface (e.g., 612, 614, the indication of time, an indication of a day, an indication of a date, a complication, one or more letters, one or more numbers, and/or one or more elements of an analog dial, such as hour and/or minute marks) with an appearance of handwritten marks that simulate handwriting of a particular individual (e.g., the element of the user interface appears to be handwritten in an iconic handwritten script, such as by a famous author, artist, or cartoonist). Displaying an element of the user interface with an appearance of handwritten marks that simulate handwriting of a particular individual provides the user with information while keeping the user interface less cluttered, thereby providing the user with improved visual feedback.

In some embodiments, during a third day that is in a different week from the first day, the computer system detects, via the one or more input devices, a fourth request to display the user interface (e.g., a request that is separate and distinct from the first request to display the user interface); and in response to detecting the fourth request to display the user interface, displaying the user interface (e.g., 607a, 607b, 607c, 607d, 607e, 607f, 607g, 607h, 607i, 607j, 607k, 607l, 607m, 607n, or 607o, a second occurrence of the user interface that is different from the first occurrence of the user interface, and/or a second instance of the user interface that is different from the first instance of the user interface), including displaying (e.g., in or on the user interface) the indication of time (e.g., 608a and/or 608b), wherein displaying the user interface in response to detecting the fourth request to display the user interface includes: in accordance with a determination that the third day is one of the first set of one or more days, displaying the user interface with the first appearance (e.g., 607e, 607f, 607h, 607l, and/or 607m); and in accordance with a determination that the third day is one of the second set of one or more days, displaying the user interface with the second appearance (e.g., 607a-607d) that is different from the first appearance. In some embodiments, the fourth request includes a same type of input as the first request (e.g., a contact, motion of at least a portion of the computer system, a press of a button, a rotation of a rotatable input mechanism, an audio input, and/or a gesture). In some embodiments, the fourth request includes a different type of input from the first request. Displaying the user interface with a first appearance in accordance with a determination that the third day is one of the first set of one or more days and displaying the user interface with a second appearance in accordance with a determination that the third day is one of the second set of one or more days provides a user with feedback regarding the day of the week, thereby providing the user with improved visual feedback. Displaying the user interface with a first appearance in accordance with a determination that the third day is one of the first set of one or more days and displaying the user interface with a second appearance in accordance with a determination that the third day is one of the second set of one or more days reduces the number of inputs required to display the use interface with the first color, thereby reducing the number of inputs needed to perform an operation.

Note that details of the processes described above with respect to method 800 (e.g., FIG. 8) are also applicable in an analogous manner to the methods described above. For example, methods 700, 1000, 1200, 1500, and/or 1700 optionally include one or more of the characteristics of the various methods described above with reference to method 800. For example, the user interface in method 700 can be displayed with different appearances based on the day of the week, as described in method 800. For brevity, these details are not repeated below.

FIGS. 9A-9Y illustrate exemplary user interfaces for displaying a dynamic text string that changes based on context, in accordance with some embodiments. The user interfaces in these figures are used to illustrate the processes described below, including the method in FIG. 10.

FIG. 9A shows computer system 600 (e.g., as described above) displaying user interface 900a (e.g., a home screen or application springboard) that includes application icons for opening respective applications. In some embodiments, user interface 900a is a user interface of an application (e.g., a messaging application, an email application, a calendar application, or a workout application) or a menu user interface (e.g., a settings menu). In FIG. 9A, computer system 600 detects request 925a (e.g., a press of input mechanism 604) to display a user interface that includes one or more text characters of a dynamic text string that is based on a context. In response to detecting request 925a, computer system 600 displays a user interface that includes one or more text characters of a dynamic text string that is based on a context, such as, e.g., user interface 900b shown in FIG. 9B. In some embodiments, user interface 900b is a clock face, a watch face, a wake screen, a lock screen, and/or a home screen.

User interface 900b includes text character 908a, text character 908b, text character 908c, and text character 908d (collectively referred to as text characters 908 or text string 908). Collectively, text characters 908 form a dynamic text string that has a state based on context (e.g., one or more of text characters 908 change based on context). In the embodiment illustrated in user interface 900b, text string 908 is a digital indication of time. In some embodiments, text string 908 includes a textual representation of a day, date, location, or other information (e.g., information from an application). Text string 908 is dynamic in the sense that it is based on a context of time (e.g., text string 908 includes different numerals to indicate different times based on the current time of day).

User interface 900b includes background 906, which includes background portion 906a, background portion 906b, background portion 906c, and background portion 906d. User interface 900b is visually divided into four quadrants: upper left quadrant 904a, upper right quadrant 904b, lower left quadrant 904c, and lower right quadrant 904d. Upper left quadrant 904a includes background portion 906a and text character 908a; upper right quadrant 904b includes background portion 906b and text character 908b; lower left quadrant 904c includes background portion 906c and text character 908c; and lower right quadrant 904d includes background portion 906d and text character 908d. Text character 908a is a first digit of an hour of a time; text character 908b is a second digit of the hour of the time; text character 908c is a first digit of a minute of the time; and text character 908d is a second digit of the minute of the time.

Text characters 908 have respective appearances that include respective distributions of colors. For example, text character 908a includes character portion 908a1, character portion 908a2, and character portion 908a3. Character portion 908a1 has a first color represented by the pattern inside character portion 908a1; character portion 908a2 has a second color (e.g., black) represented by the pattern (e.g., solid fill) inside character portion 908a2; and character portion 908a3 has a third color represented by the pattern inside character portion 908a3. Background portion 906a has a fourth color represented by the pattern inside background portion 906a. Text character 908a has a distribution of colors that is defined by the size, shape, color, position, and relative spatial arrangement of character portion 908a1, character portion 908a2, and character portion 908a3. In some embodiments (e.g., as shown in upper left quadrant 904a), the color(s) of the background and a text character are selected so that the color of the background behind the text character (e.g., the color of background portion 906a behind text character 908a) is different from the color(s) of the text character that share a boundary with the background (e.g., so that the text character is visually distinguishable from the background). In some embodiments, character portion 908a2 represents a region in which character portion 908a1 and character portion 908a3 overlap. In some embodiments, portions of text characters that represents regions in which two or more other portions of a text character overlap have the same color as each other.

In some embodiments, the appearance and/or distribution of colors of a text character is based on a location of the text character. For example, in FIG. 9B, text character 908b and text character 908c represent the same numeral (e.g., "0"), but have different appearances (and different distributions of color) because they are displayed at different locations in user interface 900b. As a whole, text character 908b and text character 908c are roughly the same size and shape. However, text character 908b and text character 908c have different colors and are divided differently because they are displayed at different locations (e.g., the second hour digit and the first minute digit, respectively; or quadrant 904b and quadrant 904c, respectively). For example, text character 908b includes character portion 908b1 and character portion 908b2, and text character 908c includes character portion 908c1 and character portion 908c2. Character portion 908b1 occupies an upper portion of text character 908b and has the fourth color (e.g., the same color as background portion 906a), and character portion 908b2 occupies a lower portion of text character 908b and has the third color (e.g., the same color as character portion 908a3). In contrast, character portion 908c1 occupies a left-side portion of text character 908c and has the fourth color, and character portion 908c2 occupies a right-side portion of text character 908c and has the first color. Thus, text character 908b includes the fourth color and the third color, whereas text character 908c includes the fourth color and the first color, and text character 908b is divided primarily between top and bottom, whereas text character 908c is divided primarily between left and right.

In some embodiments, the distribution of colors for adjacent text characters are selected so that a portion of one text character and a portion of the adjacent text character that share a common boundary do not have the same color (e.g., so that the two portions are visually distinguishable and do not blend together). For example, in FIG. 9B, because character portion 908a3 of text character 908a shares a boundary with character portion 908b1 of adjacent text character 908b, the color of character portion 908a3 is selected to have a different color than character portion 908*b*1 (or the color of character portion 908*b*1 is selected to have a different color than character portion 908*a*3).

In FIG. 9B, computer system 600 displays text string 908 at a first time (e.g., a current time of 10:08). In FIG. 9C, computer system 600 displays user interface 900*b*, including text string 908, at a second time that is different from the time of FIG. 9B. For example, when the time changes from 10:08 to 10:09, computer system 600 changes text string 908 as shown in FIG. 9B to text string 908 as shown in FIG. 9C by changing text character 908*d* (e.g., "8") to text character 908*e* (e.g., "9").

In some embodiments, computer system 600 changes a first text character into a second, different text character by changing one or more portions of the first text character into the second text character. In some embodiments, changing a portion of a text character includes moving the portion, rotating the portion, enlarging the portion, shrinking the portion, and/or changing the shape of the portion. For example, text character 908*d* (e.g., "8") includes character portion 908*d*1, character portion 908*d*2, character portion 908*d*3, and character portion 908*d*4. As shown in FIG. 9C, the portions of text character 908*d* are changed to form text character 908*e*. In some embodiments, computer system 600 displays an animation of character portions 908*d*1-908*d*4 changing from the respective states in FIG. 9B to the respective states in FIG. 9C.

In some embodiments, an appearance of dynamic text string 908 is different when computer system 600 is in a reduced power operating state (e.g., computer system 600 changes text string 908 when computer system 600 transitions from a first operating state to an operating state that consumes less power than the first operating state). In some embodiments, computer system 600 enters a reduced power operating state when a set of criteria is met such as, e.g., computer system 600 does not detect an input for a threshold amount of time or detects an indication that a user is not looking at or actively using computer system 600.

FIG. 9D illustrates computer system 600 operating in a reduced power operating state. Because computer system 600 is operating in a reduced power operating state, computer system 600 displays user interface 900*c*. In user interface 900*c*, the portions of text characters 908 are represented by outlines (e.g., borders and/or outlined shapes) without a fill (e.g., interior regions of the portions of text characters 908 are hollow). In some embodiments, the outline of a portion of a text character when computer system 600 is in the reduced power operating state has the same color as the portion of the text character when computer system 600 is not in a reduced power operating state. For example, the outline of character portion 908*a*1 in FIG. 9D has the same color as the fill of character portion 908*a*1 in FIG. 9C. In some embodiments, in a reduced power operating state, portions of a text character that represent a region in which two or more other portions of a text character overlap (e.g., character portion 908*a*2 and character portion 908*d*2) include the colors of the two or more character portions that overlap (e.g., part of the outline of character portion 908*a*2 in FIG. 9D has the color of character portion 908*a*1 and part of the outline of character portion 908*a*2 in FIG. 9D has the color of character portion 908*a*3).

In some embodiments, when computer system 600 is in the reduced power operating state, one or more portions of a text character are in a different spatial arrangement (e.g., in a different location and/or orientation) relative to one or more other portions of the text character compared to the spatial arrangement when computer system 600 is not in a reduced power operating state. For example, in FIG. 9D, character portion 908*b*1 is shifted to the right relative to character portion 908*b*2 compared to the position of character portion 908*b*1 relative to character portion 908*b*2 in FIG. 9C. Also, in FIG. 9D, character portion 908*c*1 is shifted upward and rotated clockwise relative to the position of character portion 908*c*1 in FIG. 9C.

In some embodiments, portions of a text character that do not overlap when computer system 600 is not in a reduced power operating state do overlap when computer system 600 is in a reduced power operating state. For example, character portion 908*c*1 does not overlap character portion 908*c*2 in FIG. 9C, whereas character portion 908*c*1 does overlap character portion 908*c*2 in FIG. 9D.

In some embodiments, when computer system 600 is in the reduced power operating state, computer system 600 does not display (e.g., removes) background 906 or displays background 906 with a reduced brightness compared to when computer system 600 is not in a reduced power operating state. For example, in FIG. 9D, the portions of display occupied by background portions 906*a*-906*d* in FIG. 9C are blank and/or black (e.g., do not include a background). In some embodiments, computer system 600 displays an animation of user interface 900*b* in FIG. 9C transitioning to user interface 900*c* in FIG. 9D (e.g., when computer system 600 transitions from a normal operating state to a reduced power operating state).

In FIG. 9D, computer system 600 detects input 925*b* (e.g., a movement of computer system 600, such as a wrist raise gesture, a contact on display 602, a press of input mechanism 604, and/or a rotation of input mechanism 604). In response to detecting input 925*b*, computer system 600 transitions out of the reduced power operating state and displays (e.g., returns to or re-displays) user interface 900*b* in the same configuration as before computer system 600 entered the reduced power operating state (e.g., user interface 900*b*, including background 906 and text string 908, is the same in FIG. 9E as in FIG. 9C).

Figures 9E, 9F, 9G, 9H:
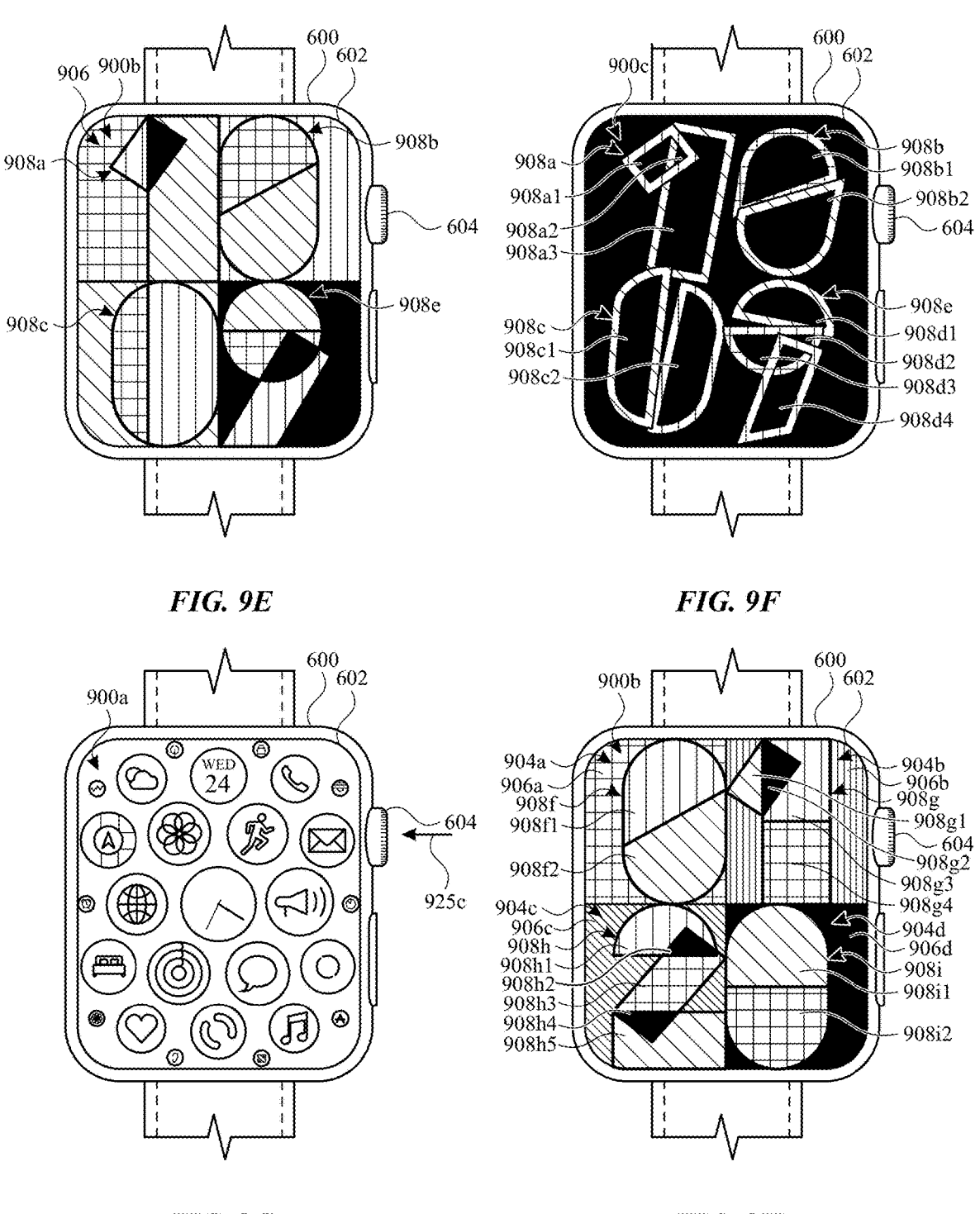

In FIG. 9F, computer system 600 is in (e.g., enter or re-enters) a reduced power operating state. Because computer system 600 is in the reduced power operating state, computer system displays (e.g., re-displays or returns to) user interface 900*c*. In FIG. 9F, similar to user interface 900*c* in FIG. 9D, background 906 is not displayed (or displayed at a reduced brightness), the portions of text characters 908 are displayed as outlines without fill, and the spatial arrangement of the portions of text characters 908 is different compared to the spatial arrangement of the portions of text characters 908 in FIG. 9E. However, the spatial arrangement of the portions of text characters 908 is different in FIG. 9F (e.g., the second illustrated instance of user interface 900*c* when computer system 600 is in a reduced power operating state) compared to the spatial arrangement of the portions of text characters 908 in FIG. 9D (e.g., the first illustrated instance of user interface 900*c* when computer system 600 is in a reduced power operating state). For example, character portion 908*b*1 is shifted to the left relative to character portion 908*b*2 in FIG. 9F, whereas character portion 908*b*1 is shifted to the right relative to character portion 908*b*2 in FIG. 9D; and character portion 908*a*3 is oriented in a clockwise direction in FIG. 9F compared to the orientation of character portion 908*a*3 in FIG. 9D.

Turning to FIG. 9G, computer system 600 displays user interface 900*a* (e.g., the same user interface displayed in FIG. 9A) at a different time than when computer system 600 displays user interface 900*a* in FIG. 9A. In FIG. 9G, computer system 600 detects request 925*c* (e.g., another request) to display a user interface (e.g., 900*b*) that includes one or more text characters of a dynamic text string that is based on a context. In response to detecting request 925*c*, computer system 600 displays user interface 900*b* with text string 908 as shown in FIG. 9H. In FIG. 9H, text string 908 indicates a time of 01:20 with text character 908*f* (e.g., "0"), text character 908*g* (e.g., "1"), text character 908*h* (e.g., "2"), and text character 908*i* (e.g., "0"). Text character 908*f* includes character portions 908*f*1 and 908*f*2; text character 908*g* includes character portions 908*g*1-, 908*g*2, 908*g*3, and 908*g*4; text character 908*h* includes character portions 908*h*1, 908*h*2, 908*h*3, 908*h*4, and 908*h*5; and text character 908*i* includes character portions 908*i*1 and 908*i*2.

Similar to text string 908 in FIGS. 9B and 9C, the individual text characters of text string 908 have an appearance and/or a distribution of colors that is based on the location of the text character. For example, text character 908*f* and text character 908*i* both represent the same numeral (e.g., "0") but have different distributions of colors, as represented by, e.g., the shapes and fill patterns of character portions 908*f*1, 908*f*2, 908*i*1, and 908*i*2. Also, because text character 908*f* is in a different location (e.g., upper left quadrant 904*a*) from text character 908*b* and text character 908*c* (e.g., in FIGS. 9B-9F), text character 908*f* has a different appearance and/or distribution of colors from text character 908*b* and text character 908*c* (e.g., even though text character 908*f*, text character 908*b*, and text character 908*c* all represent the same numeral). Similarly, because text character 908*i* is in a different location (e.g., lower right quadrant 904*d*) from text character 908*b* and text character 908*c* (e.g., in FIGS. 9B-9F), text character 908*i* has a different appearance and/or distribution of colors from text character 908*b* and text character 908*c* (e.g., even though text character 908*i*, text character 908*b*, and text character 908*c* all represent the same numeral). Also, because text character 908*g* is in a different location (e.g., upper right quadrant 904*b*) from text character 908*a* (e.g., in upper left quadrant 904*b* in FIGS. 9B-9F), text character 908*g* has a different appearance and/or distribution of colors from text character 908*a* (e.g., even though text character 908*a* and text character 908*g* both represent the same numeral).

Background portion 906*a* in FIG. 9H has the same color as in FIGS. 9B, 9C, and 9E. Similarly, background portion 906*d* in FIG. 9H has the same color as in FIGS. 9B, 9C, and 9E. However, background portion 906*b* in upper right quadrant 904*b* has a different color than in FIGS. 9B, 9C, and 9E because character portion 908*g*3 has the same color that background portion 906*b* has in FIGS. 9B, 9C, and 9E. To distinguish character portion 908*g*3 from background portion 906*b*, a different color is selected for background portion 906*b* than for character portion 908*g*3. In FIG. 9H, background element 906*b* has a darker hue of the color of background portion 906*b* in FIGS. 9B, 9C, and 9E. For example, the pattern within background element 906*b* in FIG. 9H has the same style as in FIGS. 9B, 9C, and 9E, representing the same base color, but has a greater density, representing the darker hue. Similarly, to distinguish character portion 908*h*5 from background portion 906*c*, a different color is selected for background portion 906*c* than for character portion 908*h*5. In FIG. 9H, background element 906*c* has a darker hue of the color of background element 906*c* in FIGS. 9B, 9C, and 9E. For example, the pattern within background element 906*b* in FIG. 9H has the same style as in FIGS. 9B, 9C, and 9E, representing the same base color, but has a greater density, representing the darker hue. Similarly, in FIGS. 9S, 9T, 9U, 9V, 9W, and 9X described below, portions of user interface 900*b* that have the same pattern style but different pattern densities (e.g., different densities of vertical or diagonal lines) have the same base color but different hues.

FIG. 9I shows computer system 600 in a reduced power operating state at time 01:20. Because computer system 600 is in a reduced power operating state, computer system 600 displays user interface 900*c*. Similar to user interface 900*c* in FIGS. 9D and/or 9F, the text characters of text string 908 in FIG. 9I are displayed with outlines of the portions that have the same colors as the colors of the respective portions in FIG. 9H. Also, the spatial arrangements of the portions of text characters 908 in FIG. 9I are different than in FIG. 9H, and background 906 is not shown (e.g., removed) or displayed at a lower brightness compared to background 906 in FIG. 9H. In some embodiments, computer system 600 displays an animation of user interface 900*b* in FIG. 9H transitioning to user interface 900*c* in FIG. 9I (e.g., when computer system 600 transitions from a normal operating state, such as in FIG. 9H, to a reduced power operating state, such as in FIG. 9I).

In FIG. 9I, computer system 600 detects input 925*d* (e.g., a movement of computer system 600, such as a wrist raise gesture, a contact on display 602, a press of input mechanism 604, and/or a rotation of input mechanism 604). In response to detecting input 925*d*, computer system 600 transitions out of the reduced power operating state and displays (e.g., re-displays and/or returns to) user interface 900*b* as shown in FIG. 9J (e.g., the same user interface shown in FIG. 9H).

Figures 9K, 9L, 9M, 9N:
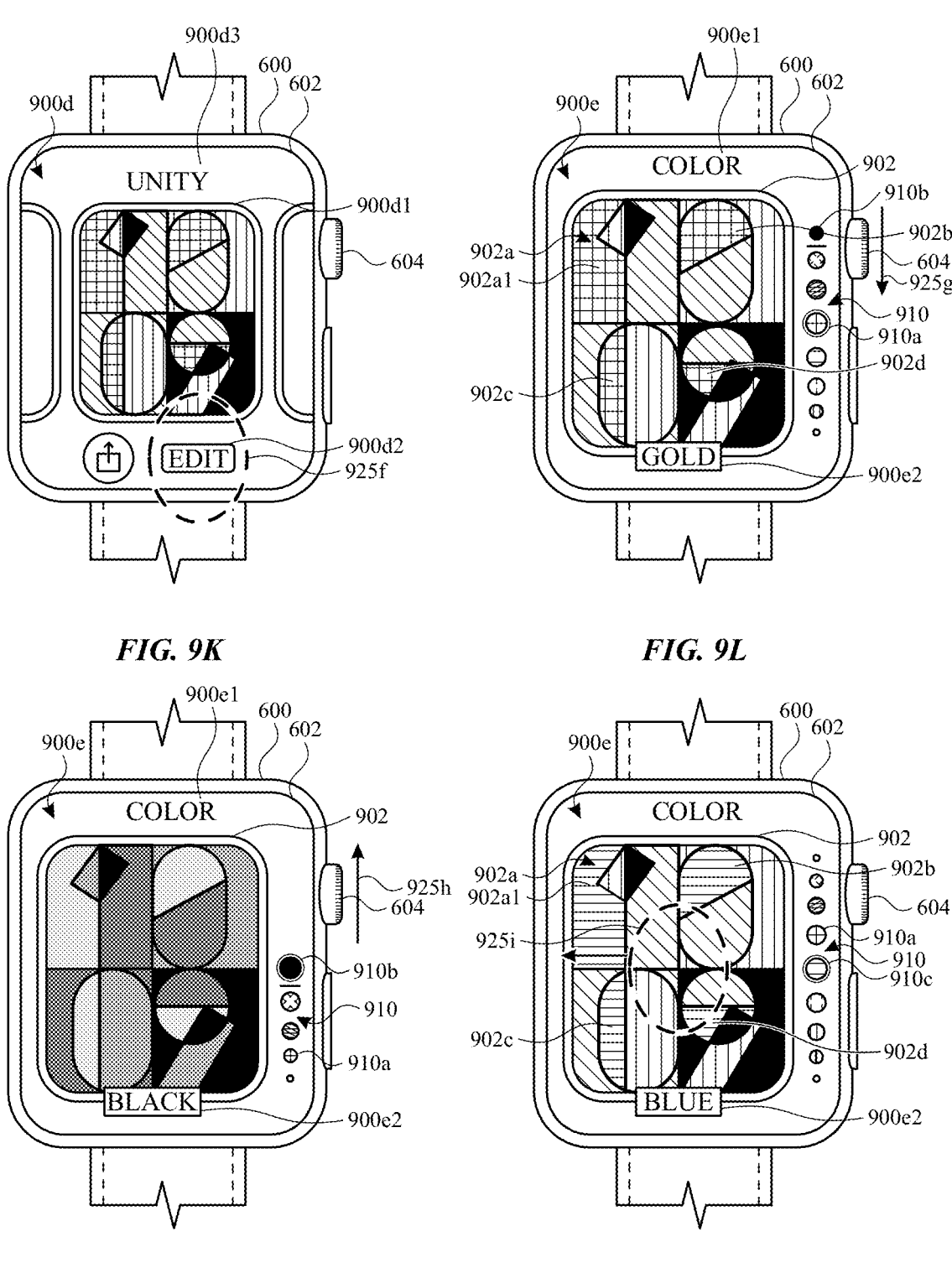

In FIG. 9J, computer system 600 detects request 925*e* (e.g., a tap on display 602 and/or other input) to initiate a process for editing user interface 900*b*. In response to detecting request 925*e*, computer system 600 displays editing user interface 900*d* as shown in FIG. 9K. Editing user interface 900*d* includes representation 900*d*1 of user interface 900*b*, selectable edit option 900*d*2, and interface identifier 900*d*3. Representation 900*d*1 provides a representation of an appearance of user interface 900*b* based on current settings for user interface 900*b*, such as color and/or background settings.

In FIG. 9K, computer system 600 detect input 925*f* (e.g., a tap and/or other selection input) corresponding to selection of edit option 900*d*2 (e.g., a request to continue the process for editing user interface 900*b*). In response to detecting input 925*f*, computer system 600 displays editing user interface 900*e* for changing one or more characteristics of user interface 900*b*, as shown in FIG. 9L. Editing user interface 900*e* provides a capability to select and/or change a color scheme (e.g., to select and/or change one or more colors) of user interface 900*b*.

Editing user interface 900*e* includes dynamic representation 902 of user interface 900*b*, parameter indicator 900*e*1, parameter value indicator 900*e*2, and color scheme selector 910. Dynamic representation 902 updates as options are selected and/or changed in editing user interface 900*e* and editing user interface 900*f* (described below) to provide a representation of an appearance of user interface 900*b* based on currently selected options. Parameter indicator 900*e*1 indicates the parameter that can be selected and/or changed using editing user interface 900*e*. In FIG. 9L, parameter indicator 900*e*1 indicates that a color (or color scheme) can be edited using editing user interface 900*e*. Parameter value indicator 900*e*2 indicates the currently selected value (e.g., "GOLD") of the parameter that can be edited using editing user interface 900*e* (e.g., the currently selected color of the color scheme for user interface 900*b*). Color scheme selector 910 includes color scheme options (e.g., the vertical array of circles on the right side of representation 902 in FIG. 9L). Color scheme option 910a represents the currently selected color scheme option (e.g., "GOLD"), as indicated by color scheme option 910a having a larger size than the other color scheme options, being in a center position (e.g., center vertical position) of user interface 900e, and being outlined compared to other color scheme options.

In some embodiments, some color scheme options apply to (or affect) only certain portions (e.g., a limited number of portions) of the appearance of user interface 900b and/or only certain portions (e.g., a limited number of portions) of the distributions of colors of text characters 908 in user interface 900b. For example, color scheme option 910a applies only to portions of user interface 900b that have the fourth color described above with reference to FIG. 9B (e.g., background portion 906a (represented by portion 902a1 in representation 902), character portion 908b1 (represented by portion 902b in representation 902), character portion 908c1 (represented by portion 902c in representation 902), character portion 908d3 (represented by portion 902d in representation 902), and portions of other text characters, such as the text characters shown in FIG. 9Y, that when displayed, have the fourth color).

In some embodiments, some color scheme options apply to additional portions of the appearance of user interface 900b and/or the distributions of colors of text characters 908. For example, in FIG. 9L, computer system 600 detects request 925g (e.g., a rotation of input mechanism 604 in a first direction or other selection input) to select a different color scheme option in color scheme selector 910. In response to detecting request 925g, computer system 600 changes the currently selected color scheme option to color scheme option 910b and updates dynamic representation 902 to represent the appearance of user interface 900b according to the current settings, as shown in FIG. 9M. For example, in color scheme selector 910, color scheme option 910b has a larger size than the other color scheme options, is in a center position of user interface 900e, and is outlined compared to other color scheme options. As indicated by parameter value indicator 900e2, color scheme option 910b corresponds to a black and white (or grey scale) color scheme in which some or all of user interface 900b is displayed in black, white, and/or tones between black and white, as shown in representation 902.

In FIG. 9M, computer system 600 detects request 925h (e.g., a rotation of input mechanism 604 in a direction opposite the direction of request 925g, a swipe gesture, a vertical swipe gesture, a tap and drag gesture, a tap and vertical drag gesture, or other selection input) to select a different color scheme option in color scheme selector 910. In response to detecting request 925h, computer system 600 changes the currently selected color scheme option to color scheme option 910c (e.g., "BLUE" as indicated by parameter value indicator 900e2) and updates dynamic representation 902 to represent the appearance of user interface 900b according to the current settings, as shown in FIG. 9N. For example, in color scheme selector 910, color scheme option 910c has a larger size than the other color scheme options, is in a center position of user interface 900e, and is outlined compared to other color scheme options. Similar to color scheme option 910a, color scheme option 910c applies only to portions of user interface 900b that have the fourth color described above with reference to FIG. 9B (e.g., background portion 906a, character portion 908b1 (represented by portion 902b in representation 902), character portion 908c1 (represented by portion 902c in representation 902), and character portion 908d3 (represented by portion 902d in representation 902)). For example, when color scheme option 910c is selected, background portion 906a (e.g., represented by portion 902a1 in representation 902), character portion 908b1 (e.g., represented by portion 902b in representation 902), character portion 908c1 (e.g., represented by portion 902c in representation 902), and character portion 908d3 (e.g., represented by portion 902d in representation 902) have a fifth color (e.g., blue) instead of the fourth color (e.g., gold), while all other portions of user interface 900b have the same color as in FIG. 9B. In this way, a user can change a single color in user interface 900b (e.g., the user can change the fourth color to the fifth color, without changing any other colors). For example, any portions of user interface 900b that would have the fourth color when color scheme option 910a is selected will instead have the fifth color when color scheme option 910c is selected, whereas other portions (e.g., all other portions) of user interface 900b have the same respective colors regardless of whether color scheme option 910a is selected or color scheme option 910c is selected.

In FIG. 9N, computer system 600 detects request 925i (e.g., a swipe gesture, a horizontal swipe gesture, a tap and drag gesture, a tap and horizontal drag gesture, or other input) to display an interface for selecting, editing, and/or changing a different parameter of user interface 900b. In response to detecting request 925i, computer system 600 displays user interface 900f shown in FIG. 9O. Editing user interface 900f provides a capability to select and/or change a background scheme (e.g., a color and/or existence of a background) of user interface 900b. Editing user interface 900f includes dynamic representation 902 of user interface 900b, parameter indicator 900f1 (e.g., parameter indicator 900e1 ("COLOR") is changed to and/or replaced with parameter indicator 900f1 ("BACKGROUND")), parameter value indicator 900f2 (e.g., parameter value indicator 900e2 is changed to and/or replaced with parameter value indicator 900f2), and parameter value position indicator 912. Parameter value indicator 900f2 indicates the currently selected value (e.g., "ON") of the parameter that can be edited using editing user interface 900f (e.g., whether the background is turned on or off for user interface 900b). Parameter value position indicator 912 indicates a position of a currently selected background scheme option within a set background scheme options (e.g., a set of available background scheme options, such as ON and OFF) and an amount of background scheme options (e.g., based on the size of the white bar in parameter value position indicator 912 and/or the percentage of parameter value position indicator 912 occupied by the white bar). In FIG. 9O, because the currently selected value of the background scheme is ON, representation 902 includes background 902a, represented by representative background portions 902a1, 902a2, 902a3, and 902a4 (e.g., corresponding to background portions 906a, 906b, 906c, and 906d, respectively).

In FIG. 9O, computer system 600 detects request 925j (e.g., a swipe gesture, a swipe up gesture, a tap and drag gesture, a tap and drag up gesture, a rotation of input mechanism 604, and/or other selection input) to select a different background scheme option. As shown in FIG. 9P, in response to detecting request 925j, computer system 600 sets (e.g., changes) the background scheme value to off (e.g., disabled), parameter value indicator 900f2 indicates that the currently selected value of the background scheme parameter is off, and representation 902 displays a representation of user interface 900b without a background (or with background 906 in a dimmed state).

In FIG. 9P, computer system 600 detects request 625*k* (e.g., a press of input mechanism 604 and/or other input) to exit (e.g., cease display of) editing user interface 900*f* and display user interface 900*b* with the currently selected settings. In response to detecting request 625*k*, computer system 600 displays user interface 900*b* as shown in FIG. 9Q. In FIG. 9Q, computer system 600 displays user interface 900*b* according to the settings selected with editing user interface 900*e* (e.g., in FIG. 9N) and editing user interface 900*f* (e.g., in FIG. 9P). For example, computer system 600 displays user interface 900*b* having a blue color scheme (e.g., as set in FIG. 9N) and no background (e.g., as set in FIG. 9P). The selected options also affect the appearance and/or distributions of colors in user interface 900*c* (e.g., when computer system 600 is in a reduced power operating state) according to the relationships between user interface 900*b* and user interface 900*c* described above with reference to, e.g., FIGS. 9C, 9D, 9E, 9F, 9H, and 9I.

Figures 9R, 9S, 9T, 9U:
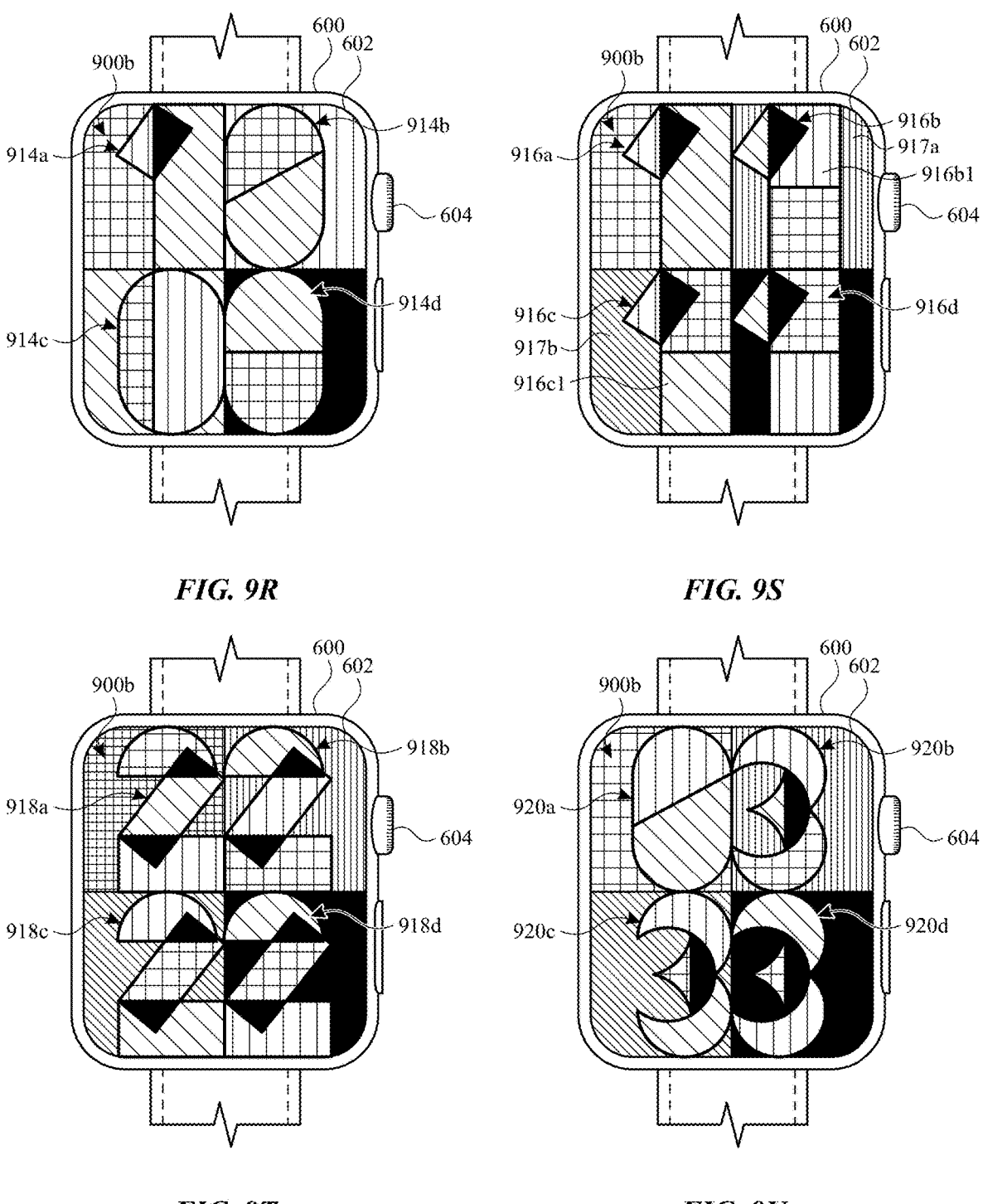
Figure 9Y:
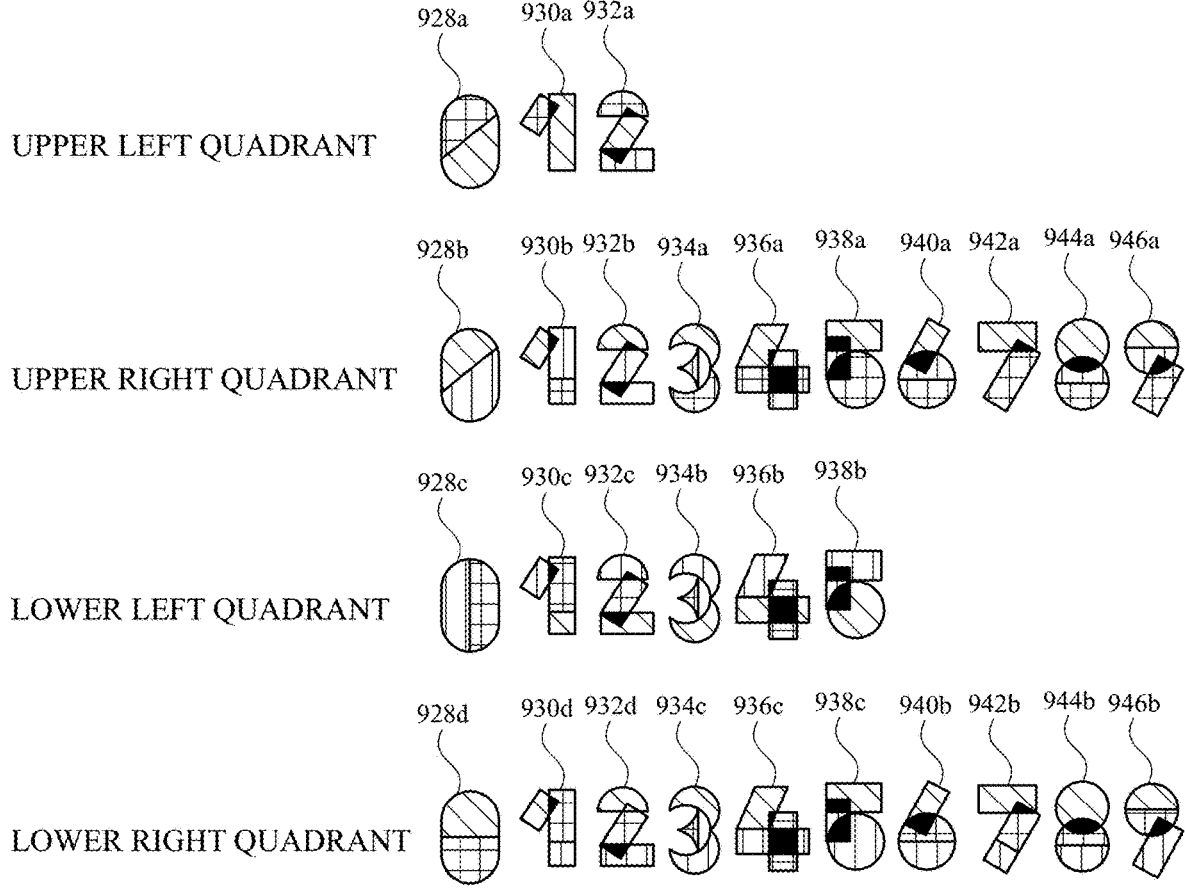

FIGS. 9R-9X illustrate examples of user interface 900*b* representing various different times. FIG. 9R illustrates an embodiment of user interface 900*b* at a time of 10:00. In FIG. 9R, user interface 900*b* includes text characters 914*a*, 914*b*, 914*c*, and 914*d*, collectively referred to as dynamic text string 914. Dynamic text string 914 represents the time 10:00. In FIG. 9R, text characters 914*b*, 914*c*, and 914*d* each represent the same numeral (e.g., "0"), but have different appearances (and different distributions of colors) because they are displayed at different locations.

FIG. 9S illustrates an embodiment of user interface 900*b* at a time of 11:11. In FIG. 9S, user interface 900*b* includes text characters 916*a*, 916*b*, 916*c*, and 916*d*, collectively referred to as dynamic text string 916. Dynamic text string 916 represents the time 11:11. In FIG. 9S, text characters 916*a*, 916*b*, 916*c*, and 916*d* each represent the same numeral (e.g., "1"), but have different appearances (and different distributions of colors) because they are displayed at different locations.

FIG. 9T illustrates an embodiment of user interface 900*b* at a 24-hour time (e.g., 24-hour military time) of 22:22 (e.g., 10:22 PM). In FIG. 9T, user interface 900*b* includes text characters 918*a*, 918*b*, 918*c*, and 918*d*, collectively referred to as dynamic text string 918. Dynamic text string 918 represents the 24-hour time 22:22. In FIG. 9T, text characters 918*a*, 918*b*, 918*c*, and 918*d* each represent the same numeral (e.g., "2"), but have different appearances (and different distributions of colors) because they are displayed at different locations.

FIG. 9U illustrates an embodiment of user interface 900*b* at a time of 03:33. In FIG. 9U, user interface 900*b* includes text characters 920*a*, 920*b*, 920*c*, and 920*d*, collectively referred to as dynamic text string 920. Dynamic text string 920 represents the time 03:33. In FIG. 9U, text characters 920*b*, 920*c*, and 920*d* each represent the same numeral (e.g., "3"), but have different appearances (and different distributions of colors) because they are displayed at different locations.

FIG. 9V illustrates an embodiment of user interface 900*b* at a time of 04:44. In FIG. 9V, user interface 900*b* includes text characters 922*a*, 922*b*, 922*c*, and 922*d*, collectively referred to as dynamic text string 922. Dynamic text string 922 represents the time 04:44. In FIG. 9V, text characters 922*b*, 922*c*, and 922*d* each represent the same numeral (e.g., "4"), but have different appearances (and different distributions of colors) because they are displayed at different locations.

FIG. 9W illustrates an embodiment of user interface 900*b* at a time of 05:55. In FIG. 9W, user interface 900*b* includes text characters 924*a*, 924*b*, 924*c*, and 924*d*, collectively referred to as dynamic text string 924. Dynamic text string 924 represents the time 05:55. In FIG. 9W, text characters 924*b*, 924*c*, and 924*d* each represent the same numeral (e.g., "5"), but have different appearances (and different distributions of colors) because they are displayed at different locations.

FIG. 9X illustrates an embodiment of user interface 900*b* at a time of 06:07. In FIG. 9X, user interface 900*b* includes text characters 926*a*, 926*b*, 926*c*, and 926*d*, collectively referred to as dynamic text string 926. Dynamic text string 926 represents the time 06:07. Text character 926*b* is an embodiment of a representation of the numeral "6", and text character 926*d* is an embodiment of a representation of the numeral "7".

FIG. 9Y illustrates embodiments of text characters and their appearances and distributions of colors corresponding to different locations in user interface 900*b*. Text characters 928*a*, 928*b*, 928*c*, and 928*d* illustrate the appearance and distribution of colors of the numeral "0" when displayed in the upper left quadrant (e.g., 904*a*), the upper right quadrant (e.g., 904*b*), lower left quadrant (e.g., 904*c*), and lower right quadrant (e.g., 904*d*), respectively. As shown, text characters 928*a*, 928*b*, 928*c*, and 928*d* each have a different distribution of colors. Text characters 930*a*, 930*b*, 930*c*, and 930*d* illustrate the appearance and distribution of colors of the numeral "1" when displayed in the upper left quadrant (e.g., 904*a*), the upper right quadrant (e.g., 904*b*), lower left quadrant (e.g., 904*c*), and lower right quadrant (e.g., 904*d*), respectively. As shown, text characters 930*a*, 930*b*, 930*c*, and 930*d* each have a different distribution of colors. Text characters 932*a*, 932*b*, 932*c*, and 932*d* illustrate the appearance and distribution of colors of the numeral "2" when displayed in the upper left quadrant (e.g., 904*a*), the upper right quadrant (e.g., 904*b*), lower left quadrant (e.g., 904*c*), and lower right quadrant (e.g., 904*d*), respectively. As shown, text characters 932*a*, 932*b*, 932*c*, and 932*d* each have a different distribution of colors. Text characters 934*a*, 934*b*, and 934*c* illustrate the appearance and distribution of colors of the numeral "3" when displayed in the upper right quadrant (e.g., 904*b*), lower left quadrant (e.g., 904*c*), and lower right quadrant (e.g., 904*d*), respectively. As shown, text characters 934*a*, 934*b*, and 934*c* each have a different distribution of colors. Text characters 936*a*, 936*b*, and 936*c* illustrate the appearance and distribution of colors of the numeral "4" when displayed in the upper right quadrant (e.g., 904*b*), lower left quadrant (e.g., 904*c*), and lower right quadrant (e.g., 904*d*), respectively. As shown, text characters 936*a*, 936*b*, and 936*c* each have a different distribution of colors. Text characters 938*a*, 938*b*, and 938*c* illustrate the appearance and distribution of colors of the numeral "5" when displayed in the upper right quadrant (e.g., 904*b*), lower left quadrant (e.g., 904*c*), and lower right quadrant (e.g., 904*d*), respectively. As shown, text characters 938*a*, 938*b*, and 938*c* each have a different distribution of colors. Text characters 940*a* and 940*b* illustrate the appearance and distribution of colors of the numeral "6" when displayed in the upper right quadrant (e.g., 904*b*) and lower right quadrant (e.g., 904*d*), respectively. As shown, text characters 940*a* and 940*b* have different distributions of colors. Text characters 942*a* and 942*b* illustrate the appearance and distribution of colors of the numeral "7" when displayed in the upper right quadrant (e.g., 904*b*) and lower right quadrant (e.g., 904*d*), respectively. As shown, text characters 942*a* and 942*b* have different distributions of colors. Text characters 944*a* and 944*b* illustrate the appearance and distribution of colors of the numeral "8" when displayed in the upper right quadrant (e.g., 904*b*) and lower right quadrant (e.g., 904*d*), respectively. As shown, text characters 944*a* and 944*b* have different distributions of colors. Text characters 946*a* and 946*b* illustrate the appearance and distribution of colors of the numeral "9" when displayed in the upper right quadrant (e.g., 904*b*) and lower right quadrant (e.g., 904*d*), respectively. As shown, text characters 946*a* and 946*b* have different distributions of colors.

FIG. 10 is a flow diagram illustrating a method for displaying a user interface that includes a dynamic text string in accordance with some embodiments. Method 1000 is performed at a computer system (e.g., 100, 300, 500, 600, a smartphone, a smartwatch, a tablet computer, a laptop computer, a desktop computer, and/or a head mounted device such as, e.g., a head mounted augmented reality and/or extended reality device) that is in communication with a display generation component (e.g., 602, a display controller, a touch-sensitive display system, a monitor, and/or a head mounted display system) and one or more input devices (e.g., 602, 604, 606, a touch-sensitive surface, a physical button, a rotatable input mechanism, a rotatable and depressible input mechanism, a motion sensor, an accelerometer, a gyroscope, a keyboard, a controller, and/or a mouse). Some operations in method 1000 are, optionally, combined, the orders of some operations are, optionally, changed, and some operations are, optionally, omitted.

As described below, method 1000 provides an intuitive way for displaying a user interface that includes a dynamic text string. The method reduces the cognitive burden on a user for displaying a user interface that includes a dynamic text string, thereby creating a more efficient human-machine interface. For battery-operated computing devices, enabling a user to display a user interface that includes a dynamic text string faster and more efficiently conserves power and increases the time between battery charges.

The computer system detects (1002), via the one or more input devices, a request to display a user interface (e.g., 900*b*, 900*c*, a clock face user interface, a watch face user interface, a wake screen, and/or a lock screen) that includes one or more text characters (e.g., 908*a*-908*i*, 914*a*-914*d*, 916*a*-916*d*, 918*a*-918*d*, 920*a*-920*d*, 922*a*-922*d*, 924*a*-924*d*, 926*a*-926*d*, 928*a*-928*d*, 930*a*-930*d*, 932*a*-932*d*, 934*a*-934*c*, 936*a*-936*c*, 938*a*-938*c*, 940*a*, 940*b*, 942*a*, 942*b*, 944*a*, 944*b*, 946*a*, 946*b*, an alphanumeric character, a letter, and/or a numeral such as, e.g., "0", "1", "2", "3", "4", "5", "6", "7", "8", or "9") that are part of a dynamic text string (e.g., 908, 914, 916, 918, 920, 922, 924, and/or 926) that changes based on a context of the computer system (e.g., a date, time, location and/or other contextual parameter that changes periodically).

In some embodiments, a wake screen is a user interface that is displayed (e.g., initially displayed) when the computer system transitions from an inactive state, low-power state, off state, and/or sleep state to an active state, full-power state, on state, and/or awake state. In some embodiments, the request includes a contact (e.g., a tap, swipe, or other gesture) on a touch-sensitive surface. In some embodiments, the request includes motion (e.g., change in position, change in spatial arrangement, rotation, and/or change in orientation) of at least a portion of the computer system (e.g., motion that satisfies a set of motion criteria, such as motion that is indicative of a wrist raise gesture, picking up the computer system, an intent to view the display generation component, and/or an intent to interact with the computer system). In some embodiments, the request includes a press of a button (e.g., a physical button) and/or a depressible input mechanism (e.g., a rotatable and depressible input mechanism). In some embodiments, the request includes rotation of a rotatable input mechanism (e.g., a rotatable and depressible input mechanism). In some embodiments, the request includes an audio input (e.g., a voice command). In some embodiments, the request includes a gesture (e.g., an air gesture, a wrist raise gesture, a wrist rotation gesture, covering the display generation component, and/or uncovering the display generation component).

Examples of a context of the computer system include, but are not limited to: a state of an activity (e.g., moving, exercising, standing, walking, and/or running); a state of a workout (e.g., duration, remaining duration, time, time remaining, steps, strides, strokes, sets, repetitions, distance, and/or speed); a state of an alarm, stopwatch, or timer; a state, position, and/or phase of an astronomical object; a playback state of audio and/or video content (e.g., a song, audio recording, video, movie, podcast, audiobook, or TV show); a state of a calendar event (e.g., upcoming, in progress, or overdue); a status of a recording, a battery state; a network (e.g., a cellular, data, and/or Wi-Fi) status; heart rate; a state of an external device (e.g., a controllable external device, an accessory, a light, a thermostat, a camera, a plug, an appliance, and/or a speaker); a status of an email message (e.g., sent, received, unread, or read); a status of a text message (e.g., sent, delivered, not delivered, and/or read); a state of a navigation activity (e.g., planned, en route, estimated time remaining, and/or length of trip); a state (e.g., calling, connected, or duration) of a call (e.g., a phone call, an audio call, and/or a video call); a state of a stock (e.g., current value, percent change, and/or price range); and/or a weather state (e.g., current condition, forecasted condition, temperature, temperature range, humidity, pressure, air quality, UV index, wind speed and/or direction, precipitation, wind chill, and/or visibility).

In response to detecting the request to display the user interface, the computer system displays (1004), via the display generation component, the user interface (e.g., 900*b* or 900*c*), including displaying (1006) a first text character (e.g., 908*a*-908*i*, 914*a*-914*d*, 916*a*-916*d*, 918*a*-918*d*, 920*a*-920*d*, 922*a*-922*d*, 924*a*-924*d*, 926*a*-926*d*, 928*a*-928*d*, 930*a*-930*d*, 932*a*-932*d*, 934*a*-934*c*, 936*a*-936*c*, 938*a*-938*c*, 940*a*, 940*b*, 942*a*, 942*b*, 944*a*, 944*b*, 946*a*, 946*b*, an alphanumeric character, a letter, and/or a numeral such as, e.g., "0", "1", "2", "3", "4", "5", "6", "7", "8", or "9") of the dynamic text string in the user interface. In some embodiments, the user interface includes two or more (e.g., 2, 3, 4, 5, 8, or 10) visually distinct portions (e.g., quadrants, such as a top left quadrant, top right quadrant, bottom left quadrant, and bottom right quadrant) that can include respective text characters. In some embodiments, a text character includes two or more visually distinct portions. In some embodiments, the two or more visually distinct portions include respective visually distinct boundaries. In some embodiments, a first visually distinct portion of the text character overlaps with one or more other visually distinct portions (e.g., a second portion, a third portion, and/or a fourth portion) of the text character.

Displaying the first text character includes: in accordance with a determination that the first text character of the dynamic text string is displayed at a first location (e.g., 904*a*, 904*b*, 904*c*, 904*d*, a first quadrant, or first region) in the user interface, displaying (1008) the first text character having a first appearance (e.g., a visual appearance, a shape, a combination of shapes, a color, a combination of colors, an arrangement of shapes and/or colors, a size, a brightness, a shading, a pattern, and/or an orientation) that includes a first distribution of colors (e.g., a combination of 908*a*1, 908*a*2, and/or 908*a*3; a combination of 908*b*1 and 908*b*2; a combination of 908*c*1 and 908*c*2; a combination of 908*d*1, 908*d*2, 908*d*3, and/or 908*d*4; a combination of 908*f*1 and 908*f*2; a combination of 908*g*1, 908*g*2, 908*g*3, and/or 908*g*4; a combination of 908*h*1, 908*h*2, 908*h*3, 908*g*4, and/or 908*h*5; and/or a combination of 908*i*1 and 908*i*2) (e.g., the appearance of the first character is based on a distribution of colors); and in accordance with a determination that the first text character of the dynamic text string is displayed at a second location (e.g., a second quadrant or second region) in the user interface that is different from the first location in the user interface, displaying (1010) the first text character having a second appearance that is different from the first appearance that includes a second distribution of colors that is different from the first distribution of colors.

In some embodiments, a distribution of colors includes a position, arrangement (e.g., spatial arrangement), configuration, and/or frequency of occurrence of one or more colors (or one or more shapes having one or more colors) over an area, such as at least a portion of a text character (or at least a portion of an area occupied by a text character).

In some embodiments, the first distribution of colors includes a first set of colors, and the second distribution of colors includes the first (e.g., the same) set of colors (e.g., the same set of colors as the first distribution of colors in a different arrangement). In some embodiments, a text character (e.g., the first text character) includes a plurality of portions (e.g., visually distinct portions) that have a first distribution of colors in the first appearance; and the plurality of portions have a second (different) distribution of colors in the second appearance (e.g., one or more portions have a color in the first appearance that is different from a color of the respective portion in the second appearance). In some embodiments, the first text character includes a plurality of portions that have respective positions, spatial arrangements, sizes, shapes, and colors in the first appearance; and the plurality of portions have the same respective positions, spatial arrangements, sizes, and shapes in the second appearance as in the first appearance, but the respective colors of one or more of the plurality of portions is different in the second appearance than in the first appearance.

In some embodiments, the dynamic text string includes a word and/or one or more letters (e.g., the first text character is a letter). In some embodiments, the dynamic text string includes a day (or an abbreviation of a day) spelled out with letters (e.g., "Sunday," "Sun," "Monday," "Mon," "Tuesday," "Tues," "Wednesday," "Wed," "Thursday," "Thur," "Friday," "Fri," "Saturday," and/or "Sat"), a month (or an abbreviation of a month) spelled out with letters (e.g., "January," "Jan," "February," "Feb," "November," or "Nov."), a date (or a portion of a date) spelled out with letters (e.g., "May Fifth, Two-thousand Twenty Three"), and/or a time (or a portion of a time) spelled out with letters (e.g., "Ten Thirty AM").

Automatically displaying the first text character of the dynamic text string with an appearance and a distribution of colors based on the location at which the first text character is displayed is more efficient, faster, and requires fewer inputs than a user manually creating the appearance of the first text character with the distribution of colors, thereby reducing the number of inputs needed to perform an operation. Automatically displaying the first text character of the dynamic text string with an appearance that is based on the location at which the first text character is displayed makes it easier to operate the computer system with fewer errors by distinguishing the location of the first text character by the appearance (including the distribution of colors) of the first text character, thereby providing improved visual feedback to the user, reducing the number of inputs needed to perform an operation, and performing an operation when a set of conditions has been met without requiring further user input.

In some embodiments, displaying the user interface includes: in accordance with a determination that the computer system is operating in a first context (e.g., a first time, date, and/or location), displaying, in the user interface, the dynamic text string having a first configuration of characters (e.g., a first set of characters, order of characters, and/or placement of characters) (e.g., 908, 914, 916, 918, 920, 922, 924, and/or 926); and in accordance with a determination that the computer system is operating in a second context (e.g., a second time, date, and/or location) (e.g., 908, 914, 916, 918, 920, 922, 924, and/or 926) that is different from the first context, displaying, in the user interface, the dynamic text string having a second configuration of characters (e.g., a second set of characters, order of characters, and/or placement of characters) that is different from the first configuration of characters. Automatically displaying the first text character of the dynamic text string with a configuration of characters that is based on the context in which the computer system is operating is more efficient, faster, and requires fewer inputs than a user manually creating the configuration of characters, thereby reducing the number of inputs needed to perform an operation. Automatically displaying the first text character of the dynamic text string with a configuration of characters that is based on the context in which the computer system is operating makes it easier to operate the computer system with fewer errors by distinguishing the context of the computer system by the configuration of the first text character, thereby providing improved visual feedback to the user, reducing the number of inputs needed to perform an operation, and performing an operation when a set of conditions has been met without requiring further user input.

In some embodiments, the dynamic text string indicates a time (e.g., a current time and/or a digital representation of a time) (e.g., 908, 914, 916, 918, 920, 922, 924, and/or 926) (or, in some embodiments, a portion of a time indicated by one or more text characters). In some embodiments, the dynamic text string includes (e.g., is) an indication of time (e.g., a digital indication of time) and the first character is a digit in the indication of time (e.g., a digit in a digital representation of an hour of the time, such as "1" or "2" in "12:35", or a digit in a digital representation of a minute of the time, such as "3" or "5" in "12:35"). Automatically displaying the first text character of the dynamic text string with an appearance that is based on the location at which the first text character is displayed makes it easier to operate the computer system with fewer errors by identifying the time by the appearance (including the distribution of colors) of the dynamic text string, thereby providing improved visual feedback to the user, reducing the number of inputs needed to perform an operation, and performing an operation when a set of conditions has been met without requiring further user input.

In some embodiments, the first location corresponds to a first portion (e.g., a first digit) of the time (e.g., the first location corresponds to a location of a first digit of a digital representation of the time); and the second location corresponds to a second portion (e.g., a second digit) of the time (e.g., the second location corresponds to a location of a second digit of the digital representation of the time) that is different from the first portion of the time. Automatically displaying the first text character with an appearance that is based on a location corresponding to a portion of a time makes it easier to operate the computer system with fewer errors by distinguishing the portion of the time represented by the first text character by the appearance (including the distribution of colors) of the first text character, thereby providing improved visual feedback to the user, reducing the number of inputs needed to perform an operation, and performing an operation when a set of conditions has been met without requiring further user input.

In some embodiments, the first portion of the time includes (e.g., is) a first digit of a digital representation of an hour of the time (e.g., the first text character is a first digit of the digital representation of the hour of the time, such as "1" in "12:35") (e.g., 908a, 914a, 916a, 918a, 920a, 922a, 924a, 926a, 928a, 930a, and/or 932a); and the second portion of the time includes (e.g., is) a second digit of the digital representation of the hour of the time (e.g., the first text character is a second digit of the digital representation of the hour of the time, such as "2" in "12:35") (e.g., 908b, 914b, 916b, 918b, 920b, 922b, 924b, 926b, 928b, 930b, 932b, 934a, 936a, 938a, 940a, 942a, 944a, and/or 946a). Automatically displaying the first text character with an appearance that is based on a location corresponding to an hour of a time makes it easier to operate the computer system with fewer errors by distinguishing the hour of the time by the appearance of the first text character, thereby providing improved visual feedback to the user, reducing the number of inputs needed to perform an operation, and performing an operation when a set of conditions has been met without requiring further user input.

In some embodiments, the first portion of the time includes (e.g., is) a first digit of a digital representation of a minute of the time (e.g., the first text character is a first digit of the digital representation of the minute of the time, such as "3" in "12:35") (e.g., 908c, 914c, 916c, 918c, 920c, 922c, 924c, 926c, 928c, 930c, 932c, 934b, 936b, and/or 938b); and the second portion of the time includes (e.g., is) a second digit of the digital representation of the minute of the time (e.g., the first text character is a second digit of the digital representation of the minute of the time, such as "5" in "12:35") (e.g., 908d, 914d, 916d, 918d, 920d, 922d, 924d, 926d, 928d, 930d, 932d, 934c, 936c, 938c, 940b, 942b, 944b, and/or 946b). Automatically displaying the first text character with an appearance that is based on a location corresponding to a minute of a time makes it easier to operate the computer system with fewer errors by distinguishing the minute of the time by the appearance of the first text character, thereby providing improved visual feedback to the user, reducing the number of inputs needed to perform an operation, and performing an operation when a set of conditions has been met without requiring further user input.

In some embodiments, displaying the first text character includes: in accordance with a determination that the first text character is displayed at a third location (e.g., a third quadrant or third region) in the user interface that is different from the first location in the user interface and the second location in the user interface, displaying the first text character having a third appearance that includes a third distribution of colors that is different from the first distribution of colors and the second distribution of colors (e.g., 914b-914d, 916a-916d, 918a-918d, 920b-920d, 922a-922d, 924b-924d, 928a-928d, 930a-930d, 932a-932d, 934a-934c, 936a-936c, and/or 938a-938c). Automatically displaying the first text character of the dynamic text string with an appearance and a distribution of colors based on the location at which the first text character is displayed is more efficient, faster, and requires fewer inputs than a user manually creating the appearance of the first text character with the distribution of colors, thereby reducing the number of inputs needed to perform an operation. Automatically displaying the first text character of the dynamic text string with an appearance that is based on the location at which the first text character is displayed makes it easier to operate the computer system with fewer errors by distinguishing the location of the first text character by the appearance (including the distribution of colors) of the first text character, thereby providing improved visual feedback to the user, reducing the number of inputs needed to perform an operation, and performing an operation when a set of conditions has been met without requiring further user input.

In some embodiments, displaying the first text character includes: in accordance with a determination that the first text character is displayed at a fourth location (e.g., a fourth quadrant a fourth region) in the user interface that is different from the first location in the user interface, the second location in the user interface, and the third location in the user interface, displaying the first text character having a fourth appearance that includes a fourth distribution of colors that is different from the first distribution of colors, the second distribution of colors, and the third distribution of colors (e.g., 914b-914d, 916a-916d, 918a-918d, 922a-922d, 928a-928d, 930a-930d, and/or 932a-932d). Automatically displaying the first text character of the dynamic text string with an appearance and a distribution of colors based on the location at which the first text character is displayed is more efficient, faster, and requires fewer inputs than a user manually creating the appearance of the first text character with the distribution of colors, thereby reducing the number of inputs needed to perform an operation. Automatically displaying the first text character of the dynamic text string with an appearance that is based on the location at which the first text character is displayed makes it easier to operate the computer system with fewer errors by distinguishing the location of the first text character by the appearance (including the distribution of colors) of the first text character, thereby providing improved visual feedback to the user, reducing the number of inputs needed to perform an operation, and performing an operation when a set of conditions has been met without requiring further user input.

In some embodiments, displaying the user interface includes displaying a second text character of the dynamic text string that is different from the first text character (e.g., a different character than the first text character or a second, separate instance of the same character), including: in accordance with a determination that the second text character of the dynamic text string is displayed at a fifth location (e.g., 904a, 904b, 904c, 904d, a quadrant, a region, the first location, the second location, the third location, or the fourth location) in the user interface, displaying the second text character having a fifth appearance that includes a fifth distribution of colors (e.g., the appearance of the second character is based on a distribution of colors); and in accordance with a determination that the second text character of the dynamic text string is displayed at a sixth location (e.g., a second quadrant, a region, the first location, the second location, the third location, or the fourth location) in the user interface that is different from the fifth location in the user interface, displaying the second text character having a sixth appearance that is different from the fifth appearance that includes a sixth distribution of colors that is different from the fifth distribution of colors. Automatically displaying a second text character of the dynamic text string with an appearance and a distribution of colors based on the location at which the second text character is displayed is more efficient, faster, and requires fewer inputs than a user manually creating the appearance of the second text character with the distribution of colors, thereby reducing the number of inputs needed to perform an operation. Automatically displaying a first text character and a second text character of the dynamic text string with appearances that are based on the location of the first text character and the second text character makes it easier to operate the computer system with fewer errors by distinguishing the locations of the first and second text character by their appearances (including the distributions of colors), thereby providing improved visual feedback to the user, reducing the number of inputs needed to perform an operation, and performing an operation when a set of conditions has been met without requiring further user input.

In some embodiments, the first distribution of colors includes (e.g., consists of, does not include more than, are selected from, and/or includes only colors from) a first set of colors; and the second distribution of colors includes (e.g., consists of, does not include more than, are selected from, and/or includes only colors from) the first set of colors (e.g., only the first set of colors; the second distribution of colors includes only colors from the first set of colors and does not include any color that is not included in the first set of colors; the first distribution of colors and the second distribution of colors are comprised of the same colors; and/or the first text character is comprised of the same set of colors when displayed at the first location as when the first text character is displayed at the second location). In some embodiments, 908a, 908b, 908c, and 908d each include only colors from the same set of four colors, such as black, red, green, and a user-selectable fourth color. Displaying the first text character with the same set of colors at different location, but with different distributions of the same set of colors at the different locations, makes it easier to operate the computer system with fewer errors by distinguishing the location of the first text character by the appearance of the first text character while also maintaining consistency within the user interface, thereby providing improved visual feedback to the user and reducing the number of inputs needed to perform an operation.

In some embodiments, the first set of colors includes one or more colors that are selectable (e.g., set, selected, customizable, and/or customized) in response to one or more inputs (e.g., user inputs, 925e, 925f, 925g, and/or 925h) detected by the computer system (e.g., via a user input) (e.g., as described with reference to FIGS. 9J-9N). In some embodiments, a user can select and/or customize one or more colors in the first set of colors. In some embodiments, one or more colors of the first set of colors are predetermined (e.g., are not and/or cannot be selected by a user). In some embodiments, the first set of colors includes one or more colors that are not selectable by a user. Displaying the first text character with one or more colors that are selectable in response to one or more inputs detected by the computer system enables the user to customize display of the dynamic text string in a way that makes it easier for the user to operate the computer system with fewer errors by displaying the first text character with an appearance that is more easily recognizable to the particular user, thereby providing improved visual feedback to the user and reducing the number of inputs needed to perform an operation.

In some embodiments, the one or more colors that are selectable in response to one or more inputs (e.g., user inputs, 925e, 925f, 925g, and/or 925h) detected by the computer system are a subset of the first set of colors (e.g., a first subset of the colors in the first set of colors are selectable in response to one or more inputs detected by the computer system and a second subset of the colors in the first set of colors are not selectable in response to one or more inputs (e.g., user inputs) detected by the computer system) (e.g., as described with reference to FIGS. 9J-9N). In some embodiments, only a subset (e.g., some but not all) of the colors in the first set of colors are selectable in response to one or more inputs detected by the computer system. Limiting the color(s) that are selectable in response to one or more inputs detected by the computer system to a subset of the colors of the first text character enables the user to efficiently customize display of the dynamic text string with fewer inputs while also maintaining consistency within the user interface, and makes it easier for the user to operate the computer system with fewer errors by displaying the first text character with an appearance that is personalized but is not so different from other aspects of the user interface that is distracts the user, thereby providing improved visual feedback to the user and reducing the number of inputs needed to perform an operation.

In some embodiments, displaying the user interface includes: in accordance with a determination that a user selectable color setting has (e.g., is set to or has been set to by a user) a first color setting value (e.g., color enabled and/or a specific color is selected), displaying the user interface (or, in some embodiments, one or more portions of the user interface, such as one or more text characters of the dynamic text string and/or one or more portions of a background of the user interface) in a first color scheme (e.g., including colors, such as red, yellow, and/or green, other than gray scale tones); and in accordance with a determination that a user selectable color setting has (e.g., is set to or has been set to by a user) a second color setting value (e.g., color disabled, black and white, and/or gray scale) that is different from the first value, displaying the user interface (or, in some embodiments, one or more portions of the user interface, such as one or more text characters of the dynamic text string and/or one or more portions of a background of the user interface) in a second color scheme (e.g., only in gray scale tones, such as black, white, and tones between black and white, without colors other than gray scale tones) that is different from the first color scheme (e.g., as described with reference to FIGS. 9L-9Q). In some embodiments, the computer system display the user interface in a first color scheme; the computer system detects a set of one or more inputs that includes a request to select a second color scheme (e.g., to change the color scheme from the first color scheme to the second color scheme; and/or to change the user selectable color setting from a first value to a second value that is different from the first value); after detecting the set of one or more inputs that include the request to select the second color scheme, the computer system detects a second request to display the user interface; and in response to detecting the second request to display the user interface, the computer system displays the user interface in the second color scheme. Displaying the user interface with a color scheme that is based on a user selectable color setting enables the user to customize display of the user interface in a way that makes it easier for the user to operate the computer system with fewer errors by displaying the user interface with an appearance that is more easily recognizable to the particular user, thereby providing improved visual feedback to the user and reducing the number of inputs needed to perform an operation.

In some embodiments, displaying the user interface includes displaying a background (e.g., 906) of the user interface (e.g., behind, between, and/or around the one or more text characters of the dynamic text string), including: in accordance with a determination that a user selectable background setting has (e.g., is set to or has been set to by a user) a first background setting value (e.g., background enabled and/or one or more colors are selected for the background), displaying the background (or, in some embodiments, one or more portions of the background) in a first background scheme (e.g., with at least a portion of the background including colors, such as red, yellow, and/or green, other than gray scale tones); and in accordance with a determination that the user selectable background setting has (e.g., is set to or has been set to by a user) a second background setting value (e.g., background disabled, black and white, and/or gray scale) that is different from the first background setting value, displaying the background (or, in some embodiments one or more portions of the background) in a second background scheme (e.g., only in gray scale tones, such as black, white, and tones between black and white, without colors other than gray scale tones) that is different from the first background scheme (e.g., as described with reference to FIGS. 90-9Q). In some embodiments, the computer system display the user interface with a background in a first background scheme; the computer system detects a set of one or more inputs that includes a request to select a second background scheme (e.g., to change the background scheme from the first background scheme to the second background scheme; and/or to change the user selectable background setting from a first value to a second value that is different from the first value); after detecting the set of one or more inputs that include the request to select the second background scheme, the computer system detects a second request to display the user interface; and in response to detecting the second request to display the user interface, the computer system displays the user interface with the background in the second background scheme. Displaying the user interface with a background scheme that is based on a user selectable background setting enables the user to customize display of the user interface in a way that makes it easier for the user to operate the computer system with fewer errors by displaying the user interface with an appearance that is tailored to the particular user, thereby providing improved visual feedback to the user and reducing the number of inputs needed to perform an operation. Displaying the user interface with a background scheme that is based on a user selectable background setting enables the user to increase battery life of the computer system by selecting a background that conserves battery power (e.g., a darker and/or dimmer background), thereby conserving power and reducing batter consumption.

In some embodiments, displaying the background (e.g., 906) includes displaying a first color (e.g., the color of 906a in FIG. 9B) behind the first text character (e.g., 908a) of the one or more text characters and displaying a second color (e.g., the color of 906b in FIG. 9B) that is different from the first color behind a second text character (e.g., 908b in FIG. 9B) of the one or more text characters that is different from the first text character (e.g., the background includes different colors behind different text characters). Displaying different colors behind different characters makes it easier for the user to operate the computer system with fewer errors and improves legibility of the first text character and the second character by more clearly distinguishing the first text character from the second text character and by more clearly distinguishing the first text character and the second text character from the background (or their respective backgrounds), thereby providing improved visual feedback to the user and reducing the number of inputs needed to perform an operation.

In some embodiments, displaying the first text character includes displaying the first text character (e.g., 908g or 908h in FIG. 9H) (or, in some embodiments, a portion of the first text character) with a first hue of a first color; and displaying the background includes displaying the background (e.g., 906b or 906c, respectively, in FIG. 9H) (or, in some embodiments, a portion of the background, such as, e.g., a portion of the background behind the first text character) with a second hue (e.g., a darker hue or a lighter hue than the first hue) of the first color that is different from the first hue of the first color (e.g., the background includes a lighter or darker hue of a color that is included in the first text character). Displaying the background with a different hue of the same color as the first text character makes it easier for the user to operate the computer system with fewer errors by more clearly distinguishing the first text character from the background while maintaining consistency within the user interface, thereby providing improved visual feedback to the user and reducing the number of inputs needed to perform an operation.

In some embodiments, displaying the first text character includes displaying a portion (e.g., 908a3) of the first text character (e.g., 908a) having a first color; and displaying the user interface includes displaying a second text character (e.g., 908b) that is different from the first text character, including displaying the second text character with a distribution of colors selected so that the second text character is displayed without a portion (e.g., 908b1) of the second text character that is adjacent to (e.g., touching and/or sharing a boundary with) the portion of the first character having the first color (e.g., the distribution of colors of the first text character and the second text character is selected to avoid adjacent portions of different text characters having the same or similar colors). Selecting the distributions of colors of the first text character and second text character so that adjacent portions of the first and second text characters do not have the same color is more efficient, faster, and requires fewer inputs than a user manually adjusting the distributions of colors to avoid adjacent portions of the first and second text characters having the same color, thereby reducing the number of inputs needed to perform an operation. Displaying the first and second text characters with distributions of colors selected so that adjacent portions of the first and second text characters do not have the same color makes it easier for the user to operate the computer system with fewer errors by more clearly distinguishing the first text character from the second text character, thereby providing improved visual feedback to the user and reducing the number of inputs needed to perform an operation.

In some embodiments, displaying the first text character having the first appearance (e.g., at the first location) includes displaying the first text character with a first size (e.g., in a first dimension, such as height, a second dimension, such as width, and/or a font size); and displaying the first text character having the second appearance (e.g., at the second location) includes displaying the first text character with the first size (e.g., the same size) (e.g., 908b and 908c have the same height in FIGS. 9B and 9C; 908f and 908i have the same height and width in FIG. 9H)) (or, in some embodiments, a second size that is approximately the same as the first size and/or that is within a threshold difference from the first size, such as 5 percent, 10 percent, or 20 different from the first size). Displaying the first text character with the same size when the first text character is displayed at the first location as when the first text character is displayed at the second location makes it easier for the user to operate the computer system with fewer errors by maintaining consistency within the user interface even though the distribution of colors is different for different locations, thereby providing improved visual feedback to the user and reducing the number of inputs needed to perform an operation.

In some embodiments, displaying the user interface (or, in some embodiments, displaying the first text character) includes: displaying a first instance of the first text character (e.g., 908*b* in FIG. 9B) having the first appearance that includes the first distribution of colors at the first location (e.g., 904*b*); and displaying a second instance of the first text character (e.g., 908*c* in FIG. 9B) having the second appearance that includes the second distribution of colors at the second location (e.g., 904*c*). Displaying multiple instances of the same text character with different appearances (and different distributions of colors) at different locations makes it easier for the user to operate the computer system with fewer errors by clearly distinguishing between multiple instances of the same text character without the user having to manually adjust the appearance of one or more of the different instances of the text character, thereby providing improved visual feedback to the user and reducing the number of inputs needed to perform an operation.

In some embodiments, while displaying the user interface including the first text character of the dynamic text string in the user interface (e.g., in a normal operating state and/or a standard power operating state): in accordance with (or, in some embodiments, in response to) a determination that a set of criteria (e.g., reduced-power criteria) is met (e.g., the computer system has not detected an input (such as contact on a touch-sensitive surface, a press of a button, a rotation of a rotatable input mechanism, and/or motion of the computer system that satisfies a movement threshold) for a threshold amount of time), wherein the computer system operates in (or, in some embodiments, transitions to) a reduced power operating state (e.g., reduces power consumption) when the set of criteria is met, the computer system displays (e.g., as shown in FIGS. 9D, 9F, and 9I) the first text character having a third appearance that includes a third distribution of colors, wherein the third appearance is different from the first appearance and the second appearance, and wherein the third distribution of colors is different from the first distribution of colors and the second distribution of colors (e.g., 908*b* in FIG. 9D has a different appearance than 908*b* and 908*c* in FIG. 9C). In some embodiments, the computer system changes the appearance of the first text character (e.g., changes the distribution of colors of the first text character) when the computer system enters or transitions to the reduced power operating state. In some embodiments, operating the computer system in the reduced power operating state includes dimming and/or reducing the brightness of the light output of the display generation component. In some embodiments, operating the computer system in the reduced power operating state includes reducing an update rate of one or more operations of the computer system, such as the update rate of content displayed via the display generation component and/or the update rate of an operation of an application. In some embodiments, displaying the first text character having the third appearance that includes the third distribution of colors includes changing an appearance of the first text character from the first appearance or the second appearance to the third appearance. In some embodiments, displaying the first text character having the third appearance (e.g., changing the appearance of the first text character to the third appearance) includes shifting a color distribution of the first text character (e.g., moving, or changing a position or spatial arrangement of, one or more portions of the first text character from a first position (or spatial arrangement) to a second position (or spatial arrangement)). In some embodiments, displaying the first text character having the third appearance includes changing a position (or spatial arrangement) of one or more portions of the first text character without changing a color of the one or more portions of the first text character. Automatically displaying the first text character with a different appearance when the computer system is in a reduced power operating state makes it easier for the user to operate the computer system with fewer errors and reduces power consumption by providing the user with visual feedback about the state of the computer system, enabling the user to easily identify the state of the computer system, and allowing the computer system to display the first text character in a manner that consumes less power, thereby providing improved visual feedback to the user, reducing the number of inputs needed to perform an operation, and performing an operation when a set of conditions has been met without requiring further user input. Automatically displaying the first text character with a different appearance when the computer system is in a reduced power operating state is more efficient, faster, and requires fewer inputs than a user manually adjusting the appearance of the first text character, thereby reducing the number of inputs needed to perform an operation.

In some embodiments, the first text character includes a first portion (e.g., 908*a*1, 908*b*1, 908*c*1, 908*d*1, 908*f*1, 908*g*1, 908*h*1, 908*i*1, a first visually distinct portion, a first block, and/or a first polygon) and a second portion (e.g., 908*a*2, 908*b*2, 908*c*2, 908*d*2, 908*f*2, 908*g*2, 908*h*2, 908*i*2, a second visually distinct portion, a second block, and/or a second polygon); displaying the first text character (e.g., having the first appearance or the second appearance) in response to detecting the request to display the user interface (e.g., displaying 908*a*, 908*b*, 908*c*, and/or 908*e* in FIG. 9C; or displaying 908*f*, 908*g*, 908*h*, and/or 908*i* in FIG. 9H) (e.g., when the computer system is not in the reduced power operating state and/or the set of criteria is not met) includes displaying the first portion in a first spatial arrangement (e.g., location and/or orientation) relative to the second portion; and displaying the first text character having the third appearance that includes the third distribution of colors (e.g., displaying 908*a*, 908*b*, 908*c*, and/or 908*e* in FIG. 9D; or displaying 908*f*, 908*g*, 908*h*, and/or 908*i* in FIG. 9I) includes displaying the first portion in a second spatial arrangement (e.g., location and/or orientation) relative to the second portion that is different from the first spatial arrangement relative to the second portion. In some embodiments, the first portion has a first color, and the second portion has a second color that is different from the first color. In some embodiments, the computer system changes the spatial arrangement of the first portion relative to the second portion (e.g., by moving the first portion and/or the second portion) when the computer system enters or transitions to the reduced power operating state. Displaying portions of the first text character in different spatial arrangements relative to each other when the computer system is in a reduced power operating state makes it easier for the user to operate the computer system with fewer errors by providing the user with visual feedback about the state of the computer system and enabling the user to easily identify the state of the computer system, thereby providing improved visual feedback to the user, reducing the number of inputs needed to perform an operation, and performing an operation when a set of conditions has been met without requiring further user input. Displaying portions of the first text character in different spatial arrangements relative to each other when the computer system is in a reduced power operating state reduces burn-in by varying positions of the portions of the first text character.

In some embodiments, while displaying the user interface including the first text character of the dynamic text string in the user interface (e.g., in a normal operating state and/or a standard power operating state): in accordance with (or, in some embodiments, in response to) a determination (e.g., a second determination) that the set of criteria is met, the computer system displays the first text character, including displaying the first portion in a third spatial arrangement relative to the second portion that is different from the second spatial arrangement relative to the second portion (e.g., the spatial arrangements of the portions of 908*a*, 908*b*, 908*c*, and/or 908*e* in FIG. 9F are different than in FIG. 9D). In some embodiments, the computer system changes the spatial arrangement of the first portion relative to the second portion differently for different instances of entering or transitioning to the reduced power operating state. Automatically displaying portions of the first text character in different spatial arrangements relative to each other when the computer system is in a first instance of a reduced power operating state compared to when the computer system is in another instance of the reduced power operating state makes it easier for the user to operate the computer system with fewer errors by enabling the user to distinguish between instances of the reduced power operating state, thereby providing improved visual feedback to the user, reducing the number of inputs needed to perform an operation, and performing an operation when a set of conditions has been met without requiring further user input. Automatically displaying portions of the first text character in different spatial arrangements relative to each other when the computer system is in a first instance of a reduced power operating state compared to when the computer system is in another instance of the reduced power operating state reduces burn-in by varying positions of the portions of the first text character.

In some embodiments, displaying the first text character in response to detecting the request to display the user interface (e.g., when the computer system is not in the reduced power operating state and/or the set of criteria is not met) includes displaying a first portion of the first text character as a solid color (e.g., one or more portions of 908*a*, 908*b*, 908*c*, and/or 908*d* in FIG. 9B; one or more portions of 908*a*, 908*b*, 908*c*, and/or 908*e* in FIG. 9C; and/or one or more portions of 908*f*, 908*g*, 908*h*, and/or 908*i* in FIG. 9H); and displaying the first text character having the third appearance that includes the third distribution of colors includes displaying the first portion as an outline (e.g., not in a solid color, such as with, e.g., black and/or a background color) (e.g., one or more portions of 908*a*, 908*b*, 908*c*, and/or 908*d* in FIGS. 9D and/or 9F; and/or one or more portions of 908*f*, 908*g*, 908*h*, and/or 908*i* in FIG. 9I). In some embodiments, the computer system changes one or more portions of the first text character from solid to outline when the computer system enters or transitions to the reduced power operating state. Automatically displaying the first text character with the first portion as an outline (e.g., rather than as a solid color) when the computer system is in the reduced power operating state reduces power consumption and/or burn in when the set of criteria is met, thereby performing an operation when a set of conditions has been met without requiring further user input and increasing battery life.

In some embodiments, displaying the first text character having the third appearance that includes the third distribution of colors includes displaying the first portion of the first text character overlapping a second portion (e.g., a second outlined portion) of the first text character (e.g., in FIGS. 9D and 9F, 908*b*1 overlaps 908*b*2, 908*c*1 overlaps 908*c*2, and 908*d*1 overlaps 908*d*3; and in FIG. 9I, 908*f*1 overlaps 908*f*2). Automatically displaying the first portion of the first text character overlapping the second portion of the first text character when the computer system is in the reduced power operating state makes it easier to operate the computer system with fewer errors by providing the user with visual feedback about the state of the computer system and enabling the user to easily identify that the computer system is in the reduced power operating state, thereby providing improved visual feedback to the user, reducing the number of inputs needed to perform an operation, and performing an operation when a set of conditions has been met without requiring further user input.

In some embodiments, displaying the user interface (e.g., 900*b*) includes displaying a background (e.g., 906) of the user interface (e.g., behind, between, and/or around the one or more text characters of the dynamic text string), and in accordance with (or, in some embodiments, in response to) the determination that the set of criteria is met, the computer system displays the user interface (e.g., 900*c*) without the background (e.g., the computer system does not display, removes display of, and/or ceases display of the background when the computer system is in or enters the reduced power operating state) (e.g., computer system 600 displays user interface 900*c* in FIGS. 9D, 9F, and 9I without background 906). Automatically displaying the user interface without the background when the computer system is in a reduced power operating state makes it easier for the user to operate the computer system with fewer errors by providing the user with visual feedback about the state of the computer system and enabling the user to easily identify that the computer system is in the reduced power operating state, thereby providing improved visual feedback to the user, reducing the number of inputs needed to perform an operation, and performing an operation when a set of conditions has been met without requiring further user input. Automatically displaying the user interface without the background when the computer system is in a reduced power operating state reduces display burn-in and power consumption by displaying the user interface in a manner that consumes less power (e.g., with fewer elements and/or lower brightness) without user input, thereby improving battery life, extending display lifetime, and reducing the number of inputs needed to perform an operation.

In some embodiments, the first text character includes a first portion (e.g., a first visually distinct portion, a first block, and/or a first polygon) and a second portion (e.g., a second visually distinct portion, a second block, and/or a second polygon); displaying the first text character in response to detecting the request to display the user interface includes displaying the first text character at a first time having the first portion in a first spatial arrangement (e.g., location and/or orientation) relative to the second portion (e.g., FIG. 9B); and, at a second time that is different from the first time (e.g., in response to a change in time (such as a change in an hour and/or a minute of time) and/or in response to a request to display the user interface at the second time), the computer system displays an animation that includes changing position of (e.g., moving, translating, shifting, rotating, changing a shape of, and/or changing a size of) the first portion of the first text character (and/or one or more other portions of the text character, such as the second portion of the text character) such that the first portion is in a second spatial arrangement relative to the second portion that is different from the first spatial arrangement relative to the second portion (e.g., an animation of the first portion and/or second portion changing from the first spatial arrangement to the second spatial arrangement) (e.g., computer system 600 displays an animation of text character 908*d* transitioning from a numeral "8" in FIG. 9B to text character 908*e* representing a numeral "9" in FIG. 9C). In some embodiments, the first portion has a first color, and the second portion has a second color that is different from the first color. In some embodiments, the computer system changes the spatial arrangement of the first portion relative to the second portion (e.g., by moving the first portion and/or the second portion) when the time changes. In some embodiments, changing position of the first portion (and/or one or more other portions of the text character) includes changing the first text character from a first alphanumeric character to a second alphanumeric character. Displaying an animation of one or more portions of the first text character changing spatial arrangements relative to each other makes it easier for the user to operate the computer system with fewer errors by enabling the user to easily identify a change in time and distinguish the time at which the first text character is displayed from other times while maintaining consistency in the appearance of the first text character over time, thereby providing improved visual feedback to the user and reducing the number of inputs needed to perform an operation.

In some embodiments, displaying the animation includes changing the first text character (e.g., 908*d*) from a first numeral (e.g., "8" in FIG. 9B) (e.g., of a digit in a current time, such as a digit of a minute or a digit of an hour) to a second numeral (e.g., "9" in FIG. 9D, represented by text character 908*e*, which includes character portions 908*d*1, 908*d*2, 908*d*3, and 908*d*4) that is different from the first numeral (e.g., of the same digit in the current time). Displaying an animation of the first text character changing from a first numeral to a second numeral makes it easier for the user to operate the computer system with fewer errors by enabling the user to more easily identify a change in time and to distinguish between different numerals represented by the first text character, thereby providing improved visual feedback to the user and reducing the number of inputs needed to perform an operation.

Note that details of the processes described above with respect to method 1000 (e.g., FIG. 10) are also applicable in an analogous manner to the methods described above. For example, methods 700, 800, 1200, 1500, and/or 1700 optionally include one or more of the characteristics of the various methods described above with reference to method 1000. For example, the user interface in method 700 and/or method 800 can be displayed with dynamic text strings as described in method 1000. For brevity, these details are not repeated below.

FIGS. 11A-11AC illustrate exemplary time user interfaces, in accordance with some embodiments. The user interfaces in these figures are used to illustrate the processes described below, including the processes in FIG. 12.

FIG. 11A illustrates computer system 600 (e.g., as described above) displaying, on display 602, user interface 1100*a* (e.g., a home screen or an application springboard) that includes application icons for opening respective applications. In some embodiments, user interface 1100*a* is a user interface of an application (e.g., a messaging application, an email application, a calendar application, or a workout application) or a menu user interface (e.g., a settings menu). In FIG. 11A, computer system 600 detects request 1125*a* (e.g., a press of input mechanism 604) to display a time user interface. In some embodiments, request 1125*a* is an input on mechanism 604, such as a press and/or a rotation. In some embodiments, request 1125*a* is a tap input and/or other input on an application icon, such as clock icon 1101 shown in FIG. 11A. In some embodiments, request 1125*a* is a swipe input and/or other input on a different user interface, such as a menu user interface (e.g., a settings menu), a user interface associated with notifications (e.g., a user interface that displays a summary of notifications), and/or a user interface of an application (e.g., a messaging application, an email application, a calendar application, or a workout application). In some embodiments, request 1125*a* is a swipe input and/or other input on a different time user interface, such as user interface 1300*b* in FIG. 13B or user interface 1600*b* in FIG. 16B. In some embodiments, request 1125*a* is a predefined movement of at least a portion of computer system 600, such as raising and/or rotating computer system 600 (e.g., a wrist raise gesture).

In response to detecting request 1125*a*, computer system 600 displays user interface 1100*b*, a time user interface, as shown in FIG. 11B. In some embodiments, user interface 1100*b* is displayed in response to movement of computer system 600 (e.g., displayed in response to a wrist raise gesture) while display 602 is in an inactive state or a less active state (e.g., a low power state). In some embodiments, user interface 1100*b* is a clock face, a watch face, a wake screen, a lock screen, and/or a home screen. As shown in FIG. 11B, user interface 1100*b* includes indication of time 1102, a plurality of inner complications 1104*a*-1104*g*, and customizable border complication 1106. Customizable border complication 1106 surrounds at least a portion of a region of the user interface that includes indication of time 1102 and the plurality of inner complications 1104*a*-1104*g*.

Customizable border complication 1106 includes a measurement indicator, such as elevation measurement indicator 1106*a*, and a scale, such as scale 1106*b*. In the example shown in FIG. 11B, elevation measurement indicator 1106*a* indicates an elevation measurement of 100 feet (or 30 meters) above sea level. In the example shown, elevation measurement indicator 1106*a* is displayed in two units: feet and meters. In FIG. 11B, elevation measurement indicator 1106*a* indicates an elevation measurement of 100 feet, which is displayed on the left side of the region of the user interface that includes indication of time 1102 and the plurality of inner complications 1104*a*-1104*g*; the corresponding elevation measurement of 30 meters is displayed on the right side of the region of the user interface that includes indication of time 1102 and the plurality of inner complications 1104*a*-1104*g*.

In some embodiments, the elevation measurement is indicated by shaded and/or colored tic marks on scale 1106*b*. In some embodiments, the elevation measurement is indicated by a shaded and/or colored bar, either in addition to or in place of the shaded and/or colored tic marks. For example, in FIG. 11B, the shading of the tic marks ranging from 0 to 100 feet (0 to 30 meters) on scale 1106*b* indicate an elevation measurement of 100 feet (30 meters). Additionally, the shaded bar ranging from 0 to 100 feet (0 to 30 meters), shown behind the tic marks in FIG. 11B, indicates an elevation measurement of 100 feet (30 meters).

Computer system 600 causes elevation measurement indicator 1106*a* to change based on a change in time and/or conditions. For example, in FIG. 11C, computer system 600 displays user interface 1100*c* including elevation measurement indicator 1106*a*1 indicating a decreased elevation measurement of 60 feet (or 18 meters), based on a change in location/elevation of computer system 600 (e.g., as a user of computer system 600 descends a hill). In FIG. 11D, computer system 600 displays user interface 1100*d* including elevation measurement indicator 1106*a*2 indicating an increased elevation measurement of 140 feet (43 meters), also based on a change in location/elevation (e.g., as a user of computer system 600 ascends a hill).

Figure 11E:
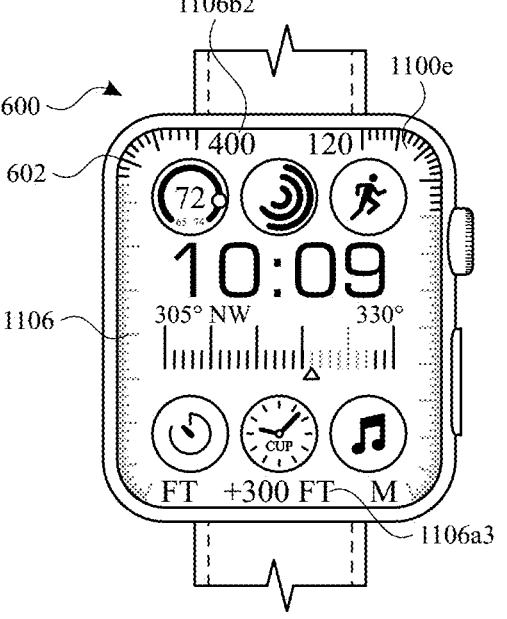
FIGS. 11A-11AC illustrate exemplary user interfaces that include a customizable border complication in accordance with some embodiments.

Computer system 600 causes scale 1106*b* to dynamically adapt based on a change in location/elevation. In some embodiments, computer system 600 dynamically increases and/or decreases the range of values displayed on scale 1106*b* based on changes to the elevation measurement. For example, in FIG. 11E, elevation measurement indicator 1106*a*3 indicates an elevation measurement of 300 feet (90 meters) above sea level, which exceeds the range of scale 1106*b*1 displayed in FIG. 11D, which ranges from 0 to 200 feet (0 to 60 meters). Accordingly, as shown in FIG. 11E, computer system 600 displays user interface 1100*e* including scale 1106*b*2, which ranges from 0 to 400 feet (0 to 120 meters). In some embodiments, computer system 600 causes the number of tic marks, the distance between tic marks, and/or the incremental value of each tic mark to change so that scale 1106*b* occupies the same amount of space on display 602 regardless of the change in values displayed on scale 1106*b*. For example, as shown in FIGS. 11D and 11E, scale 1106*b*1 and scale 1106*b*2 span the same distance on user interfaces 1100*d* and 1100*e*, respectively, although the scales cover a different range in values.

In some embodiments, after displaying user interface 1100*e* with scale 1106*b*2 ranging from 0 to 400 feet (0 to 120 meters), if the elevation measurement decreases to a value below 200 feet (60 meters) above sea level, computer system 600 once again displays scale 1106*b* with a range from 0 to 200 feet (0 to 60 meters), as illustrated by the range of scale 1106*b*1 in FIG. 11D. In some embodiments, computer system 600 changes the range of scale 1106*b* when the elevation measurement reaches a predetermined threshold from the upper limit of the range, rather than when the elevation measurement reaches the upper limit itself. For example, when the elevation measurement increases to a predetermined threshold of 190 feet, computer system 600 changes the range of scale 1106*b* from a range of 0 to 200 feet (0 to 60 meters) to a range of 0 to 400 feet (0 to 120 meters). In some embodiments, the predetermined threshold is different when increasing the range of scale 1106*b* than when decreasing the range of scale 1106*b*. For example, when the elevation measurement decreases to a predetermined threshold of 180 feet (as opposed to 190 feet), computer system 600 changes the range of scale 1106*b* from a range of 0 to 400 feet (0 to 120 meters) to a range of 0 to 200 feet (o to 60 meters).

Figure 11F:
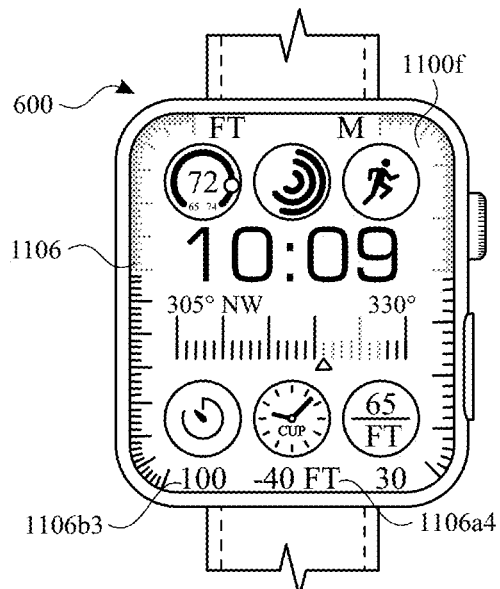
Figure 11G:
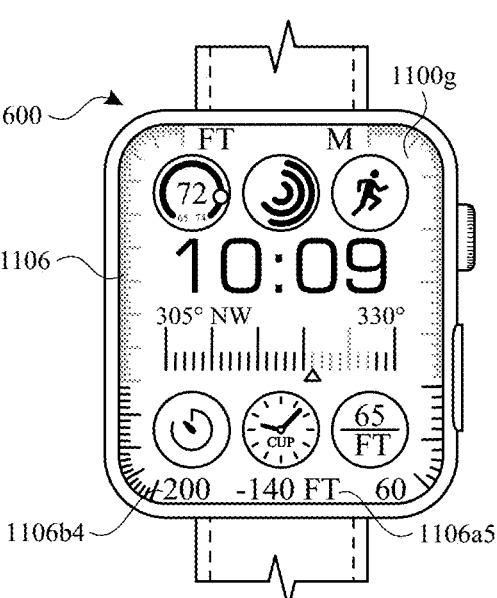

In some embodiments, if the value of the elevation measurement is above sea level, computer system 600 displays scale 1106*b* with the lower limit (e.g., sea level or 0 feet/meters) at the bottom of the time user interface and the upper limit at the top of the time user interface. In this case, the values on scale 1106*b* and the shaded and/or colored tic marks extend from the bottom to the top, as illustrated in FIGS. 11B-11E. In some embodiments, if the value of the elevation measurement is below sea level, computer system 600 displays scale 1106*b* so the lower limit (e.g., sea level or 0 feet/meters) is displayed at the top of the time user interface and the upper limit is displayed at the bottom of the time user interface. In this case, the values on scale 1106*b* and the shaded and/or colored tic marks extend from the top to the bottom, as illustrated in FIGS. 11F-11G. As described with respect to FIGS. 11B-11E, computer system 600 causes scale 1106*b* to dynamically adapt based on changes to the value of elevation measurement indicator 1106*a*. For example, in FIG. 11F, the elevation measurement is 40 feet below sea level and scale 1106*b*3 ranges from 0 to 100 feet (0 to 30 meters). In FIG. 11G, the elevation measurement is 140 feet below sea level and scale 1106*b*4 ranges for 0 to 200 feet (0 to 60 meters).

In some embodiments, computer system 600 displays a user interface based on a mode and/or state of computer system 600. In some embodiments, computer system 600 is configured to operate in a night mode and/or reduced-power state that consumes (e.g., on average over time) less energy than other operating states (e.g., than the operating state of computer system 600 in FIGS. 11B-11H). In some embodiments, computer system 600 enters a night mode and/or reduced-power state in response to a determination that a user of computer system 600 is inactive and/or is not looking at display 602 (e.g., the user lowers computer system 600 and/or does not interact with display 602 (or another input device of computer system 600) for a threshold amount of time). In some embodiments, computer system 600 enters a night mode and/or a reduced-power mode in response to an input, such as swipe input 1125*b* directed to user interface 1100*g* illustrated in FIG. 11G. In some embodiments, computer system 600 enters a night mode and/or reduced-power mode based on a user-selected setting (e.g., a pre-selected and/or pre-configured setting).

In some embodiments, in response to detecting a set of one or more inputs (e.g., a long press on any of user interfaces 1100*b*-1100*h*), computer system 600 enters a clock face edit mode. For example, in FIG. 11I, computer system 600 enters a clock face edit mode and displays user interface 1100*i* corresponding to selection of a night mode setting (and/or reduced-power mode setting). In some embodiments, the settings for night mode (and/or reduced-power mode) include dynamic, off, and/or on. For example, a user can select whether a night mode (and/or reduced-power mode) is set to dynamic (e.g., a mode in which the computer system automatically transitions into or out of night mode based on predetermined criteria being met), off, or on by rotating input mechanism 604, such as providing input 1125*c* shown in FIG. 11I. In some embodiments, while in a clock face edit mode, a user can change between different setting options by providing a swipe input. For example, computer system 600 receives a swipe input on user interface 1100*i* and, in response to receiving the swipe input, computer system 600 displays an alternative setting option, such as a bezel setting shown in user interface 1100*k* of FIG. 11K, a style setting shown in user interface 1100*q* of FIG. 11Q, and/or a color setting for the time user interface.

Figure 11H:
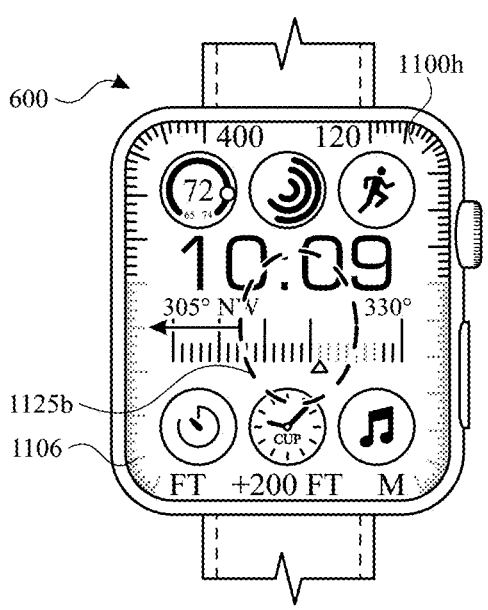
Figure 11I:
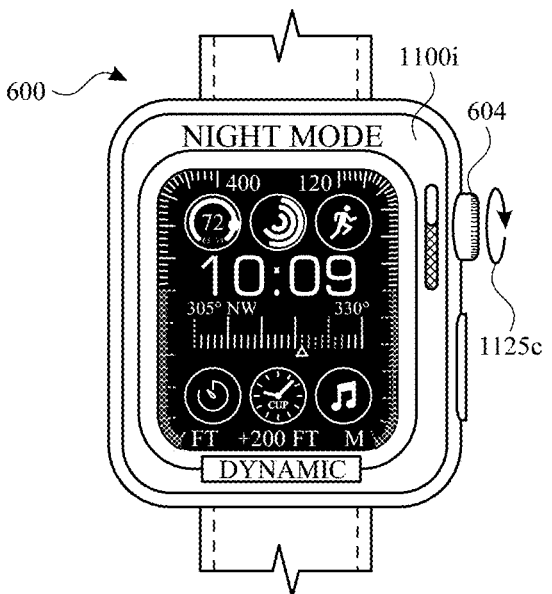
Figure 11J:

FIG. 11J illustrates computer system 600 operating in a night mode and/or a reduced-power mode. In some embodiments, computer system 600 displays user interface 1100*j* with a darker background than as displayed in user interface 1100*h* of FIG. 11H. In some embodiments, computer system 600 displays user interface 1100*j* with fewer colors and/or different colors than as displayed in user interface 1100*h* of FIG. 11H. For example, user interface 1100*j* has a black background. In some embodiments, all text and graphics displayed in user interface 1100*j*, including indication of time 1102, inner complications 1104*a-g*, and customizable border complication 1106, are displayed having a single color, such as red. In some embodiments, computer system 600 enters a daytime mode and/or standard mode (as shown in FIG. 11H, for example) in response to an input, such as a swipe input in the same direction as swipe input 1125*b* and/or a swipe input in the opposite direction as swipe input 1125*b*. In some embodiments, computer system 600 enters a daytime mode and/or standard mode based on a setting selected in the clock face edit mode (e.g., dynamic, off, or on setting).

When the dynamic night mode option is selected (e.g., as shown in FIG. 11I), computer system 600 dynamically and/or automatically changes between a daytime mode (and/or standard mode) and a night mode (and/or reduced-power mode) based on a determination that a set of one or more conditions has been met. In some embodiments, a condition for automatically changing between a daytime mode (and/or standard mode) and a night mode (and/or reduced-power mode) includes a predetermined threshold for ambient light conditions. For example, if the amount of ambient light is above a predetermined threshold, computer system 600 displays time user interface 1100*h* in a daytime mode (and/or standard mode), as shown in FIG. 11H. If the amount of ambient light drops below a predetermined threshold, computer system 600 displays time user interface 1100*j* in a night mode (and/or reduced-power mode), as shown in FIG. 11J. In some embodiments, a condition for automatically changing between a daytime mode (and/or standard mode) and a night mode (and/or reduced-power mode) includes a threshold time. For example, after 6 pm local time, computer system displays time user interface 1100*j* in a night mode (and/or reduced-power mode), as shown in FIG. 11J. Prior to 6 pm local time, computer system displays time user interface 1100*h* in a daytime mode (and/or standard mode). In some embodiments, a condition for automatically changing between a daytime mode (and/or standard mode) and a night mode (and/or reduced-power mode) includes one or more time criteria based on the location of the computer system and/or the time of year, as well as corresponding lighting conditions (e.g., sunrise, sunset, twilight, daytime, and nighttime). For example, after sunset local time, computer system displays time user inter-face 1100*j* in a night mode (and/or reduced-power mode), as shown in FIG. 11J. Prior to sunset local time, computer system displays time user interface 1100*h* in a daytime mode (and/or standard mode), as shown in FIG. 11J.

When the "off" night mode setting is selected, computer system 600 displays time user interface 1100*h* in a daytime mode (and/or standard mode) irrespective of the time or ambient conditions. When the "on" night mode setting is selected, computer system 600 displays time user interface 1100*j* in a night mode (and/or reduced-power mode) irre-spective of the time or ambient conditions.

As discussed above with respect to FIG. 11I, in some embodiments, in response to detecting a set of one or more inputs (e.g., a long press on any of user interfaces 1100*b*-1100*h*), computer system 600 enters a clock face edit mode. For example, in FIG. 11K, computer system 600 enters a clock face edit mode and displays user interface 1100*k* corresponding to selection of information to be displayed. In some embodiments, a user can select elements to modify, add, or remove, such as modifying, adding, or removing indication of time 1102, inner complications 1104*a*-1104*g*, and/or customizable border complication 1106. For example, a user can select whether to include customizable border complication 1106 by rotating input mechanism 604, such as providing input 1125*d* shown in FIG. 11K. In some embodiments, computer system 600 changes (e.g., in response to receiving a request to display a modified version of a time user interface, such as rotation input 1125*d*) the size and/or proportion of displayed elements based on the modification, addition, or removal of one or more elements and the space available on display 602.

For example, FIG. 11L illustrates user interface 1100*l* without including customizable border complication 1106. As a result, computer system 600 displays indication of time 1102 and inner complications 1104*a*-1104*g* larger in user interface 1100*i* (as compared with in user interface 1100*b* of FIG. 11B, for example, which includes customizable border complication). As another example, FIG. 11M illustrates user interface 1100*m* with a modified indication of time 1102 that includes indication of seconds 1102*a*. As a result, computer system 600 displays user interface 1100*j* with an adjusted size and/or proportion of indication of time 1102, such that the additional indication of seconds 1102*a* infor-mation is displayed within the space available on display 602.

In some embodiments, the color of indication of time 1102 and/or indication of seconds 1102*a* corresponds to a color of inner complications 1104*a*-1104*g* and/or customi-zable border complication 1106. For example, as shown in FIG. 11M, indication of seconds 1102*a* is the same color as the elevation measurement shown on scale 1106*b* of cus-tomizable border complication 1106. In some embodiments, a particular border complication type has a predefined color scheme (e.g., orange for elevation, blue for depth, white/greyscale for time, red for heading, and blue for tide). In some embodiments, the color of indication of seconds 1102*a* matches the predefined color scheme for the selected com-plication type and the color of indication of seconds 1102*a* is changed if the user changes the complication type. In some embodiments, a user can select (e.g., in the clock face edit mode) a color scheme for indication of time 1102, indication of seconds 1102*a*, inner complications 1104*a*-1104*g*, and/or customizable border complication 1106.

Figure 11K:
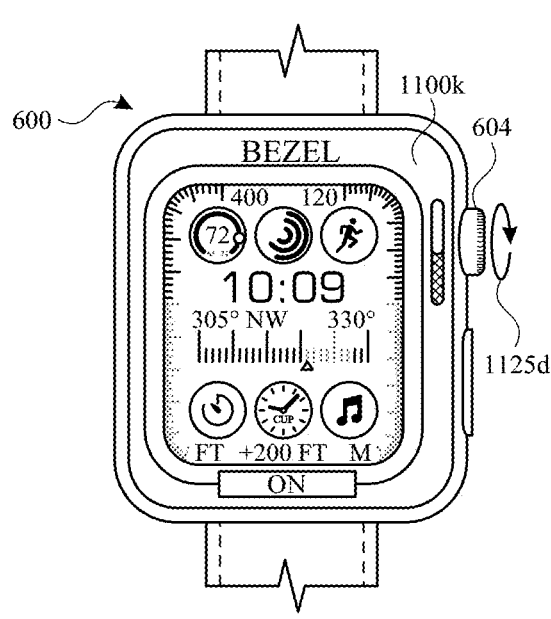

In some embodiments, computer system 600 changes the text size and/or proportions of indication of time 1102 based on modification, addition, or removal of one or more ele-ments. In some embodiments, the text size of indication of time 1102 is increased, horizontally stretched, vertically stretch, decreased, horizontally compressed, and/or verti-cally compressed. For example, in FIG. 11K, computer system 600 displays user interface 1100*k* without including inner complication 1104*a*. As a result (e.g., in response to receiving a request to display a modified version of time user interface 1100*i*, for example, without including inner com-plication 1104*a*), the text size of indication of time 1102 is vertically stretched in user interface 1100*k*. As another example, in FIG. 11L, indication of seconds 1102*a* is removed and indication of time 1102 is horizontally stretched in user interface 1100*l*. In FIG. 11M, inner com-plications 1104*a*, 1104*b*, 1104*c*, and 1104*d* are removed and, as a result, the text of indication of time 1102 in user interface 1100*m* is vertically stretched further than as shown in FIGS. 11K and 11M.

In some embodiments, in response to detecting a set of one or more inputs (e.g., a long press on any of user interfaces 1100*b*-1100*h*), computer system 600 enters a clock face edit mode, as mentioned above. For example, in FIG. 11N, computer system 600 enters a clock face edit mode and displays user interface 1100*n* corresponding to user selection of a type of customizable border complication 1106 to display. For example, in some embodiments, a user can select (e.g., by rotating rotatable input mechanism 604, as illustrated by input 1125*e*) between different customizable border complications 1106 that display different measurement indicators 1106*a* and/or scales 1106*b* (e.g., elevation, depth, time, heading, and/or tide).

FIG. 11O illustrates user interface 1100*o* with depth measurement indicator 1106*c*1 indicating a depth measurement, such as a depth of computer system 600 below sea level and/or a depth of computer system 600 underwater. In the example shown, depth measurement indicator 1106*c*1 indicates a depth value of 65 feet (19 meters) under water, indicating that computer system 600 is at a depth 65 feet below the surface of the water. While under water, the input options for computer system 600 may be limited; thus, displaying user interface 1100*o* including depth measurement indicator 1106*c*1 prominently on a wake screen enables a user to easily view information when it may not otherwise be possible or easy to access the information via navigating through other user interfaces and/or menus. In FIG. 11O, depth measurement indicator 1106*c*1 indicates the depth measurement in two units (e.g., feet and meters), which are displayed on opposite sides (e.g., the left side and the right side) of the region of the user interface that includes indication of time 1102 and the plurality of inner complications 1104*a*-1104*g*. In some embodiments, depth measurement indicator 1106*c*1 indicates the maximum depth reached during a session underwater, such as 98 feet shown in depth measurement indicator 1106*c*1. In some embodiments, depth measurement indicator 1106*c*1 changes based on a change in time and/or conditions. FIG. 11P illustrates user interface 1100*p* including depth measurement indicator 1106*c*2 with an updated depth value of 100 feet (30 meters) under water and an updated maximum depth of 100 feet under water.

Figure 11T:
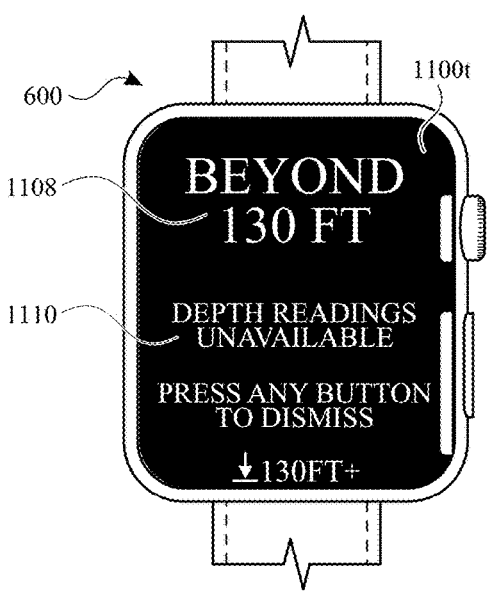
Figure 11U:
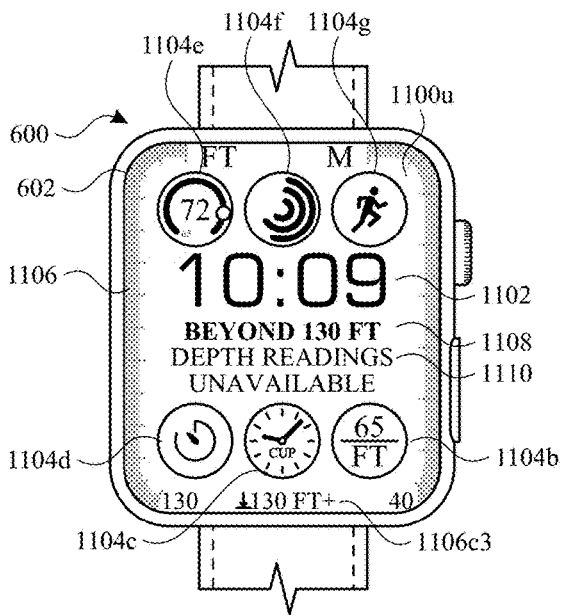

In some embodiments, computer system 600 has a maximum recommended depth (e.g., 130 feet), which is the maximum recommended underwater depth that computer system 600 should reach (e.g., to maintain accuracy of depth measurements and/or to prevent computer system 600 from being damaged). In some embodiments, as shown in FIGS. 11T and 11U, if the depth measurement reaches or exceeds the maximum recommended depth, computer system 600 outputs an alert to notify the user that the maximum recommended depth has been reached and/or exceeded. In some embodiments, the alert is a haptic alert. In some embodiments, computer system 600 displays a notification indicating the maximum recommended depth has been reached and/or exceeded, such as notification 1108 (e.g., "BEYOND 130 FT"). In some embodiments, computer system 600 does not measure and/or output depth measurements beyond the maximum recommended depth. In some embodiments, computer system 600 displays a notification indicating that depth readings are not available, such as notification 1110 (e.g., "DEPTH READINGS UNAVAILABLE").

In some embodiments, the alert replaces the time user interface that was displayed prior to reaching the maximum recommended depth. For example, in FIG. 11T, computer system 600 replaces display of a time user interface (such as user interface 1100*s*) with user interface 1100*t*, which indicates the maximum recommended depth has been reached and that depth readings are no longer available. In some embodiments, a user can dismiss the alert in order to once again display the time user interface. In some embodiments, the alert is shown in addition to the time user interface. In some embodiments, if the user dismisses the alert shown in FIG. 11S, computer system 600 displays the time user interface, as well as a variation of the alert (e.g., in a different format and/or at a different size). For example, in FIG. 11U, user interface 1100*u* includes indication of time 1102 and inner complications 1104*b*-1104*g*, as well as notifications 1108 and 1110. In some embodiments, notifications 1108 and 1110 replace one or more elements of the time user interface, such as replacing inner complication 1104*h* shown in FIGS. 11R and 11S. In some embodiments, elements of the time user interface adjust according to the space available on display 602, as described with respect to FIGS. 11L through 11P, in order to display notifications 1108 and 1110 in addition to the previously displayed elements.

In some embodiments, while displaying a respective user interface that is different from the time user interface, the computer system detects that a set of one or more immersion criteria have been met. In some embodiments, the set of one or more criteria includes a criterion that is met when a determination is made that the computer system is immersed and/or submerged in a liquid, such as water. For example, the computer system has been submerged to more than a threshold depth below the surface of water. In some embodiments, the respective user interface that is different from the time user interface does not include a customizable border complication. In some embodiments, the respective user interface that is different from the time user interface is another time user interface, such as user interface 607*a* in FIG. 6A or user interface 900*b* in FIG. 9B. In some embodiments, the respective user interface includes an indication of time, a plurality of inner complications, and a customizable border complication including a measurement indicator but one or more of these aspects is different than in the time user interface. In some embodiments, the respective user interface is an application interface, such as user interface 607*w* that is a calendar application or a system user interface such as user interface 1100*a* that is a home screen.

In some embodiments, the time user interface (e.g., 1100*r*-1100*s*) is displayed in response to a determination that the set of one or more immersion criteria have been met. For example, the time user interface is displayed in response to detecting that the computer system has been submerged to more than a threshold depth under water. For example, while displaying user interface 607*w* that is a calendar application, computer system 600 displays user interface 1100*r* in response to detecting that computer system 600 has been submerged under water. In some embodiments, the time user interface is displayed in response to detecting that the computer system has been submerged in water (in some embodiments, submerged to at least a threshold depth) and in accordance with a determination that the time user interface includes one or more complications (e.g., one or more of the plurality of inner complications and/or the customizable border complication) that correspond to and/or are relevant to a user while under water. For example, a complication including a depth meter, a dive timer, and/or information pertaining to a swim workout could be relevant to a user while under water. Accordingly, in one example, computer system 600 displays user interface 1100*r* (which includes depth measurement 1106*c*1 indicating that computer system 600 is 65 feet below the surface of water) in response to detecting that computer system 600 is submerged in water and in accordance with a determination that customizable border complication 1106 includes depth measurement 1106*c*1, which is relevant to a user while under water.

In FIG. 11V, computer system 600 displays user interface 1100*v* including time measurement indicator 1106*d*1 indicating the seconds value associated with the current time. For example, in FIG. 11V, time measurement indicator 1106*d*1 indicates a value of 44 seconds, as depicted by the 44 grey tic marks 1112. After 60 seconds has passed, time measurement indicator 1106d2 resets and only the first tic mark 1112 is grey, as shown in user interface 1100w in FIG. 11W. As time continues to progress, an additional tic mark 1112 turns grey each second. FIG. 11X illustrates user interface 1100x at a later time, wherein time measurement indicator 1106d3 indicates a value of 15 seconds.

In some embodiments, FIG. 11Y illustrates user interface 1100y including time measurement indicator 1106d4 indicating the number of seconds remaining on a timer. For example, in FIG. 11Y, measurement indicator 1106d4 indicates that 30 seconds remain on the timer. In some embodiments, FIG. 11Y illustrates user interface 1100d4 including measurement indicator 1106d4 indicating the number of seconds that have passed on a stopwatch. In this example, measurement indicator 1106d4 in FIG. 11Y indicates that 30 seconds have passed since the stopwatch started. In some embodiments, as time continues to progress, measurement indicator 1106d4 is updated to reflect the change in time.

In FIG. 11Z, computer system 600 displays user interface 1100z including heading indicator 1106d indicating a heading on a compass. In some embodiments, heading indicator 1106d is white and scale 1106b is black or a color that is different than the color of heading indicator 1106d. As illustrated in user interface 1100aa in FIG. 11AA, heading indicator 1106d is updated to show a position relative to true north and/or magnetic north based on a change in position of computer system 600. In some embodiments, scale 1106b rotates as computer system 600 rotates and heading indicator 1106d is displayed in a fixed position at the top of the user interface.

In FIG. 11AB, computer system 600 displays user interface 1100ab including tide measurement indicator 1106f1 indicating tide conditions and scale 1106b ranging from low tide to high tide. In the example shown in FIG. 11AB, tide measurement indicator 1106f1 indicates low tide conditions at a predetermined location, such as a location at or near computer system 600, a location selected by the user, a location of a tide measurement station, and/or a location on a body of water. Tide measurement indicator 1106f2 is updated in FIG. 11AC to reflect changes in tide conditions at the predetermined location. In FIG. 11AC, computer system 600 displays user interface 110ac with tide measurement indicator 1106f2 indicating high tide conditions based on a change in tide conditions. In some embodiments, tide measurement indicator 1106f2 is updated to reflect tide conditions at a different location than the predetermined location for which tide conditions were previously displayed.

FIG. 12 is a flow diagram illustrating a method for displaying a user interface including a customizable border complication using a computer system in accordance with some embodiments. Method 1200 is performed at a computer system (e.g., 100, 300, 500, 600, a smartwatch, a smartphone, a tablet computer, a laptop computer, and/or a desktop computer) that is in communication with a display generation component (e.g., a display controller, a display, a touch-sensitive display system, a touchscreen, and/or a monitor) and one or more input devices (e.g., 602, 604, 606, a touch-sensitive surface, a touchscreen display, a button, a keyboard, a mouse, a joystick, a camera sensor, and/or a microphone). Some operations in method 1200 are, optionally, combined, the orders of some operations are, optionally, changed, and some operations are, optionally, omitted.

As described below, method 1200 provides an intuitive way for displaying a user interface including a customizable border complication. The method reduces the cognitive burden on a user for displaying a user interface including a customizable border complication, thereby creating a more efficient human-machine interface. For battery-operated computing devices, enabling a user to display a user interface including a customizable border complication faster and more efficiently conserves power and increases the time between battery charges.

The computer system receives (1202), via the one or more input devices, a request (e.g., 1125a, an input, a raise or rotation gesture, a tap gesture (e.g., on a touch-sensitive surface), a voice command, a button press, and/or a rotation of a rotatable input mechanism) to display a time user interface (e.g., 1100b). In some embodiments, the request to display the user interface is received while the display generation component is in a locked state, an inactive state, a low-power state, a sleep state, and/or a dimmed state. In some embodiments, the request to display the user interface is received while the display generation component is displaying a home screen or springboard user interface (e.g., a user interface that includes a plurality of selectable objects for launching respective applications). In some embodiments, the request to display the user interface is received while the display generation component is displaying a wake screen, a lock screen, a user interface of an application (e.g., a music application, email application, or messaging application), and/or a user interface other than a clock face user interface. In some embodiments, the request to display the user interface is received while the display generation component is displaying a user interface (e.g., a clock face user interface) in a first state (e.g., in a locked state, an inactive state, a low-power state, a sleep state, and/or a dimmed state). In some embodiments, the request to display the user interface is received while the display generation component is displaying a different clock face user interface (e.g., a clock face user interface other than the clock face user interface in FIGS. 11B-11AC). In some embodiments, the request to display the user interface is received while the display generation component is displaying a user interface associated with notifications (e.g., a user interface that displays a summary or list of notifications and/or concurrently displays two or more notifications).

In response to receiving the request to display the time user interface, the computer system displays (1204), via the display generation component, a time user interface (e.g., 1100b and/or a watch face), including concurrently displaying: an indication of time (e.g., 1102 and/or an indication of the current time); a plurality of inner complications (e.g., 1104a-1104g); and a customizable (e.g., the user can configure one or more aspects of the complication, including whether the complication is displayed in the time user interface) border complication (e.g., 1106) including a measurement indicator (e.g., 1106a and/or an indicator indicating a current measurement and/or a measurement that is updated over time). In some embodiments, one or more of the inner complications includes a user interface element representing an application and displays information obtained from the application; in some embodiments, one or more of the inner complications are user-customizable (e.g., the user can configure one or more aspects of the complication, including whether the complication is displayed in the time user interface). In some embodiments, the measurement indicator indicates progress toward a goal (e.g., the period of time that has passed on a timer). In some embodiments, the measurement indicator indicates ambient, local, and/or environmental conditions (e.g., the current elevation). In some embodiments, the customizable border complication is displayed surrounding at least a portion of a region of the user interface that includes the indication of time and the plurality of inner complications. In some embodiments, the customizable border complication surrounds a substantial portion (e.g., at least ⅓, at least ½, at least ⅔, at least ¾, or at least 9/10 of a perimeter around the indication of time and the plurality of inner complications. Displaying a measurement indicator in the time user interface reduces the number of inputs required to display the measurement indicator, thereby performing an operation when a set of conditions has been met without requiring further user input and reducing the number of inputs needed to perform an operation. Displaying a customizable border complication including a measurement indicator, wherein the customizable border complication is displayed surrounding at least a portion of a region of the user interface that includes the indication of time and the plurality of inner complications, keeps the user interface less cluttered, thereby providing the user with improved visual feedback.

In some embodiments, the customizable border complication (or, in some embodiments, the measurement indicator) is displayed along an outer perimeter (e.g., an edge) of a total displayable content area (e.g., an area that includes all of the area in which the display generation component can display content and/or the entire displayable area of a display screen, including at least the portion of the region of the user interface) generated by the display generation component. In some embodiments, the customizable border complication and/or the measurement indicator is displayed along an outer perimeter of all displayed content and/or an outer perimeter of the displayable area of a display screen. In some embodiments, no other elements are displayed between the customizable border complication and/or the measurement indicator and the outermost edge of the total displayable content area generated by the generation component. Displaying the customizable border complication along the out perimeter of a region of the user interface that includes content keeps the user interface less cluttered, thereby providing the user with improved visual feedback.

In some embodiments, at a first time, the computer system displays the measurement indicator with a first value (e.g., 1106*a*1). In some embodiments, at a second time that is different from the first time, the computer system displays the measurement indicator with a second value (e.g., 1106*a*2) that is different from the first value (e.g., based on a change in time and/or conditions). In some embodiments, the measurement indicator continually changes to display an updated measurement. In some embodiments, the measurement indicator periodically changes to display an updated measurement. In some embodiments, the measurement indicator updates each second to indicate passage of time, such as on a clock, stopwatch, or a timer. In some embodiments, the measurement indicator updates to display a change in physical conditions, such as elevation, depth, direction, or tide conditions. Displaying a measurement indicator, in the time user interface, that changes over time reduces the number of inputs required to display an updated measurement indicator, thereby performing an operation when a set of conditions has been met without requiring further user input and reducing the number of inputs needed to perform an operation. Displaying the measurement indicator with a first value at a first time and a second value at a second time reduces the number of inputs required to display an updated measurement, thereby performing an operation when a set of conditions has been met without requiring further user input and reducing the number of inputs needed to perform an operation.

In some embodiments, the measurement indicator indicates a seconds value (e.g., 1106*d*1, 1106*d*2, 1106*d*3, and/or an indication of seconds associated with the current time) on a set of tic marks (e.g., 1112 and/or a set of 60 tic marks representing the seconds in a minute) that surround at least a portion of the region of the user interface that includes the indication of time and the plurality of inner complications. Displaying a seconds value in the time user interface reduces the number of inputs required to display the seconds value, thereby performing an operation when a set of conditions has been met without requiring further user input and reducing the number of inputs needed to perform an operation. Displaying a measurement indicator indicating seconds provides the user with information of interest while keeping the user interface less cluttered, thereby providing the user with improved visual feedback.

In some embodiments, the measurement indicator indicates tide conditions (e.g., 1106*f*1, 1106*f*2, and/or high tide and/or low tide measured in feet, inches, or meters from a reference height at a particular location) on a tide scale (e.g., 1106*b* and/or a scale ranging from low tide to high tide or from another minimum and maximum value) that surround at least a portion of the region of the user interface that includes the indication of time and the plurality of inner complications. In some embodiments, the measurement indicator indicates the tide conditions at a predetermined location, such as a location selected by the user, a location of a tide measurement station, and/or a location on a body of water. In some embodiments, the measurement indicator indicates the tide conditions at a tide measurement station that is nearest to the user and/or at a point on a body of water that is nearest to the user. In some embodiments, the measurement indicator indicates the tide conditions at the location of the electronic device. Displaying an indication of tide conditions in the time user interface reduces the number of inputs required to display the tide conditions, thereby performing an operation when a set of conditions has been met without requiring further user input and reducing the number of inputs needed to perform an operation. Displaying a measurement indicator indicating tide conditions provides the user with information of interest while keeping the user interface less cluttered, thereby providing the user with improved visual feedback.

In some embodiments, the measurement indicator indicates a depth measurement (e.g., 1106*c*1, 1106*c*2, and/or the depth below sea level and/or depth under water) on a depth scale (e.g., 1106*b* and/or a scale indicating depth in feet and/or depth in meters) that surrounds at least a portion of the region of the user interface that includes the indication of time and the plurality of inner complications. In some embodiments, the measurement indicator indicates the depth of the electronic device below the surface of water. In some embodiments, the measurement indicator indicates the depth measurement by changing a color of one or more markers on the depth scale as a detected depth changes. Displaying a depth measurement in the time user interface reduces the number of inputs required to display the depth measurement, thereby performing an operation when a set of conditions has been met without requiring further user input and reducing the number of inputs needed to perform an operation. Displaying a measurement indicator indicating depth provides the user with information of interest while keeping the user interface less cluttered, thereby providing the user with improved visual feedback.

In some embodiments, the depth measurement indicates a depth value in a first unit of measure (e.g., a depth measurement in feet or other US/English customary system of measurement units) on a first depth scale (e.g., 1106*c*1, 1106*c*2, and/or a scale in feet or other US/English customary system of measurement units) that is on a first side of the portion of the region of the user interface that includes the indication of time and the plurality of inner complications (e.g., on the left side of the region of the user interface that includes the indication of time and the plurality of inner complications) and a corresponding depth value in a second unit of measure (e.g., 1106c1, 1106c2, and/or a depth measurement in meters or other metric or International System of Units measurement units), different from the first unit of measure, on a second depth scale (e.g., a scale in meters or other metric or International System of Units measurement units) that is on a second side (e.g., a side that is opposite the first side) of the portion of the region of the user interface that includes the indication of time and the plurality of inner complications (e.g., opposite the first portion of the region of the user interface and/or on the right side of the region of the user interface that includes the indication of time and the plurality of inner complications). Displaying a measurement indicator indicating depth value in a first unit of measure and a second unit of measure provides the user with information of interest and cleanly presents the information for two units of measure while keeping the user interface less cluttered, thereby providing the user with improved visual feedback.

In some embodiments, in accordance with a determination that the depth measurement is greater than (or, alternatively, not less than or greater than or equal to) a predetermined depth measurement (e.g., a maximum recommended depth limit for the computer system), the computer system outputs an alert (e.g., 1108 and/or 1110). In some embodiments, the computer system outputs a haptic alert and/or displays a warning and/or notification overlaid on the time user interface or forgoes displaying the time user interface and displays the warning and/or notification. In some embodiments, the alert notifies the user that a maximum recommended depth limit for the computer system has been reached. In some embodiments, the computer system does not measure and/or display depth values greater than the maximum recommended depth limit. In some embodiments, the warning and/or notification replaces and/or blocks all or a portion of the time user interface that was being displayed prior to the output of the alert. In some embodiments, the warning is opaque, translucent, or semi-transparent. Displaying an alert in accordance with a determination that the depth measurement is not less than a predetermined depth measurement provides the user with information that the depth exceeds the maximum recommended depth measurement for the computer system, thereby providing the user with improved visual feedback.

In some embodiments, the measurement indicator indicates a compass heading (e.g., 1106e and/or the direction and/or orientation of the electronic device relative to true north and/or magnetic north). In some embodiments, the compass heading shows as white and/or a color different than the other directions displayed on the compass. In some embodiments, the directions on the measurement indicator rotate as the electronic device rotates. Displaying a compass heading in the time user interface reduces the number of inputs required to display the compass heading, thereby performing an operation when a set of conditions has been met without requiring further user input and reducing the number of inputs needed to perform an operation. Displaying a measurement indicator indicating a compass heading provides the user with information of interest while keeping the user interface less cluttered, thereby providing the user with improved visual feedback.

In some embodiments, the measurement indicator indicates an elevation measurement (e.g., 1106a, 1106a1, 1106a2, and/or the elevation above sea level) on an elevation scale (e.g., 1106b and/or a scale indicating elevation in feet and/or elevation in meters) that surrounds at least the portion of the region of the user interface that includes the indication of time and the plurality of inner complications. In some embodiments, the measurement indicator indicates the elevation of the electronic device. In some embodiments, the measurement indicator indicates the elevation measurement by changing a color of one or more markers on the elevation scale as a detected elevation changes. Displaying an elevation measurement in the time user interface reduces the number of inputs required to display the elevation measurement, thereby performing an operation when a set of conditions has been met without requiring further user input and reducing the number of inputs needed to perform an operation. Displaying a measurement indicator indicating elevation provides the user with information of while keeping the user interface less cluttered, thereby providing the user with improved visual feedback.

In some embodiments, the elevation measurement (e.g., 1106a, 1106a1, and/or 1106a2) changes dynamically based on a detected elevation of the electronic device (e.g., as the electronic device increases elevation, the elevation measurement dynamically updates). In some embodiments, the measurement indicator includes a scale, which dynamically adjusts so the measurement is displayed within the lower limit and the upper limit of the scale. Dynamically changing the elevation measurement based on a location of the electronic device reduces the number of inputs required to display an updated measurement, thereby performing an operation when a set of conditions has been met without requiring further user input and reducing the number of inputs needed to perform an operation.

In some embodiments, the elevation measurement indicates an elevation value in a first unit of measure (e.g., 1106a, 1106a1, 1106a2, and/or elevation measurement in feet or other US/English customary system of measurement units) on a first elevation scale (e.g., 1106b and/or a scale in feet or other US/English customary system of measurement units) that is on a third side (e.g., a side that is the same or different than the first side or the second side) of the portion of the region of the user interface that includes the indication of time and the plurality of inner complications (e.g., the elevation value in a first unit of measure is displayed on the left side of the region of the user interface that includes the indication of time and the plurality of inner complications) and a corresponding elevation value in a second unit of measure (e.g., 1106a, 1106a1, 1106a2, and/or elevation measurement in meters or other metric or International System of Units measurement units), different from the first unit of measure, on a second elevation scale (e.g., 1106b and/or a scale in meters or other metric or International System of Units measurement units) that is on a fourth side (e.g., a side that is opposite the third side) of the portion of the region of the user interface that includes the indication of time and the plurality of inner complications (e.g., the corresponding elevation value in the second unit of measure is displayed opposite the third position of the region of the user interface and/or on the right side of the region of the user interface that includes the indication of time and the plurality of inner complications). In some embodiments, the third portion of the region of the user interface that includes the indication of time and the plurality of inner complications is the same as the first portion of the region of the user interface that includes the indication of time and the plurality of inner complications. In some embodiments, third portion of the region of the user interface that includes the indication of time and the plurality of inner complications is the same as the third portion of the region of the user interface that includes the indication of time and the plurality of inner complications. Displaying a measurement indicator indicating elevation in a first unit of measure and a second unit of measure provides the user with information of interest and cleanly presents the information for two units of measure while keeping the user interface less cluttered, thereby providing the user with improved visual feedback.

In some embodiments, in accordance with a determination that the elevation measurement is less than (or, alternatively, less than or equal to) a predetermined value (e.g., sea level, 100 feet above sea level, 300 feet above sea level, 500 feet above sea level, 1,000 feet above sea level, 100 feet below sea level, 200 feet below sea level, or 300 feet below sea level), the computer system displays (e.g., within a designated area of the time user interface) the elevation scale (e.g., 1106*b*) with a first range of values (e.g., 0-100 feet below sea level, 0-100 feet above sea level, 0-300 feet above sea level, 0-500 feet above sea level, 0-1,000 feet above sea level, 0-100 feet below sea level, 0-200 feet below sea level, or 0-300 feet below sea level). In some embodiments, in accordance with a determination that the elevation measurement is greater than (or, alternatively, greater than or equal to) the predetermined value (e.g., sea level, 100 feet above sea level, 300 feet above sea level, 500 feet above sea level, 1,000 feet above sea level, 100 feet below sea level, 200 feet below sea level, or 300 feet below sea level), the computer system displays (e.g., within the designated area of the time user interface) the elevation scale with a second range of values (e.g., 0-100 feet above sea level, 0-300 feet above sea level, 0-500 feet above sea level, 0-1,000 feet above sea level, 0-10,000 feet above sea level, 0-200 feet below sea level, 0-300 feet below sea level, or 0-1,600 feet below sea level). In some embodiments, the computer system displays the elevation scale with a first range of values in response to detecting a first elevation measurement (e.g., wherein the first elevation measurement is less than the predetermined value In some embodiments, the computer system displays the elevation scale with a second range of values in response to detecting a change from the first elevation measurement to a second elevation measurement (e.g., wherein the second elevation measurement is greater than the predetermined value). In some embodiments, while displaying the elevation scale with the first range of values, the computer system detects a change in elevation measurement to a value that is greater than the predetermined value, and in response to that change, the computer system displays the elevation scale with the second range of values. In some embodiments, the predetermined value is the same as the upper limit of the elevation scale. In some embodiments, the predetermined value is offset from the upper limit of the elevation scale (e.g., the upper limit of the elevation scale is 100 feet above sea level, but the predetermined value is 80 feet above sea level, such that the elevation scale is displayed with a range of 0-100 feet when the measurement in below 80 feet and with a range of 0-200 feet when the measurement is above 80 feet). In some embodiments, the second range of values includes a wider range of values than the first range of values. In some embodiments, the second range of values has a different upper limit than the first range of values and the same lower limit as the first range of values. In some embodiments, the second range of values has a different lower limit than the first range of values and the same upper limit as the first range of values. In some embodiments, the second range of values has a different upper limit and lower limit than the first range of values. In some embodiments, the elevation scale spans the same distance on the display (e.g., within the designated area of the time user interface) whether the elevation scale is displayed with the first range of values or the second range of values. Displaying the elevation scale with a first range of values in accordance with a determination that the elevation measurement is less than a predetermined value and displaying the elevation scale with a second range of values in accordance with a determination that the elevation measurement is greater than a predetermined value optimizes the range of values displayed on the scale within the amount of space available on the display, allowing for a more precise indication of measurement on a small display, thereby providing the user with improved visual feedback and making the measurement indication easier to read and more visible at a further distance from the display.

In some embodiments, in accordance with a determination that the elevation measurement is below sea level (or, in some embodiments, at or below sea level), the computer system displays the elevation scale (e.g., 1106*b*) with a lower limit of the elevation scale (e.g., 0 feet below sea level) at an upper portion of the time user interface and an upper limit of the elevation scale at a lower portion of the time user interface, wherein values of the elevation scale increase from the upper portion of the time user interface to the lower portion of the time user interface. Displaying the elevation scale with a lower limit at an upper portion of the time user interface and an upper limit at a lower portion of the time user interface in accordance with a determination that the elevation measurement is below sea level provides the user with a visual indication that the measurement is below sea level, thereby providing the user with improved visual feedback.

In some embodiments, in accordance with a determination that the elevation measurement is above sea level (or, in some embodiments, at or above sea level), the computer system displays the elevation scale (e.g., 1106*b*) with an upper limit of the elevation scale at an upper portion of the time user interface and a lower limit of the elevation scale (e.g., 0 feet above sea level) at a lower portion of the time user interface, wherein values of the elevation scale increase from the lower portion of the time user interface to the upper portion of the time user interface. Displaying the elevation scale with an upper limit at an upper portion of the time user interface and a lower limit at a lower portion of the time user interface in accordance with a determination that the elevation measurement is above sea level provides the user with a visual indication that the measurement is above sea level, thereby providing the user with improved visual feedback.

In some embodiments, the measurement indicator indicates time remaining on a timer (e.g., 1106*d*4 and/or an amount of time and/or the number of seconds remaining until the timer expires) on a set of tic marks (e.g., 1112 and/or a set of 60 tic marks representing the seconds in a minute) that surround at least a portion of the region of the user interface that includes the indication of time and the plurality of inner complications. Displaying an indicator of time remaining on a timer in the time user interface reduces the number of inputs required to display the time remaining on the timer, thereby performing an operation when a set of conditions has been met without requiring further user input and reducing the number of inputs needed to perform an operation. Displaying a measurement indicator indicating time remaining on a timer provides the user with information of interest while keeping the user interface less cluttered, thereby providing the user with improved visual feedback.

In some embodiments, the measurement indicator indicates passage of time on a stopwatch (e.g., 1106d4 and/or the amount of time and/or the number of seconds that have passed since the stopwatch was started) on a set of tic marks (e.g., 1112 and/or a set of 60 tic marks representing the seconds in a minute) that surround at least a portion of the region of the user interface that includes the indication of time and the plurality of inner complications. In some embodiments, the measurement indicator indicates the passage of time by changing a color of the tic marks. In some embodiments, the duration of the timer is one minute. In some embodiments, the duration of the timer is greater or less than one minute, such as an arbitrary length selected by a user. In some embodiments, one tic mark represents one second and one tic mark changes color each second, such that all tic marks change color after one minute. In some embodiments, the tic marks reset (e.g., change back to the original color) after all of the tic marks changed color (e.g., after a full minute has passed on the stopwatch); additional passage of time is indicated by repeating changing the color of the tic marks. Displaying an indication of passage of time on a stopwatch in the time user interface reduces the number of inputs required to display the stopwatch, thereby performing an operation when a set of conditions has been met without requiring further user input and reducing the number of inputs needed to perform an operation. Displaying a measurement indicator indicating passage of time on a stopwatch provides the user with information of interest while keeping the user interface less cluttered, thereby providing the user with improved visual feedback.

In some embodiments, displaying the plurality of inner complications of the time user interface that includes the customizable border complication includes displaying a first inner complication (e.g., 1104a) at a first complication size and displaying a second inner complication (e.g., 1104b) at a second complication size (e.g., a size that is the same or different than the first size). In some embodiments, the computer system receives, via the one or more input devices, a request to display a second version of the time user interface that does not include the customizable border complication. In some embodiments, in response to receiving the request to display the second version of the time user interface that does not include the customizable border complication, the computer system displays, via the display generation component, the second version of the time user interface that does not include the customizable border complication (e.g., 1100l). In some embodiments, displaying the second version of the time user interface that does not include the customizable border complication includes concurrently displaying the indication of time (e.g., 1102) and the plurality of inner complications (e.g., 1104a-1104g), including displaying the first inner complication at a third complication size that is larger than the first complication size and the second inner complication at a fourth complication size that is larger than the second complication size. In some embodiments, the indication of time of the second version of the time user interface is displayed at a different size and/or at a different position than when the indication of time is displayed in the time user interface that includes the customizable border complication. In some embodiments, the first inner complication and/or the second inner complications are displayed at different positions than when displayed in the time user interface that includes the customizable border complication. Displaying a first inner complication at a first size while displaying the customizable border complication and displaying the first inner complication at a third size when not displaying the customizable border complication reduces the number of inputs required to adjust the size of the inner complications, thereby performing an operation when a set of conditions has been met without requiring further user input and reducing the number of inputs needed to perform an operation. Displaying a first inner complication at a first size while displaying the customizable border complication and displaying the second inner complication at a second size when not displaying the customizable border complication optimizes the display of the plurality of inner complications based on the amount of space available on the display, allowing for display of larger complications on a small display, thereby providing the user with improved visual feedback and making the complications easier to read and more visible at a further distance from the display.

In some embodiments, displaying the indication of time of the time user interface includes displaying the indication of time (e.g., 1102) at a first font size and including an indication of hours and an indication of minutes, without including an indication of seconds. In some embodiments, the computer system receives, via the one or more input devices, a request to display a third version of the time user interface that includes an indication of seconds. In some embodiments, in response to receiving the request to display the third version of the time user interface that includes the indication of seconds, the computer system displays, via the display generation component, the third version of the time user interface (e.g., 1100m) that includes the indication of seconds (e.g., 1102a), including displaying the indication of time at a second font size that is different than the first font size and including the indication of hours, the indication of minutes, and the indication of seconds. In some embodiments, the indication of time, the indication of hours, and/or the indication of minutes are displayed at different positions than when the indication of time is displayed without including the indication of seconds. Displaying the indication of time at a first size when the indication of time does not include an indication of seconds and displaying the indication of time at a second size while displaying the indication of seconds reduces the number of inputs required to adjust the size of the indication of time, thereby performing an operation when a set of conditions has been met without requiring further user input and reducing the number of inputs needed to perform an operation. Displaying the indication of time at a first size when the indication of time does not include an indication of seconds and displaying the indication of time at a second size while displaying the indication of seconds optimizes the display of the indication of time based on the amount of space available on the display, thereby providing the user with improved visual feedback.

In some embodiments, the indication of seconds (e.g., 1102a) is displayed with a color based on (in some embodiments, that corresponds to and/or matches) a color of the measurement indicator (e.g., the indication of seconds is displayed with the same shade, tone, and/or hue as a color displayed in the measurement indicator, such as the color of the tic marks and/or the measurement on the measurement indicator). In some embodiments, the measurement indicator indicates a number of seconds in white and/or grey scale and the indication of seconds on the time user interface is displayed white and/or grey scale. In some embodiments, the measurement indicator indicates an elevation measurement in orange and the indication of seconds on the time user interface is displayed orange. In some embodiments, the measurement indicator indicates a depth measurement in blue and the indication of seconds on the time user interface is displayed blue. Displaying the indication of seconds with a color that corresponds to a color of the measurement indicator provides the user with an indication of the type of measurement indicator, thereby providing the user with improved visual feedback.

In some embodiments, the computer system receives a set of one or more inputs (e.g., tap gestures, such as on a touch-sensitive surface; voice commands; button presses; and/or rotation of a rotatable input mechanism) corresponding to a request to change the measurement indicator (e.g., a request to change the type of measurement indicator and/or a request to change the color of the measurement indicator). In some embodiments, the request to change the measurement indicator includes a request to change the type of measurement indicator, such as from a measurement indicator indicating elevation to a measurement indicator indicating depth. In some embodiments, the request to change the measurement indicator includes a request to change a color of the customizable border complication, such as a color of the measurement indicator, without including a request to change the type of measurement indicator. In some embodiments, in response to receiving the set of one or more inputs corresponding to the request to change the measurement indicator, the computer system changes the color of the indication of seconds (e.g., in accordance with the change in measurement indicator). In some embodiments, the change in color of the indication of seconds corresponds to (e.g., is the same change in shade, tone, and/or hue as) a change in color of the measurement indicator. In some embodiments, prior to receiving the request to change the measurement indicator, the measurement indicator indicates the elevation in orange and the indication of seconds is displayed orange. In some embodiments, after receiving the request to change the measurement indicator, the measurement indicator indicates the depth in blue and the indication of seconds is displayed blue. Changing the color of the indication of seconds in response to receiving the set of one or more inputs corresponding to a request to change the measurement indicator provides the user with an indication that the type of measurement indicator has changed, thereby providing the user with improved visual feedback.

In some embodiments, displaying the plurality of inner complications of the time user interface includes displaying a first set of one or more inner complications (e.g., 1104e-1104g) and a second set of one or more inner complications (e.g., 1104b-1104d). In some embodiments, displaying the indication of time of the time user interface includes displaying the indication of time with a first characteristic (e.g., at a particular size, at a particular ratio of height to width, and/or at a particular location). In some embodiments, the computer system receives, via the one or more input devices, a request to display a fourth version of the time user interface that does not include the second set of one or more inner complications. In some embodiments, in response to receiving the request to display the fourth version of the time user interface that does not include the second set of one or more inner complications, the computer system displays, via the display generation component, the fourth version of the time user interface (e.g., 1100p) that does not include the second set of one or more inner complications, including displaying the indication of time with a second characteristic that is different from the first characteristic (e.g., at a different size, at a different ratio of height to width, and/or at a different location). Changing the indication of time based on one or more features of the time user interface reduces the number of inputs required to adjust the indication of time, thereby performing an operation when a set of conditions has been met without requiring further user input and reducing the number of inputs needed to perform an operation. Changing the indication of time based on one or more features of the time user interface optimizes the display of the indication of time based on the amount of space available on the display, thereby providing the user with improved visual feedback.

In some embodiments, the first characteristic includes a third font size and the second characteristic includes a fourth font size that is different than the third font size (e.g., the fourth font size is larger or smaller than the third font size). Changing the font size of the indication of time based on one or more features of the time user interface reduces the number of inputs required to adjust the font size of the indication of time, thereby performing an operation when a set of conditions has been met without requiring further user input and reducing the number of inputs needed to perform an operation. Changing the font size of the indication of time based on one or more features of the time user interface optimizes the display of the indication of time based on the amount of space available on the display, thereby providing the user with improved visual feedback.

In some embodiments, the first characteristic includes a first ratio of height to width and wherein the second characteristic includes a second ratio of height to width that is greater than the first ratio of height to width (e.g., the font is stretched and/or expanded vertically). In some embodiments, the width remains the same (e.g., the width of the first characteristic and the width of the second characteristic are the same) but the height increases (e.g., the height of the second characteristic is greater than the height of the first characteristic), so the second ratio of height to width is greater than the first ratio of height to width. For example, in changing from user interface 1100m shown in FIG. 11M to user interface 1100n shown in FIG. 11N, the height of indication of time 1102 increases, while the width of indication of time 1102 remains the same; therefore, the ratio of height to width of indication of time 1102 is greater in FIG. 11N. In some embodiments, the height remains the same (e.g., the height of the first characteristic and the height of the second characteristic are the same) but the width decreases (e.g., the width of the second characteristic is smaller than the width of the first characteristic), so the second ratio of height to width is greater than the first ratio of height to width. For example, in changing from user interface 1100n shown in FIG. 11N to user interface 1100o shown in FIG. 11O, the height of indication of time 1102 remains the same, while the width of indication of time 1102 (e.g., the portion indicating "10:09") increases; therefore, the ratio of height to width of indication of time 1102 is smaller in FIG. 11O. In some embodiments, both the width and the height change (e.g., the height and width of the second characteristic are different than the height and width of the first characteristic) and the second ratio of height to width is greater than the first ratio of height to width. For example, in changing from user interface 1100l shown in FIG. 11L to user interface 1100n shown in FIG. 11N, the height of indication of time increases and the width of indication of time 1102 (e.g., the portion indicating "10:09") decreases; therefore, the ratio of height to width of indication of time 1102 is greater in FIG. 11N. Increasing the ratio of height to width of the indication of time based on one or more features of the time user interface reduces the number of inputs required to adjust the proportion of the indication of time, thereby performing an operation when a set of conditions has been met without requiring further user input and reducing the number of inputs needed to perform an operation. Increasing the ratio of height to width of the indication of time based on one or more features of the time user interface optimizes the display of the indication of time based on the amount of space available on the display, thereby providing the user with improved visual feedback.

In some embodiments, the first characteristic includes a third ratio of height to width and wherein the second characteristic includes a fourth ratio of height to width that is smaller (e.g., shorter) than the third ratio of height to width (e.g., the font is compressed vertically). In some embodiments, the width remains the same (e.g., the width of the first characteristic and the width of the second characteristic are the same) but the height decreases (e.g., the height of the second characteristic is smaller than the height of the first characteristic), so the second ratio of height to width is less than the first ratio of height to width. For example, in changing from user interface 1100n in FIG. 11N to user interface 1100m in FIG. 11M, the width of indication of time 1102 remains the same, while the height of indication of time 1102 decreases; therefore, the ratio of height to width of indication of time 1102 is smaller in FIG. 11M. In some embodiments, the height remains the same (e.g., the height of the first characteristic and the height of the second characteristic are the same) but the width increases (e.g., the width of the second characteristic is greater than the width of the first characteristic), so the second ratio of height to width is less than the first ratio of height to width. For example, in changing from user interface 1100o in FIG. 11O to user interface 1100n in FIG. 11N, the height of indication of time 1102 remains the same, while the width of indication of time 1102 (e.g., the portion indicating "10:09") increases; therefore, the ratio of height to width of indication of time 1102 is smaller in FIG. 11N. In some embodiments, both the width and the height change (e.g., the height and width of the second characteristic are different than the height and width of the first characteristic) and the second ratio of height to width is less than the first ratio of height to width. For example, in changing from user interface 1100o shown in FIG. 11O to user interface 1100m shown in FIG. 11M, the height of indication of time decreases and the width of indication of time 1102 (e.g., the portion indicating "10:09") decreases; therefore, the ratio of height to width of indication of time 1102 is smaller in FIG. 11M. Decreasing the height of the indication of time based on one or more features of the time user interface reduces the number of inputs required to adjust the font size of the indication of time, thereby performing an operation when a set of conditions has been met without requiring further user input and reducing the number of inputs needed to perform an operation. Decreasing the height of the indication of time based on one or more features of the time user interface optimizes the display of the indication of time based on the amount of space available on the display, thereby providing the user with improved visual feedback.

In some embodiments, the first characteristic includes a first width and the second characteristic includes a second width that is larger (e.g., wider) than the first width (e.g., the font is stretched and/or expanded horizontally). In some embodiments, the width of the indication of time is increased (e.g., changed from the first width to the second width) without changing a first height of the indication of time. For example, in changing from user interface 1100n in FIG. 11N to user interface 1100o in FIG. 11O, the width of indication of time 1102 (e.g., the portion indicating "10:09") increases, while the height of indication of time 1102 remains the same. Increasing the width of the indication of time based on one or more features of the time user interface reduces the number of inputs required to adjust the font size of the indication of time, thereby performing an operation when a set of conditions has been met without requiring further user input and reducing the number of inputs needed to perform an operation. Increasing the width of the indication of time based on one or more features of the time user interface optimizes the display of the indication of time based on the amount of space available on the display, thereby providing the user with improved visual feedback.

In some embodiments, the first characteristic includes a third width and the second characteristic includes a fourth width that is smaller (e.g., narrower) than the third width (e.g., the font is compressed horizontally). In some embodiments, the width of the indication of time is decreased (e.g., changed from the third width to the fourth width) without changing a first height of the indication of time. For example, in changing from user interface 1100o in FIG. 11O to user interface 1100n in FIG. 11N, the width of indication of time 1102 (e.g., the portion indicating "10:09") decreases, while the height of indication of time 1102 remains the same. Decreasing the width of the indication of time based on one or more features of the time user interface reduces the number of inputs required to adjust the font size of the indication of time, thereby performing an operation when a set of conditions has been met without requiring further user input and reducing the number of inputs needed to perform an operation. Decreasing the width of the indication of time based on one or more features of the time user interface optimizes the display of the indication of time based on the amount of space available on the display, thereby providing the user with improved visual feedback.

In some embodiments, displaying the time user interface includes displaying the time user interface in a standard mode (e.g., 1100b-1100h). In some embodiments, while displaying the time user interface in the standard mode, the computer system receives, via the one or more input devices, a request to display the time user interface in a low light mode (e.g., 1125b and/or a swipe to the right and/or a swipe to the left). In some embodiments, in response to receiving the request to display the time user interface in a low light mode, the computer system displays the time user interface in a low light mode (e.g., 1100j) (e.g., in a power conserving mode). In some embodiments, the overall (e.g., cumulative) brightness of the time user interface in the standard mode is greater than the overall brightness of the time user interface in the low light mode. In some embodiments, one or more graphical elements (e.g., the indication of time, one or more inner complications, and/or the border complication of the time user interface) are different (e.g., displayed in a modified form or not displayed at all), as between the standard mode and the low light mode. In some embodiments, in the low light mode, the background of the time user interface is displayed having a dark color and/or the indication of time and/or information displayed on the time user interface is displayed having a color that is easily visible in low light conditions (e.g., red, blue, or yellow). In some embodiments, the time user interface does not include the customizable border complication, and the time user interface is displayed in the standard mode and, in response to receiving the request to display the time user interface in the low light mode, the time user interface is displayed in the low light mode. Displaying the time user interface in a low light mode in response to receiving the first input provides improved feedback and allows a user to select the manner in which the time user interface is displayed. Displaying the time user interface in a low light mode reduces power usage and improves battery life.

In some embodiments, while the time user interface is displayed in the low light mode (e.g., 1100*j*), the computer system receives, via the one or more input devices, a request to display the time user interface in the standard mode (e.g., a swipe to the left and/or a swipe to the right). In some embodiments, the request to display the time user interface in a low light mode is an input in a first direction and the request to display the time user interface in the standard mode is an input in a second direction that is different than the first direction (e.g., opposite the first direction). In some embodiments, in response to receiving the request to display the time user interface in the standard mode, the computer system displays the time user interface in the standard mode (e.g., 1100*b*-1100*h*). Displaying the time user interface in a normal mode in response to receiving the second input provides improved feedback and allows a user to select the manner in which the time user interface is displayed.

In some embodiments, displaying the time user interface in the low light mode includes displaying the time user interface with a darker background than as is displayed in the standard mode (e.g., 1100*j*). Displaying the time user interface with a darker background reduces power usage and improves battery life.

In some embodiments, displaying the time user interface in the low light mode includes displaying the time user interface with fewer colors (e.g., the low light mode is displayed with limited colors or is displayed in black and white and/or grayscale) than as is displayed in the standard mode. Displaying the time user interface with fewer colors reduces power usage and improves battery life. Displaying the time user interface with fewer colors simplifies the display, thereby providing the user with improved visual feedback.

In some embodiments, displaying the time user interface in the low light mode includes displaying the time user interface with a single color (e.g., the time user interface is displayed with one color such as red, blue or yellow, and is otherwise black and white and/or grayscale). Displaying the time user interface with a single color reduces power usage and improves battery life. Displaying the time user interface with a single color simplifies the display, thereby providing the user with improved visual feedback.

In some embodiments, the computer system detects that a set of one or more low light criteria has been met. In some embodiments, in response to detecting that the set of one or more low light criteria has been met, the computer system displays the time user interface in a low light mode (e.g., 1100*j*). In some embodiments, in response to detecting that the set of one or more low light criteria has not been met, the computer system displays the time user interface in a normal mode and/or a mode that is different than the low light mode. In some embodiments, the computer system displays the low light mode whether or not the set of one or more low light criteria has been met (e.g., the low light mode is always on). In some embodiments, the computer system displays a normal mode and/or a mode that is different than the low light mode whether or not the set of one or more low light criteria has been met (e.g., low light mode is always off). In some embodiments, the computer system receives a set of one or more inputs (e.g., one or more inputs in a settings menu) for changing a low light mode setting (e.g., changing between always on, always off, or automatically displaying low light mode). Displaying the low light mode in response to detecting that a set of one or more low light criteria has been met reduces the number of inputs required to display the time user interface in the low light mode, thereby performing an operation when a set of conditions has been met without requiring further user input and reducing the number of inputs needed to perform an operation.

In some embodiments, the set of one or more low light criteria includes an ambient light criterion (e.g., a criterion that is met when an amount of ambient light is above or below a predetermined threshold). Displaying the low light mode in response to detecting that an ambient light criterion has been met reduces the number of inputs required to display the time user interface in the low light mode, thereby performing an operation when a set of conditions has been met without requiring further user input and reducing the number of inputs needed to perform an operation.

In some embodiments, the set of one or more low light criteria includes a time criterion (e.g., a criterion that is met at a predetermined time, such as 6 PM, and/or at a time of an event, such as sunset local time). In some embodiments, the time criteria is based on a location of the computer system and/or a time of year that causes different lighting conditions to occur at different times (e.g., sunrise, sunset, twilight, daytime, and/or nighttime). Displaying the low light mode in response to detecting a time criterion has been met reduces the number of inputs required to display the time user interface in the low light mode, thereby performing an operation when a set of conditions has been met without requiring further user input and reducing the number of inputs needed to perform an operation.

In some embodiments, the customizable border complication (e.g., 1106) substantially surrounds (e.g., surrounds 80%, 85%, 90%, 95%, or 100% of) a total displayable content area (e.g., an area that includes all of the area in which the display generation component can display content and/or the entire displayable area of a display screen, including at least the portion of the region of the user interface) generated by the display generation component. Displaying the customizable border complication substantially surrounding the region of the user interface in which content is displayed keeps the user interface less cluttered, thereby providing the user with improved visual feedback.

In some embodiments, the customizable border complication (e.g., 1106) is displayed along at least two opposite portions (e.g., left portion and right portion or top portion and bottom portion) of a total displayable content area (e.g., an area that includes all of the area in which the display generation component can display content and/or the entire displayable area of a display screen, including at least the portion of the region of the user interface) generated by the display generation component. Displaying the customizable border complication along at least two opposite portions of the region of the user interface that includes the indication of time and the plurality of inner complications keeps the user interface less cluttered, thereby providing the user with improved visual feedback.

In some embodiments, while displaying a respective user interface (e.g., an application user interface, a time user interface or a system user interface that is not a time user interface) that is different from the time user interface (or, in some embodiments, while not displaying the time user interface and/or not displaying the customizable border complication), the computer system detects that a set of one or more immersion criteria have been met. In some embodiments, the respective user interface is a different watch face (e.g., 607*a*, 900*b*, 1100*b*, 1300*b*, 1400*b*, or 1600*b*). In some embodiments, the set of one or more immersion criteria includes a criterion that is met when a determination is made that the computer system is immersed (or, in some embodiments, submerged) in a liquid (e.g., water and/or an aqueous solution). In some embodiments, the determination is made based on data from one or more sensors of the computer system (e.g., a touch-sensitive surface, a pressure sensor, a conductivity sensor, and/or a capacitive sensor)). In some embodiments, the set of one or more immersion criteria includes a criterion that is met when a determination is made that the computer system is submerged in a liquid to more than a threshold depth (e.g., 6 inches, 1 foot, 3 feet, 5 feet, or 10 feet underwater). In some embodiments, the computer system is a watch and the set of one or more immersion criteria includes a criterion that is met when a currently set watch face (e.g., a currently selected watch face) includes one or more complications that correspond to (e.g., are relevant to) being submerged under water (e.g., a dive timer complication, a depth meter complication, and/or a swimming workout complication). In some embodiments, in response to detecting that the set of one or more immersion criteria have been met, the computer system displays a respective time user interface (e.g., displaying the time user interface that includes concurrently displaying one or more of the indication of time, the plurality of inner complications, and/or the customizable border complication including the measurement indicator (e.g., including a depth indicator that indicates the depth below water)). In some embodiments, the time user interface is only displayed if one or more of elements of the time interface (e.g., one of more of the complications (e.g., one or more of the plurality of inner complications and/or the customizable border complication)) is relevant while under water, such as one or more complications being a depth meter, a dive timer, and/or swim workout complication, and if the time user interface does not include one or more elements that are relevant while under water, the time user interface is not displayed when the immersion criteria have been met. In some embodiments, the respective user interface is a time user interface that includes an indication of time, a plurality of inner complications, and a customizable border complication (e.g., is a version of the time user interface that does not include a complication that is relevant while under water). In some embodiments, after displaying the respective time user interface based on the set of one or more immersion criteria being met, the computer system detects that the immersion criteria cease to be met and, in response to detecting that the immersion criteria cease to be met, the computer system maintains display of the respective time user interface (e.g., that includes the one or more elements that are relevant while under water). In some embodiments, after displaying the respective time user interface based on the set of one or more immersion criteria being met, the computer system detects that the immersion criteria cease to be met and in response to detecting that the immersion criteria cease to be met, the computer system ceases to display the respective time user interface (e.g., that includes the one or more elements that are relevant while under water) and optionally redisplays a user interface that was displayed prior to the immersion criteria being met (or, alternatively displays a different user interface or ceases to display any user interface). Displaying the time user interface in response to detecting that the computer system has been submerged in water reduces the number of inputs required to display the time user interface, thereby performing an operation when a set of conditions has been met without requiring further user input and reducing the number of inputs needed to perform an operation. Displaying the time user interface in response to detecting that the computer system has been submerged in water provides an indication that the computer system has been submerged in water, thereby providing the user with improved visual feedback.

Note that details of the processes described above with respect to method 1200 (e.g., FIG. 12) are also applicable in an analogous manner to the methods described above. For example, methods 700, 800, 1000, 1500, and/or 1700 optionally include one or more of the characteristics of the various methods described above with reference to method 1200. For example, the user interface in method 1200 can display a user interface including a customizable border complication as described in method 1200. For brevity, these details are not repeated below.

FIGS. 13A-13L illustrate exemplary time user interfaces, in accordance with some embodiments. The user interfaces in these figures are used to illustrate the processes described below, including the processes in FIG. 15.

Figure 13A:
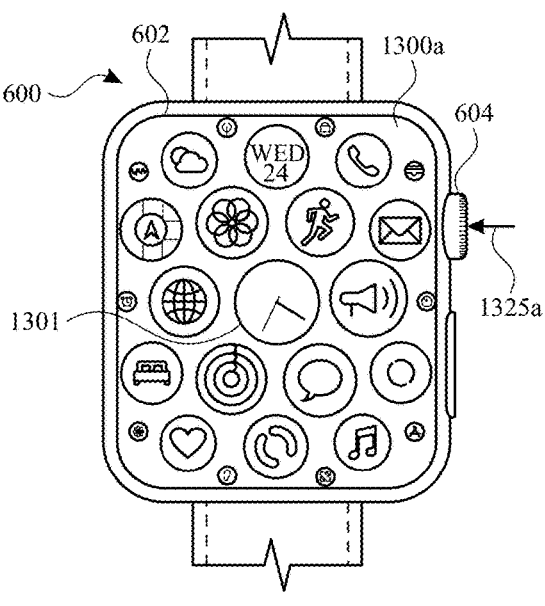

FIG. 13A illustrates computer system 600 (e.g., as described above) displaying, on display 602, user interface 1300a (e.g., a home screen or an application springboard) that includes application icons for opening respective applications. In some embodiments, user interface 1300a is a user interface of an application (e.g., a messaging application, an email application, a calendar application, or a workout application) or a menu user interface (e.g., a settings menu). In FIG. 13A, computer system 600 detects request 1325a (e.g., a press of input mechanism 604) to display a time user interface. In some embodiments, request 1325a is an input on mechanism 604, such as a press and/or a rotation, as discussed with respect to FIG. 13A. In some embodiments, request 1325a is a tap input and/or other input on an application icon, such as clock icon 1301 shown in FIG. 13A. In some embodiments, request 1325a is a swipe input and/or other input on a different user interface, such as a menu user interface (e.g., a settings menu), a user interface associated with notifications (e.g., a user interface that displays a summary of notifications), and/or a user interface of an application (e.g., a messaging application, an email application, a calendar application, or a workout application). In some embodiments, request 1325a is a swipe input and/or other input on a different time user interface, such as user interface 1100b in FIG. 11B or user interface 1600b in FIG. 16B. In some embodiments, request 1325a is a predefined movement of at least a portion of computer system 600, such as raising and/or rotating computer system 600 (e.g., a wrist raise gesture).

Figure 13B:
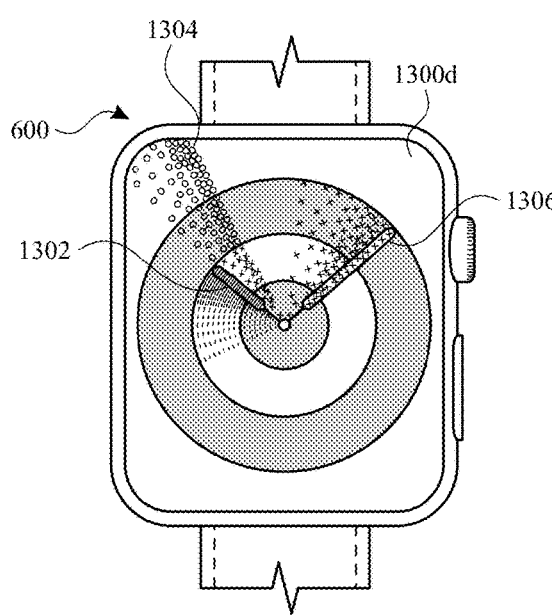

In response to detecting request 1325a, computer system 600 displays a time user interface, such as user interface 1300b shown in FIG. 13B. In some embodiments, user interface 1300b is a clock face, a watch face, a wake screen, a lock screen, and/or a home screen. In some embodiments, user interface 1300b is displayed in response to movement of computer system 600 (e.g., displayed in response to a wrist raise gesture) while display 602 is in an inactive state or a less active state (e.g., a low power state). As shown in FIG. 13B, user interface 1300b includes an indication of the current time, including first watch hand 1302 (e.g., hour hand), second watch hand 1304 (e.g., seconds hand), and third watch hand 1306 (e.g., minute hand).

In some embodiments, one or more of the watch hands is colored, such as first watch hand 1302 being yellow. In some embodiments, one or more of the watch hands is a different color from one of the other watch hands. For example, first watch hand 1302 is yellow and second watch hand 1304 is red. In some embodiments, a watch hand is multicolored, such as second watch hand 1304 being red and green. For example, in FIG. 13B, interior portion 1304a of second watch hand 1304 is red and exterior portion 1304b of second watch hand 1304 is green. In some embodiments, the location of the colors on a multicolored watch hand correspond to regions of user interface 1300b that relate to other watch hands, such as interior region 1308a corresponding to the hours hand and exterior region 1308b corresponding to the minutes hand In some embodiments, the background of user interface 1300b visually distinguishes between the regions of user interface 1300b. In FIG. 13B, for example, the background of user interface 1300b includes ring 1308 that visually distinguishes between interior region 1308a and exterior region 1308b. In some embodiments, the location where a multicolor watch hand transitions colors correspond to a visual distinction in the background of user interface 1300b. In some embodiments, interior portion 1304a of second watch hand 1304 corresponds to interior region 1308a and exterior portion 1304b of second watch hand 1304 corresponds to exterior region 1308b. For example, in FIG. 13B, the transition from red in interior portion 1304a of second watch hand 1304 to green in exterior portion 1304b of second watch hand 1304 occurs at ring 1308.

FIG. 13B illustrates computer system 600 displaying user interface 1300b, wherein first watch hand 1302, second watch hand 1304, and third watch hand 1306 are different colors. First watch hand 1302 is yellow; second watch hand 1304 is red in interior region 1308a and green in exterior region 1308b; and third watch hand 1306 is blue. In FIGS. 13B-13L, the colors are represented by patterns. For example, yellow is represented by a pattern of dots (•), red is represented by a pattern of dashes (-), green is represented by a pattern of ohs (○), and blue is represented by a pattern of exes (x).

Figure 13C:
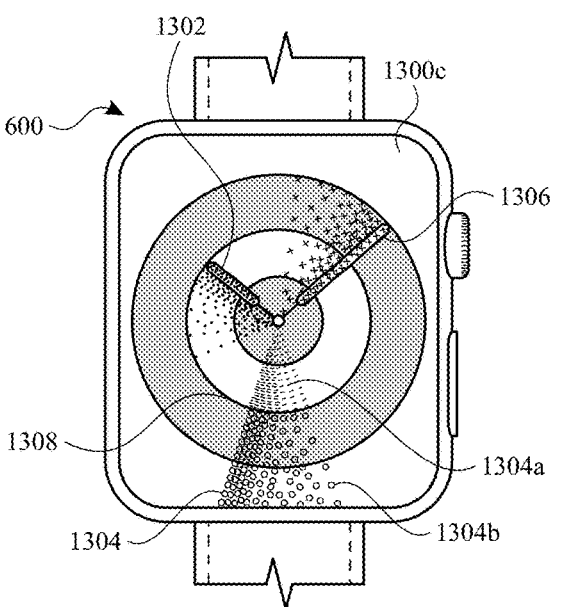
Figure 13D:

In accordance with a determination that the current time is a first time, computer system 600 displays a user interface with first watch hand 1302 having a first color. For example, FIG. 13C illustrates computer system 600 displaying user interface 1300c at a first time (e.g., 10:10:35), wherein first watch hand 1302 is yellow (•). In accordance with a determination that the current time is a second time, computer system 600 displays a user interface with first watch hand 1302 having a second color. For example, FIG. 13D illustrates computer system 600 displaying user interface 1300d at a second time (e.g., 10:10:55), wherein first watch hand 1302 is red (-).

In some embodiments, first watch hand 1302 changes color in accordance with a determination that the current time is a third time (e.g., 10:11:13). In some embodiments, the third time is the moment when second watch hand 1304 intersects with first watch hand 1302. For example, transitioning from FIG. 13C to FIG. 13D, second watch hand 1304 intersects with first watch hand 1302. As a result, first watch hand 1302 changes from yellow (•) to red (-), as shown in user interface 1300d of FIG. 13D. In comparison, transitioning from FIG. 13B to FIG. 13C, second watch hand 1304 does not intersect with first watch hand 1302. Accordingly, first watch hand 1302 is yellow (•) in user interface 1300b shown in FIG. 13B and first watch hand 1302 remains yellow (•) in user interface 1300c shown in FIG. 13C.

In some embodiments, third watch hand 1306 changes color. For example, third watch hand changes color when second watch hand 1304 intersects with third watch hand 1306. The transition from FIG. 13D to FIG. 13E illustrates a change in time, wherein second watch hand 1304 has intersected with third watch hand 1306. As a result, first watch hand 1302 changed from blue (x) to green (○), as shown by third watch hand being green (○) in user interface 1300e of FIG. 13E.

In some embodiments, computer system 600 displays a preview or indication of the colors to which first watch hand 1302 and/or third watch hand 1306 will change. In some embodiments, the preview is indicated by the color of a watch hand, such as the color of second watch hand 1304. For example, the preview of the color to which first watch hand 1302 will change is indicated by the current color of second watch hand 1304. In some embodiments, a single watch hand, such as second watch hand 1304, displays a preview of two different colors corresponding to two different watch hands, such as first watch hand 1302 and third watch hand 1306. In FIG. 13C, for example, interior portion 1304a of second watch hand 1304 is red (-) and exterior portion 1304b of second watch hand 1304 is green (○). The red portion and the green portion indicate the colors to which first watch hand 1302 and third watch hand 1306 will change, respectively. In FIG. 13D, first watch hand 1302 changes from yellow (•) to red (-), which was indicated by interior portion 1304a of second watch hand 1304 being red (-) in FIG. 13C. In FIG. 13E, third watch hand 1306 changes from blue (x) to green (○), which was indicated by exterior portion 1304b of second watch hand 1304 being green (○) in FIG. 13D.

In some embodiments, the colored watch hands and/or previews are displayed as gradients, ranging from a more saturated color at the watch hand to a less saturated color away from the watch hand. As shown in FIG. 13C, for example, computer system 600 displays user interface 1300c including a darker and/or more saturated red color along first watch hand 1302 and a lighter and/or less saturated red away from first watch hand 1302, eventually fading into the background of user interface 1300c. In FIGS. 13B-13L the color saturation is illustrated by the density of the pattern, wherein a denser pattern corresponds to more color saturation and a less dense pattern corresponds to less color saturation. In some embodiments, the watch hand and/or preview includes two gradients. In FIG. 13C, for example, interior portion 1304a of second watch hand 1304 includes a red (-) gradient and exterior portion 1304b of second watch hand 1304 includes a green (○) gradient.

In some embodiments the size of a gradient changes as one or more watch hands change positions. In some embodiments, a gradient disappears at or near (e.g., within a threshold amount of time, such as 0.001, 0.01, 0.1, or 1 second of) the moment a watch hand intersects with another watch hand and/or at the moment the one or more watch hands change colors. For example, in the transition between FIG. 13D and FIG. 13E, the gradient corresponding to second watch hand 1304 disappears when second watch hand 1304 intersects with third watch hand 1306 or within a threshold amount of time of the moment second watch hand 1304 intersect with third watch hand 1306. In some embodiments, the size of a gradient increases as one watch hand moves away from another watch hand. For example, after the gradient corresponding to second watch hand 1304 disappears (e.g., at the moment of intersection with third watch hand 1306 or within a threshold period of time), the gradient corresponding to second watch hand 1304 reappears and expands to fill the growing space between second watch hand 1304 and third watch hand 1306. In some embodiments, a gradient does not exceed a maximum size, such as 40, 60, or 80 degrees. In some embodiments, a gradient fills the entire space between one watch hand and another watch hand, regardless of the distance between the two watch hands. FIG. 13E illustrates user interface 1300*e* at a point in time where second watch hand 1304 recently intersected with third watch hand 1306 and, accordingly, the distance between second watch hand 1304 and third watch hand 1306 is relatively small. In this case, the gradients in interior portion 1304*a* and exterior portion 1304*b* are compressed and the gradients extend from second watch hand 1304 to third watch hand 1306.

FIG. 13F illustrates user interface 1300*f* at a later point in time, wherein the distance between second watch hand 1304 and third watch hand 1306 is greater than that shown in FIG. 13E. As a result, the gradients in interior portion 1304*a* and exterior portion 1304*b* are larger than those shown in FIG. 13E. In the example illustrated in FIG. 13F, the gradient does not extend beyond a maximum gradient size. Thus, the gradients in FIG. 13F do not fully extend from second watch hand 1304 to third watch hand 1306, but rather, the gradients extend from second watch hand 1304 to the maximum gradient size.

In some embodiments, the size of a gradient decreases as one watch hand moves towards another watch hand. For example, the transition between FIG. 13F to FIG. 13G illustrates compression of first watch hand 1302 (e.g., compression of the gradient of first watch hand 1302) as second watch hand 1304 moves towards first watch hand 1302. In FIG. 13F, first watch hand 1302 is fully expanded to a maximum gradient size. In FIG. 13G, computer system 600 displays user interface 1300*g* wherein second watch hand 1304 has moved towards first watch hand 1302, so the distance between second watch hand 1304 and first watch hand 1302 becomes relatively small. In this case, the gradient corresponding to first watch hand 1302 is compressed and the gradient extends from second watch hand 1304 to first watch hand 1302. In some embodiments, a gradient disappears at or near (e.g., within a threshold amount of time, such as 0.001, 0.01, 0.1 or 1 second of) the moment a watch hand intersects with another watch hand and/or at or near (e.g., within a threshold amount of time, such as 0.001, 0.01, 0.1 or 1 second of) the moment one or more watch hands change colors. For example, in the transition between FIG. 13G and FIG. 13H, the gradient corresponding to second watch hand 1304 disappears when second watch hand 1304 intersects with first watch hand 1302 or within a threshold amount of time of the moment second watch hand 1304 intersect with first watch hand 1302. Then, the gradient corresponding to second watch hand 1304 expands as second watch hand 1304 moves away from first watch hand 1302, as illustrated in user interface 1300*h* of FIG. 13H.

In some embodiments, computer system 600 displays a user interface based on a state of computer system 600. In some embodiments, computer system 600 is configured to operate in a reduced-power state that consumes (e.g., on average over time) less energy than other operating states (e.g., the operating state of computer system in FIGS. 13B-13H). In some embodiments, computer system 600 enters a reduced-power state in response to a determination that a user of computer system 600 is inactive and/or is not looking at display 602 (e.g., the user lowers computer system 600 and/or does not interact with display 602 (or another input device of computer system 600) for a threshold amount of time).

Figures 13I, 13J:
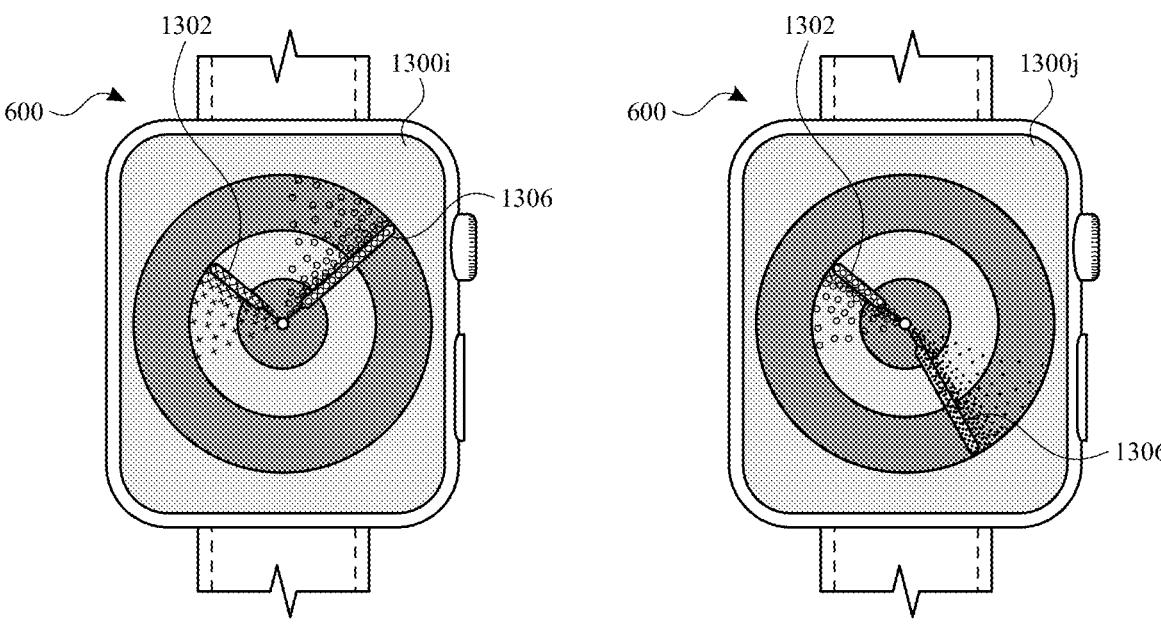
Figures 13K, 13L:
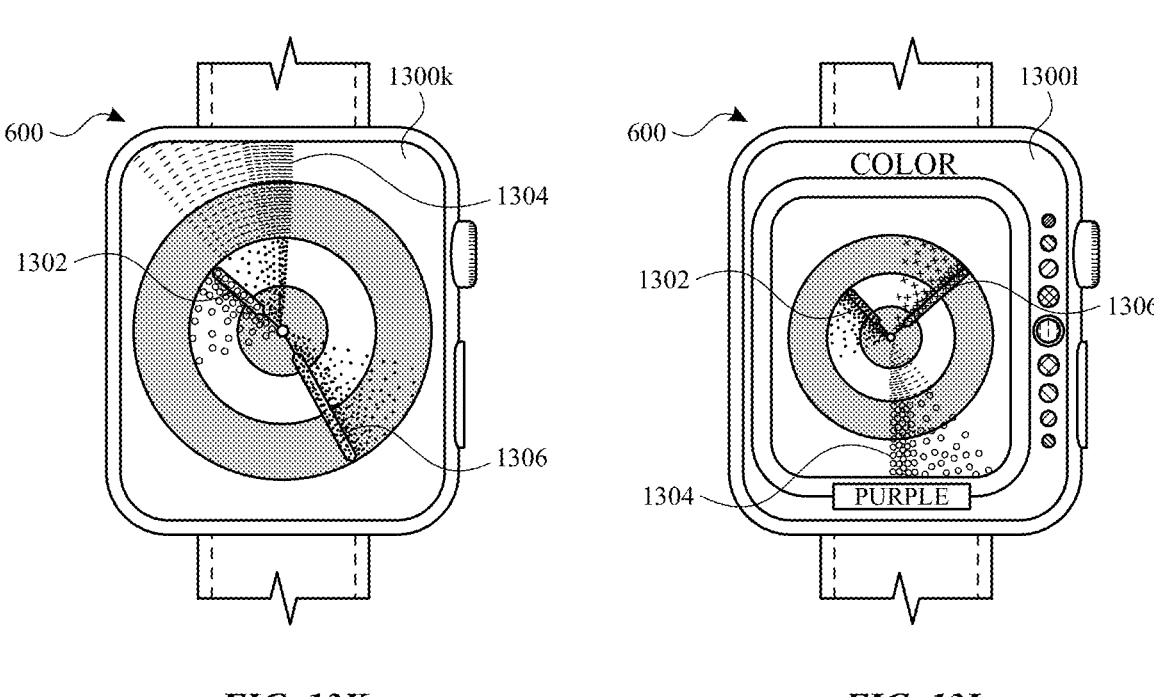

FIGS. 13I-13J illustrate computer system 600 operating in a reduced-power state. In some embodiments, computer system 600 displays user interface 1300*i* with a darker background than as displayed in FIG. 13H. In some embodiments, computer system 600 displays user interface 1300*i* without displaying second watch hand 1304. In some embodiments, as time progresses, one or more of the watch hands change colors even though second watch hand 1304 is not displayed in user interface 1300*i*. For example, in FIG. 13J, computer system 600 displays user interface 1300*j*, wherein first watch hand changed from blue (x) to green (○) and third watch hand 1306 changed from green (○) to yellow (•) based on the change in time. In some embodiments, first watch hand 1302 and third watch hand 1306 remain the colors they were at the time computer system 600 entered the reduced-power state. In some embodiments, first watch hand 1302 and third watch hand 1306 change colors when computer system 600 transitions from reduced-power state to a standard and/or high-powered state. FIG. 13K illustrates user interface 1300*k* after computer system 600 resumes an active and/or high-power state.

In some embodiments, in response to detecting a set of one or more inputs, computer system 600 enters a clock face edit mode. For example, in FIG. 13L, computer system 600 enters a clock face edit mode and displays user interface 1300*l* corresponding to selection of color combinations. In some embodiments, a user can select between different combinations of colors in order to edit how a user interface appears, including the combination of colors through which first watch hand 1302, second watch hand 1304, third watch hand 1306, and/or the background of the time user interface will cycle as the time changes. For example, a user can select from predetermined and/or curated combinations of colors.

FIGS. 14A-14R illustrate exemplary time user interfaces, in accordance with some embodiments. The user interfaces in these figures are used to illustrate the processes described below, including the processes in FIG. 15.

FIG. 14A illustrates computer system 600 (e.g., as described above) displaying, on display 602, user interface 1400*a* (e.g., a home screen or an application springboard) that includes application icons for opening respective applications. In some embodiments, user interface 1400*a* is a user interface of an application (e.g., a messaging application, an email application, a calendar application, or a workout application) or a menu user interface (e.g., a settings menu). In FIG. 14A, computer system 600 detects request 1425*a* (e.g., a press of input mechanism 604) to display a time user interface. In some embodiments, request 1425*a* is an input on mechanism 604, such as a press and/or a rotation, as discussed with respect to FIG. 14A. In some embodiments, request 1425*a* is a tap input and/or other input on an application icon, such as clock icon 1401 shown in FIG. 14A. In some embodiments, request 1425*a* is a swipe input and/or other input on a different user interface, such as a menu user interface (e.g., a settings menu), a user interface associated with notifications (e.g., a user interface that displays a summary of notifications), and/or a user interface of an application (e.g., a messaging application, an email application, a calendar application, or a workout application). In some embodiments, request 1425*a* is a swipe input and/or other input on a different time user interface, such as user interface 1100*b* in FIG. 11B or user interface 1600*b* in FIG. 16B. In some embodiments, request 1425*a* is a predefined movement of at least a portion of computer system 600, such as raising and/or rotating computer system 600 (e.g., a wrist raise gesture).

In response to detecting request 1425*a*, computer system 600 displays a time user interface, such as user interface 1400*b* shown in FIG. 14B. In some embodiments, user interface 1400*b* is a clock face, a watch face, a wake screen, a lock screen, and/or a home screen. In some embodiments, user interface 1400*b* is displayed in response to movement of computer system 600 (e.g., displayed in response to a wrist raise gesture) while display 602 is in an inactive state or a less active state (e.g., a low power state). As shown in FIG. 14B, user interface 1400b includes an indication of the current time, including first watch hand 1402 (e.g., minute hand) and second watch hand 1404 (e.g., hour hand).

In some embodiments, user interface 1400b includes an animated background that is displayed behind first watch hand 1402 and second watch hand 1404. In some embodiments, the animated background includes a static background element, such as a solid color background that does not move or change over time. In some embodiments, user interface 1400b includes an animated background graphical element 1406 that moves over time. In some embodiments, user interface 1400b includes a plurality of animated background graphical elements 1406 that move over time. In some embodiments, individual animated background graphical elements of the plurality of animated background graphical elements 1406 have different colors, such as red, orange, yellow, green, blue, purple, brown, black, light blue, pink, white, and grey. In some embodiments, there are an equal number of animated background graphical elements of each color. In some embodiments, animated background graphical elements having the same color are grouped together, as shown in FIG. 14B. In some embodiments, the plurality of animated background graphical elements are concentrated near the outer edge of user interface 1400b, as shown in FIG. 14B. In some embodiments, there are twelve colors for the plurality of animated background graphical elements, and each group of colored animated background graphical elements represents approximately 5 seconds of time.

In some embodiments, the plurality of animated background graphical elements move around user interface 1400b in a circular motion (e.g., circling around and/or behind first watch hand 1402 and second watch hand 1404). In some embodiments, each animated background graphical element individually rotates, spins, and/or moves in a different manner. In some embodiments, the plurality of animated background graphical elements move in a recurring cycle, such that a plurality of the animated background graphical elements complete one rotation around user interface 1400b and returns to corresponding similar position upon completing the cycle. In some embodiments, the plurality of animated background graphical elements move in a recurring pattern, such that a plurality of individual animated background elements returns to their corresponding original position or a similar position upon completing the pattern. In some embodiments, the period of the cycle is one minute, thereby indicating that a minute has passed each time the plurality of animated background graphical elements completes a rotation around user interface 1400b.

In some embodiments, one or more of the watch hands is colored, such as first watch hand 1402 being yellow. In some embodiments, one or more of the watch hands is a different color from one of the other watch hands. FIG. 14B illustrates computer system 600 displaying user interface 1400b, wherein first watch hand 1402 and second watch hand 1404 are different colors. For example, first watch hand 1402 is yellow and second watch hand 1404 is white. In FIGS. 14B-14R, the colors are represented by patterns. For example, the following colors are represented by the indicated patterns: Red is represented by a pattern of dots. Orange is represented by a pattern of stripes. Yellow is represented by a pattern of dashes. Green is represented by a pattern of hatching. Blue is represented by a pattern of pluses. Purple is represented by a pattern of squiggles. Brown is represented by a pattern of circles. Black is represented by solid black. Light blue is represented by a pattern of diagonal stripes. Pink is represented by a pattern of stars. White is represented by solid white. Grey is represented by a pattern of triangles.

In accordance with a determination that the current time is a first time (e.g., 10:10:00), computer system 600 displays a user interface with first watch hand 1402 having a first color. For example, FIG. 14B illustrates computer system 600 displaying user interface 1400b, wherein first watch hand 1402 is yellow (dashes). In accordance with a determination that the current time is a second time, computer system 600 displays a user interface with first watch hand 1402 having a second color. For example, FIG. 14C illustrates computer system 600 displaying user interface 1400c at a second time (e.g., 10:10:05), wherein first watch hand 1402 is orange (stripes).

In some embodiments, at the first time (e.g., 10:10:00), a first animated background graphical element is displayed in a first position. For example, in FIG. 14B, animated background graphical element 1406a is displayed behind first watch hand 1402, in the 2 o'clock position. In some embodiments, at the second time (e.g., 10:10:05), the first animated background graphical element is displayed in a second position. For example, in FIG. 14C, animated background graphical element 1406a is no longer behind first watch hand 1402 but rather is displayed in the 3 o'clock position.

In some embodiments, the color of first watch hand 1402 corresponds to movement of the plurality of animated background graphical elements 1406. For example, the color of first watch hand 1402 corresponds to the color of the animated background graphical element shown behind watch hand 1402 at a given time. FIG. 14B illustrates user interface 1400b at the first time (e.g., 10:10:00) and, at the first time, animated background graphical element 1406a is displayed behind first watch hand 1402. Because animated background graphical element 1406a is yellow (dashes), first watch hand 1402 is yellow (dashes) at the first time. FIG. 14C illustrates user interface 1400c at the second time (e.g., 10:10:05) and, at the second time, animated background graphical element 1406b is displayed behind first watch hand 1402. Because animated background graphical element 1406b is orange (stripes), first watch hand 1402 is orange (stripes) at the second time. FIG. 14D illustrates user interface 1400c at the third time (e.g., 10:10:15) and, at the third time, animated background graphical element 1406c is displayed behind first watch hand 1402. Because animated background graphical element 1406c is red (dots), first watch hand 1402 is red (dots) at the third time.

In some embodiments, second watch hand 1404 changes color. For example, second watch hand 1404 changes color based on movement of the plurality of animated background graphical elements 1406. In FIG. 14B, second watch hand 1404 is white (white), which corresponds to the color of the animated background graphical elements displayed behind watch hand 1404 at the first time. In FIG. 14C, second watch hand 1404 is light blue (diagonal stripes), which corresponds to the color of the animated background graphical elements displayed behind watch hand 1404 at the second time. In FIG. 14D, second watch hand 1404 is black (solid black), which corresponds to the color of the animated background graphical elements displayed behind watch hand 1404 in user interface 1400d at the third time.

In some embodiments, the change in colors of first watch hand 1402 and second watch hand 1404 is gradual. For example, in transitioning from yellow (dashes) in FIG. 14B to orange (stripes) in FIG. 14C, first watch hand 1402 changes from yellow to yellow-orange to orange. In transitioning from orange (stripes) in FIG. 14C to red (dots) in FIG. 14D, first watch hand 1402 changes from orange to red-orange to red.

In some embodiments, first watch hand 1402 includes two portions, inner portion 1402*a* and outer portion 1402*b*. For example, in FIG. 14B, first watch hand 1402 includes inner portion 1402*a*, shown as the inlay within the surrounding border. In FIG. 14B, first watch hand 1402 includes outer portion 1402*b*, shown as the border surrounding inner portion 1402*a*. In some embodiments, both inner portion 1402*a* and outer portion 1402*b* are colored. In some embodiments, both inner portion 1402*a* and outer portion 1402*b* gradually change color based on movement of the plurality of animated background graphical elements 1406. In some embodiments, inner portion 1402*a* and outer portion 1402*b* change at a different rate and/or at different times, such that there is a visual distinction between the color of inner portion 1402*a* and the color of outer portion 1402*b*. For example, in transitioning from yellow (dashes) in FIG. 14B to orange (stripes) in FIG. 14C, outer portion 1402*b* changes earlier than inner portion 1402*a*, such that outer portion 1402*b* is a more orange shade of yellow-orange, whereas inner portion 1402*a* is a more yellow shade of yellow-orange.

In some embodiments, computer system 600 detects input 1425*b*, such as a tap and/or press. In response to detecting input 1425*b*, computer system 600 modifies the position of the plurality of animated background graphical elements. For example, as shown in FIG. 14E, the plurality of animated background graphical elements scatter, such that the animated background elements move away from the tap input and/or from the center of user interface 1400*e*. In some embodiments, the animated background graphical elements seem to move off the edge of user interface 1400*f*, as shown in FIG. 14F. In some embodiments, after a period of time, the plurality of animated background graphical elements return on the screen and/or to their previous positions, such as the positions shown in user interface 1400*d* in FIG. 14D.

In some embodiments, computer system 600 detects input 1425*c*, such as shaking of computer system 600. In response to detecting input 1425*c*, computer system 600 rearranges the position of the plurality of animated background graphical elements. For example, as shown in FIG. 14G, the plurality of animated background graphical elements jumble and/or mix together, such that animated background graphical elements are not grouped by color in user interface 1400*g*. In some embodiments, a faster and/or more vigorous shaking input will cause a different (e.g., more significant) rearranging of the plurality of animated background graphical elements. In some embodiments, computer system 600 continues mixing the plurality of animated background graphical elements for the duration of the shaking input. For example, in FIG. 14H, the plurality of animated background graphical elements are in different positions in user interface 1400*h* than the positions shown in user interface 1400*g* in FIG. 14G. In some embodiments, the plurality of animated background graphical elements return to their previous positions when the shaking stops, such as the positions shown in user interface 1400*d* in FIG. 14D.

Figure 14I:
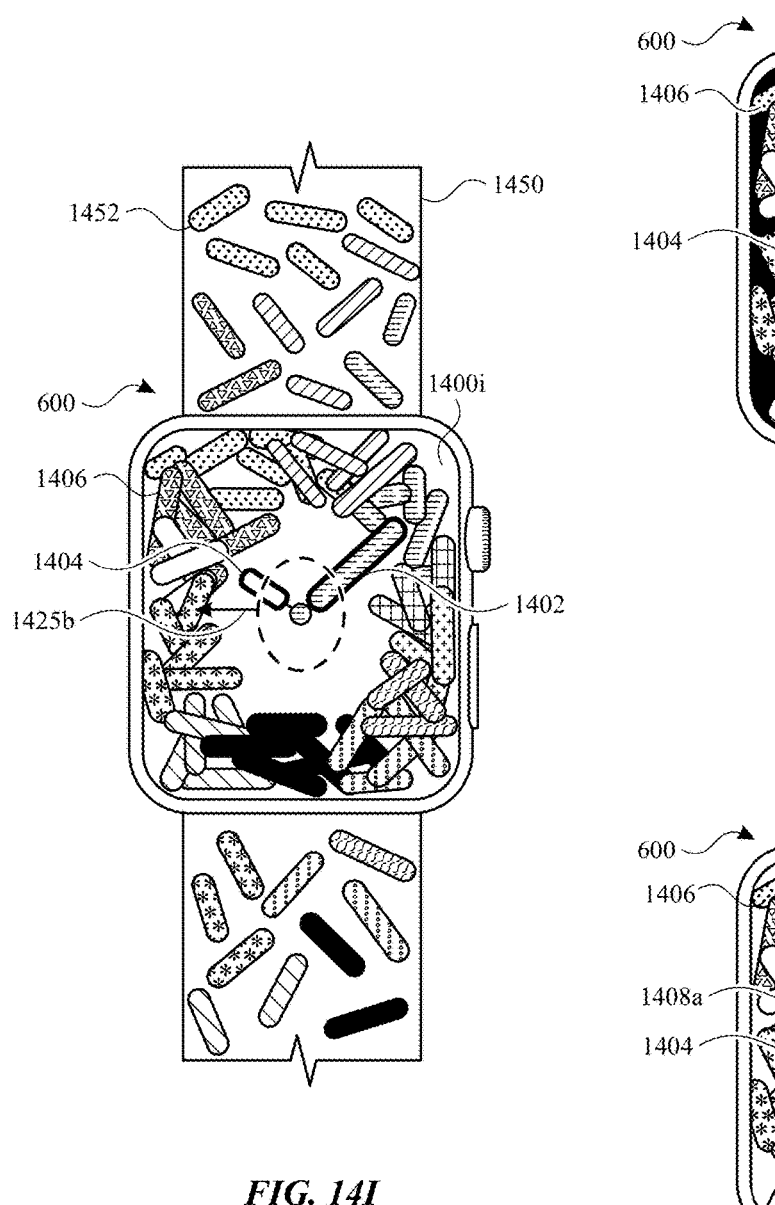
FIGS. 14A-14R illustrate exemplary user interfaces that include a watch hand that changes color at predetermined times in accordance with some embodiments.

In some embodiments, the position of the plurality of animated background graphical elements corresponds to a location of a physical portion of the computer system, such as watch band 1450. In some embodiments, the colors, sizes, and/or shapes of the plurality of animated background graphical elements 1406 corresponds to the colors, sizes, and/or shapes of graphical elements 1452 on the physical portion of the computer system. For example, as shown in FIG. 14I, the colors, size, and shape of the plurality of animated background graphical elements 1406 correspond to the colors, size, and shape of graphical elements 1452 shown on watch band 1450. In some embodiments, computer system 600 displays an animation corresponding to the physical portion of the computer system. For example, computer system 600 displays an animation wherein the plurality of animated background graphical elements seem to appear from a corresponding location on watch band 1450, the plurality of animated background graphical elements 1406 move around user interface 1400*i*, and the plurality of animated background graphical elements settle into position, such as the positions shown in user interface 1400*i*.

In some embodiments, computer system 600 displays a user interface based on a state of computer system 600. In some embodiments, computer system 600 is configured to operate in a reduced-power state and/or night mode that consumes (e.g., on average over time) less energy than other operating states (e.g., the operating state of computer system in FIG. 14J). In some embodiments, computer system 600 enters a reduced-power state in response to a determination that a user of computer system 600 is inactive and/or is not looking at display 602 (e.g., the user lowers computer system 600 and/or does not interact with display 602 (or another input device of computer system 600) for a threshold amount of time). In some embodiments, computer system 600 enters into the reduced-power state and/or the night mode in response to swipe input 1425*b*.

Figure 14J:
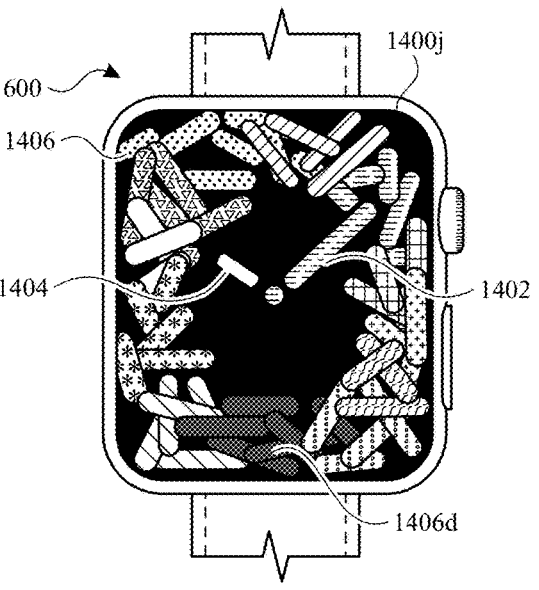

FIG. 14J illustrates computer system 600 operating in a reduced-power state and/or a night mode. In some embodiments, computer system 600 displays user interface 1400*j* with a darker background than as displayed in FIGS. 14B-14I. In some embodiments, when computer system 600 is operating in a reduced-power state and/or night mode that uses a darker background, one or more of the colors of the plurality of animated background graphical elements adjusts to provide greater contrast from the darker background. For example, as shown in user interface 1400*j* of FIG. 14J, animated background graphical element 1406*d* adjusts from black to dark grey to provide greater contrast from the black background. In some embodiments, first watch hand 1402 and second watch hand 1404 remain the colors they were at the time computer system 600 entered the reduced-power state and/or night mode and do not change while computer system 600 is in the reduced-power state and/or night mode. In some embodiments, first watch hand 1402 and second watch hand 1404 change colors when computer system 600 transitions from reduced-power state to a standard and/or high-powered state.

Figure 14K:
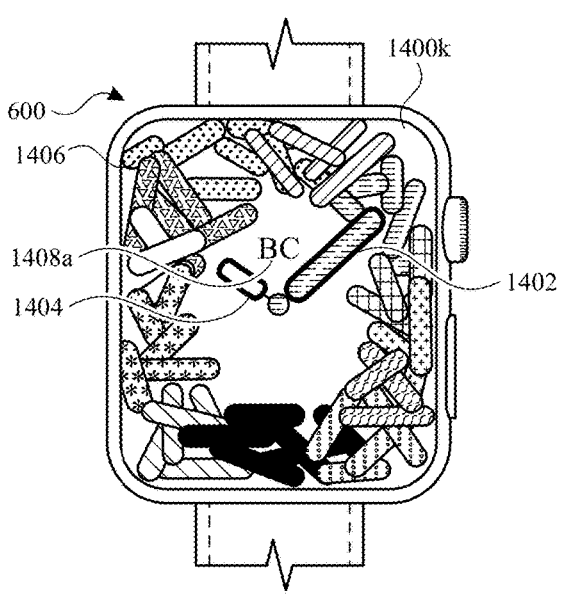

In some embodiments, in response to detecting a set of one or more inputs, computer system 600 enters a clock face edit mode. In some embodiments, a user can select between different options for information to include in the user interface. For example, a user can select monogram 1408*a* to be displayed on user interface 1400*k*, as shown in FIG. 14K. A user can select date 1408*b* to be displayed on user interface 1400*l*, as shown in FIG. 14L. A user can select digital time 1408*c* to be displayed on user interface 1400*m*, as shown in FIG. 14M.

In some embodiments, computer system 600 displays user interface 1400*n* with background graphical elements 1410. In some embodiments, background graphical elements 1410 are static. In some embodiments, background graphical elements 1410 are arranged in a circle and correspond to hour positions on a clock face (e.g., positions 1 o'clock through 12 o'clock). In some embodiments, different background graphical elements 1410 are the same shape and size. In some embodiments, different background graphical elements 1410 are different colors. In some embodiments, each background graphical element 1410 is a different color.

In some embodiments, computer system 600 displays user interface 1400o with background graphical elements 1412. In some embodiments, background graphical elements 1412 are static. In some embodiments, background graphical elements 1412 are arranged in a circle and correspond to hour positions on a clock face (e.g., positions 1 o'clock through 12 o'clock). In some embodiments, different background graphical elements 1412 are different shapes. In some embodiments, each background graphical element 1412 is the shape of the hour position to which it corresponds. For example, background graphical element 1412a is in the shape of the number 12 because is corresponds to the 12 o'clock position on user interface 1400o. In some embodiments, different background elements 1412 are different colors. In some embodiments, each background graphical element 1412 is a different color.

In some embodiments, the color of the first watch hand corresponds to the color of the closest background graphical element 1412. For example, in FIG. 14P, the color of first watch hand 1402 is yellow (dashes), which corresponds to the color of background graphical element 1412b in user interface 1400p. In FIG. 14Q, the color of first watch hand 1402 is blue (pluses), which corresponds to the color of background graphical element 1412c in user interface 1400q. In FIG. 14R, the color of first watch hand 1402 is black (solid black), which corresponds to the color of background graphical element 1412d in user interface 1400r. In some embodiments, the color of the second watch hand corresponds to the color of the nearby background graphical elements 1412. For example, in FIG. 14R, the color of second watch hand 1404 is light blue (diagonal stripes), which corresponds to the color of background graphical element 1412e in user interface 1400r. In some embodiments, the change in color of first watch hand 1402 and/or second watch hand 1404 is gradual, as discussed above with respect to the changes from FIG. 14B to FIG. 14C to FIG. 14D. In some embodiments, first watch hand 1402 includes inner portion 1402a and outer portion 1402b, and inner portion 1402a and outer portion 1042b change at different rates and/or at different times, as discussed above with respect to FIG. 14B and FIG. 14C.

In some embodiments, a user can select different options for information to include in the corners and/or on the edges of the user interface. For example, a user can select up to four corner complications 1414, as shown in FIG. 14R. Corner complications 1414 display information associated with an application and/or serve as an affordance for launching the associated application. In some embodiments, a user can select corner complications 1414, such as those shown in FIG. 14P, to be displayed in user interface 1400n shown in FIG. 14N. In some embodiments, the user can select monogram 1408a, date 1408b, or digital time 1408c options to be displayed in user interface 1400n of FIG. 14N or user interfaces 1400o-1400r of FIGS. 140-14R.

FIG. 15 is a flow diagram illustrating a method for displaying a user interface including a watch hand that changes color at predetermined times using a computer system in accordance with some embodiments. Method 1500 is performed at a computer system (e.g., 100, 300, 500, 600, a smartwatch, a smartphone, a tablet computer, a laptop computer, and/or a desktop computer) that is in communication with a display generation component (e.g., a display controller, a display, a touch-sensitive display system, a touchscreen, and/or a monitor) and one or more input devices (e.g., 602, 604, 606, a touch-sensitive surface, a touchscreen display, a button, a keyboard, a mouse, a joystick, a camera sensor, and/or a microphone). Some operations in method 1500 are, optionally, combined, the orders of some operations are, optionally, changed, and some operations are, optionally, omitted.

As described below, method 1500 provides an intuitive way for displaying a user interface including a watch hand that changes color at predetermined times. The method reduces the cognitive burden on a user for displaying a user interface including a watch hand that changes color at predetermined times, thereby creating a more efficient human-machine interface. For battery-operated computing devices, enabling a user to display a user interface including a watch hand that changes color at predetermined times faster and more efficiently conserves power and increases the time between battery charges.

The computer system receives (1502), via the one or more input devices, a request (e.g., 1325a, 1425a, an input, a raise or rotation gesture, a tap gesture (e.g., on a touch-sensitive surface), a voice command, a button press, and/or a rotation of a rotatable input mechanism) to display a time user interface (e.g., 1300b or 1400b). In some embodiments, the request to display the user interface is received while the display generation component is in a locked state, an inactive state, a low-power state, a sleep state, and/or a dimmed state. In some embodiments, the request to display the user interface is received while the display generation component is displaying a home screen or springboard user interface (e.g., a user interface that includes a plurality of selectable objects for launching respective applications). In some embodiments, the request to display the user interface is received while the display generation component is displaying a wake screen, a lock screen, a user interface of an application (e.g., a music application, email application, or messaging application), and/or a user interface other than a clock face user interface. In some embodiments, the request to display the user interface is received while the display generation component is displaying a user interface (e.g., a clock face user interface) in a first state (e.g., in a locked state, an inactive state, a low-power state, a sleep state, and/or a dimmed state). In some embodiments, the request to display the user interface is received while the display generation component is displaying a different clock face user interface (e.g., a clock face user interface other than the clock face user interface in FIGS. 13B-13L). In some embodiments, the request to display the user interface is received while the display generation component is displaying a user interface associated with notifications (e.g., a user interface that displays a summary or list of notifications and/or concurrently displays two or more notifications).

In response to receiving the request to display the time user interface, the computer system displays (1504), via the display generation component (e.g., 602), the time user interface (e.g., 1300b or 1400b), wherein the time user interface includes an indication of a current time (e.g., an indication of the current time at a predetermined location and/or a current location), wherein the indication of the current time includes a first watch hand (e.g., 1302, 1402, an hour hand, a minute hand, and/or a second hand) In some embodiments, while displaying the time user interface that includes the indication of the current time (1506), in accordance with a determination that the current time is a first time, the computer system displays (1508), via the display generation component, the time user interface with the first watch hand having a first color (e.g., 1300b or 1400b) (e.g., the first watch hand is yellow). In some embodiments, while displaying the time user interface that includes the indication of the current time (1506), in accordance with a determination that the current time is a second time that is different from the first time, the computer system displays (1510), via the display generation component, the time user interface with the first watch hand having a second color (e.g., 1300c or 1400c) (e.g., the first watch hand is red or orange) that is different from the first color (e.g., the second color is a different shade, tone, and/or hue than the first color) (e.g., if a predetermined period of time has not passed after the first time, the watch hand remains blue). Displaying the first watch hand having a different color at different times provides a user with feedback regarding a change in time, thereby providing the user with improved visual feedback. Displaying the first watch hand having a first color in accordance with a determination that the current time is a first time and displaying the first watch hand having a second color in accordance with a determination that the current time is a second time reduces the number of inputs required to change the color of the first watch hand, thereby performing an operation when a set of conditions has been met without requiring further user input and reducing the number of inputs needed to perform an operation.

In some embodiments, the indication of the current time includes a second watch hand (e.g., 1304, 1404, the seconds hand, and/or the hour hand) In some embodiments, in accordance with a determination that the current time is a third time, the computer system changes the color of the first watch hand (e.g., 1302) from a third color (e.g., yellow) to a fourth color (e.g., red) that is different from the third color (e.g., the fourth color is a different shade, tone, and/or hue than the third color), wherein, at the third time, the second watch hand (e.g., 1304) intersects with (e.g., aligns with, overlaps with, and/or comes within a predetermined proximity of) the first watch hand (e.g., 1302 and/or the hour hand) In some embodiments, the third time is the same as the first time or the second time. In some embodiments, the third time is different from the first time and the second time. In some embodiments, the third color is the same as the first color. In some embodiments, the third color is different from the first color. In some embodiments, the fourth color is the same as the second color. In some embodiments, the fourth color is different from the second color. In some embodiments, the first watch hand changes color based on intersection of the second watch hand with the first watch hand, such as the hour hand changing color when the second hand intersects with the hour hand Changing the color of the first watch hand in accordance with a determination that the current time is a third time provides a user with feedback regarding a change in time, thereby providing the user with improved visual feedback. Changing the color of the first watch hand in accordance with a determination that the current time is a third time reduces the number of inputs required to change the color of the first watch hand, thereby performing an operation when a set of conditions has been met without requiring further user input and reducing the number of inputs needed to perform an operation.

In some embodiments, prior to the third time, the computer system displays, via the display generation component, the time user interface including an indication (e.g., 1304a) of the fourth color (e.g., red) (e.g., a preview of the color to which the first watch hand will change). In some embodiments, prior to the moment when the second watch hand intersects with the first watch hand, the second watch hand indicates the fourth color, which is the color to which the first watch hand will change when the first watch hand and the second watch hand intersect. In some embodiments, displaying the indication of the fourth color includes displaying the second watch hand and/or a region of the second hand as the fourth color (e.g., a region of the seconds hand is red, which is the color to which the hour watch hand will change when the seconds hand intersects with the hour hand). In some embodiments, the indication of the fourth color (e.g., the preview of the color to which the first watch hand will change) includes displaying a gradient of the fourth color (e.g., a region ranging from more color saturation to less color saturation). Displaying an indication of the fourth color provides a user with feedback regarding a color associated with a change in time, thereby providing the user with improved visual feedback.

In some embodiments, the indication of the current time includes a third watch hand (e.g., 1306 and/or the minute hand) In some embodiments, in accordance with a determination that the current time is a fourth time, the computer system changes the color of the third watch hand from a fifth color (e.g., blue) to a sixth color (e.g., green) that is different from the fifth color (e.g., the sixth color is a different shade, tone, and/or hue than the fifth color), wherein, at the fourth time, the second watch hand (e.g., 1304 and/or the seconds hand) intersects with the third watch hand (e.g., 1306 and/or the minute hand) In some embodiments, the third watch hand changes color based on intersection with the second watch hand, such as the minute hand changing color when the seconds hand intersects with the minute hand. In some embodiments, prior to the third time and the fourth time, the computer system displays, via the display generation component, the time user interface including an indication (e.g., 1304a) of the fourth color (e.g., red) and an indication (e.g., 1304b) of the sixth color (e.g., green). In some embodiments, prior to the second watch hand intersecting with the first watch hand and the third watch hand, the second watch hand indicates the fourth color, which is the color to which the first watch hand will change when the first watch hand and the second watch hand intersect, and the sixth color, which is the color to which the third watch hand will change when the third watch hand and the second watch hand intersect. In some embodiments, displaying the indication of the fourth color and the indication of the sixth color includes displaying the second watch hand with a region corresponding to the first hand as the fourth color (e.g., a region of the seconds hand corresponding to the hour hand, such as an inner region, is red, displaying a preview of the color to which the hour watch hand will change when the seconds hand intersects with the hour hand) and a region corresponding to the third hand as the sixth color (e.g., a region of the seconds hand corresponding to the minute hand, such as an outer region, is green, displaying a preview of the color to which the hour watch hand will change when the seconds hand intersects with the hour hand) In some embodiments, the indication of the fourth color (e.g., the preview of the color the first watch hand will change) includes displaying a gradient of the fourth color (e.g., a region ranging from more color saturation to less color saturation) and the indication of the sixth color (e.g., the preview of the color the third watch hand will change) includes displaying a gradient of the sixth color (e.g., a region ranging from more color saturation to less color saturation). Changing the color of the third watch hand in accordance with a determination that the current time is a fourth time provides a user with feedback regarding a change in time, thereby providing the user with improved visual feedback. Changing the color of the third watch hand in accordance with a determination that the current time is a fourth time reduces the number of inputs required to change the color of the first watch hand, thereby performing an operation when a set of conditions has been met without requiring further user input and reducing the number of inputs needed to perform an operation. Displaying an indication of the fourth color and an indication of the sixth color provides a user with feedback regarding colors associated with changes in time, thereby providing the user with improved visual feedback.

In some embodiments, the time user interface includes a first color gradient (e.g., 1304a) comprising a gradual transition from more color saturation (e.g., fully saturated and/or solid color) at the first edge of the first color gradient to less color saturation (e.g., no saturation and/or transparent color) at the second edge of the first color gradient, wherein the first edge of the first color gradient is selected based on a position of the first watch hand (e.g., 1302 and/or the hour hand) In some embodiments, the first color gradient extends from the position of the first watch hand (e.g., the hour hand) to the position of the second watch hand (e.g., the seconds hand) In some embodiments, the first color gradient is a curved gradient that optionally extends around a circumference of a circle. In some embodiments, the first color gradient is an angular and/or conic gradient (e.g., the gradient is based on a center point and an angle). Displaying the time user interface including a first color gradient emphasizes the first watch hand, thereby providing the user with improved visual feedback.

In some embodiments, the second edge of the first color gradient is selected based on the position of the first watch hand (e.g., 1302 and/or the hour hand) and a position of a respective watch hand (e.g., 1304 and/or the seconds hand), wherein a size of the first color gradient contracts as the distance between the respective watch hand (e.g., the seconds hand) and the first watch hand (e.g., the hour hand) decreases (e.g., the first color gradient contracts as the space between the second watch hand and the first watch hand decreases). Contracting the size of the first color gradient based on the position of the first watch hand and the position of the respective watch hand optimizes display of the color gradient based on the time, thereby performing an operation when a set of conditions has been met without requiring further user input and reducing the number of inputs needed to perform an operation.

In some embodiments, the time user interface includes a second color gradient (e.g., 1304b) comprising a gradual transition from more color saturation (e.g., fully saturated and/or solid color) at a first edge of the second color gradient to less color saturation (e.g., no saturation and/or transparent color) at a second edge of the second color gradient. In some embodiments, the first edge of the second color gradient is selected based on a position of a respective watch hand (e.g., 1304 and/or the seconds hand) In some embodiments, the second edge of the second color gradient is selected based on the position of the respective watch hand (e.g., 1304 and/or the seconds hand) and the position of the first watch hand (e.g., 1302 and/or the hour hand) In some embodiments, a size of the second color gradient expands as the distance between the respective watch hand (e.g., 1304 and/or the seconds hand) and the first watch hand (e.g., 1302 and/or the hour hand) increases (e.g., the second color gradient expands as the space between the respective watch hand and the first watch hand increases). Expanding the size of the first color gradient based on the position of the first watch hand and the position of the respective watch hand optimizes display of the color gradient based on the time, thereby performing an operation when a set of conditions has been met without requiring further user input and reducing the number of inputs needed to perform an operation.

In some embodiments, the time user interface includes a multi-color gradient comprising (e.g., 1304a and 1304b) a gradual transition from more color saturation (e.g., fully saturated and/or solid colors) at the first edge of the multi-color gradient to less color saturation (e.g., no saturation and/or transparent colors) at the second edge of the multi-color gradient. In some embodiments, the multi-color gradient includes one color in a first portion of the multi-color gradient (e.g., 1304a and/or an inner portion) and another color in a second portion of the multi-color gradient (e.g., 1304b and/or an outer portion). In some embodiments, the multi-color gradient indicates the colors to which watch hands will change, such as an indication of the colors to which the hour hand and the minute hand will change when the seconds hand intersects with each. In some embodiments, the inner portion of the multi-color gradient corresponds to the hour hand and the inner portion of the multi-color gradient indicates the color to which the hour hand will change when the seconds hand next intersects with the hour hand In some embodiments, the outer portion of the multi-color gradient corresponds to the minute hand, and the outer portion of the multi-color gradient indicates the color to which the minute hand will change when the seconds hand next intersects with the minute hand In some embodiments, one or more of the portions extend from one watch hand (such as the seconds watch hand) to another watch hand (such as the hour hand or the minute hand) Displaying the time user interface including two color gradients emphasizes the first watch hand and the regions of the time user interface, thereby providing the user with improved visual feedback.

In some embodiments, the indication of time includes a respective watch hand (e.g., 1304 and/or the seconds hand) In some embodiments, the first watch hand (e.g., 1302 and/or the hour hand) and the respective watch hand are different colors (e.g., at one point in time, the first watch hand is yellow and the respective watch hand is blue). Displaying the first watch hand and the respective watch hand having different colors visually distinguishes between the different watch hands, thereby providing the user with improved visual feedback.

In some embodiments, the first watch hand (e.g., 1302 and/or the watch hand that is a first color at a first time and a second color at a second time) is an hour hand or a minute hand Displaying the hour hand or the minute hand having a first color at a first time and having a second color at a second time provides the user with feedback regarding a change in time, thereby providing the user with improved visual feedback.

In some embodiments, the time user interface includes a background (e.g., 1308) that visually distinguishes regions (e.g., 1308a and 1308b) of the time user interface (e.g., the background includes a ring indicating the edge of the hour hand and/or a ring indicating the edge of the minute hand) In some embodiments, the time user interface includes a background that visually distinguishes regions of color gradients, such as an inner region corresponding to the hour hand and an outer region corresponding to the minute hand, wherein the inner region contains a first color gradient and/or a first portion of a multi-color gradient and the outer region contains a second color gradient and/or a second portion of a multi-color gradient. Displaying the time user interface with a background that visually distinguishes regions of the time user interface enables a user to more easily identify colors displayed within the regions and the watch hands that correspond to those regions, thereby providing the user with improved visual feedback.

In some embodiments, displaying the time user interface includes displaying the time user interface in a standard mode (e.g., 1300*b*-1300*h* or 1400*b*-1400*i*). In some embodiments, while displaying the time user interface in the standard mode, the computer system receives, via the one or more input devices, a first input (e.g., 1425*b* and/or a swipe to the right and/or a swipe to the left). In some embodiments, in response to receiving the first input, the computer system displays the time user interface in a low power mode (e.g., 1300*i*-1300*j* or 1400*j*), including displaying the time user interface with a darker background than as displayed in the standard mode (e.g., displaying the time user interface in a low light mode and/or a power conserving mode). In some embodiments, the overall (e.g., cumulative) brightness of the time user interface in the standard mode is greater than the overall brightness of the time user interface in the low light mode. In some embodiments, one or more graphical elements are different (e.g., displayed in a modified form or not displayed at all), as between the standard mode and the low light mode. Displaying the time user interface with a darker background in response to receiving the first input provides improved feedback and allows a user to select the manner in which the time user interface is displayed. Displaying the time user interface in a low power mode and with a darker background reduces power usage and improves battery life.

In some embodiments, displaying the time user interface in a standard mode includes displaying a respective watch hand (e.g., 1306 and/or the seconds hand). In some embodiments, in response to receiving the first input (e.g., the swipe to the right and/or swipe to the left), the computer system displays the time user interface without displaying the respective watch hand (e.g., 1306 and/or the seconds hand) Displaying the time user interface without displaying a respective watch hand in response to receiving the first input provides improved feedback and allows a user to select the manner in which the time user interface is displayed. Displaying the time user interface without displaying the respective watch hand reduces power usage and improves battery life.

In some embodiments, displaying the time user interface includes, in accordance with a determination that a first combination (e.g., a predetermined combination, a curated combination, and/or a combination that is selectable as a single, cohesive set) of colors has been selected (e.g., selected via a configuration process performed at the computer system and/or at an external computer system that is connected to the computer system), displaying the first watch hand (e.g., 1302) having a seventh color and a background of the time user interface having an eighth color. In some embodiments, the seventh color is based on (e.g., is a variant of) the eighth color and/or vice versa. In some embodiments, displaying the time user interface includes, in accordance with a determination that a second combination of colors has been selected, displaying the first watch hand (e.g., 1302) having a ninth color that is different from the seventh color and the background of the time user interface having a tenth color that is different from the eighth color. In some embodiments, one or more additional watch hands and/or one or more color gradients are displayed with different colors based on selection of a first combination of colors or a second combination of colors. Displaying the displaying the first watch hand having a seventh color and a background of the time user interface having an eighth color in accordance with a determination that a first combination of colors has been selected and displaying the first watch hand having a ninth color that is different from the seventh color and the background of the time user interface having a tenth color that is different from the eighth color in accordance with a determination that a second combination of colors has been selected provides improved feedback and allows a user to select the manner in which the time user interface is displayed.

In some embodiments, the time user interface includes a first animated background graphical element (e.g., 1406*a*) that moves (e.g., rotates and/or spins) over time. In some embodiments, the indication of the current time is displayed over the first animated background graphical element and the element moves separately from (e.g., differently than) changes and/or movement of the indication of the current time. In some embodiments, at the first time (e.g., the time shown in 1400*c*), the first animated background graphical element is in a first position. In some embodiments, the first position includes an orientation of the element. In some embodiments, at the second time (e.g., the time shown in 1400*d*), the first animated background graphical element is in a second position that is different from the first position. In some embodiments, the first color with which the first watch hand is displayed at the first time is based on (e.g., matches) a color of a portion of the first animated background graphical element that is adjacent to and/or underlying the first watch hand at the first time. In some embodiments, the second color with which the first watch hand is displayed at the second time is based on (e.g., matches) a color of a portion of the first animated background graphical element that is adjacent to and/or underlying the first watch hand at the second time. Displaying the first watch hand having a different color at different times, wherein the first animated background graphical element is in a different position at the different times, provides a user with feedback regarding a change in time, thereby providing the user with improved visual feedback. Displaying the first watch hand having a first color in accordance with a determination that the current time is a first time, when the first animated background graphical element is in a first position, and displaying the first watch hand having a second color in accordance with a determination that the current time is a second time, when the first animated background graphical element is in the second position, reduces the number of inputs required to change the color of the first watch hand, thereby performing an operation when a set of conditions has been met without requiring further user input and reducing the number of inputs needed to perform an operation.

In some embodiments, the time user interface includes a respective watch hand (e.g., 1404, an hour hand, a minute hand, and/or a second hand) that is different from the first watch hand, and a second animated background graphical element (e.g., 1406*b*) that moves over time (e.g., rotates and/or spins). In some embodiments, the second animated background graphical element is different than the first animated background graphical element. In some embodiments, the second animated background graphical element is the same as the first animated background graphical element. In some embodiments, the first and second animated background elements are different parts of a background (e.g., a single background). In some embodiments, at the first time (e.g., the time shown in 1400*c*), the second animated background graphical element is in a third position. In some embodiments, the third position is different than the first position. In some embodiments, the third position is the same as the first position. In some embodiments, at the second time (e.g., the time shown in 1400*d*), the second animated background graphical element is in a fourth position that is different from the third position. In some embodiments, the fourth position is different than the second position. In some embodiments, the fourth position is the same as the second position. In some embodiments, while displaying the time user interface that includes the indication of the current time, in accordance with a determination that the current time is the first time, the computer system displays, via the display generation component, the time user interface with the respective watch hand (e.g., 1404) having an eleventh color (e.g., brown). In some embodiments, the eleventh color with which the respective watch hand is displayed at the first time is based on (e.g., matches) a color of a portion of the second animated background graphical element that is adjacent to and/or underlying the respective watch hand at the first time. In some embodiments, while displaying the time user interface that includes the indication of the current time, in accordance with a determination that the current time is the second time, the computer system displays, via the display generation component, the time user interface with the respective watch hand having a twelfth color (e.g., black) that is different from the eleventh color (e.g., the twelfth color is a different shade, tone, and/or hue than the eleventh color). In some embodiments, the eleventh color with which the respective watch hand is displayed at the second time is based on (e.g., matches) a color of a portion of the second animated background graphical element that is adjacent to and/or underlying the respective watch hand at the second time. In some embodiments, (e.g., when the first watch hand and the respective watch hand align and/or intersect) the first animated background graphical element is the same as the second animated background graphical element, the first position is the same as the third position, the second position is the same as the fourth position, the first color is the same as the eleventh color, and/or the second color is the same as the twelfth color. Displaying the respective watch hand having a different color at different times, wherein the second animated background graphical element is in a different position at the different times, provides a user with feedback regarding a change in time and change in background, thereby providing the user with improved visual feedback. Displaying the respective watch hand having an eleventh color in accordance with a determination that the current time is a first time, when the second animated background graphical element is in a first position, and displaying the respective watch hand having a twelfth color in accordance with a determination that the current time is a second time, when the second animated background graphical element is in the second position, reduces the number of inputs required to change the color of the respective watch hand, thereby performing an operation when a set of conditions has been met without requiring further user input and reducing the number of inputs needed to perform an operation.

In some embodiments, the time user interface includes a static background element (e.g., a solid color, gradient, pattern, or image background that does not move or change over time) and a plurality of animated background graphical elements (e.g., 1406) that move (e.g., rotate, spin and/or otherwise animate) over time (e.g., the plurality of animated background graphical elements is overlaid on and/or moves on top of the static background element). In some embodiments, the plurality of animated background graphical elements includes the first animated background graphical element (e.g., 1406*a*). In some embodiments, the plurality of animated background graphical elements completes a full rotation around the time user interface each minute (e.g., every 60 seconds). Displaying the time user interface including a static background element and a plurality of animated background graphical elements provides a user with feedback regarding a change in time and change in background, thereby providing the user with improved visual feedback. Displaying the plurality of animated background graphical elements wherein the animated background graphical elements move over time reduces the number of inputs required to change the positions of the animated background graphical elements, thereby performing an operation when a set of conditions has been met without requiring further user input and reducing the number of inputs needed to perform an operation.

In some embodiments, at a point in time, the position of the plurality of animated background graphical elements corresponds to a location (e.g., an attachment point) of a physical portion of the computer system (e.g., 1450 and/or a watch band). In some embodiments, the position of the plurality of animated background graphical elements corresponds to (e.g., aligns with) an aspect (e.g., a shape, size, and/or appearance) of the physical portion of the computer system. In some embodiments, the plurality of animated background graphical elements appear to enter onto the display from the physical portion of the computer system and then circle around the display. In some embodiments, the size and/or shape of a plurality of animated background graphical elements corresponds to (e.g., is the same as) the size and/or shape of one or more graphical elements on the physical portion of the computer system. Displaying the plurality of animated background graphical elements in a position corresponding to the location of a physical portion of the computer system reduces the number of inputs required to change the position of the plurality of animated background graphical elements, thereby performing an operation when a set of conditions has been met without requiring further user input and reducing the number of inputs needed to perform an operation.

In some embodiments, the computer system detects, via the one or more input devices, a second input (e.g., 1425*b* and/or a tap and/or a press). In some embodiments, in response to detecting the second input, the computer system modifies the position of one or more animated background graphical elements of the plurality of animated background graphical elements (e.g., 1406) (e.g., scatters the plurality of animated background elements, such as in user interface 1400*e* and 1400*f*). In some embodiments, in response to the second input, an animation of the plurality of animated background graphical elements moving is displayed. In some embodiments, in response to detecting the second input, the plurality of animated background elements moves away from and/or off the display generation component and realigns on the display generation component in the same position that the plurality of animated background elements was in at the time the second input was detected. In some embodiments, in response to detecting the second input, the plurality of animated background elements moves away from and/or off the display generation component and realigns on the display generation component in a different position than the plurality of animated background elements was in at the time the second input was detected. Displaying the plurality of animated background graphical elements having a first type of animation in response to detecting the second input provides an indication that the second input was received, thereby providing the user with improved visual feedback.

In some embodiments, prior to detecting a third input, the plurality of animated background graphical elements are in a first arrangement (e.g., are displayed in first pattern). In some embodiments, the computer system detects, via the one or more input devices, the third input (e.g., 1425c and/or shaking of the computer system). In some embodiments, the third input is a different type of input (e.g., is detected by a different input device) than the second input. In some embodiments, the third input is the same type of input (e.g., is detected by the same input device) as the second input. In some embodiments, in response to detecting the third input, the computer system rearranges the plurality of animated background graphical elements from the first arrangement to a second arrangement, different from the first arrangement (e.g., mixing and/or jumbling of the plurality of animated background elements, such as in user interface 1400g and 1400h). In some embodiments, displaying an animation of the plurality of animated background graphical elements rearranging into the second arrangement. In some embodiments, the plurality of animated background graphical elements is displayed with different animated background graphical elements having different colors. In some embodiments, animated background graphical elements having the same color are grouped and/or displayed close to each other. In some embodiments, in response to detecting the third input, the plurality of animated background graphical elements mixes and/or jumbles, such that animated background graphical elements having the same color are no longer grouped and/or displayed close to each other. In some embodiments, after mixing and/or jumbling, the plurality of animated background graphical elements realigns on the display generation component in the same position that the plurality of animated background graphical elements was in at the time the third input was detected. In some embodiments, the plurality of animated background graphical elements realigns on the display generation component in a different position than the plurality of animated background graphical elements was in at the time the second input was detected. In some embodiments, the second arrangement is based on a characteristic of the third input (e.g., a magnitude, direction, duration, and/or speed of the third input). In some embodiments, rearranging the plurality of animated background graphical elements from the first arrangement to the second arrangement (e.g., the manner and/or extent of the rearranging, such as how much or how far the animated background graphical elements move) is based on a characteristic of the third input (e.g., magnitude, direction, duration, and/or speed of the third input). Displaying the plurality of animated background graphical elements having a second type of animation in response to detecting the third input provides an indication that the third input was received, thereby providing the user with improved visual feedback.

In some embodiments, the plurality of animated background graphical elements moves in a recurring cycle with a first periodicity (e.g., a minute, 5 minutes, 10 minutes, 15 minutes, 30 minutes, or 60 minutes) (e.g., the recurring cycle has a periodicity that is the same for each recurrence of the cycle). In some embodiments, the plurality of animated background graphical elements rotates around the time user interface over a period of time (e.g., a minute), indicating the passage of time (e.g., the passage of a minute). In some embodiments, a particular animated background graphical element of the plurality of animated background graphical elements rotates around the time user interface each minute (e.g., every 60 seconds), such that a particular animated background graphical element, or a portion thereof, returns to the same position each minute after completing a full rotation around the time user interface. In some embodiments, the plurality of animated background graphical elements moves in a recurring pattern with a first periodicity, such that the pattern is repeated each period. In some embodiments, the plurality of animated background graphical elements moves in a recurring cycle with a first periodicity, such that the individual animated background graphical elements complete a full rotation around the watch face each period while moving in the different manner each period (e.g., a particular animated background graphical element spins and/or moves in a different manner each time it completes a rotation around the watch face). Displaying the plurality of animated background graphical elements moving in a recurring cycle with a first periodicity provides the user with an indication of the passage of time, thereby providing the user with improved visual feedback.

In some embodiments, the first watch hand includes an inner portion (e.g., 1402a and/or an inlay and/or a portion surrounded by or partially surrounded by an outer portion and/or border of the first watch hand) In some embodiments, displaying the time user interface with the first watch hand having a first color includes displaying the inner portion of the first watch hand having a first inner color (e.g., as shown in 1400b). In some embodiments, the first inner color is the same as the first color. In some embodiments, the first inner color is a different shade and/or tone than the first color (e.g., is lighter than the first color). In some embodiments, displaying the time user interface with the first watch hand having a second color includes displaying the inner portion of the first watch hand having a second inner color (e.g., as shown in 1400c). In some embodiments, the second inner color is the same as the second color. In some embodiments, the second inner color is a different shade and/or tone than the second color (e.g., is lighter than the second color). Changing the color of the inner portion of the first watch hand at different times reduces the number of inputs required to change the color of the inner portion of the first watch hand, thereby performing an operation when a set of conditions has been met without requiring further user input and reducing the number of inputs needed to perform an operation.

In some embodiments, the first watch hand includes an outer portion (e.g., 1402b and/or a border and/or a portion surrounding or partially surrounding an inner portion and/or inlay of the first watch hand) In some embodiments, displaying the time user interface with the first watch hand having a first color includes displaying the outer portion of the first watch hand having a first outer color. In some embodiments, the first outer color is the same as the first color. In some embodiments, the first outer color is a different shade and/or tone than the first color (e.g., is darker than the first color). In some embodiments, displaying the time user interface with the first watch hand having a second color includes displaying the outer portion of the first watch hand having a second outer color. In some embodiments, the second inner color is the same as the second color. In some embodiments, the second inner color is a different shade and/or tone than the second color (e.g., is darker than the second color). Changing the color of the outer portion of the first watch hand at different times reduces the number of inputs required to change the color of the outer portion of the first watch hand, thereby performing an operation when a set of conditions has been met without requiring further user input and reducing the number of inputs needed to perform an operation.

In some embodiments, the first watch hand includes an inner portion (e.g., 1402a and/or an inlay and/or a portion surrounded by or partially surrounded by an outer portion and/or border of the first watch hand) and an outer portion (e.g., 1402b and/or a border and/or a portion surrounding or partially surrounding an inner portion and/or inlay of the first watch hand) In some embodiments, changing from displaying the time user interface with the first watch hand having a first color (e.g., yellow) to displaying the time user interface with the first watch hand having a second color (e.g., red) includes transitioning (e.g., gradually and/or incrementally) the first watch hand from having the first color to having the second color (e.g., displaying a spectrum of colors between the first color and the second color, such as changing from yellow to yellow-orange to orange to red-orange to red in a transition from yellow to red), including: transitioning, at a first rate, the inner portion of the first watch hand from a first inner color to a second inner color (e.g., displaying a spectrum of colors between the first inner color and the second inner color, such as changing from yellow to yellow-orange to orange to red-orange to red in a transition from yellow to red); and transitioning, with a second rate that is different from the first rate, the outer portion of the first watch hand from the first outer color to the second outer color (e.g., displaying a spectrum of colors between the first outer color and the second outer color, such as changing from yellow to yellow-orange to orange to red-orange to red in a transition from yellow to red). In some embodiments, the inner portion of the first watch hand and the outer portion of the first watch hand are (e.g., at least at some times) visually distinguishable because the inner portion of the first watch hand and the outer portion of the first watch hand change differently. In some embodiments, the inner color of the first watch hand and the outer color of the first watch hand change with different patterns, at different rates, and/or with different cadences. In some embodiments, the rate of change of the inner color of the first watch hand and the rate of change of the outer color of the first watch hand are variable, such that sometimes the inner color of the first watch hand lags behind changes to the outer color of the first watch hand, sometimes the outer color of the first watch hand lags behind changes to the inner color of the first watch hand, and sometimes the inner color of the first watch hand and the outer color of the first watch hand are the same. In some embodiments, the inner color of the first watch hand and the outer color of the first watch hand change in the same pattern, at the same rate, and/or with the same cadence but the timing is offset, such that the inner portion of the first watch hand and the outer portion of the first watch hand are not the same color (e.g., are not the same shade and/or tone) at any given time. In some embodiments, the color of the inner portion of the first watch hand lags behind the changes in color to the outer portion of the first watch hand In some embodiments, the color of the outer portion of the first watch hand lags behind the changes in color to the inner portion of the first watch hand Displaying the inner portion of the first watch hand with a first inner color and displaying the outer portion of the first watch hand with a first outer color provides contrast between the portions of the first watch hand, thereby providing the user with improved visual feedback. Changing the colors of the portions of the first watch hand based on a respective rate reduces the number of inputs required to change the colors of the portions of the first watch hand, thereby performing an operation when a set of conditions has been met without requiring further user input and reducing the number of inputs needed to perform an operation.

Note that details of the processes described above with respect to method 1500 (e.g., FIG. 15) are also applicable in an analogous manner to the methods described above. For example, methods 700, 800, 1000, 1200, and/or 1700 optionally include one or more of the characteristics of the various methods described above with reference to method 1500. For example, the user interface in method 1500 can display a user interface including a watch hand that changes color at predetermined as described in method 1500. For brevity, these details are not repeated below.

FIGS. 16A-16L illustrate exemplary time user interfaces, in accordance with some embodiments. The user interfaces in these figures are used to illustrate the processes described below, including the processes in FIG. 17.

FIG. 16A illustrates computer system 600 (e.g., as described above) displaying, on display 602, user interface 1600a (e.g., a home screen or an application springboard) that includes application icons for opening respective applications. In some embodiments, user interface 1600a is a user interface of an application (e.g., a messaging application, an email application, a calendar application, or a workout application) or a menu user interface (e.g., a settings menu). In FIG. 16A, computer system 600 detects request 1625a (e.g., a press of input mechanism 604) to display a time user interface.

In some embodiments, request 1625a is an input on mechanism 604, such as a press and/or a rotation, as discussed with respect to FIG. 16A. In some embodiments, request 1625a is a tap input and/or other input on an application icon, such as clock icon 1601 shown in FIG. 16A. In some embodiments, request 1625a is a swipe input and/or other input on a different user interface, such as a menu user interface (e.g., a settings menu), a user interface associated with notifications (e.g., a user interface that displays a summary of notifications), and/or a user interface of an application (e.g., a messaging application, an email application, a calendar application, or a workout application). In some embodiments, request 1625a is a swipe input and/or other input on a different time user interface, such as user interface 1100b in FIG. 11B or user interface 1300b in FIG. 13B. In some embodiments, request 1625a is a predefined movement of at least a portion of computer system 600, such as raising and/or rotating computer system 600 (e.g., a wrist raise gesture).

In response to detecting request 1625a, computer system 600 displays a time user interface, such as user interface 1600b shown in FIG. 16B. In some embodiments, user interface 1600b is displayed in response to movement of computer system 600 (e.g., displayed in response to a wrist raise gesture) while display 602 is in an inactive state or a less active state (e.g., a low power state). In some embodiments, user interface 1600b is a clock face, a watch face, a wake screen, a lock screen, and/or a home screen. As shown in FIG. 16B, user interface 1600b includes an indication of the current time, including first watch hand 1602, second watch hand 1604, third watch hand 1606, and tic marks 1608.

In some embodiments, in accordance with a determination that the indication of time corresponds to a first period of time, such as nighttime, a period of time after an event (e.g., after a user of the computer system leaves work), and/or a period of time after a certain time of day (e.g., after 7 PM), computer system 600 displays a user interface, such as user interface 1600b, including a simulated lighting visual effect. In some embodiments, the first period of time is determined based on a location, such as the geographical location of computer system 600. In some embodiments, the first period of time is determined based on a time of year. In some embodiments, the first period of time is determined based on sunrise and/or sunset times. In some embodiments, the first period of time corresponds to sunrise and/or sunset times at a particular geographical location and/or at a particular time of the year.

FIG. 16B and FIG. 16C illustrate a simulated lighting visual effect in accordance with a determination that the indication of time corresponds to nighttime. In some embodiments, the simulated lighting visual effect is emitted from third watch hand 1606. In some embodiments, third watch hand 1606 represents a seconds hand (e.g., indicating the seconds value of the current time). In some embodiments, the length of third watch hand 1606 is dynamic. For example, FIG. 16B and FIG. 16C illustrate watch hand 1606 at different lengths in order to maintain a constant distance between the end of third watch hand 1606 and the edge of user interface 1600b and 1600c, respectively. In some embodiments, watch hand 1606 extends to the edge of display 602.

In the example shown in FIG. 16B, the simulated lighting visual effect simulates light being emitted from one side of third watch hand 1606, such as the counterclockwise facing edge (e.g., the simulated lighting visual effect is emitted from third watch hand 1606 and is cast in a counterclockwise direction). In some embodiments, third watch hand 1606 appears as a gradient of simulated light, as shown in FIG. 16B. For example, the simulated visual effect is a light and/or bright color at the leading edge of third watch hand 1606 and fades to a darker color (e.g., fading and/or blending into a background of user interface 1600b).

In some embodiments, the simulated lighting visual effect casts simulated light onto one or more virtual elements in user interface 1600b, such as first watch hand 1602 and second watch hand 1604. FIG. 16B illustrates simulated shadows that are cast by first watch hand 1602 and second watch hand 1604 as a result of the simulated light being cast onto first watch hand 1602 and second watch hand 1604 (e.g., the simulated shadows are opposite of the simulated light).

In some embodiments, one or more virtual elements in user interface 1600b exhibit a simulated phosphorescent effect as a result of the simulated lighting visual effect. For example, in FIG. 16B, tic marks 1608 that are in close proximity to the simulated light emitted by third watch hand 1606 and/or that have been recently exposed to the simulated light emitted by third watch hand 1606 emit a simulated glow, as illustrated by tic mark 1608a. In some embodiments, the brightness and/or magnitude of the simulated glow decreases as the proximity to the simulated light emitted by third watch hand 1606 decreases (e.g., tic marks 1608 closer to third watch hand 1606 have a brighter simulated glow and tic marks 1608 farther from watch hand 1606 have dimmer or no simulated glow). In some embodiments, tic marks 1608 that are not in close proximity to the simulated light emitted by third watch hand 1606 and/or that have not been recently exposed to the simulated light emitted by third watch hand 1606 do not emit any simulated glow, as illustrated by tic mark 1608b.

FIG. 16C illustrates user interface 1600c with the simulated lighting visual effect and at a point in time later than that shown in FIG. 16B. As illustrated, the simulated light continues to be emitted from third watch hand 1606; therefore, the simulated lighting visual effect changes position as third watch hand 1606 changes position (e.g., as time progresses). In some embodiments, the appearance of one or more tic marks 1608 changes to emit a simulated glow based on proximity and/or recent exposure to the changed position of the simulated light emitted by third watch hand 1606. For example, FIG. 16C illustrates tic mark 1608a emitting a simulated glow in FIG. 16C based on the change in position of third watch hand 1606, whereas tic mark 1608 shown in the same position in FIG. 16B does not emit a simulated glow. In some embodiments, the appearance of one or more tic marks 1608 changes so as to not emit a simulated glow based on lack of proximity and/or less recent exposure to the changed position of the simulated light emitted by third watch hand 1606. For example, FIG. 16C illustrates tic mark 1608b without emitting a simulated glow based on the change in position of third watch hand 1606, whereas tic mark 1608 shown in the same position in FIG. 16B emits a simulated glow.

In some embodiments, computer system 600 displays a user interface based on a state of computer system 600. In some embodiments, computer system 600 is configured to operate in a reduced-power state that consumes (e.g., on average over time) less energy than other operating states (e.g., the operating state of computer system in FIGS. 16B-16C). In some embodiments, computer system 600 enters a reduced-power state in response to a determination that a user of computer system 600 is inactive and/or is not looking at display 602 (e.g., the user lowers computer system 600 and/or does not interact with display 602 (or another input device of computer system 600) for a threshold amount of time).

Figure 16E:
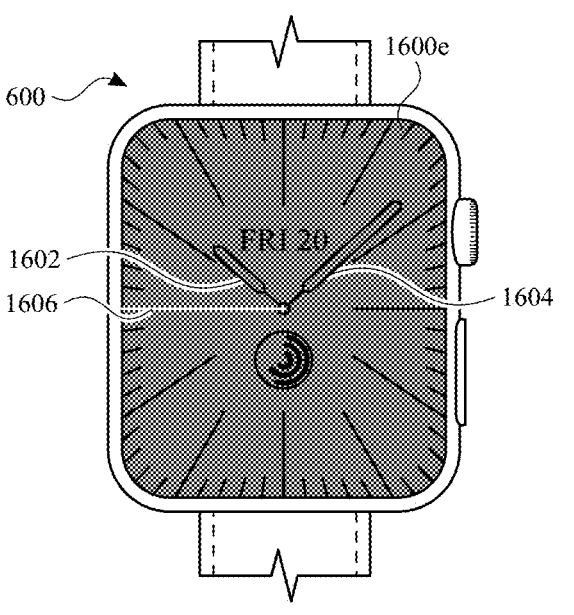
Figure 16F:
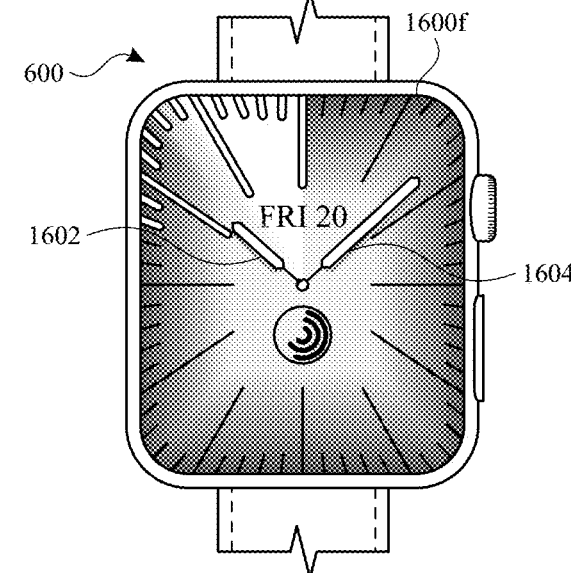

FIGS. 16D-16E illustrate computer system 600 operating in a reduced-power state. In some embodiments, although the indication of time corresponds to the first period of time (e.g., nighttime), computer system 600 displays user interface 1600d without displaying a simulated lighting visual effect when computer system 600 is in the reduced-power state. In some embodiments, third watch hand 1606 appears as a stick watch hand in the reduced-power state, as opposed to with the simulated lighting visual effect in the active or high-power state. FIG. 16E illustrates user interface 1600e in a reduced-power state without the simulated lighting visual effect and at a point in time later than that shown in FIG. 16D.

In some embodiments, user interface 1600d includes a light effect different from the simulated lighting visual effect displayed in FIGS. 16B-16C. For example, user interface 1600d may include a light effect in the background (e.g., a backlight), but third watch hand 1606 does not emit a simulated lighting visual effect (or emits less simulated light), first watch hand 1602 and second watch hand 1604 do not reflect simulated light (or reflect less simulated light), and/or tic marks 1608 do not emit a simulated glow (or emit a less prominent simulated glow).

In some embodiments, while operating in a reduced-power state, such as that shown in FIG. 16E, computer system detects a user input (e.g., the user performs a wrist movement that rotates computer system 600 and/or moves computer system 600 in an upward direction, a tap on display 602, and/or an input with rotatable input mechanism 604). In response to detecting the user input, computer system 600 resumes operation in an active or high-power mode and displays a user interface including a simulated lighting visual effect, such as displaying user interface 1600f shown in FIG. 16F.

Figure 16G:
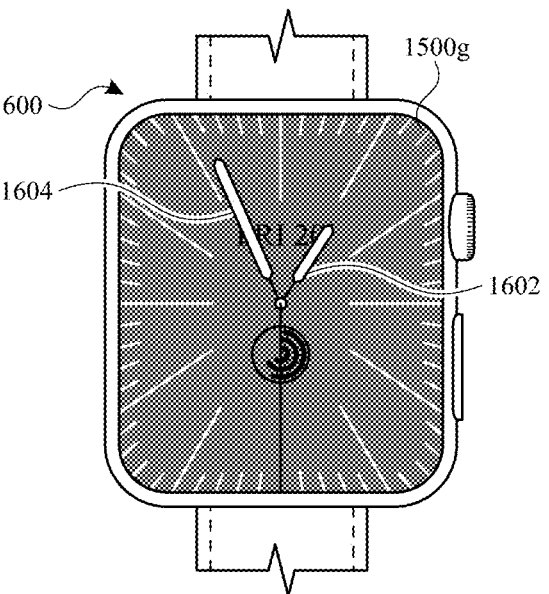

In some embodiments, in accordance with a determination that the indication of time corresponds to a second period of time, such as daytime, computer system 600 displays a user interface, such as user interface 1600g in FIG. 16G, without including a simulated lighting visual effect. In some embodiments, the second period of time is determined based on a location, such as the geographical location of computer system 600. In some embodiments, the second period of time is determined based on a time of year. In some embodiments, the second period of time is determined based on sunrise and/or sunset times. In some embodiments, the second period of time corresponds to sunrise and/or sunset times at a particular geographical location and/or at a particular time of the year.

Figure 16H:
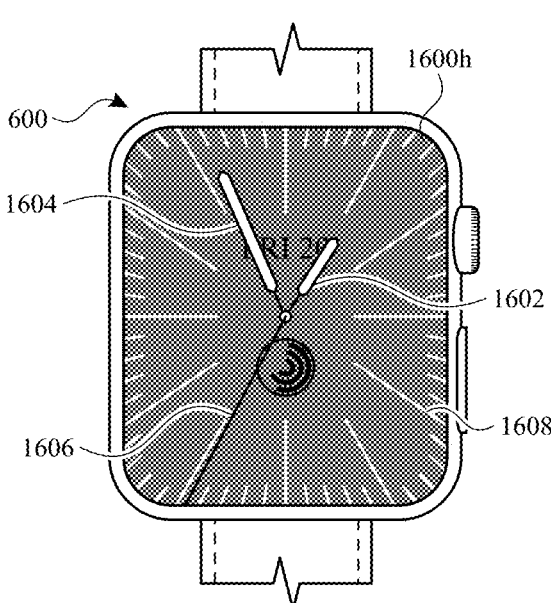
Figure 16I:
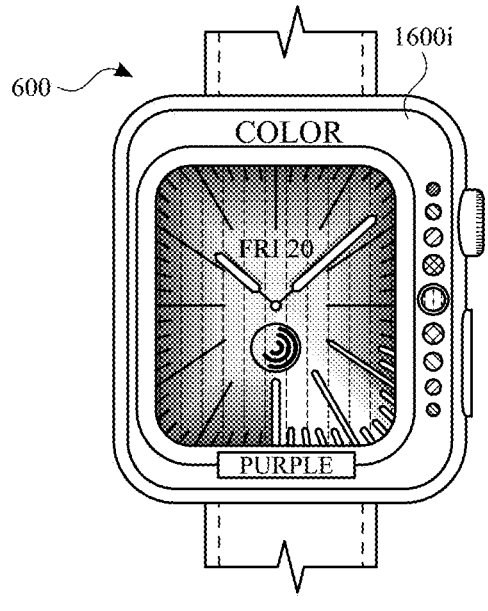

In some embodiments, user interface 1600*g* (e.g., a user interface corresponding to the second period of time) appears in the same manner as user interface 1600*d* (e.g., the user interface corresponding to the reduced-power state). In some embodiments, computer system 600 displays user interface 1600*g* with different colors and/or brightness than as displayed in user interface 1600*d*. For example, as shown in FIG. 16G, tic marks 1608 are a lighter color in user interface 1600*g* than in user interface 1600*d*. In some embodiments, user interface 1600*g* includes a light effect different from the simulated lighting visual effect displayed in FIGS. 16B-16C. For example, user interface 1600*g* may include a light effect in the background (e.g., a backlight), but third watch hand 1606 does not emit a simulated lighting visual effect (or reflects less simulated light), first watch hand 1602 and second watch hand 1604 do not reflect simulated light (or reflect less simulated light), and/or tic marks 1608 do not emit a simulated glow (or emit a less prominent simulated glow). FIG. 16H illustrates user interface 1600*h* in an active and/or high-power state without the simulated lighting visual effect (e.g., a user interface corresponding to the second period of time) and at a point in time later than that shown in FIG. 16G.

In some embodiments, in response to detecting a set of one or more inputs, computer system 600 enters a clock face edit mode. For example, in FIG. 16I, computer system 600 enters a clock face edit mode and displays user interface 1600*i* corresponding to color selection (e.g., a user interface for editing a color of the background and/or a color of the simulated lighting visual effect). In some embodiments, the color of the simulated lighting visual effect is determined based on the color selected for a different element of the user interface, such as the background of the user interface. For example, the color of the simulated lighting visual effect could be the same as the selected background color or a variation of the selected background color (e.g., a different tone and/or shade of the selected background color).

Figure 16J:
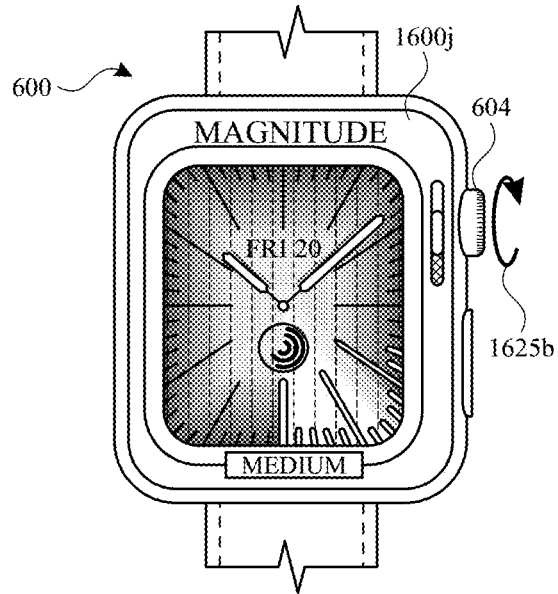
Figure 16K:
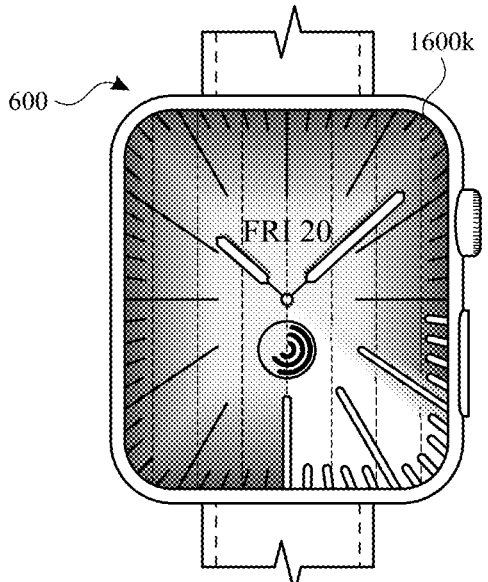
Figure 16L:
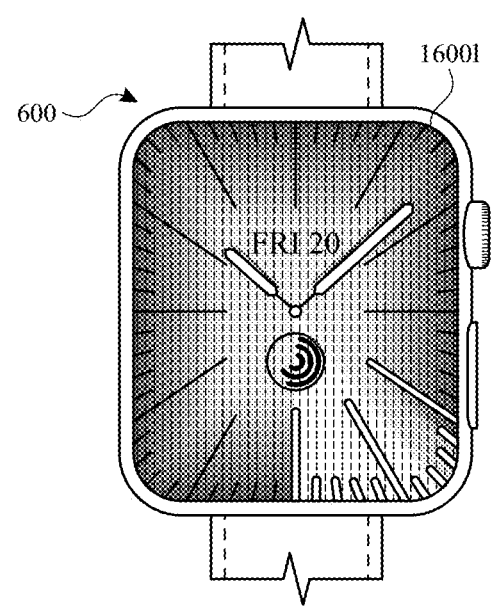

In FIG. 16J, computer system 600 enters a clock face edit mode and displays user interface 1600*j* corresponding to editing a magnitude (e.g., the brightness and/or the size) of the simulated lighting visual effect. In some embodiments, computer system 600 changes the magnitude of the simulated lighting visual effect in response to input 1625*b*, such as rotation of a mechanical or digital rotatable input mechanism. For example, as shown in FIG. 16K, in response to an input increasing the magnitude of the simulated lighting visual effect, computer system 600 displays 1600*k* with a brighter appearance (as indicated by fewer hash marks as compared with FIG. 16L) and a larger area representing the simulated lighting visual effect. On the other hand, as shown in FIG. 16L, in response to an input decreasing the magnitude of the simulated lighting visual effect, computer system 600 displays 1600*l* with a darker appearance (as indicated by more hash marks as compared with FIG. 16K) and a smaller area representing the simulated lighting visual effect.

FIG. 17 is a flow diagram illustrating a method for displaying a user interface including a simulated lighting visual effect using a computer system in accordance with some embodiments. Method 1700 is performed at a computer system (e.g., 100, 300, 500, 600, a smartwatch, a smartphone, a tablet computer, a laptop computer, and/or a desktop computer) that is in communication with a display generation component (e.g., 602, a display controller, a display, a touch-sensitive display system, a touchscreen, and/or a monitor) and one or more input devices (e.g., 602, 604, 606, a touch-sensitive surface, a touchscreen display, a button, a keyboard, a mouse, a joystick, a camera sensor, and/or a microphone). Some operations in method 1700 are, optionally, combined, the orders of some operations are, optionally, changed, and some operations are, optionally, omitted.

As described below, method 1700 provides an intuitive way for displaying a user interface including a simulated lighting visual effect. The method reduces the cognitive burden on a user for displaying a user interface including a simulated lighting visual effect, thereby creating a more efficient human-machine interface. For battery-operated computing devices, enabling a user to display a user interface including a simulated lighting visual effect faster and more efficiently conserves power and increases the time between battery charges.

The computer system receives (1702), via the one or more input devices, a request (e.g., 1625*a*, an input, a raise or rotation gesture, a tap gesture (e.g., on a touch-sensitive surface), a voice command, a button press, and/or a rotation of a rotatable input mechanism) to display a time user interface (e.g., 1600*b* and/or a watch face) that includes an indication of time (e.g., an indication of the current time, such as a digital indication and/or one or more watch hands). In some embodiments, the request to display the user interface is received while the display generation component is in a locked state, an inactive state, a low-power state, a sleep state, and/or a dimmed state. In some embodiments, the request to display the user interface is received while the display generation component is displaying a home screen or springboard user interface (e.g., a user interface that includes a plurality of selectable objects for launching respective applications). In some embodiments, the request to display the user interface is received while the display generation component is displaying a wake screen, a lock screen, a user interface of an application (e.g., a music application, email application, or messaging application), and/or a user interface other than a clock face user interface. In some embodiments, the request to display the user interface is received while the display generation component is displaying a user interface (e.g., a clock face user interface) in a first state (e.g., in a locked state, an inactive state, a low-power state, a sleep state, and/or a dimmed state). In some embodiments, the request to display the user interface is received while the display generation component is displaying a different clock face user interface (e.g., a clock face user interface other than the clock face user interface in FIGS. 15B-15L). In some embodiments, the request to display the user interface is received while the display generation component is displaying a user interface associated with notifications (e.g., a user interface that displays a summary or list of notifications and/or concurrently displays two or more notifications).

In some embodiments, in response to receiving the request to display the time user interface (1704), in accordance with a determination that the indication of time (or, in some embodiments, in accordance with the current and/or local time of the computer system) corresponds to a first period of time (e.g., the current time corresponds to nighttime and/or a predetermined period of time, such as from 6

PM to 5 AM or from sunrise to sunrise at the current location), the computer system displays (1706), via the display generation component, the time user interface with a simulated lighting visual effect that simulates light being cast onto one or more virtual elements in the time user interface (e.g., the appearance of light being cast onto and/or emitted from one or more features of the time user interface, such as a clock hand and/or a background of the time user interface, such as shown in user interface 1600b and 1600c). In some embodiments, in response to receiving the request to display the time user interface (1704), in accordance with a determination that the indication of time corresponds to a second period of time (e.g., the current time corresponds to daytime and/or a predetermined period of time, such as from 5 AM to 6 PM or from sunrise to sunset at the current location), the computer system displays (1708), via the display generation component, the time user interface without the simulated lighting visual effect that simulates light being cast onto one or more virtual elements in the time user interface. Displaying the time user interface with a simulated lighting visual effect in accordance with a determination that the indication of time corresponds to a first period of time and displaying the time user interface without a simulated lighting visual effect in accordance with a determination that the indication of time corresponds to a second period of time reduces the number of inputs required to display the time user interface with a simulated lighting visual effect, thereby performing an operation when a set of conditions has been met without requiring further user input. Displaying the time user interface with a simulated lighting visual effect in accordance with a determination that the indication of time corresponds to a first period of time and displaying the time user interface without a simulated lighting visual effect in accordance with a determination that the indication of time corresponds to a second period of time provides a user with feedback regarding the time, thereby providing the user with improved visual feedback.

In some embodiments, the first period of time (e.g., the period of time when the simulated lighting visual effect is displayed) corresponds to nighttime (or, in some embodiments, based on the current geographic location of the computer system and/or the current time of year). In some embodiments, the simulated lighting visual effect is only displayed at night and is not displayed during the day. Displaying the time user interface with a simulated lighting visual effect in accordance with a determination that the indication of time corresponds to nighttime provides a user with feedback regarding the time of day, thereby providing the user with improved visual feedback.

In some embodiments, the first period of time (e.g., the period of time when the simulated lighting visual effect is displayed) is based on location (e.g., the start time and/or end time of the first period of time changes based on a current location and/or a predetermined location of the computer system). In some embodiments, the start time and/or end time of the first period of time is based on and/or correspond to sunrise and/or sunset times. In some embodiments, in accordance with a determination that the computer system is in a first location, the first period of time is a first respective period of time (e.g., 5 PM to 4 AM); and in accordance with a determination the computer system is in a second location, different from the first location, the first period of time is a second respective period of time (e.g., 6 PM to 5 AM). In some embodiments, the first period of time is determined in accordance with a determination that a first location has been selected (e.g., selected by a user or selected based on proximity to a location of the computer system). Determining the first period of time based on location reduces the number of inputs required to display the time user interface with a simulated lighting visual effect, thereby performing an operation when a set of conditions has been met without requiring further user input.

In some embodiments, the first period of time (e.g., the period of time when the simulated lighting visual effect is displayed) is based on the time of year (e.g., the start time and/or end time of the first period of time changes throughout the year). In some embodiments, the start time and/or end time of the first period of time is based on and/or correspond to sunrise and/or sunset times. In some embodiments, in accordance with a determination that the current time of year is a first time of year, the first period of time begins at a first respective time (e.g., 5 PM which corresponds to sunset on a first day of the year); and in accordance with a determination the current time of year is a second time of year, different from the first time of year, the first period of time begins at a second respective time (e.g., 6 PM which corresponds to sunset on a second day of the year). Determining the first period of time based on a time of year reduces the number of inputs required to display the time user interface with a simulated lighting visual effect, thereby performing an operation when a set of conditions has been met without requiring further user input.

In some embodiments, the indication of time includes a first watch hand (e.g., 1606), wherein a length of the first watch hand is dynamic (e.g., the length of the first watch hand changes over time as the watch hand moves, such as shown in FIGS. 16B-16H). In some embodiments, in accordance with a determination that the first watch hand is in a first position, the first watch hand is a first length; and in accordance with a determination that the first watch hand is in a second position, the first watch hand is a second length. Displaying the indication of time including a first watch hand that changes length dynamically allows for the watch hand to maintain a constant distance from the edge of the user interface and simplifies the user interface, thereby providing the user with improved visual feedback.

In some embodiments, the first watch hand (e.g., 1606 and/or the watch hand that changes length) is a seconds hand (e.g., a hand that indicates the value of seconds of the current time). Displaying the indication of time including a seconds hand that changes length dynamically allows for the seconds hand to maintain a constant distance from the edge of the user interface and simplifies the user interface, thereby providing the user with improved visual feedback.

In some embodiments, the length of the first watch hand changes (e.g., changes over time), such that an end of the first watch hand (e.g., 1606) maintains a constant distance (e.g., 0, 0.1, 0.2, 0.3, 0.5, 1, or 2 mm) from an edge of the user interface (e.g., 1600b-1600h) (e.g., the seconds hand changes length in order to maintain a constant distance from the edge of the user interface). In some embodiments, the first watch hand changes length in order to maintain a constant distance from the edge of the display generation component. In some embodiments, the edge of the user interface is a constant distance from the edge of the display generation component. Changing the length of the first watch hand so the watch hand maintains a constant distance from the edge of the user interface simplifies the user interface, thereby providing the user with improved visual feedback.

In some embodiments, the first watch hand (e.g., 1606) emits the simulated lighting visual effect (e.g., a simulated light is emitted from the first watch hand, such as shown in FIGS. 16B and 16C). In some embodiments, the first watch hand emits simulated lighting visual effect in a particular direction (e.g., counterclockwise direction), and the simulated lighting visual effect casts simulated light onto features of the time user interface in that direction (e.g., in the counterclockwise direction) and causes those features to cast simulated shadows. Displaying the first watch hand as emitting a simulated light visual effect visually emphasizes the first watch hand, thereby providing the user with improved visual feedback.

In some embodiments, the computer system displays the simulated lighting visual effect with a first magnitude (e.g., as shown in FIG. 16K). In some embodiments, the computer system receives, via the one or more input devices, a set of one or more inputs (e.g., 1625*b*). In some embodiments, the set of one or more inputs includes rotation of a crown (e.g., a mechanical or digital rotatable input mechanism). In some embodiments, in response to receiving the set of one or more inputs, the computer system displays the simulated lighting visual effect with a second magnitude (e.g., as shown in FIG. 16L) that is different than the first magnitude (e.g., a greater magnitude or a lesser magnitude than the first magnitude). In some embodiments, the second magnitude of the simulated lighting visual effect has a different brightness than the first magnitude (e.g., the second magnitude is more or less bright than the first magnitude). In some embodiments, the second magnitude of the simulated lighting visual effect has a different spatial extent than the first magnitude (e.g., the second magnitude is larger or smaller than the first magnitude). In some embodiments, in response to receiving the set of one or more inputs, in accordance with a determination that the set of one or more inputs includes a first amount of rotation, the computer system changes the magnitude of the simulated lighting visual effect by a respective amount; and in accordance with a determination that the set of one or more inputs includes rotation of an input device in a first direction, the computer system changes the magnitude of simulated lighting visual effect in a respective direction. In some embodiments, in response to receiving the set of one or more inputs, in accordance with a determination that the set of one or more inputs includes rotation of an input mechanism in a clockwise direction, the computer system increases the magnitude and/or the extent of the simulated lighting visual effect, such that the simulated lighting visual effect extends further in the counterclockwise direction. In some embodiments, in response to receiving the set of one or more inputs, in accordance with a determination that the set of one or more inputs includes rotation of an input mechanism in a counterclockwise direction, the computer system decreases the magnitude and/or extent of the simulated lighting visual effect (e.g., the simulated lighting visual effect extends less far in the clockwise direction). Displaying the simulated lighting visual effect with a second magnitude that is different from a first magnitude in response to receiving a set of one or more inputs provides improved feedback and allows a user to select the manner in which the time user interface is displayed.

In some embodiments, while displaying the time user interface with the simulated lighting visual effect, the computer system receives, via the one or more input devices, a first input (e.g., a swipe to the right and/or a swipe to the left). In some embodiments, the time user interface is in a standard mode when it includes the simulated lighting visual effect. In some embodiments, in response to receiving the first input, the computer system displays the time user interface without the simulated lighting visual effect (e.g., 1600*d* or 1600*e*) (e.g., displaying the time user interface in a low power mode and/or a power conserving mode). In some embodiments, in a low power mode, there is a light effect in the background (e.g., backlight), but a watch hand does not emit and/or reflect simulated light. In some embodiments, the overall (e.g., cumulative) brightness of the time user interface in the standard mode is greater than the overall brightness of the time user interface in the low light mode. In some embodiments, one or more graphical elements are different (e.g., displayed in a modified form or not displayed at all), as between the standard mode and the low light mode. Displaying the time user interface without the simulated lighting visual effect in response to receiving a first input provides improved feedback and allows a user to select the manner in which the time user interface is displayed.

In some embodiments, one or more features of the time user interface (e.g., 1602, 1604, 1608, one or more watch hands, and/or one or more tic marks) block the simulated lighting visual effect (e.g., the one or more features of the time user interface cast simulated shadows). Displaying the time user interface including one or more features that block the simulated lighting visual effect visually emphasizes the one or more features of the time user interface, thereby providing the user with improved visual feedback.

In some embodiments, the time user interface includes a user interface element (e.g., a background) having a first color (e.g., orange). In some embodiments, the computer system displays the time user interface including the simulated lighting visual effect, wherein the simulated lighting visual effect is a color that is based on the first color. In some embodiments, the color that is based on the first color is the same as the first color. In some embodiments, the color that is based on the first color is a different shade and/or tone than the first color. In some embodiments, displaying the time user interface including the simulated lighting visual effect includes, in accordance with a determination that the first color is selected for the user interface element, the computer system displays the simulated lighting visual effect having a color that is based on the first color and in accordance with a determination that a second color is selected for the user interface element, the computer system displays the simulated lighting visual effect having a color that is based on the second color. In some embodiments, the computer system receives, via the one or more input devices, a second set of one or more inputs (e.g., one or more inputs in a settings menu, such as that shown in FIG. 16I) for changing the user interface element to a second color (e.g., purple). In some embodiments, in response to receiving the second set of one or more inputs, the computer system displays the time user interface including the simulated lighting visual effect, wherein the simulated lighting visual effect is a color that is based on the second color. In some embodiments, the color that is based on the second color is the same as the second color. In some embodiments, the color that is based on the second color is a different shade and/or tone than the second color. In some embodiments, the color of the simulated lighting visual effect is determined based on a color selected for an element of the time user interface, such as the color selected for the background of the time user interface. Displaying the time user interface including a simulated lighting visual effect having a second color in response to receiving the second set of one or more inputs provides improved feedback and allows a user to select the manner in which the time user interface is displayed.

In some embodiments, the user interface element is a background of the time user interface and a color of the simulated lighting visual effect is determined based on a color selected for the background of the time user interface. In some embodiments, the computer system displays an editing mode, wherein the editing mode enables a user to select and/or modify the color of the background of the time user interface. In some embodiments, the editing mode enables a user to select and/or modify one or more other characteristics of the time user interface, such as a number of tic marks displayed (e.g., 4, 12, or 60 tic marks), how many complications are displayed, which complications are displayed, and a language used (e.g., the language in which the date is displayed). Displaying the time user interface without the simulated lighting visual effect in response to receiving a first input provides improved feedback and allows a user to select the manner in which the time user interface is displayed.

In some embodiments, the simulated lighting visual effect is emitted from one side of a respective watch hand (e.g., 1606 and/or the seconds hand) without being emitted from at least one other side of the respective watch hand. In some embodiments, the simulated lighting visual effect is emitted from one side of the first watch hand and is not emitted from the other side of the first watch hand In some embodiments, the first watch hand emits simulated lighting visual effect in a particular direction, such as the counterclockwise direction. Displaying the time user interface including a simulated lighting visual effect emitted from one side of a first watch hand emphasizes the first watch hand, thereby providing the user with improved visual feedback.

In some embodiments, the time user interface includes a plurality of tic marks (e.g., 1608 and/or 60 tic marks representing 60 seconds in a minute) and wherein one or more tic marks of the plurality of tic marks emit a simulated glow (e.g., 1608a) (e.g., simulated light and/or a simulated phosphorescent effect). In some embodiments, the one or more tic marks emit a simulated glow based on proximity to the simulated lighting visual effect (e.g., a simulated reflection of light). In some embodiments, the one or more tic marks emit a simulated glow based on recent exposure to the watch hand emitting the simulated lighting visual effect (e.g., a simulated phosphorescent effect). Displaying the time user interface including displaying tic marks that emit a simulated glow visually emphasizes the one or more features of the time user interface, thereby providing the user with improved visual feedback.

In some embodiments, the time user interface includes a second watch hand (e.g., 1606 and/or the seconds hand) that emits the simulated lighting visual effect and a third watch hand (e.g., 1602 and/or the hour hand) that emits a simulated glow that is different from the simulated lighting visual effect emitted from the second watch hand In some embodiments, a fourth watch hand (e.g., the minute hand) emits a simulated glow. In some embodiments, the third watch hand and/or the fourth watch hand emit a simulated glow based on proximity to the simulated lighting visual effect (e.g., a simulated reflection of light). In some embodiments, third watch hand and/or the fourth watch hand emit a simulated glow based on recent exposure to the watch hand emitting the simulated lighting visual effect (e.g., a simulated phosphorescent effect). In some embodiments, the background emits a light and, as a result, the second watch hand and/or the third watch hand are backlit. Displaying the time user interface including watch hands that emit a simulated backlight visually emphasizes the one or more features of the time user interface, thereby providing the user with improved visual feedback.

Note that details of the processes described above with respect to method 1700 (e.g., FIG. 17) are also applicable in an analogous manner to the methods described above. For example, methods 700, 800, 1000, 1200, and/or 1700 optionally include one or more of the characteristics of the various methods described above with reference to method 1700. For example, the user interface in method 1700 can display a user interface including a simulated lighting visual effect as described in method 1700.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

One aspect of the present technology is the gathering and use of data available from various sources to display user interfaces that indicate time. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to display user interfaces that indicate time. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of displaying user interfaces that indicate time, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, user interfaces that indicate time can be displayed based on non-personal information data or a bare minimum amount of personal information, such as content being requested by the device associated with a user, other non-personal information available to the computer system, or publicly available information.

What is claimed is:

1. A computer system configured to communicate with a display generation component and one or more input devices, the computer system comprising:
one or more processors; and
memory storing one or more programs configured to be executed by the one or more processors, the one or more programs including instructions for:
detecting, via the one or more input devices, a first request to display a user interface;

in response to detecting the first request to display the user interface, displaying, via the display generation component, the user interface, including displaying:
an indication of time indicating a first time, wherein the indication of time includes one or more clock hands including a first clock hand indicating the first time, wherein displaying the first clock hand indicating the first time includes displaying the first clock hand at a first position in the user interface; and
a first animation of a first character, wherein the first character is separate from the first clock hand and wherein, in the first animation, the first character is animated to show a first interaction between the first character and the first clock hand at the first position;
after displaying the user interface in response to detecting the first request to display the user interface, detecting, via the one or more input devices, a second request to display the user interface; and
in response to detecting the second request to display the user interface, displaying the user interface, including displaying:
the indication of time, including the first clock hand indicating a second time that is different from the first time, wherein displaying the first clock hand indicating the second time includes displaying the first clock hand at a second position in the user interface that is different from the first position; and
a second animation of the first character that is different from the first animation, wherein, in the second animation, the first character is animated to show a second interaction between the first character and the first clock hand at the second position that is different from the first interaction between the first character and the first clock hand at the first position.

2. The computer system of claim 1, wherein the first interaction includes the first character leaning on the first clock hand.

3. The computer system of claim 1, wherein the first interaction includes the first character sitting on the first clock hand.

4. The computer system of claim 1, wherein the first interaction includes an element on top of the first clock hand.

5. The computer system of claim 1, wherein displaying the first animation of the first character includes displaying an animation that includes at least a portion of the first character moving over time.

6. The computer system of claim 1, the one or more programs further including instructions for:
displaying, concurrently with the indication of time and the first character, a second character that is different from the first character.

7. The computer system of claim 6, wherein displaying the second character includes displaying an animation of at least a portion of the second character moving over time.

8. The computer system of claim 1, wherein detecting the first request to display the user interface includes detecting the first request while the computer system is in a reduced-power state.

9. The computer system of claim 1, the one or more programs further including instructions for:
displaying, concurrently with the first clock hand, a weather element that is based on a current weather condition, wherein displaying the weather element includes displaying the weather element interacting with the first clock hand.

10. The computer system of claim 1, the one or more programs further including instructions for:

displaying, concurrently with the first clock hand, a seasonal element that is based on a current season, wherein displaying the seasonal element includes displaying the seasonal element interacting with the first clock hand.

11. The computer system of claim 1, wherein:

displaying the user interface includes displaying the user interface with one or more appearances other than the indication of time and the first character.

12. The computer system of claim 11, wherein displaying the user interface with the one or more appearances includes:

in accordance with a determination that a current time corresponds to a first time of day, displaying the user interface with a first time-based appearance other than the indication of time and the first character; and in accordance with a determination that the current time of day corresponds to a second time of day that is different from the first time of day, displaying the user interface with a second time-based appearance other than the indication of time and the first character, wherein the second time-based appearance is different from the first time-based appearance.

13. The computer system of claim 11, wherein displaying the user interface with the one or more appearances includes:

in accordance with a determination that a current date corresponds to a first season, displaying the user interface with a first season-based appearance other than the indication of time and the first character; and in accordance with a determination that the current date corresponds to a second season that is different from the first season, displaying the user interface with a second season-based appearance other than the indication of time and the first character, wherein the second season-based appearance is different from the first season-based appearance.

14. The computer system of claim 11, wherein displaying the user interface with the one or more appearances includes:

in accordance with a determination that a current date corresponds to a first event, displaying the user interface with a first event-based appearance other than the indication of time and the first character; and in accordance with a determination that the current date corresponds to a second event that is different from the first event, displaying the user interface with a second event-based appearance other than the indication of time and the first character, wherein the second event-based appearance is different from the first event-based appearance.

15. The computer system of claim 11, wherein displaying the user interface with the one or more appearances includes:

in accordance with a determination that a current day corresponds to a first day of a week, displaying the user interface with a first day-based appearance other than the indication of time and the first character; and in accordance with a determination that the current day corresponds to a second day of the week that is different from the first day of the week, displaying the user interface with a second day-based appearance other than the indication of time and the first character, wherein the second day-based appearance is different from the first day-based appearance.

16. The computer system of claim 11, wherein displaying the user interface with the one or more appearances includes:

in accordance with a determination that a first activity is being performed, displaying the user interface with a first activity-based appearance other than the indication of time and the first character; and in accordance with a determination that a second activity is being performed that is different from the first activity, displaying the user interface with a second activity-based appearance other than the indication of time and the first character, wherein the second activity-based appearance is different from the first activity-based appearance.

17. The computer system of claim 1, wherein detecting the first request to display the user interface includes detecting the first request while displaying the first character in a state that is different from the first animation and the second animation.

18. The computer system of claim 1, the one or more programs further including instructions for:

in accordance with a determination that the computer system is in a reduced-power state, displaying the first character in a respective state.

19. The computer system of claim 1, the one or more programs further including instructions for:

in response to detecting the first request to display the user interface, displaying an indication of a date at a third position in the user interface, wherein the third position in the user interface at which the indication of a date is displayed is based on the first animation of the first character.

20. A non-transitory computer-readable storage medium storing one or more programs configured to be executed by one or more processors of a computer system that is in communication with a display generation component and one or more input devices, the one or more programs including instructions for:

detecting, via the one or more input devices, a first request to display a user interface;

in response to detecting the first request to display the user interface, displaying, via the display generation component, the user interface, including displaying:

an indication of time indicating a first time, wherein the indication of time includes one or more clock hands including a first clock hand indicating the first time, wherein displaying the first clock hand indicating the first time includes displaying the first clock hand at a first position in the user interface; and a first animation of a first character, wherein the first character is separate from the first clock hand and wherein, in the first animation, the first character is animated to show a first interaction between the first character and the first clock hand at the first position;

after displaying the user interface in response to detecting the first request to display the user interface, detecting, via the one or more input devices, a second request to display the user interface; and in response to detecting the second request to display the user interface, displaying the user interface, including displaying:

the indication of time, including the first clock hand indicating a second time that is different from the first time, wherein displaying the first clock hand indicating the second time includes displaying the first clock hand at a second position in the user interface that is different from the first position; and a second animation of the first character that is different from the first animation, wherein, in the second animation, the first character is animated to show a second interaction between the first character and the first clock hand at the second position that is different from the first interaction between the first character and the first clock hand at the first position.

21. The non-transitory computer-readable storage medium of claim 20, the one or more programs further including instructions for:

displaying, concurrently with the first clock hand, a weather element that is based on a current weather condition, wherein displaying the weather element includes displaying the weather element interacting with the first clock hand.

22. The non-transitory computer-readable storage medium of claim 20, the one or more programs further including instructions for:

displaying, concurrently with the first clock hand, a seasonal element that is based on a current season, wherein displaying the seasonal element includes displaying the seasonal element interacting with the first clock hand.

23. The non-transitory computer-readable storage medium of claim 20, wherein:

displaying the user interface includes displaying the user interface with one or more appearances other than the indication of time and the first character.

24. The non-transitory computer-readable storage medium of claim 23, wherein displaying the user interface with the one or more appearances includes:

in accordance with a determination that a current time corresponds to a first time of day, displaying the user interface with a first time-based appearance other than the indication of time and the first character; and in accordance with a determination that the current time of day corresponds to a second time of day that is different from the first time of day, displaying the user interface with a second time- based appearance other than the indication of time and the first character, wherein the second time- based appearance is different from the first time-based appearance.

25. The non-transitory computer-readable storage medium of claim 23, wherein displaying the user interface with the one or more appearances includes:

in accordance with a determination that a current date corresponds to a first season, displaying the user interface with a first season-based appearance other than the indication of time and the first character; and in accordance with a determination that the current date corresponds to a second season that is different from the first season, displaying the user interface with a second season-based appearance other than the indication of time and the first character, wherein the second season-based appearance is different from the first season-based appearance.

26. The non-transitory computer-readable storage medium of claim 23, wherein displaying the user interface with the one or more appearances includes:

in accordance with a determination that a current date corresponds to a first event, displaying the user interface with a first event-based appearance other than the indication of time and the first character; and in accordance with a determination that the current date corresponds to a second event that is different from the first event, displaying the user interface with a second event-based appearance other than the indication of time and the first character, wherein the second event-based appearance is different from the first event-based appearance.

27. The non-transitory computer-readable storage medium of claim 23, wherein displaying the user interface with the one or more appearances includes:

in accordance with a determination that a current day corresponds to a first day of a week, displaying the user interface with a first day-based appearance other than the indication of time and the first character; and in accordance with a determination that the current day corresponds to a second day of the week that is different from the first day of the week, displaying the user interface with a second day- based appearance other than the indication of time and the first character, wherein the second day- based appearance is different from the first day-based appearance.

28. The non-transitory computer-readable storage medium of claim 23, wherein displaying the user interface with the one or more appearances includes:

in accordance with a determination that a first activity is being performed, displaying the user interface with a first activity-based appearance other than the indication of time and the first character; and in accordance with a determination that a second activity is being performed that is different from the first activity, displaying the user interface with a second activity-based appearance other than the indication of time and the first character, wherein the second activity-based appearance is different from the first activity-based appearance.

29. A method, comprising:

at a computer system that is in communication with a display generation component and one or more input devices:

detecting, via the one or more input devices, a first request to display a user interface;

in response to detecting the first request to display the user interface, displaying, via the display generation component, the user interface, including displaying:

an indication of time indicating a first time, wherein the indication of time includes one or more clock hands including a first clock hand indicating the first time, wherein displaying the first clock hand indicating the first time includes displaying the first clock hand at a first position in the user interface; and a first animation of a first character, wherein the first character is separate from the first clock hand and wherein, in the first animation, the first character is animated to show a first interaction between the first character and the first clock hand at the first position;

after displaying the user interface in response to detecting the first request to display the user interface, detecting, via the one or more input devices, a second request to display the user interface; and in response to detecting the second request to display the user interface, displaying the user interface, including displaying:

the indication of time, including the first clock hand indicating a second time that is different from the first time, wherein displaying the first clock hand indicating the second time includes displaying the first clock hand at a second position in the user interface that is different from the first position; and a second animation of the first character that is different from the first animation, wherein, in the second animation, the first character is animated to show a second interaction between the first character and the first clock hand at the second position that is different from the first interaction between the first character and the first clock hand at the first position.

30. The method of claim 29, further comprising:

displaying, concurrently with the first clock hand, a weather element that is based on a current weather condition, wherein displaying the weather element includes displaying the weather element interacting with the first clock hand.

31. The method of claim 29, further comprising:

displaying, concurrently with the first clock hand, a seasonal element that is based on a current season, wherein displaying the seasonal element includes displaying the seasonal element interacting with the first clock hand.

32. The method of claim 29, wherein:

displaying the user interface includes displaying the user interface with one or more appearances other than the indication of time and the first character.

33. The method of claim 32, wherein displaying the user interface with the one or more appearances includes:

in accordance with a determination that a current time corresponds to a first time of day, displaying the user interface with a first time-based appearance other than the indication of time and the first character; and in accordance with a determination that the current time of day corresponds to a second time of day that is different from the first time of day, displaying the user interface with a second time- based appearance other than the indication of time and the first character, wherein the second time- based appearance is different from the first time-based appearance.

34. The method of claim 32, wherein displaying the user interface with the one or more appearances includes:

in accordance with a determination that a current date corresponds to a first season, displaying the user interface with a first season-based appearance other than the indication of time and the first character; and in accordance with a determination that the current date corresponds to a second season that is different from the first season, displaying the user interface with a second season-based appearance other than the indication of time and the first character, wherein the second season-based appearance is different from the first season-based appearance.

35. The method of claim 32, wherein displaying the user interface with the one or more appearances includes:

in accordance with a determination that a current date corresponds to a first event, displaying the user interface with a first event-based appearance other than the indication of time and the first character; and in accordance with a determination that the current date corresponds to a second event that is different from the first event, displaying the user interface with a second event-based appearance other than the indication of time and the first character, wherein the second event-based appearance is different from the first event-based appearance.

36. The method of claim 32, wherein displaying the user interface with the one or more appearances includes:

in accordance with a determination that a current day corresponds to a first day of a week, displaying the user interface with a first day-based appearance other than the indication of time and the first character; and in accordance with a determination that the current day corresponds to a second day of the week that is different from the first day of the week, displaying the user interface with a second day- based appearance other than the indication of time and the first character, wherein the second day- based appearance is different from the first day-based appearance.

37. The method of claim 32, wherein displaying the user interface with the one or more appearances includes:

in accordance with a determination that a first activity is being performed, displaying the user interface with a first activity-based appearance other than the indication of time and the first character; and in accordance with a determination that a second activity is being performed that is different from the first activity, displaying the user interface with a second activity-based appearance other than the indication of time and the first character, wherein the second activity-based appearance is different from the first activity-based appearance.

* * * * *